United States Patent [19]

Newman et al.

[11] Patent Number: 5,313,615
[45] Date of Patent: May 17, 1994

[54] BLOCK DIAGRAM SIMULATOR USING A LIBRARY FOR GENERATION OF A COMPUTER PROGRAM

[75] Inventors: William C. Newman, San Bruno; Paul F. Titchener; Douglas B. Powell, both of San Francisco, all of Calif.

[73] Assignee: Comdisco Systems, Inc., Foster City, Calif.

[21] Appl. No.: 514,725

[22] Filed: Apr. 26, 1990

Related U.S. Application Data

[63] Continuation of Ser. No. 173,771, Mar. 23, 1988, abandoned, which is a continuation-in-part of Ser. No. 65,372, Jun. 22, 1987, abandoned.

[51] Int. Cl.$^5$ .................... G06F 5/40; G06F 9/455
[52] U.S. Cl. .................... 395/500; 395/700
[58] Field of Search ... 364/200 MS File, 900 MS File, 364/DIG. 1, DIG. 2; 395/500, 600, 700

[56] References Cited

U.S. PATENT DOCUMENTS

| 3,971,000 | 7/1976 | Cromwell . |
| 4,315,315 | 2/1982 | Kossiakoff . |
| 4,385,367 | 5/1983 | Nakao et al. . |
| 4,455,619 | 6/1984 | Masui et al. . |
| 4,546,435 | 10/1985 | Herbert et al. . |
| 4,570,217 | 2/1986 | Allen et al. . |
| 4,615,011 | 9/1986 | Linsker . |
| 4,677,587 | 6/1987 | Zemany, Jr. . |
| 4,725,975 | 2/1988 | Sasahi .................... 364/900 |

OTHER PUBLICATIONS

"Grafcet as a description and simulation tool at the functional level in cad system*," Diane Boucher et al., 1984.
"Designscope," BrainPower, Inc. (USA), Apr. 1986.
"Graphical Function Chart Programming For Programmable Controllers," *Control Engineering*, Oct. 1985.
"The Time-Sequenced Adaptive Filter," Earl R. Ferrara, Jr. et al. (IEEE) 1981.
"Block-Oriented Systems Simulator (Boss)", K. Sam Shanmugan, et al., (IEEE) 1986.
Desoer et al., *Basic Circuit Theory* (1969), p. 508.
Kopec, "The Signal Representation Language SRL," *IEEE Transactions of Acoustics Speech and Signal Processing*, vol. ASSP-33, No. 4 (1985).
Kopec, "The Integrated Signal Processing System ISP," *IEEE Transactions on Acoustics, Speech, and Signal Processing*, vol. ASSP-32, No. 4 (1984).

(List continued on next page.)

*Primary Examiner*—David Y. Eng
*Attorney, Agent, or Firm*—Christie, Parker & Hale

[57] ABSTRACT

Method for ordering computer software procedures in an order using a computing machine for modeling each of multiple blocks of a block diagram. The block diagram is capable of having at least one feedback loop. Each block corresponds to a software procedure for performing at least one function and has at least one input or at least one output. The block diagram has interconnections between such inputs and outputs of such blocks forming a block diagram. A list of inputs for each of such blocks is generated; a list of outputs for each of such blocks is generated; a feed-through list for each of at least some of such outputs of such blocks is generated. Each feed-through list has a list of any input which directly affects the output of the same block. The input, output and feed-through lists are machine processed for ordering of such procedures in the order during modeling.

35 Claims, 78 Drawing Sheets

OTHER PUBLICATIONS

Guernic, et al., "Signal-A Data Flow-Oriented Language for Signal Processing," *IEEE Transactions of Acoustics, Speech, and Signal Processing*, vol. ASSP-34, No. 2 (1986).

Fashano, M., "Communication System Simulation and Analysis with Systid", *IEEE Journal on Selected Areas in Communications*, vol. SAC-2, No. 1, pp. 8-29, Jan. 1984.

Messerschmitt, D. G., "A Tool for Structured Functional Simulation", *IEEE Journal on Selected Areas in Communications*, vol. SAC-2, No. 1, pp. 137-147, Jan. 1984.

Messerschmitt, D. G., "Blosim-A Block Simulator", pp. 1-48, Jun. 7, 1982.

Modestino, J. W. et al. "Interactive Simulation of Digital Communication Systems", *IEEE Journal on Selected Areas in Communications*, vol. SAC-2, No. 1, pp. 51-75, Jan. 1984.

Poza, H. B. et al., "A Wideband Data Link Computer Simulation Model", *Computers and Electrical Engineering*, vol. 5, No. 2, pp. 135-149, Jun. 1978.

Shanmugan, K. S. et al., "Computer-Aided Modeling, Analysis and Design of Communication System-Introduction and Overview", *IEEE Journal on Selected Areas in Communications*, vol. SAC-2, No. 1, pp. 1-8, Jan. 1984.

University of Kansas and TRW, "BOSS (Block Oriented Systems Simulator) User's Manual, BOSS Version: Star 1.1", 1986.

Wade, W. D. et al., "Interactive Communication Systems Simulation Model-ICSSM", *IEEE Journal on Selected Areas in Communications*, vol. SAC-2, No. 1, pp. 102-128, Jan. 1984.

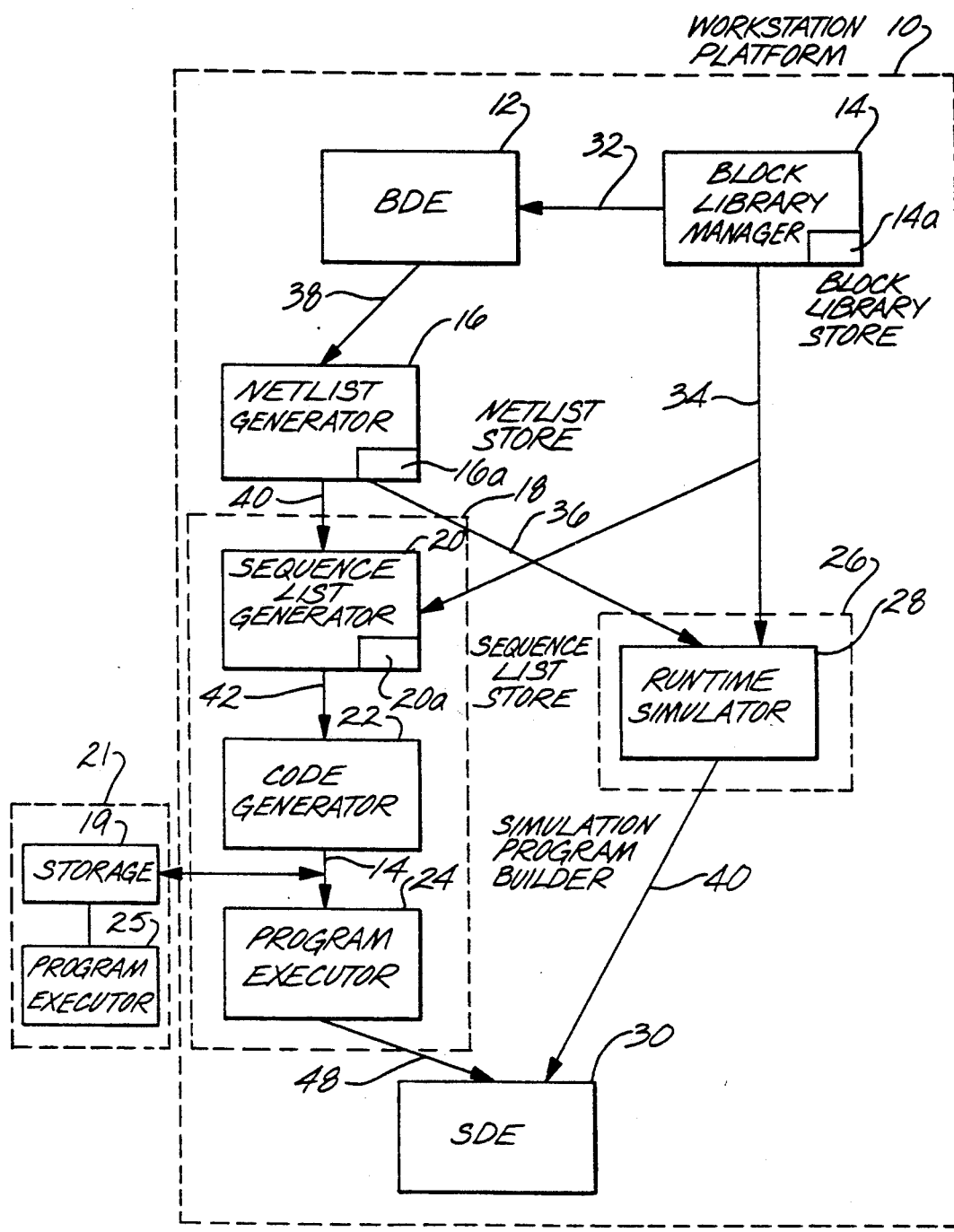

Fig. 3A

NETLIST

| | Block Type | Instance Number | Inputs | Outputs |
|---|---|---|---|---|
| 2040 | Source | 64 | None | $O_1$ conn. to 92 |
| 2042 | $B_0$ | 76 | $I_1$ conn. to 92 | $O_1$ conn. to 104 |
| 2044 | $B_1$ | 74 | $I_1$ conn. to 92 | $O_1$ conn. to 102 |
| 2046 | $B_2$ | 72 | $I_1$ conn. to 92 | $O_1$ conn. to 100 |
| 2048 | Sum 2 | 86 | $I_1$ conn. to 104<br>$I_2$ conn. to 116 | $O_1$ conn. to 118 and to 120 |
| 2050 | Unit delay | 84 | $I_1$ conn. to 114 | $O_1$ conn. to 116 |
| 2052 | Sum 3 | 82 | $I_1$ conn. to 102<br>$I_2$ conn. to 112<br>$I_3$ conn. to 108 | $O_1$ conn. to 114 |
| 2054 | Unit Delay | 80 | $I_1$ conn. to 110 | $O_1$ conn. to 112 |
| 2056 | Sum 2 | 78 | $I_1$ conn. to 100<br>$I_2$ conn. to 106 | $O_1$ conn. to 110 |
| 2058 | $A_2$ | 88 | $I_1$ conn. to 120 | $O_1$ conn. to 106 |
| 2060 | $A_1$ | 90 | $I_1$ conn. to 120 | $O_1$ conn. to 108 |
| 2062 | sink | 68 | $I_1$ conn. to 118 | NONE |

Fig. 3B

SEQUENCE LIST OF PROCEDURE CALLS FOR SIMULATING FILTER (FIG. 3)

| | | |
|---|---|---|
| 2064 | Sig_Src_spb | (param. 64, inputs NONE, outputs 92) |
| 2066 | UO_dly_spb | (param. 80, inputs 110, outputs 112 state 80) |
| 2068 | UO_dly_spb | (param. 84, inputs 114, outputs 116 state 84) |
| 2070 | CoeF_spb | (param. 76, inputs 92, outputs 104) |
| 2072 | CoeF_spb | (param. 74, inputs 92, outputs 102) |
| 2074 | CoeF_spb | (param. 72, inputs 92, outputs 100) |
| 2076 | SUM2_spb | (param. 86, inputs 104, 116, outputs 118, 120) |
| 2078 | CoeF_spb | (param. 90, inputs 120, outputs 108) |
| 2080 | CoeF_spb | (param. 88, inputs 120, outputs 106) |
| 2082 | SUM2_spb | (param. 78, inputs 100, 106, outputs 110) |
| 2084 | SUM3_spb | (param. 82, inputs 102, 112, 108, outputs 114) |
| 2086 | Sig_Sink_spb | (param. 68, inputs 118, outputs NONE) |
| 2088 | US_dly_spb | (param. 80, inputs 110, outputs NONE, state 80 |
| 2090 | US_dly_spb | (param. 84, inputs 114, outputs NONE, state 84 |

Fig. 3c

LIBRARY OF PROCEDURES OF BLOCKS IN FIG. 3

| | | |
|---|---|---|
| 2902 | Sig_Src_spb | (input, output) "software varies depending on the particular type of function used to generate a signal." |
| 2094 | UO_dly_spb | (input, output, state) spb_output-->out = spb_state-->past_value return |
| | US_dly_spb | spb_state-->past_value = (spb_input-->in) return |
| 2098 | Coef_spb | (input, output) spb_output-->out = (spb_input-->in)* (spb_param CoeF val) return |
| 2100 | Sig_Sink_spb | (input, output) "software program for storing the output of the block diagram" |
| 2102 | SUM2_spb | (input, output) spb_output-->out = (spb_input-->in1) + (spb_input-->in2) + (spb_input-->in3) return |
| 2104 | SUM3_spb | (input, output) spb_output-->out = (spb_input-->in1) + (spb_input-->in2) + (spb_input-->in3) return |

Fig. 30

COMPILED COMPUTER PROGRAM FOR SIMULATING FILTER (FIG. 3)

2106 | Sig_Src_spb (param. 64, inputs NONE, outputs 92)
"software varies depending on the particular type of function used to generate a signal"

2108 | UO_dly_spb (param. 80, inputs 110, outputs 112, state 80)
spb_output-->out = spb_state-->past_value 2100 | UO_dly_spb (param. 84, inputs 114, outputs 116, state 84)
spb_output-->out = spb_state-->past_value 2112 | CoeF_spb (param. 76, inputs, 92, outputs 104)
spb_output-->out = (spb_input-->in)*
(spb_param-->CoeF_val)
return 2114 | CoeF_spb (param. 74, inputs 92, outputs 102)
spb_output-->out = (spb_input-->in)*
(spb_param-->CoeF_val)
return 2116 | CoeF_spb (param. 72, inputs 92, outputs 100)
spb_output-->out = (spb_input-->in)*
(spb_param-->CoeF_val)
return 2118 | SUM2_spb (param. 86, inputs 104,116, outputs 118,120)
spb_input-->out = (spb_input-->in1 +
(spb_input-->in2)
return 2120 | CoeF_spb (param. 90, inputs 120, outputs 108)
spb_output-->out = (spb_input-->in)*
(spb_param-->CoeF_val)
return 2122 | CoeF_spb (param. 88, inputs 120, outputs 106)
spb_output-->out = (spb_input-->in)*
(spb_param-->CoeF_val)
return 2124 | SUM2_spb (param. 78, inputs 100,106, outputs 110
spb_output-->out - (spb_input-->in1) +
(spb_input-->in2)
return

Fig. 3D continued

| | | |
|---|---|---|
| 2126 | SUM3_spb | (param. 82, inputs 102, 112, 108, outputs 114<br>spb_output-->out = (spb_input-->in1) +<br>(spb_input-->in2) + (spb_input-->in3)<br>return |
| 2128 | Sig_Sink_spb | (param. 68, inputs 118, outputs NONE)<br>"software program for storing the output<br>of the block diagram" |
| 2130 | US_dly_spb | (param. 80, inputs 110, outputs NONE,<br>state 80)<br>spb_state-->past_value = (spb_input-->in)<br>return |
| 2132 | US_dly_dpb | (param. 84, inputs 114, outputs NONE,<br>state 84)<br>spb_state-->past_value = (spb_input-->in)<br>return |

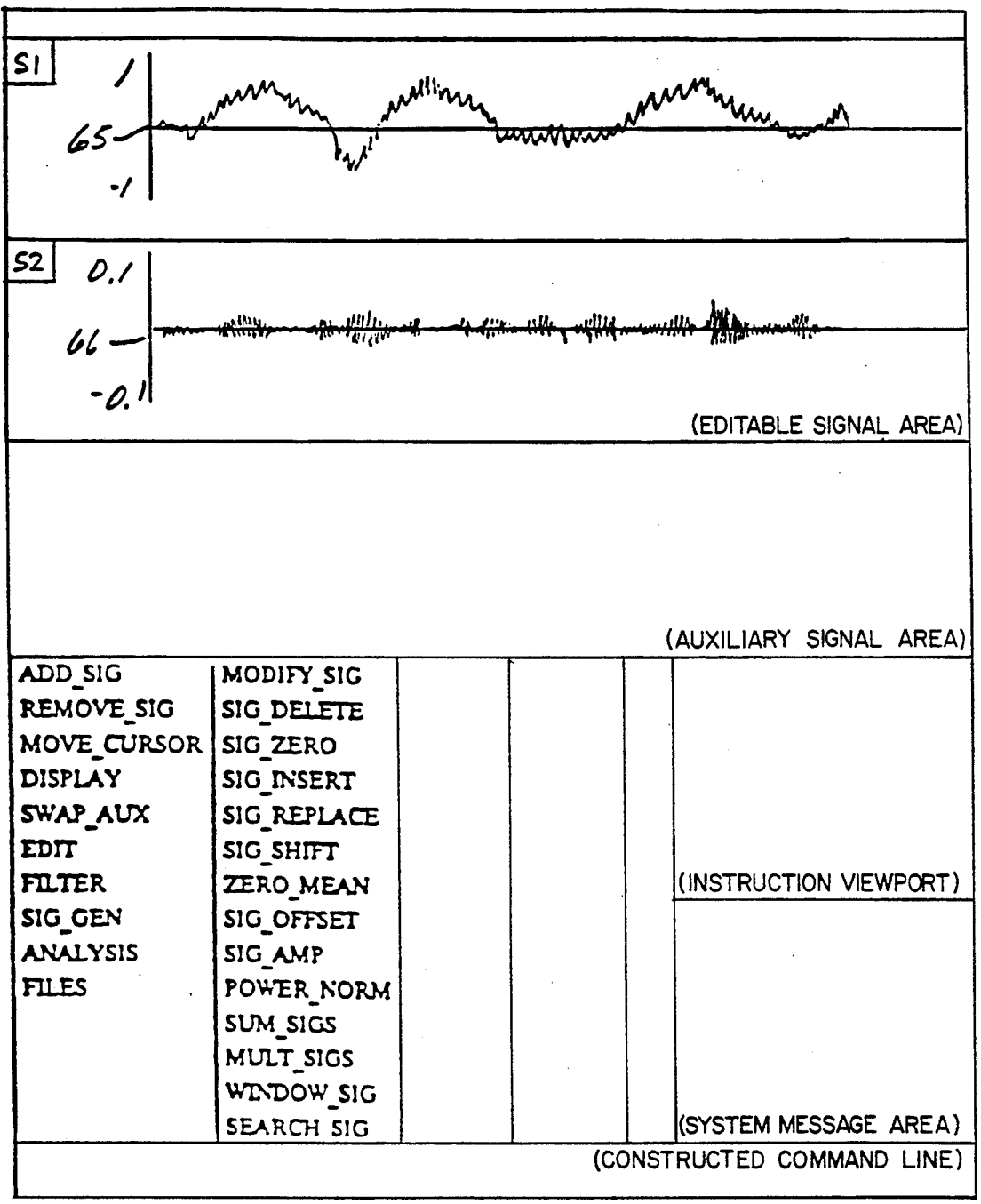

Fig. 8A
NETLIST OF FIG. 8

| | BLOCK | INSTANCE NO. | INPUTS | OUTPUTS |
|---|---|---|---|---|
| 2134 | A | 210 | NONE | $O_4$ conn. to 218 |
| 2136 | B | 212 | $I_1$ conn. to 218<br>$I_2$ conn. to 226 | $O_1$ conn. to 220<br>$O_2$ conn. to 222 |
| 2138 | C | 216 | $I_4$ conn. to 220 | $O_3$ conn. to 226 |
| 2140 | D | 214 | $I_3$ conn. to 222 | NONE |

Fig. 8B
LIBRARY OF FIG. 8

| | BLOCK | FTL | UPDATE OUPTUT P. | UPDATE STATE P. | INPUT LIST | OUTPUT LIST |
|---|---|---|---|---|---|---|
| 2142 | A | NONE | A(UO) | NONE | NONE | $O_4$ |
| 2144 | B | $I_1$ | B(UO) | B(US) | $I_1$<br>$I_2$ | $O_1$<br>$O_2$ |
| 2146 | C | $I_4$ | C(UO) | NONE | $I_4$ | $O_3$ |
| 2148 | D | $I_3$ | D(UO) | NONE | $I_3$ | NONE |

Fig. 8D

NETLIST OF FIG. 8A

| | BLOCK | INSTANCE NO. | INPUTS | OUTPUTS |
|---|---|---|---|---|
| 2150 | A | 211 | NONE | $O_4$ conn. to 231 |
| 2152 | B | 213 | $I_1$ conn. to 231<br>$I_2$ conn. to 229 | $O_1$ conn. to 227<br>$O_2$ conn. to 223 |
| 2154 | C | 217 | $I_4$ conn. to 227 | $O_3$ conn. to 229 |
| 2156 | D | 215 | $I_3$ conn. to 223 | NONE |

Fig. 8E

LIBRARY OF FIG. 8C

| | BLOCK | FTL | UPDATE OUPUT P. | UPDATE STATE P. | INPUT LIST | OUTPUT LIST |
|---|---|---|---|---|---|---|
| 2158 | A | NONE | A(UO) | NONE | NONE | $O_4$ |
| 2160 | B | $I_1$ | B(UO) | B(US) | $I_1$<br>$I_2$ | $O_1$<br>$O_2$ |
| 2162 | C | $I_4$ | C(UO) | NONE | $I_4$ | $O_3$ |
| 2164 | D | $I_3$ | D(UO) | NONE | $I_3$ | NONE |

Fig. 9A

| NETLIST POINTER 226 | NETLIST | SEQUENCE LIST |
|---|---|---|
| | C D A B | |
| 227 --> | C D A B | |
| 228 | C D A B | |
| 229 --> | C D A B | |
| 230 | C D A B | |
| --> | C D A B | |
| 232 | C D A B | A(UO) |
| --> | | |
| 234 | C D B | A(UO) |
| --> | | |
| 236 | C D B | A(UO) |
| --> | | |
| 238 | C D B | A(UO) |
| --> | | |
| 240 | C D B | A(UO) B(UO) |
| 242 --> | C D B | A(UO) B(UO) |
| 244 --> | C D B | A(UO) B(UO) |
| 246 --> | C D B | A(UO) B(UO) |
| 248 --> | C D B | A(UO) B(UO) C(UO) |
| --> | D B | A(UO) B(UO) C(UO) |

Fig. 9B

| NETLIST POINTER | NETLIST | SEQUENCE LIST |
|---|---|---|
| 250 --> | | |
| | D | A(UO) |
| | | B(UO) |
| | B | C(UO) |
| 252 --> | | |
| | D | A(UO) |
| | | B(UO) |
| | B | C(UO) |
| 254 --> | | |
| | D | A(UO) |
| | | B(UO) |
| | B | C(UO) |
| | | D(UO) |
| 256 --> | | |
| | B | A(UO) |
| | | B(UO) |
| | | C(UO) |
| | | D(UO) |
| 258 --> | | |
| | B | A(UO) |
| | | B(UO) |
| | | C(UO) |
| | | D(UO) |
| 260 --> | | |
| | B | A(UO) |
| | | B(UO) |
| | | C(UO) |
| | | D(UO) |
| 262 | | |
| | | A(UO) |
| --> | B | B(UO) |
| | | C(UO) |
| | | D(UO) |
| | | B(US) |
| 263 --> | | |
| | | A(UO) |
| | | B(UO) |
| | | C(UO) |
| | | D(UO) |
| | | B(US) |
| 264 | NORMAL EXIT | |

Fig. 10

| NETLIST POINTER | NETLIST | SEQUENCE |
|---|---|---|
| 265 | C<br>D<br>A<br>B | |
| 267 | BLOCK 226 TO BLOCK 238 (FIGURE 9(A)) | |
| 268 --> | C<br>D<br>B | A(U0) |
| 269 --> | C<br>D<br>B | A(U0) |
| 270 --> | C<br>D<br>B | A(U0) |
| 272 --> | C<br>D<br>B | A(U0) |
| 274 | NETLIST NOT SEQUENCEABLE | |

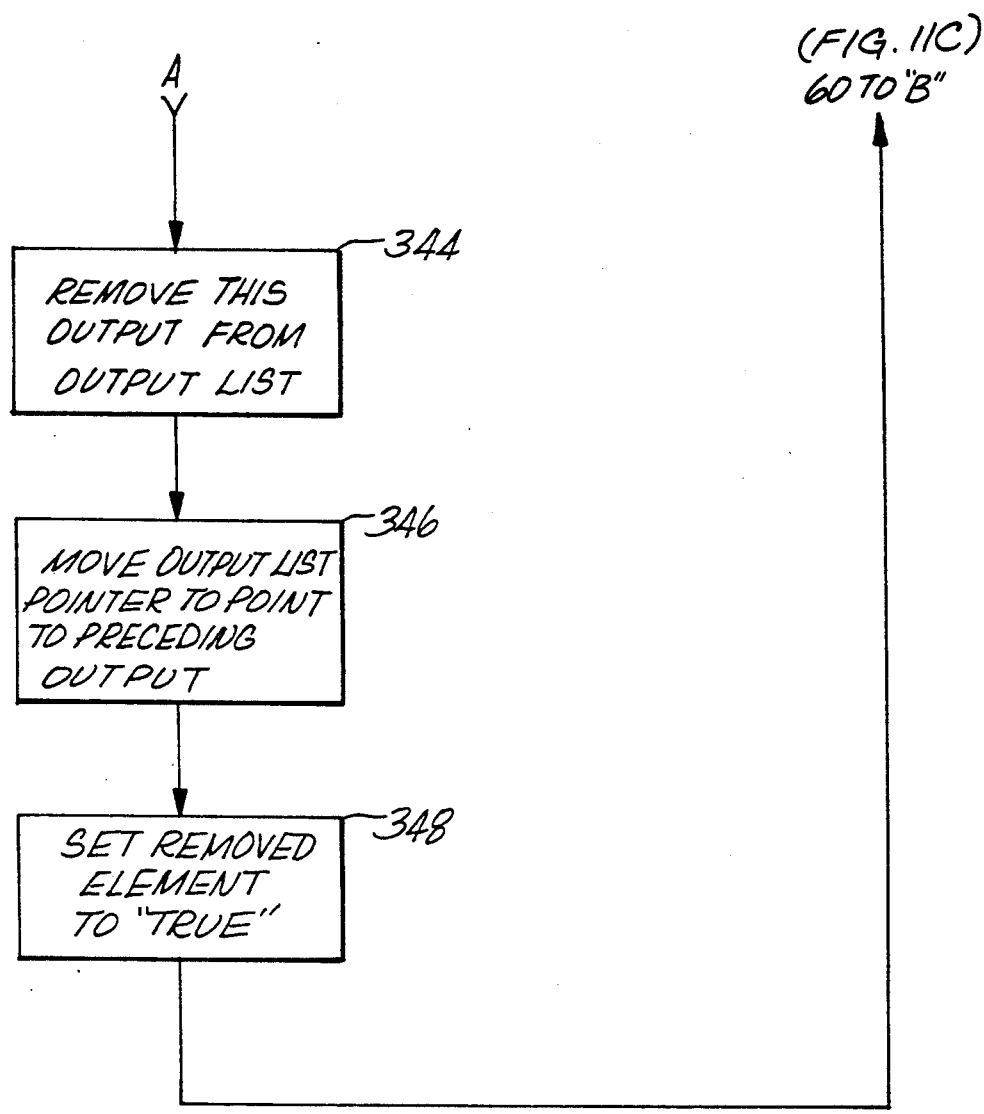

Fig. 12A

| NETLIST POINTER | NETLIST | OUTPUT LIST POINTER | OUTPUT LIST | SEQUENCE LIST |
|---|---|---|---|---|
| 350 | C D A B | | Out 1 Out 2 | |
| 352 --> | C D A B | | Out 1 Out 2 | |
| 354 --> | C D A B | | Out 1 Out 2 | |
| 356 --> | C D A B | | Out 1 Out 2 | |
| 358 --> | C D A B | | Out 1 Out 2 | A(U0) |
| 362 --> | C D B | | Out 1 Out 2 | A(U0) |
| 364 --> | C D B | | Out 1 Out 2 | A(U0) |
| 368 --> | C D B | | Out 1 Out 2 | A(U0) |

Fig.12B

| NETLIST POINTER | NETLIST | OUTPUT LIST POINTER | OUTPUT LIST | SEQUENCE LIST |
|---|---|---|---|---|
| 370 | | | | A(U0) |
| | C | | | |
| | D | | | |
| --> | B | --> | Out 1 | |
| | | | Out 2 | |
| 372 | | | | A(U0) |
| | C | | | |
| | D | | | |
| --> | B | --> | Out 1 | |
| | | | Out 2 | |
| 374 | | | | A(U0) |
| | C | | | B(U0[Out 1]) |
| | D | | | |
| --> | B | --> | Out 1 | |
| | | | Out 2 | |
| 376 | | | | A(U0) |
| | C | | | B[U0(Out 1)] |
| | D | | | |
| --> | B | --> | Out 2 | |
| 378 | | | | A(U0) |
| | C | | | B[U0(Out 1)] |
| | D | --> | | |
| --> | B | | Out 2 | |
| 380 | | | | A(U0) |
| | C | | | B[U0(Out 1)] |
| | D | | | |
| --> | B | --> | Out 2 | |
| 382--> | | | | A(U0) |
| | C | | | B[U0(Out 1)] |
| | D | | | |
| | B | --> | Out 2 | |
| 384--> | C | | | A(U0) |
| | D | | | B[U0(Out 1)] |
| | B | --> | Out 2 | |
| 386 | | | | A(U0) |
| --> | C | | | B[U0(Out 1)] |
| | D | | | C(U0) |
| | B | --> | Out 2 | |
| 388--> | D | | | A(U0) |
| | B | --> | Out 2 | B[U0(Out 1)] |
| | | | | C(U0) |

Fig. 12c

| NETLIST POINTER | NETLIST | OUTPUT LIST POINTER | OUTPUT LIST | SEQUENCE LIST |
|---|---|---|---|---|
| 390--> | D<br>B | --> | Out 2 | A(U0)<br>B[U0(Out 1)]<br>C(U0) |
| 392<br>--> | D<br>B | --> | Out 2 | A(U0)<br>B[U0(Out 1)]<br>C(U0) |
| 400 | D<br>--> B | --> | Out 2 | A(U0)<br>B[U0(Out 1)]<br>C(U0) |
| 402 | D<br>--> B | --> | Out 2 | A(U0)<br>B[U0(Out 1)]<br>C(U0) |
| 404 | D<br>--> B | --> | Out 2 | A(U0)<br>B[U0(Out 1)]<br>C(U0) |
| 406 | D<br>--> B | --> | Out 2 | A(U0)<br>B[U0(Out 1)]<br>C(U0)<br>B[U0(Out 2)] |
| 408 | D<br>--> B | | | A(U0)<br>B[U0(Out 1)]<br>C(U0)<br>B[U0(Out 2)] |
| 410--> | D<br>B | | | A(U0)<br>B[U0(Out 1)]<br>C(U0)<br>B[U0(Out 2)] |
| 412<br>--> | D<br>B | | | A(U0)<br>B[U0(Out 1)]<br>C(U0)<br>B[U0(Out 2)]<br>D(U0) |
| 414<br>--> | B | | | A(U0)<br>B[U0(Out 1)]<br>C(U0)<br>B[U0(Out 2)]<br>D(U0) |

Fig. 12D

| NETLIST POINTER | NETLIST | OUTPUT LIST POINTER | OUTPUT LIST | SEQUENCE LIST |
|---|---|---|---|---|
| 416 --> | B | | | A(U0)<br>B[U0(Out 1)]<br>C(U0)<br>B[U0(Out 1)]<br>D(U0) |
| 418 --> | B | | | A(U0)<br>B[U0(out 1)]<br>C(U0)<br>B[U0(Out 2)]<br>D(U0) |
| 420 --> | B | | | A(U0)<br>B[U0(Out 1)]<br>C(U0)<br>B[U0(Out 2)]<br>D(U0)<br>B(US) |
| 422 | | | | A(U0)<br>B[U0(Out 1)]<br>C(U0)<br>B[U0(Out 2)]<br>D(U0)<br>B(US) |

NORMAL EXIT

Fig. 13A

NETLIST OF FIG. 13

| | BLOCK | INSTANCE NO. | INPUTS | OUTPUTS |
|---|---|---|---|---|
| 2166 | A | 424 | NONE | $O_4$ conn. to 432 |
| 2168 | B | 426 | $I_1$ conn. to 432<br>$I_2$ conn. to 438 | $O_1$ conn. to 434<br>$O_2$ conn. to 436 |
| 2170 | C | 430 | $I_4$ conn. to 434 | $O_3$ conn. to 438 |
| 2172 | D | 428 | $I_3$ conn. to 436 | NONE |

Fig. 13B

LIBRARY OF FIG. 13

| | BLOCK | FTL | UPDATE OUTPUT P. | UPDATE STATE P. | INPUT LIST | OUTPUT LIST |
|---|---|---|---|---|---|---|
| 2174 | A | NONE | A(UO) | NONE | NONE | $O_4$ |
| 2176 | B | NONE($O_1$)<br>$I_2(O_2)$ | B(UO($O_1$))<br>B(UO($O_2$)) | B(US) | $I_1$<br>$I_2$ | $O_1$<br>$O_2$ |
| 2178 | C | $I_4$ | C(UO) | NONE | $I_4$ | $O_3$ |
| 2180 | D | $I_3$ | D(UO) | NONE | $I_3$ | NONE |

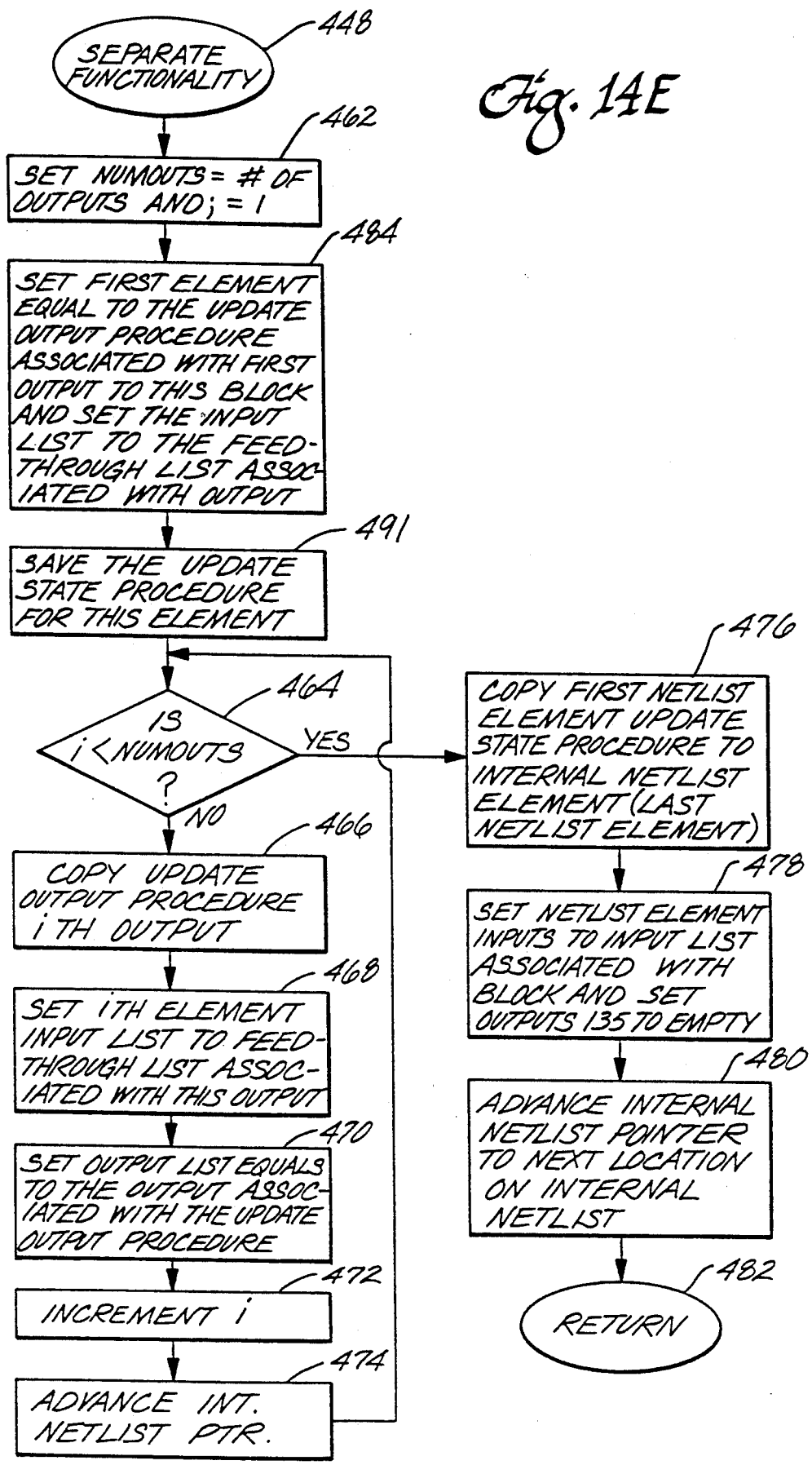

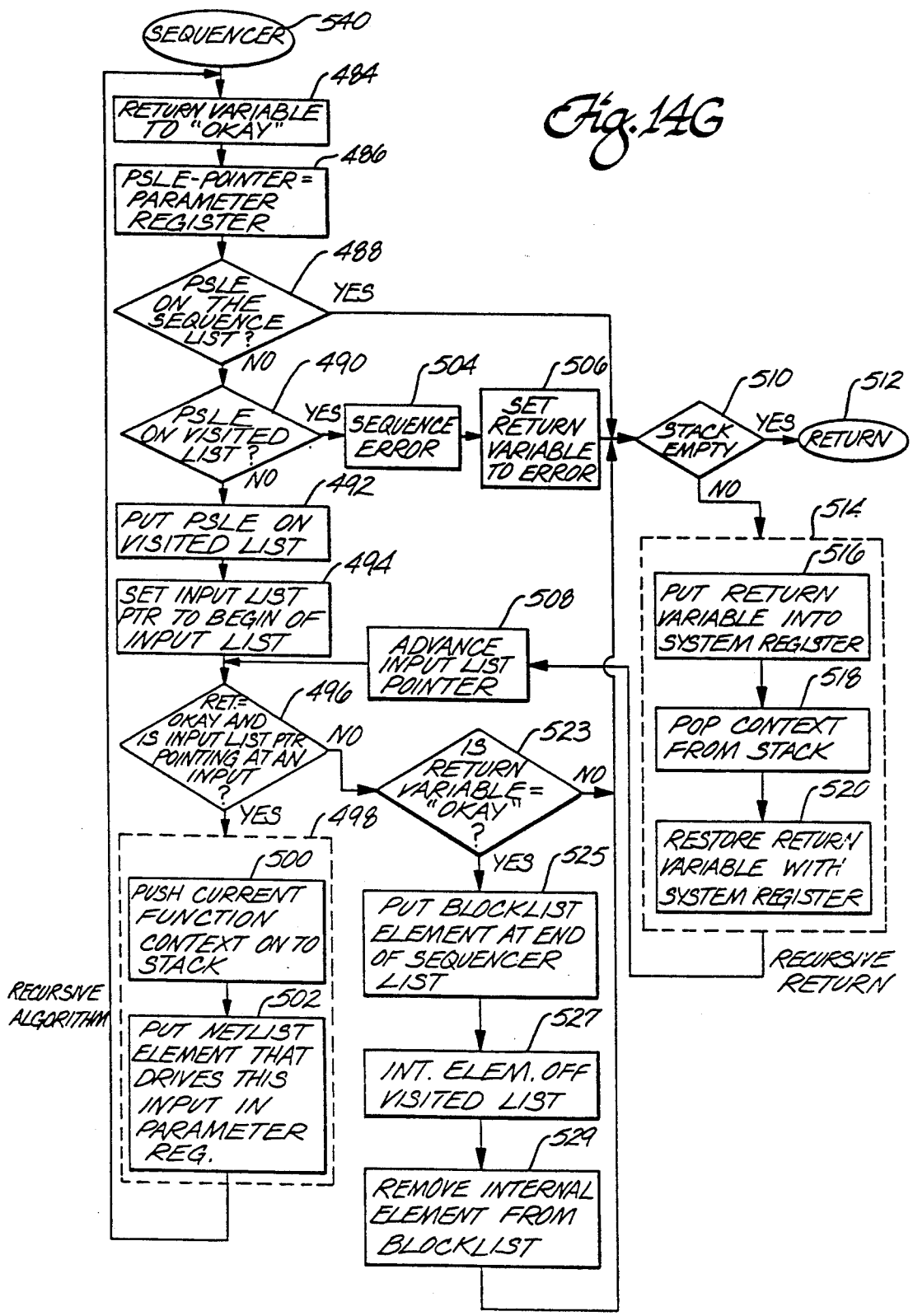

Fig. 15B

EXTERNAL NETLIST OF FIG. 15A

| | BLOCK | INSTANCE NO. | INPUTS | OUTPUTS |
|---|---|---|---|---|
| 2182 | A | 560 | NONE | $O_4$ conn. to 568 |
| 2184 | B | 562 | $I_1$ conn. to 568<br>$I_2$ conn. to 574 | $O_1$ conn. to 570<br>$O_2$ conn. to 572 |
| 2186 | C | 566 | $I_4$ conn. to 570 | $O_3$ conn. to 574 |
| 2188 | D | 564 | $I_3$ conn. to 572 | NONE |

Fig. 15C

LIBRARY OF FIG. 15A

| | BLOCK | FTL | UPDATE OUTPUT P. | UPDATE STATE P. | INPUT LIST | OUTPUT LIST |
|---|---|---|---|---|---|---|
| 2190 | A | NONE | A(UO) | NONE | NONE | $O_4$ |
| 2192 | B | $I_1$ | B(UO) | B(US) | $I_1$<br>$I_2$ | $O_1$<br>$O_2$ |
| 2194 | C | $I_4$ | C(UO) | NONE | $I_4$ | $O_3$ |
| 2196 | D | $I_3$ | D(UO) | NONE | $I_3$ | NONE |

Fig. 15E

INTERNAL NETLIST OF FIG. 15B

| | BLOCK | INSTANCE NO. | INPUTS | OUTPUTS |
|---|---|---|---|---|
| 2198 | A | 560 | NONE | $O_4$ conn. to 568 |
| 2200 | B(UO) | 562(A) | $I_1$ conn. to 568 | $O_2$ conn. to 572<br>$O_1$ conn. to 570 |
| 2202 | B(US) | 562(B) | $I_1$ conn. to 568<br>$I_2$ conn. to 574 | NONE |
| 2204 | C | 566 | $I_4$ conn. to 570 | $O_3$ conn. to 574 |
| 2206 | D | 564 | $I_3$ conn. to 572 | NONE |

Fig. 16

| POINTER | EXTERNAL NETLIST | INTERNAL NETLIST POINTER | INTERNAL NETLIST |
|---|---|---|---|
| 584--> | C<br>D<br>A<br>B | | |
| 586--> | C<br>D<br>A<br>B | --> | |
| 588--> | D<br>A<br>B | --> | C |
| 590 --> | D<br>A<br>B | --> | C |
| 592--> | A<br>B | --> | C<br>D |
| 594 --> | A<br>B | --> | C<br>D |
| 596 --> | B | --> | C<br>D |
| 605 --> | B | --> | C<br>D<br>A |
| 607 --> | | --> | C<br>D<br>A<br>B |
| 601 --> | | --> | C<br>D<br>A<br>B(U0)<br>B(US) |
| 598 --> | B | --> | C<br>D<br>A<br>B |
| 599 | | --> | C<br>D<br>A<br>B(U0)<br>B(US) |

Fig.17A

| POINTER INTERNAL NETLIST | INTERNAL NETLIST | STACK | INPUT LIST | SEQUENCE LIST |
|---|---|---|---|---|
| --> 591 | C<br>D<br>A<br>B(U0)<br>B(US) | | $I_4$<br>$I_3$<br>( )<br>$I_1$<br>$I_1, I_2$ | |
| --> 593 | [C]<br>D<br>A<br>B(U0)<br>B(US) | | $[I_4]$<br>$I_3$<br>( )<br>$I_1$<br>$I_1, I_2$ | |
| --> 595 | C<br>D<br>A<br>B(U0)<br>B(US) | $[C, I_4]$ | $I_4$<br>$I_3$<br>( )<br>$I_1$<br>$I_1, I_2$ | |
| --> 597 | C<br>D<br>A<br>[B(U0)]<br>B(US) | $[C, I_4]$ | $I_4$<br>$I_3$<br>( )<br>$[I_1]$<br>$I_1, I_2$ | |
| --> 601 | C<br>D<br>[A]<br>[B(U0)]<br>B(US) | $[C, I_4]$<br>$[B(U0), I_1]$ | $I_4$<br>$I_3$<br>[( )]<br>$I_1$<br>$I_1, I_2$ | |
| 601A | C<br>D<br>A<br>B(U0)<br>B(US) | $[C, I4]$<br>$[B(U0), I.]$ | | |
| --> 602 | C<br>D<br>[A]<br>B(U0)<br>B(US) | $[C, I_4]$<br>$[B(U0), I_1]$ | $I_4$<br>$I_3$<br>[( )]<br>$I_1$<br>$I_1, I_2$ | |
| --> 603 | C<br>D<br>[A]<br>B(U0)<br>B(US) | $[C, I_4]$<br>$[B(U0), I_1]$ | $I_4$<br>$I_3$<br>[( )]<br>$I_1$<br>$I_1, I_2$ | A |

Fig. 17B

| POINTER INTERNAL NETLIST | INTERNAL NETLIST | STACK | INPUT LIST | SEQUENCE LIST |
|---|---|---|---|---|
| --> 604 | C<br>D<br>B(U0)<br>B(US) | [C,$I_4$]<br>[B(U0),$I_1$] | $I_4$<br>$I_3$<br>[( )]<br>$I_1$<br>$I_1,I_2$ | A |
| --> 606 | C<br>D<br>[B(U0)]<br>B(US) | [C,$I_4$] | $I_4$<br>$I_3$<br>[$I_1$]<br>$I_1,I_2$ | A |
| --> 608 | C<br>D<br>[B(U0)]<br>B(US) | [C,$I_4$] | $I_4$<br>$I_3$<br>$I_1$<br>$I_1,I_2$ | A<br>B(U0) |
| --> 610 | C<br>D<br>B(US) | [C,$I_4$] | $I_4$<br>$I_3$<br>$I_1,I_2$ | A<br>B(U0) |
| --> 612 | [C]<br>D<br>B(US) | | [$I_4$]<br>$I_3$<br>$I_1,I_2$ | A<br>B(U0) |
| --> 614 | C<br>D<br>B(US) | | $I_4$<br>$I_3$<br>$I_1,I_2$ | A<br>B(U0)<br>C |
| --> 616 | D<br>B(US) | | $I_3$<br>$I_1,I_2$ | A<br>B(U0)<br>C |
| --> 617 | D<br>B(US) | | [$I_3$]<br>$I_1,I_2$ | A<br>B(U0)<br>C |
| --> 618 | [D]<br>B(US) | | [$I_3$]<br>$I_1,I_2$ | A<br>B(U0)<br>C |
| --> 620 | D<br>[B(US)] | [D,$I_3$] | $I_3$<br>$I_1,I_2$ | A<br>B(U0)<br>C |

*Fig. 17c*

| POINTER INTERNAL NETLIST | INTERNAL NETLIST | STACK | INPUT | SEQUENCE LIST |
|---|---|---|---|---|
| --><br>622 | D<br>[B(US)] | [D,$I_3$] | $I_3$<br>[$I_1$],$I_2$ | A<br>B(UO)<br>C |
| --><br>624 | D<br>B(US) | [D,$I_3$]<br>[B(US),$I_1$] | $I_3$<br>$I_1$,$I_2$ | A<br>B(UO)<br>C |
| --><br>626 | D<br>B(US) | [D,$I_3$]<br>[B(US),$I_1$] | $I_3$<br>$I_1$,$I_2$ | [A]<br>B(UO)<br>C |
| --><br>628 | D<br>[B(US)] | [D,$I_3$] | $I_3$<br>[$I_1$],$I_2$ | A<br>B(UO)<br>C |
| --><br>630 | D<br>[B(US)] | [D,$I_3$] | $I_3$<br>$I_1$,[$I_2$] | A<br>B(UO)<br>C |
| --><br>632 | D<br>B(US) | [D,$I_3$]<br>[B(US),$I_2$] | $I_3$<br>$I_1$,$I_2$ | A<br>B(UO)<br>C |
| --><br>633 | D<br>B(US) | [D,I3]<br>[B(US),I2] | I3<br>I1,I2 | A<br>B(UO)<br>[C] |
| --><br>634 | D<br>[B(US)] | [D,$I_3$] | $I_3$<br>$I_1$,[$I_2$] | A<br>B(UO)<br>C |
| --><br>635 | D<br>[B(US)] | [D,$I_3$] | $I_3$<br>$I_1$,$I_2$( ) | A<br>B(UO)<br>C |

*Fig. 17D*

| POINTER INTERNAL NETLIST | INTERNAL NETLIST | -STACK | INPUT LIST | SEQUENCE LIST |
|---|---|---|---|---|
| --> 636 | D<br>B(US) | [D,I$_4$] | I$_3$ | A<br>B(UO)<br>C<br>B(US) |
| --> 638 | D | [D,I$_4$] | I$_3$ | A<br>B(UO)<br>C<br>B(US) |
| 640 --> | [D] | | [I$_3$] | A<br>B(UO)<br>C<br>B(US) |
| 641 --> | [D] | | I$_3$( ) | A<br>B(UO)<br>C<br>B(US) |
| 642 --> | D | | I$_3$ | A<br>B(UO)<br>C<br>B(US)<br>D |
| 644 --> | | | | A<br>B(UO)<br>C<br>B(US)<br>D |
| 646 --> | | | | A<br>B(UO)<br>C<br>B(US)<br>D |
| 648 | | | | |

RETURN

Fig. 18B

NETLIST OF FIG. 18A

| | BLOCK | INSTANCE NO. | INPUTS | OUTPUTS |
|---|---|---|---|---|
| 2218 | A | 650 | NONE | $O_4$ conn. to 658 |
| 2220 | B | 652 | $I_1$ conn. to 658<br>$I_2$ conn. to 664 | $O_1$ conn. to 660<br>$O_2$ conn. to 662 |
| 2222 | C | 656 | $I_4$ conn. to 660 | $O_3$ conn. to 664 |
| 2224 | D | 428 | $I_3$ conn. to 662 | NONE |

Fig. 18C

LIBRARY OF FIG. 18A

| | BLOCK | FTL | UPDATE OUTPUT P. | UPDATE STATE P. | INPUT LIST | OUTPUT LIST |
|---|---|---|---|---|---|---|
| 2226 | A | NONE | A(UO) | NONE | NONE | $O_4$ |
| 2228 | B | NONE($O_1$)<br>$I_2$($O_2$) | B(UO($O_1$))<br>B(UO($O_2$)) | B(US) | $I_1$<br>$I_2$ | $O_1$<br>$O_2$ |
| 2230 | C | $I_4$ | C(UO) | NONE | $I_4$ | $O_3$ |
| 2232 | D | $I_3$ | D(UO) | NONE | $I_3$ | NONE |

Fig. 18E

INTERNAL NETLIST OF FIG. 18D

| BLOCK | INSTANCE NO. | INPUTS | OUTPUTS |
|---|---|---|---|
| 2234 | A | 650 | NONE | $O_4$ conn. to 658 |
| 2236 | B[(UO)($O_1$)] | 652 | NONE | $O_1$ conn. to 660 |
| 2238 | B[(UO)($O_2$)] | 652 | $I_2$ conn. to 664 | $O_2$ conn. to 662 |
| 2240 | B(US) | 652 | $I_1$ conn. to 658<br>$I_2$ conn. to 664 | NONE |
| 2242 | C | 656 | $I_4$ conn. to 660 | $O_3$ conn. to 664 |
| 2244 | D | 654 | $I_3$ conn. to 662 | NONE |

Fig. 19A

| EXTERNAL NETLIST POINTER | EXTERNAL NETLIST | EXTERNAL NETLIST INPUT LIST | EXTERNAL NETLIST OUTPUT LIST | INTERNAL NETLIST POINTER | INTERNAL NETLIST | INTERNAL NETLIST INPUT LIST | INTERNAL NETLIST OUTPUT LIST |
|---|---|---|---|---|---|---|---|
| 692 → | C<br>D<br>A<br>B | $I_4$<br>$I_3$<br>None<br>$I_1, I_2$ | $O_3$<br>None<br>$O_4$<br>$O_1, O_2$ | → | | | |
| 694 → | C<br>D<br>A<br>B | $I_4$<br>$I_3$<br>None<br>$I_1, I_2$ | $O_3$<br>None<br>$O_4$<br>$O_1, O_2$ | | | | |
| 696 → | D<br>A<br>B | $I_3$<br>None<br>$I_1, I_2$ | None<br>$O_4$<br>$O_1, O_2$ | → | C | $I_4$ | $O_3$ |
| 698 → | D<br>A<br>B | $I_3$<br>None<br>$I_1, I_2$ | None<br>$O_4$<br>$O_1, O_2$ | → | C | $I_4$ | $O_3$ |
| 700 → | A<br>B | None<br>$I_1, I_2$ | $O_4$<br>$O_1, O_2$ | → | C<br>D | $I_4$<br>$I_3$ | $O_3$<br>None |

Fig. 19B

| EXTERNAL NETLIST POINTER | EXTERNAL NETLIST | EXTERNAL NETLIST INPUT LIST | EXTERNAL NETLIST OUTPUT LIST | INTERNAL NETLIST POINTER | INTERNAL NETLIST | INTERNAL NETLIST INPUT LIST | INTERNAL NETLIST OUTPUT LIST |
|---|---|---|---|---|---|---|---|
| 702 → | A<br>B | None<br>$I_1, I_2$ | $O_4$<br>$O_1, O_2$ | → | C<br>D | $I_4$<br>$I_3$ | $O_3$<br>None |
| 704 → | B | $I_1, I_2$ | $O_1, O_2$ | → | C<br>D<br>A | $I_4$<br>$I_3$<br>None | $O_3$<br>None<br>$O_4$ |
| 705 → | B | $I_1, I_2$ | $O_1, O_2$ | → | C<br>D<br>A | $I_4$<br>$I_3$<br>None | $O_3$<br>None<br>$O_4$ |
| 706 → | | | | → | C<br>D<br>A<br>B | $I_4$<br>$I_3$<br>None<br>$I_1, I_2$ | $O_3$<br>None<br>$O_4$<br>$O_1, O_2$ |

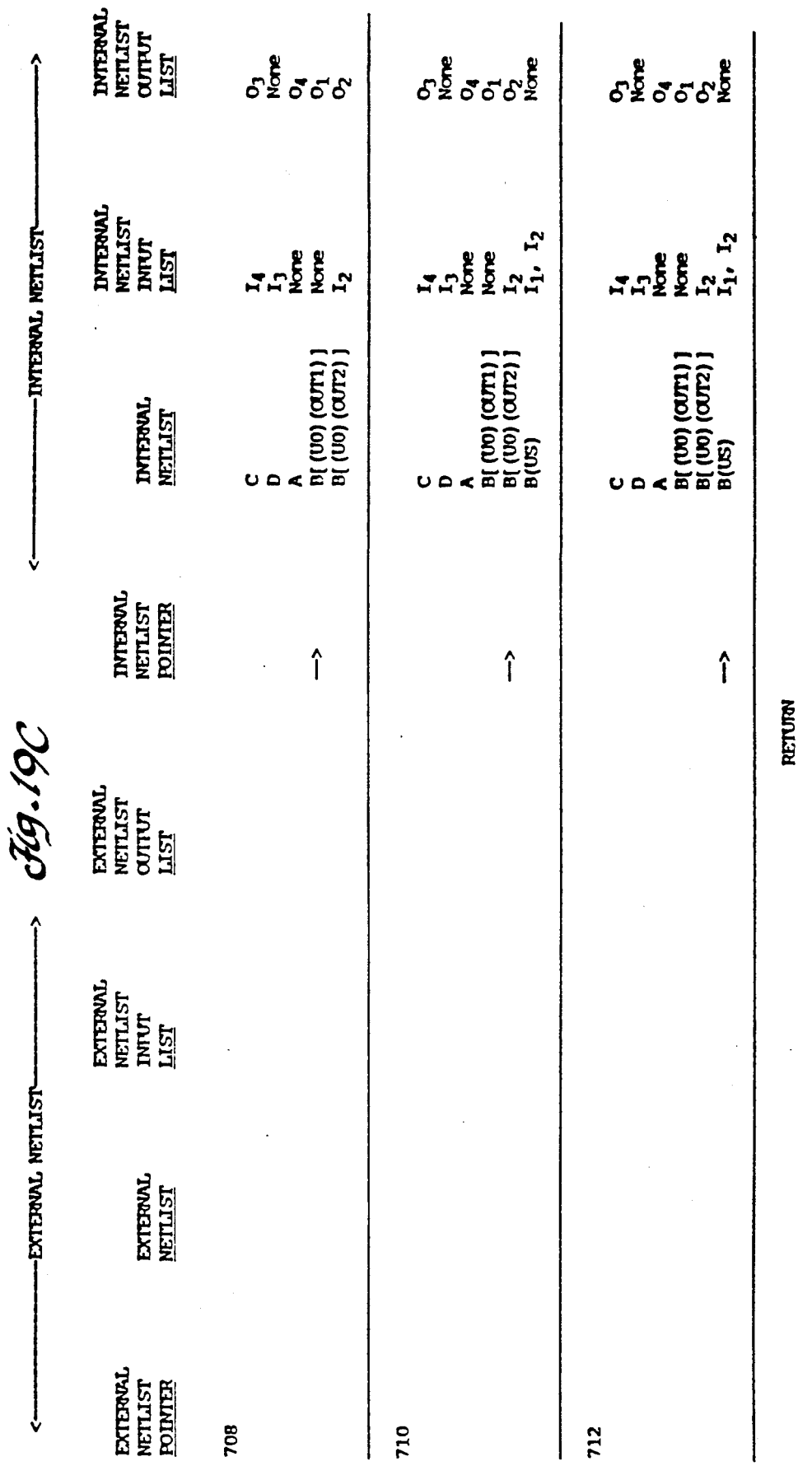

Fig. 20A

| INTERNAL NETLIST PTR. | INTERNAL NETLIST | STACK | INPUT LISTS | SEQUNCE LIST |
|---|---|---|---|---|
| --> 714 | C<br>D<br>A<br>B[(U0)(OUT1)]<br>B[(U0)(OUT2)]<br>B(US) | | $I_4$<br>$I_3$<br>()<br>()<br>$I_2$<br>$I_1, I_2$ | |
| --> 716 | [C]<br>D<br>A<br>B[(U0)(OUT1)]<br>B[(U0)(OUT2)]<br>B(US) | | [$I_4$]<br>$I_3$<br>()<br>()<br>$I_2$<br>$I_1, I_2$ | |
| -- 718 | C<br>D<br>A<br>B[(U0)(OUT1)]<br>B[(U0)(OUT2)]<br>B(US) | [C, $I_4$] | $I_4$<br>$I_3$<br>()<br>()<br>$I_2$<br>$I_1, I_2$ | |
| --> 720 | C<br>D<br>A<br>[B[(U0)(OUT1)]]<br>B[(U0)(OUT2)]<br>B(US) | [C, $I_4$] | $I_4$<br>$I_3$<br>()<br>[()]<br>$I_2$<br>$I_1, I_2$ | |
| --> 722 | C<br>D<br>A<br>[B[(U0)(OUT1)]]<br>B[(U0)(OUT2)]]<br>B(US) | [C, $I_4$] | $I_4$<br>$I_3$<br>()<br>[()]<br>$I_2$<br>$I_1, I_2$ | B[(U0)(OUT1)] |
| --> 724 | C<br>D<br>A<br>B[(U0)(OUT2)]<br>B(US) | [C, $I_4$] | $I_4$<br>$I_3$<br>()<br>$I_2$<br>$I_1, I_2$ | B[(U0)(OUT1)] |
| --> 726 | [C]<br>D<br>A<br>B[(U0)(OUT2)]<br>B(US) | | $I_4$<br>$I_3$<br>()<br>$I_2$<br>$I_1, I_2$ | B[(U0)(OUT1)] |
| --> 728 | [C]<br>D<br>A<br>B[(U0)(OUT2)]<br>B(US) | | $I_4$[]<br>$I_3$<br>()<br>$I_2$<br>$I_1, I_2$ | B[(U0)(OUT1)] |
| --> 730 | [C]<br>D<br>A<br>B[(U0)(OUT2)]<br>B(US) | | $I_4$[]<br>$I_3$<br>()<br>$I_2$<br>$I_1, I_2$ | B[(U0)(OUT1)]<br>C |
| 732 --> | D<br>A<br>B[(U0)(OUT2)]<br>B(US) | | $I_3$<br>()<br>$I_2$<br>$I_1, I_2$ | B[(U0)(OUT1)]<br>C |

Fig. 20B

| INTERNAL NETLIST PTR. | INTERNAL NETLIST | STACK | INPUT LISTS | SEQUENCE LIST |
|---|---|---|---|---|
| 734 --> | D<br>A<br>B[(U0)(OUT2)]<br>B(US) | | $I_3$<br>()<br>$I_2$<br>$I_1, I_2$ | B[(U0)(OUT1)]<br>C |
| 736 --> | [D]<br>A<br>B[(U0)(OUT2)]<br>B(US) | | $[I_3]$<br>()<br>$I_2$<br>$I_1, I_2$ | B[(U0)(OUT1)]<br>C |
| 738 --> | D<br>A<br>B[(U0)(OUT2)]<br>B(US) | [D, $I_3$] | $I_3$<br>()<br>$I_2$<br>$I_1, I_2$ | B[(U0)(OUT1)]<br>C |
| 740 --> | D<br>[A]<br>B[(U0)(OUT2)]<br>B(US) | [D, $I_3$] | $I_3$<br>[()]<br>$I_2$<br>$I_1, I_2$ | B[(U0)(OUT1)]<br>C |
| 742 --> | D<br>[A]<br>B[(U0)(OUT2)]<br>B(US) | [D, $I_3$] | $I_3$<br>[()]<br>$I_2$<br>$I_1, I_3$ | B[(U0)(OUT1)]<br>C<br>A |
| 744 --> | D<br>B[(U0)(OUT2)]<br>B(US) | [D, $I_3$] | $I_3$<br>$I_2$<br>$I_1, I_2$ | B[(U0)(OUT1)]<br>C<br>A |
| 746 --> | [D]<br>B[(U0)(OUT2)]<br>B(US) | | $[I_3]$<br>$I_2$<br>$I_1, I_2$ | B[(U0)(OUT1)]<br>C<br>A |
| 748 --> | [D]<br>B[(U0)(OUT2)]<br>B(US) | | $I_3[]$<br>$I_2$<br>$I_1, I_2$ | B[(U0)(OUT1)]<br>C<br>A |
| 750 --> | [D]<br>B[(U0)(OUT2)]<br>B(US) | | $I_3[]$<br>$I_2$<br>$I_1, I_2$ | B[(U0)(OUT1)]<br>C<br>A<br>D |
| 752 --> | B[(U0)(OUT2)]<br>B(US) | | $I_2$<br>$I_1, I_2$ | B[(U0)(OUT1)]<br>C<br>A<br>D |

Fig. 20c

| INTERNAL NETLIST PTR. | INTERNAL NETLIST | STACK | INPUT LISTS | SEQUENCE LIST |
|---|---|---|---|---|
| 754 --> | B[(U0)(OUT1)]<br>B(US) | | $I_2$<br>$I_1, I_2$ | B[(U0)(OUT1)]<br>C<br>A<br>D |
| 756 --> | [B[(U0)(OUT2)]]<br>B(US) | | $[I_2]$<br>$I_1, I_2$ | B[(U0)(OUT1)]<br>C<br>A<br>D |
| 758 --> | B[(U0)(OUT2)]<br>B(US) | $[B[(U0)\ (OUT2)], I_2]$ | $I_2$<br>$I_1, I_2$ | B[(U0)(OUT1)]<br>C<br>A<br>D |
| 760 --> | B[(U0)(OUT$_2$)]<br>B(US) | $[B[(U0)\ (OUT2)], I_2]$ | $I_2$<br>$I_1, I_2$ | B[(U0)(OUT1)]<br>[C]<br>A<br>D |
| 762 --> | [B[(U0)(OUT2)]]<br>B(US) | | $[I_2]$<br>$I_1, I_2$ | B[(U0)(OUT1)]<br>C<br>A<br>D |
| 764 --> | [B[(U0)(OUT2)]]<br>B(US) | | $I_2[\ ]$<br>$I_1, I_2$ | B[(U0)(OUT1)]<br>C<br>A<br>D |
| 766 --> | [B[(U0)(OUT2)]]<br>B(US) | | $I_2[\ ]$<br>$I_1, I_2$ | B[(U0)(OUT1)]<br>C<br>A<br>D<br>B[(U0)(OUT2)] |
| 768 --> | <br>B(US) | | <br>$I_1, I_2$ | B[(U0)(OUT1)]<br>C<br>A<br>D<br>B[(U0)(OUT2)] |
| 770 --> | B(US) | | $I_1, I_2$ | B[(U0)(OUT1)]<br>C<br>A<br>D<br>B[(U0)(OUT2)] |
| 772 --> | B(US) | | $I_1, I_2$ | B[(U0)(OUT1)]<br>C<br>A<br>D<br>B[(U0)(OUT2)] |

Fig. 20D

| INTERNAL NETLIST PTR. | INTERNAL NETLIST | STACK | INPUT LISTS | SEQUENCE LIST |
|---|---|---|---|---|
| 774 --> | B(US) | [B(US), $I_1$] | $I_1$, $I_2$ | B[(UO)(OUT1)]<br>C<br>A<br>D<br>B[(UO)(OUT2)] |
| 776 --> | B(US) | [B(US), $I_1$] | $I_1$, $I_2$ | B[(UO)(OUT1)]<br>C<br>[A]<br>D<br>B[(UO)(OUT2)] |
| 778 --> | [B(US)] | | $I_1$, $I_2$ | B[(UO)(OUT1)]<br>C<br>A<br>D<br>B[(40)(OUT2)] |
| 780 --> | B(US) | | $I_1$, [$I_2$] | B[(UO)(OUT1)]<br>C<br>A<br>D<br>B[(UO)(OUT1)] |
| 782 --> | B(US) | [B(US), $I_2$] | $I_1$, $I_2$ | B[(UO)(OUT1)]<br>C<br>A<br>D<br>B[(UO)(OUT2)] |
| 784 --> | B(US) | [B(US), $I_2$] | $I_1$, $I_2$ | B[(UO)(OUT1)]<br>[C]<br>A<br>D<br>B[(UO)(OUT2)] |
| 786 --> | [B(US)] | | I [$I_2$] | B[(UO)(OUT1)]<br>C<br>A<br>D<br>B[(UO)(OUT2)] |
| 788 --> | [B(US)] | | $I_1$, $I_2$[ ] | B[(UO)(OUT1)]<br>C<br>A<br>D<br>B[(UO)(OUT2)] |
| 790 --> | [B(US)] | | $I_1$, $I_2$[ ] | B[(UO)(OUT1)]<br>C<br>A<br>D<br>B[(UO)(OUT2)]<br>B(US) |
| 800 | | | | B[(UO)(OUT1)]<br>C<br>A<br>D<br>B[(UO)(OUT2)]<br>B(US) |

Fig. 24A

NETLIST OF FIG. 24

| BLOCK | INSTANCE NO. | INPUTS | OUTPUTS |
|---|---|---|---|
| D | 900 | I1 conn. to 2002<br>I2 conn. to 2007 | NONE |
| C | 898 | I3 conn. to 2001 | O6 conn. to 2002 |
| B | 896 | I4 conn. to 2000 | O4 conn. to 2001 |
| A | 894 | NONE | O1 conn. to 2000 |
| I | 908 | I6 conn. to 2006 | O8 conn. to 2007 |
| H | 906 | I7 conn. to 2005 | O7 conn. to 2006 |
| G | 902 | I8 conn. to 2003<br>I9 conn. to 2004 | O5 conn. to 2005 |
| F | 904 | NONE | O2 conn. to 2003 |
| J | 910 | NONE | O3 conn. to 2004 |

Fig. 25A

| POINTER NETLIST | NETLIST ELEMENT | NETLIST ELEMENT INPUTS | CURRENT DRIVING ELEMENT | CURRENT DRIVING INPUT LIST | COUNT |
|---|---|---|---|---|---|
| 913 --> | D<br>C<br>B<br>A<br>I<br>H<br>G<br>F<br>J | | | | |
| 914 --> | D<br>.<br>. | $I_1, I_2$ | | | |
| 916 --> | D<br>.<br>. | $[I_1], I_2$ | | | |
| 918 --> | D<br>.<br>. | $[I_1], I_2$ | [C] | | |
| 920 --> | D<br>.<br>. | $[I_1], I_2$ | [C] | $[I_3]$ | 1 |
| 922 --> | D<br>.<br>. | $[I_1], I_2$ | C<br><br>[B] | $I_3$<br><br>$[I_4]$ | 1<br><br>2 |
| 924 --> | D<br>. | $[I_1], I_2$ | C<br>[B] | $I_3$<br>$I_4[]$ | 1<br>2 |
| 926 --> | D<br>.<br>. | $[I_1], I_2$ | [C] | $[I_3]$ | 2 |
| 928 --> | D<br>.<br>. | $[I_1], I_2$ | [C] | $I_3[]$ | 1 |
| 930 --> | D<br>.<br>. | $[I_1], I_2$ | | | |

Fig. 25B

| POINTER NETLIST | NETLIST ELEMENT | NETLIST ELEMENT INPUTS | <----------STACK----------> | | |
|---|---|---|---|---|---|
| | | | CURRENT DRIVING ELEMENT | INPUT LIST | COUNT |
| 932 --> | D ⋮ | $I_1$, [$I_2$] | | | |
| 934 --> | D ⋮ | $I_1$, [$I_2$] | [I] | | |
| 936 --> | D ⋮ | $I_1$, [$I_2$] | [I] | [$I_6$] | 1 |
| 938 --> | D ⋮ | $I_1$, [$I_2$] | I<br>[H] | $I_6$<br>[$I_7$] | 1<br>2 |
| 940 --> | D ⋮ | $I_1$, [$I_2$] | I<br>H<br>[G] | $I_6$<br>$I_2$<br>[$I_8$], $I_9$ | 1<br>2<br>3 |
| 942 --> | D ⋮ | $I_1$, [$I_2$] | I<br>H<br>[G] | $I_6$<br>$I_7$<br>$I_8$, [$I_9$] | 1<br>2<br>3 |
| 944 --> | D ⋮ | $I_1$, [$I_2$] | I<br>H<br>[G] | $I_6$<br>$I_7$<br>$I_8$, $I_9$[ ] | 1<br>2<br>3 |
| 946 --> | D ⋮ | $I_1$, [$I_2$] | I<br>[H] | $I_0$<br>[$I_7$] | 1<br>3 |
| 948 --> | D ⋮ | $I_1$, [$I_2$] | I<br>[H] | $I_6$<br>$I_7$[ ] | 1<br>3 |
| 950 --> | D ⋮ | $I_1$, [$I_2$] | [I] | [$I_6$] | 3 |

Fig. 25c

| POINTER NETLIST | NETLIST ELEMENT | NETLIST ELEMENT INPUTS | CURRENT DRIVING ELEMENT | INPUT LIST | COUNT |
|---|---|---|---|---|---|
| 952 --> | D | $I_1, [I_2]$ | $[I]$ | $I_6[\,]$ | 3 |
| 954 --> | D | $I_1, [I_2]$ | | | |
| 956 --> | D | $I_1, I_2[\,]$ | | | |
| 958 --> | C | $[I_3]$ | | | |
| 960 --> | C | $I_3[\,]$ | | | |
| 962 --> | B | $[I_4]$ | | | |
| 964 --> | B | $I_4[\,]$ | | | |
| 966 --> | A | $[\,]$ | | | |
| 968 --> | I | $[I_6]$ | | | |
| 970 --> | I | $I_6[\,]$ | | | |

<----------STACK---------->

Fig. 25D

| POINTER NETLIST | NETLIST ELEMENT | NETLIST ELEMENT INPUTS | <---------STACK---------> | | |
|---|---|---|---|---|---|
| | | | CURRENT DRIVING ELEMENTS | INPUT LIST | COUNT |
| 972 --> | H | [$I_7$] | | | |
| | . | | | | |
| | . | | | | |
| 974 --> | H | $I_7$[ ] | | | |
| | . | | | | |
| | . | | | | |
| 976 --> | G | [$I_8$], $I_9$ | | | |
| | . | | | | |
| | . | | | | |
| 978 --> | G | $I_8$, [$I_9$] | | | |
| | . | | | | |
| | . | | | | |
| 979 --> | G | $I_8$, $I_9$[ ] | | | |
| | . | | | | |
| | . | | | | |
| 980 --> | F | [ ] | | | |
| | . | | | | |
| | . | | | | |
| 982 --> | J | [ ] | | | |
| 984 | | RETURN | | | |

Fig. 27A

NETLIST OF FIG. 27

| | BLOCK | INSTANCE NO. | INPUTS | OUTPUTS |
|---|---|---|---|---|
| 2276 | A | 1040 | NONE | $O_1$ conn. to 1048 |
| 2278 | B | 1042 | $I_1$ conn. to 1048<br>$I_2$ conn. to 1054 | $O_1$ conn. to 1050 |
| 2280 | B | 1044 | $I_3$ conn. to 1050 | NONE |
| 2282 | C | 1046 | $I_4$ conn. to 1052 | $O_3$ conn. to 1054 |

Fig. 28

| | I1 | I2 | I3 | I4 | O1 | O2 | O3 | (STORED) I1 | I2 | INPUT PTR. | OLF PTR. | OUTPUT UPDATED |
|---|---|---|---|---|---|---|---|---|---|---|---|---|
| 1064 | 0 | 0 | 0 | 0 | 0 | 0 | 0 | | | | | |
| 1065 | 0 | 0 | 0 | 0 | 0 | 0 | 0 | 0 | 0 | | | |
| 1066 | 0 | 0 | 0 | 0 | 0 | 0 | 0 | 0 | 0 | | | O2 |
| 1067 | 0 | 0 | 0 | 0 | 0 | 0 | 0 | 0 | 0 | | O2 | O2 |
| 1068 | 0 | 0 | 0 | 0 | 0 | 0 | 0 | 0 | 0 | I1 | O2 | O2 |
| 1070 | 0 | 0 | 0 | 0 | 0 | 0 | 0 | 0 | 0 | I2 | O2 | O2 |
| 1072 | 1 | 0 | 0 | 0 | 1 | 0 | 0 | 0 | 0 | I2 | O2 | O2 |
| 1074 | 1 | 0 | 0 | 0 | 1 | 0 | 0 | 0 | 0 | I1 | O2 | O2 |
| 1076 | 1 | 0 | 1 | 1 | 1 | 1 | 0 | 0 | 0 | I1 | O2 | O2 |
| 1078 | 1 | 0 | 1 | 1 | 1 | 1 | 0 | 1 | 0 | I1 | O2 | O2 |
| 1080 | 1 | 0 | 1 | 1 | 1 | 1 | 0 | 1 | 0 | I2 | O2 | O2 |
| 1082 | | | | | | | RETURN | | | | | |

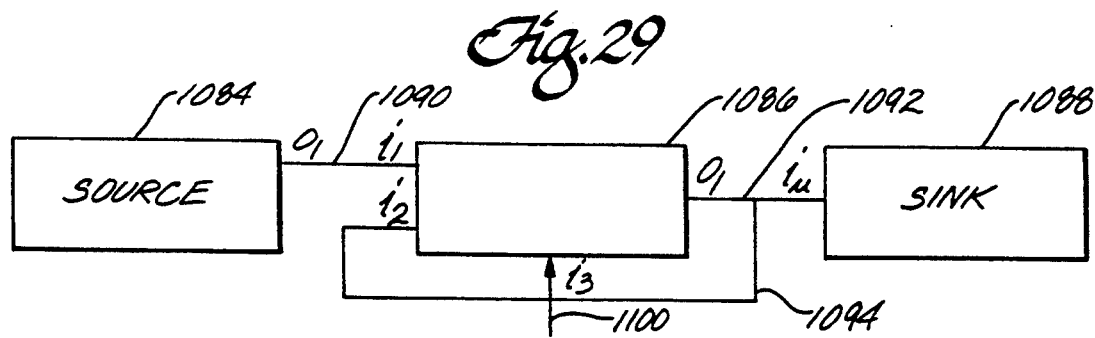
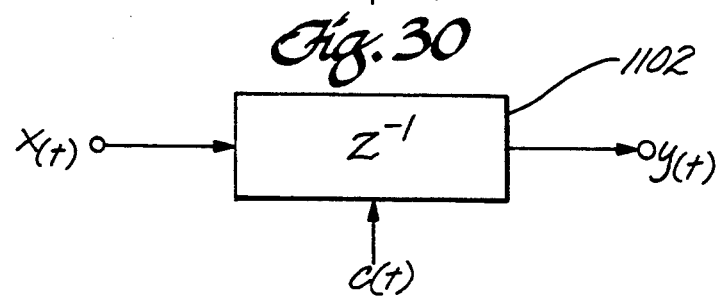
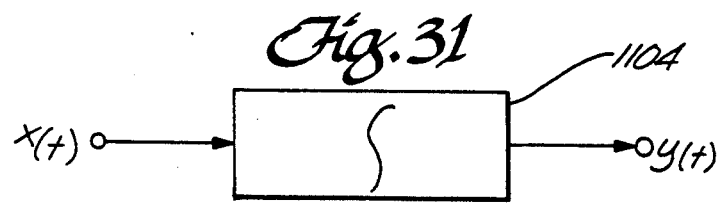
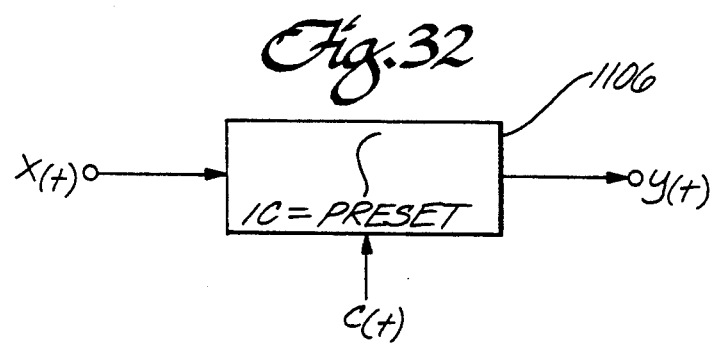
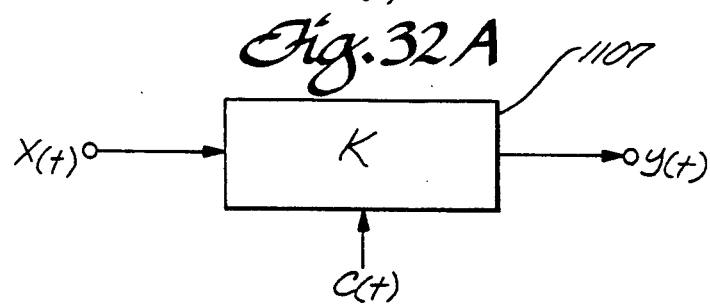
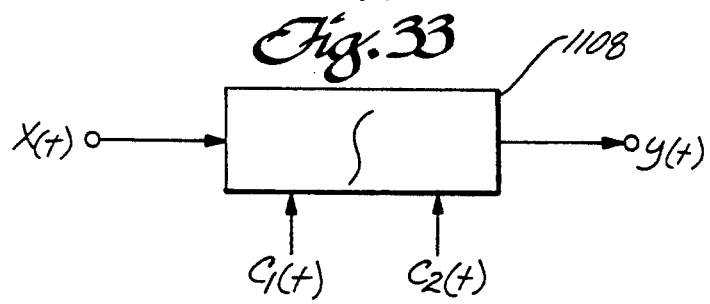

Fig. 36

| T | SOURCES (t) | | | | | | | $x_1(t)$ | $x_2(t-1)$ | $y_1(t)$ | $y_2(t-1)$ | z | $c_1(t)$ | $c_2(T)$ | | | STORE SIGNAL |
|---|---|---|---|---|---|---|---|---|---|---|---|---|---|---|---|---|---|
| | O1 | O2 | O3 | O4 | O5 | O6 | O7 | I1 | I2 | I3 | I4 | I5 | I6 | I8 | I9 | I10 | |
| 0 | 0 | 0 | 1 | 0 | 0 | 0 | 0 | 0 | 0 | 0 | 0 | 0 | 0 | 0 | 0 | 0 | 0 |
| 1 | .1 | .1 | 0 | 1 | 0 | 0 | 0 | .1 | -.1 | 0 | 0 | .1 | -.1 | 0 | 1 | 1 | - |
| 2 | .2 | .2 | 1 | 0 | .1 | -.1 | -.04 | .2 | -.2 | 1 | .1 | .2 | -.2 | -.1 | -.04 | 0 | -.04 |
| 3 | .3 | -.3 | 0 | 1 | .2 | -.2 | -.04 | .3 | -.3 | 0 | .2 | .3 | -.3 | .2 | -.04 | 1 | - |
| 4 | .4 | .4 | 1 | 0 | .3 | -.3 | -.24 | .4 | -.4 | 1 | .3 | .4 | -.4 | -.3 | -.24 | 0 | -.24 |
| 5 | | | | | | | | | | | | | | | | | |
| 6 | | | | | | | | | | | | | | | | | |

Fig. 39

| T | 01 | 02 | 03 | 04 | 05 | 06 | 11 | 12 | 13 | 14 | 15 | 16 | 17 | 18 | 19 |
|---|----|----|----|----|----|----|----|----|----|----|----|----|----|----|----|
| 0 | 0 | 0 | 0 | 0 | -1 | 1 | 0 | 0 | 0 | -1 | 0 | 0 | 0 | 1 | -1 |
| 1 | 1 | 2 | 0 | 2 | 1 | 0 | 1 | 1 | 1 | 1 | 2 | 0 | 2 | 0 | 1 |
| 2 | 2 | 4 | 0 | 4 | 1 | 0 | 2 | 2 | 2 | 1 | 4 | 0 | 4 | 0 | 1 |
| 3 | -3 | 4 | 6 | 10 | -1 | 1 | -3 | -3 | -3 | -1 | 4 | -6 | 10 | 1 | -1 |
| 4 | -4 | 4 | 8 | 2 | -1 | 1 | -4 | -4 | -4 | -1 | 4 | -8 | 12 | 1 | -1 |
| 5 | 5 | 10 | 8 | 18 | 1 | 0 | 5 | 5 | 5 | 1 | 10 | -8 | 18 | 0 | 1 |

BLOCK DIAGRAM SIMULATOR USING A LIBRARY FOR GENERATION OF A COMPUTER PROGRAM

CROSS REFERENCE TO RELATED APPLICATIONS

This application is a continuation of U.S. patent application Ser. No. 07/173,771, filed Mar. 23, 1988 which, in turn, is a continuation-in-part of U.S. patent application Ser. No. 07/065,372, filed Jun. 22, 1987, both now abandoned.

BACKGROUND OF THE INVENTION

1. Field of the Invention

This invention relates to an apparatus and/or method for assembling and executing a software computer program representative of a block diagram having none, one or more feedback loops.

2. The Prior Art

Over the past two decades, there has been a growing interest in the use of simulation-based techniques for the analysis and design of signal processor systems, communication systems and control systems. Indeed, a number of systems have been developed for simulation-based analysis to determine performance, criteria and trade-off analysis of proposed systems, Shanmugan et al., "Block-Oriented Systems Simulator (BOSS)," IEEE (1986); Shanmugan, et al., "Computer-Aided Modeling, Analysis and Design of Communication Systems," *IEEE, Journal on Selected Issues in Communications*, (Jan. 1984).

There are many situations where an explicit performance evaluation of a proposed system cannot be performed without creating an actual prototype. This approach is generally cumbersome, expensive, time-consuming and relatively inflexible; whereas, a computer simulation of the proposed system can be more easily generated and can be used to guide the analysis, testing and documentation of the proposed system.

Simulators are now available for generating models and/or software computer programs for simulating and verifying the performance of prototype or existing systems on a Computer Aided Engineering (CAE) Workstation Platform. A CAE workstation typically includes a programmable microprocessor and a graphics terminal which is a Cathode Ray Tube (CRT) display. The simulators provide the designer with user-friendly environments and easy-to-use design tools for configuring the systems. Typically, a simulator contains four basic components; a system configurator, a function block library, a simulation program builder, and a signal display editor.

The system configurator allows a user to specify the topology of the proposed system in terms of interconnected functional blocks. In some simulators, the system configurator uses interactive graphics, Modestino, et al., "Interactive Simulation of Digital Communication Systems," (Jan. 1984), Wade, et al., "Interactive Communication Systems Simulation Model," (Jan. 1984), while in others, the system configurator uses high level computer oriented software languages, Fashano, "Communication Systems Simulation Using SYSTID," (Jan. 1984), Poza, et al., "A Wideband Datalink Computer Simulation Model," *Computers and Electrical Engineering*, (1978).

Today, a typical simulator for a workstation platform includes a system configurator called a Block Diagram Editor (BDE). The BDE is a software package which enables a designer to construct a block diagram of the system to be simulated. A high resolution graphics terminal is used to display the block diagram to help the user design, edit, and interact with the block diagram. An extensive library of function block symbols is also provided to enable the designer to pick and choose from existing blocks instead of having to design them on his own.

The library contains information about each block, including its submodules, connections, documentation and high-level program code, all of which can be made available to the designer through on-line windows. Function blocks span a wide range of complexity, starting with "primitive" blocks such as summers, and multiplier blocks to blocks which perform high level functions. The user can connect the blocks together with interconnecting lines and provide required parameter information for each of the blocks. The configuration defined by the designer can then also be used to define a new block which can be stored in the library and which can be later recalled as a single block at a higher level in a hierarchic system design.

Once a block diagram has been defined by the designer the BDE then condenses and represents the block diagram as a network list or "netlist". The netlist is a computer-readable form of the block diagram, containing all the required information about the block diagram, such as how the blocks are connected together, the software procedure call the block represents, parameter lists, etc. The simulator converts the netlist version of the block diagram into a high-level computer program by use of a Simulation Program Builder (SPB). The high level computer program is essentially a model of the proposed system which had been previously described by the block diagram.

The high-level code can then be executed to perform and display a simulation of the block diagram. Typically, the simulation will be carried out without any user intervention. During the simulation execution, selected signal values can be collected and saved in various signal files. These signal files can then be accessed by a Signal Display Editor (SDE) that allows the designer to generate, manipulate and analyze the signals.

The signal display editor uses a variety of signal plotting and processing techniques to analyze the results of a simulation. The designer can select from a variety of commands, such as selecting a portion of a signal and displaying it as a function of time and performing spectral analysis.

Simulators are known which have the capability of simulating block diagrams representative of systems which have "feedback." Feedback is the reversion of the output of a system or process to a preceding stage in the same system or process for the purpose of allowing the system or process to perform self-correcting actions based on its output.

One example of a system having feedback is a simple signal processing filter which requires continuous evaluation of the output of the filter in order to determine which corrective measures to take. Systems having feedback are not limited to the signal processing environment. Indeed, any system having self-correcting type measures needs to be designed and modeled with some form of feedback arrangement. Present simulators do not have the capability of adequately simulating systems with feedback because they inefficiently model and simulate blocks in a feedback environment which have a "delay" property; the delay property requires the blocks to have a "state." A "state" is a predefined vector of parameters which are called state variables. State variables are defined by the following conditions:

1) For any time, say $T_1$ (time), the state at $T_1$ (that is the state variables) and the input waveforms determine uniquely the state at any time $T > T_1$; and 2) the state at any time T and the inputs at any time T determine uniquely the output value at time T of the block. Desoer et al., *Basic Circuit Theory* 198, 508 (1969). Essentially, "state" enables a block to process and generate defined outputs without having to have defined inputs. The principal of "delay" comes from the fact that the input values are not immediately required to process the function of the block in order to produce defined information. These concepts are discussed in greater detail in the Detailed Description portion of this application.

One such example of a present simulator which inefficiently models and simulates block diagrams having feedback loops is described in an article by David G. Messerschmitt entitled, "A Tool for Structured Functional Simulation," *IEEE Journal, Selected Areas On Communication*, Vol. SAC-2, No. 1, (Jan. 1984). In this article, a system called "BLOSIM," for simulating block diagrams, is described. In order to accommodate for the "delay" property of blocks which occur in feedback loops, the BLOSIM system provides a buffering type system for ensuring proper synchronization of the delay blocks. More particularly, for each delay block there is provided an input "FIFO" (first-in, first-out) buffer and an output FIFO buffer. The BLOSIM system provides a single software procedure representative of each delay block. The software procedure contains conditional statements for evaluating the status of the buffers. These statements are executed during the simulation of the block diagram in order to determine when particular portions of the routine representative of the delay block need to be performed.

Additionally, to improve efficiency, a sequencer routine presequences the software procedures for the blocks such that they are executed in the order of "signal flow," which is determined by the particular topology of interconnections of the blocks in the block diagram. The presequencing procedure alone, however, will not correctly sequence the software procedures representative of block diagrams which have one or more feedback loops. By repeatedly executing the software procedures in the order determined by the presequencing operation, BLOSIM provides available samples to the input FIFO buffers. When the output FIFO buffer for a particular delay block is not full and the input FIFO buffer is not empty, the software procedure representative of the block removes an input value from the input FIFO buffer and directs the necessary operations representative of the block. Outputs are provided to the output FIFO buffer for the corresponding block until the output FIFO buffer is full. The simulation "deadlocks" (terminates) when each software procedure representative of the block does not attempt to access a FIFO buffer or has an empty input FIFO buffer or a full output FIFO buffer, see, Messerschmitt, "BLOSIM, A Block Simulator," Version 1.1, University of California, Berkeley, internal memo (Jun. 7, 1982).

The BLOSIM simulator uses inefficient software programs and as a result causes inefficient execution because parts of the program are repetitively executed until each block has an empty input FIFO buffer or a full output FIFO buffer or does not attempt to access a FIFO buffer. Additionally, each software program representative of a delay block contains at least one conditional statement which is repetitively executed in order to determine when the input FIFO buffer is empty and/or when the output buffer is full. During simulation, such re-execution of the program slows down simulation. Furthermore, BLOSIM does not organize or sequence the procedures for storage so that the procedures can later be loaded into the memory of a chip for control of that chip.

U.S. Pat. No. 4,677,587 to Zemany discloses a simulator for generating a computer program representative of a block diagram having one or more feedback loops. Specifically, the system forms a table into which the user inserts block identifiers for each block of the block diagram. The user also specifies each block's interconnections with the other blocks of the block diagram. The information for each block is entered into the table in the order that they appear, from left to right, in the block diagram, except for blocks having a delay property which are entered last. The system provides a test function for ensuring that the block identifiers and interconnections have been entered by the operator in the proper order.

The Zemany simulator inefficiently constructs a computer program representative of a block diagram because the user of the system must construct a table of procedure calls representative of the block diagram. When the block diagram is complex, the operator's task becomes very time consuming and cumbersome. In sum, the simulator disclosed by Zemany is an unautomated workstation for assisting the user in designing computer programs representative of block diagrams.

Another example of a present simulator which inefficiently models block diagrams having one or more feedback loops is described in a user's manual entitled, "BOSS (Block Oriented Systems Simulator)," University of Kansas and TRW, BOSS version: Star 1.1 (1986). In this manual, a system called "BOSS," for simulating block diagrams is described. In order to accommodate blocks which have delay property, the BOSS system provides specific delay elements which must be present in the simulation. The BOSS system does not provide a mechanism for allowing a user of the system to design and identify his own blocks which have a delay property. For this reason, the user's task of designing systems which have feedback loops can become cumbersome because the user is constrained to use only the delay elements provided by the system.

SUMMARY OF THE INVENTION

The present invention seeks to provide a method and apparatus that reduces or eliminates the disadvantages referred to above.

Briefly, a method according to the present invention is for ordering computer software procedures in an order in computing machine for modeling each of multiple blocks of a block diagram. The block diagram is capable of having at least one feedback loop. Each block corresponds to a software procedure for performing at least one function and has at least one input or at least one output. The block diagram has interconnections between such inputs and outputs of such blocks forming a block diagram. The method of ordering in a computing machine is as follows. A list of any input for each of such blocks is generated; a list of any output for each of such blocks is generated; a feed-through list for each such output of such blocks is generated. The feed-through list has a list of any input which directly affects the output of the same block. The input, output and feed-through lists are machine processed for ordering of such procedures in the order during modeling.

According to the invention, a programmed computer machine is disclosed for ordering computer software procedures in an order for modeling each of multiple blocks of a block diagram. The block diagram is capable of having at least one feedback loop. Each block corresponds to a software procedure for performing at least one function and has at least one input or at least one output. The block diagram has interconnections between inputs and outputs of the blocks forming the block diagram. The provision is made for generating a list of the inputs for each of the such blocks. Provision is made for generating a list of any outputs for each of such blocks. Provision is made for generating at least one feed-through list for each such output of the blocks. The feed-through list has a list of any input which directly affects any output of the same block. Provision is made for processing, in the computing machine, the input, output and feed-through lists for ordering of the software procedures in the order for execution during modeling.

Also disclosed is a method for assembling in a computer for subsequent machine processing each of multiple blocks of a block diagram. The block diagram is capable of having at least one feedback loop. Each block corresponds to a procedure for performing at least one function and has at least one input or at least one output. The blocks have interconnections between inputs and outputs of the blocks forming the block diagram. At least one of the blocks is a delay block having an input that directly effects an output of such block. At least one of the blocks has an input that effects an output of such block after a delay. The method involves providing a list of each of any of the inputs for each of the blocks, providing a list of the interconnections between the inputs and the outputs, providing an addition to the list of inputs, at least one feed-through list for each delay block. The feed-through list has a list of each of any input for the delay block which directly affects the output of the same delay block. In the computer, the input, interconnection and feed-through lists are processed for ordering of the procedures in an order for subsequent machine processing.

This application also discloses a method for machine assembling at least one block having at least one input and at least one output connected in a feedback loop of a multiple-block diagram. The at least one block is characterized in that the at least one input does not directly affect the at least one output and the at least one input is connected in the feedback loop. The at least one block in the feedback loop corresponds to a software procedure for performing at least one function representative of the block. The software procedure has at least one input corresponding to the at least one input of the block, at least one output corresponding to the at least one output of the block and a state. The state is a function of at least one input of the software procedure occurring at a prior time step to a current time step in the execution of such procedure. The method for assembling involves machine processing the software procedure for calculating the output of the software procedure as a function of the state, and subsequent to the preceding step, machine processing the software procedure as a function of the at least one input thereof for calculating the state for use during subsequent processing of the software procedure.

Further, a programmed computing machine is disclosed for assembling at least one block having at least one input and at least one output connected in a feedback loop of a multiple-block diagram. The at least one block is characterized in that the at least one input does not directly affect the at least one output. The said at least one input is connected in the feedback loop. The at least one block in the feedback loop corresponds to a software procedure for performing at least one function representative of such block. The software procedure has at least one input corresponding to the at least one block, at least one output corresponding to the at least one output of the block and a state. The state is a function of at least one input of the software procedure occurring at a prior time step to a current time step in execution of such procedure. Means is provided for processing the software procedure for calculating the at least one output of the software procedure as a function of the state. Means is operative, subsequent to the processing of the first named means., for processing the software procedure as a function of at least one input thereof for calculating the state for use during subsequent processing of the procedure.

Also disclosed is a method for machine assembling in an order a plurality of procedure for processing where the procedures each perform at least one function and represent multiple blocks of a block diagram. The block diagram is capable of having at least one feedback loop. At least one procedure corresponds to each block for performing at least one function. Each block and the corresponding procedure has at least one input or at least one output. The blocks have interconnections between inputs and outputs of the blocks forming the block diagram. Each of at least some of the blocks and the corresponding procedure have an input that directly affects an output thereof. Each of at least some of the blocks and the corresponding procedure have an input that affects an output of such block after a delay. The method of machine assembling involves providing a list of such interconnections between the inputs and outputs and, in addition to the list of interconnections, at least one feed-through list for each of at least some of the blocks. Each feed-through list has a list of any input which directly affects an output of the same block. The interconnection and feed-through lists are processed in the machine for ordering of the procedures during assembling.

Applicant discloses a method for building in a memory, for subsequent machine processing, a machine readable data base representing a block. The block has at least one input or at least one output for connection in a feedback loop with other blocks in a block diagram. The at least one input does not directly affect the at least one output and is connected in the feedback loop. The at least one block in said feedback loop corresponds to a procedure for performing at least one function representative of the block. The procedure has at least one input corresponding to the at least one input of the block, at least one output corresponding to the at least one output of the block and a state. The state is a function of the at least one input of the procedure occurring at a prior time step to a current time step. The software procedure is separated into first and second software procedure portions. The method involves storing in the memory, a representation of the first procedure portion for calculating the output of the procedure as a function of the state, and storing in the memory a representation of the second procedure portion for calculating the state for use by the first procedure portion.

Disclosed herein is a method for building in a memory, for subsequent machine processing, a machine readable database of each of multiple blocks of a block diagram capable of having at least one feedback loop. Each block corresponds to a procedure for performing at least one function. Each block and the corresponding procedure comprise at least one input or at least one output. The blocks and corresponding procedures having interconnections between inputs and outputs of the blocks forming the block diagram. Each of at least some of the blocks and the corresponding procedure have an input that directly affects an output thereof. Each of at least some of the blocks and the corresponding procedure having an input that affects an output thereof after a delay. The method for building the database involves storing in the memory, for each block, a machine readable list of all of any such inputs for such block. Storing in the memory, for each block, a machine readable list of all of any such outputs for such block. Storing in the memory for each block, at least one machine readable feed-through list having a list identifying all of any inputs which directly effect any output of the same block.

BRIEF DESCRIPTION OF THE DRAWINGS

FIG. 1 depicts a schematic block diagram of computer programs for operation of the simulator of FIG. 1A;

FIG. 3A depicts a representative netlist stored in a memory of the system of FIG. 1A containing information which used by the simulator of FIG. 1A to interpret the block diagram of FIG. 3;

FIG. 3B depicts a representation of a sequence list of procedure calls stored in a memory of the system of FIG. 1A, including update output procedures and update state procedures which are executed by the simulator of FIG. 1A to simulate the block diagram of FIG. 3;

FIG. 3C depicts a representation of a library of the procedures stored in a memory of the system of FIG. 1A, which are referenced by the procedure calls in FIG. 3B and are representative of the function of each block of FIG. 3A;

FIG. 3D depicts a representation of a compiled computer program which is stored in a memory of the system of FIG. 1A, for simulating the block diagram of FIG. 3;

FIG. 4 is a typical screen display depicting the input and output signal waveform of the block diagram in FIG. 3 being simulated by the simulator of FIG. 1A;

FIG. 8A depicts of a representation of a NETLIST stored in a memory of the system of FIG. 1A, containing information used by the simulator of FIG. 1A to interpret the block diagram of FIG. 8;

FIG. 8B depicts a library of procedures stored in a memory of the system of FIG. 1A which are representative of the blocks in the block diagram of FIG. 8;

FIG. 8D depicts a representation of a NETLIST stored in a memory of the system of FIG. 1A containing information used by the simulator of FIG. 1A to interpret the block diagram of FIG. 8C;

FIG. 8E depicts a library of procedures stored in a memory of the system of FIG. 1A which are representative of the block in the block diagram of FIG. 8C;

FIGS. 9A and 9B depict intermediate results of the simulator (FIG. 1A) controlled by the first embodiment of the RESTRICTED SEQUENCER method (FIG. 5A) controlling the sequence the procedure calls representative of the block diagram of FIG. 8;

FIG. 10 depicts intermediate results of the simulator controlled by the first embodiment of the RESTRICTED SEQUENCER method failing to sequence the procedure calls representative of the block diagram of FIG. 8A;

FIGS. 11C and 11D are flow diagrams which depict the sequence of operations of the simulator of FIG. 1A under control of the SOME FEEDTHROUGH method referenced in FIG. 11A.

FIGS. 12A, B, C and D are tables depicting intermediate results of the simulator (FIG. 1A) controlled by the first GENERAL SEQUENCER method of FIG. 11A sequencing the procedure calls representative of the blocks of FIG. 13;

FIG. 13A depicts a representation of a NETLIST stored in a memory of the system of FIG. 1A containing information used by the simulator of FIG. 1A to interpret the block diagram of FIG. 13;

FIG. 13B depicts a library of procedures stored in a memory of the system of FIG. 1A which are representative of the blocks in the block diagram of FIG. 13;

FIG. 14E is a flow diagram which depicts the sequence of operations of the simulator of FIG. 1A under control of the SEPARATE FUNCTIONALITY method referenced by FIG. 14B in the general case;

FIG. 14G is a flow diagram which depicts the sequence of operations of the simulator of FIG. 1A under control of the SEQUENCER method referenced by FIG. 14F;

FIG. 15B depicts a representation of a NETLIST stored in a memory of the system of FIG. 1A containing information used by the simulator of FIG. 1A to interpret the block diagram of FIG. 15A;

FIG. 15C depicts a library of procedures stored in a memory of the system of FIG. 1A, which are representative of the blocks in the block diagram of FIG. 15A;

FIG. 15E depicts a representation of an internal Netlist stored in a memory of the system of FIG. 1A containing information to be used by the simulator of FIG. 1A to interpret the block diagram of FIG. 15B.

FIG. 16 is a table depicting intermediate results of the PROCESS EXTERNAL NETLIST method controlling the expansion the netlist of FIG. 15B into the internal netlist of FIG. 15E;

FIGS. 17A, B, C and D depict intermediate results of a simulation of the block diagram of FIG. 15D controlled by the second RESTRICTED SEQUENCER method of FIGS. 14A, B, C, E, F, and G;

FIG. 18B depicts a representation of a netlist stored in a memory of the system of FIG. 1A containing information used by the simulator of FIG. 1A to interpret the block diagram of FIG. 18A;

FIG. 18C depicts a library of procedures stored in a memory of the system of FIG. 1A which are representative of the blocks in the block diagram of FIG. 18A;

FIG. 18E depicts a representation of an expanded netlist of FIG. 18B containing information necessary for the simulator of FIG. 1A to interpret the block diagram of FIG. 18D;

FIG. 19, including FIGS. 19A, B and C depicts intermediate results of the PROCESS EXTERNAL NETLIST method for controlling the expansion of the netlist of FIG. 18B into the internal netlist of FIG. 18E;

FIGS. 20A, B, C, and D depict intermediate results of a simulation of the block diagram of FIG. 18D controlled by the second GENERAL SEQUENCER method of FIGS. 14A, B, D, E, F, and G;

FIG. 24A depicts a representation of a netlist stored in a memory of the system of FIG. 1A containing information necessary for the simulator of FIG. 1A to interpret the block program of FIG. 24;

FIGS. 25A, B, C, and D depict intermediate results of a simulation of the block diagram of FIG. 24 by the first RUNTIME SIMULATOR method;

FIG. 27A depicts a representation of a netlist stored in a memory of the system of FIG. 1A containing information necessary for the simulator of FIG. 1A to interpret the block diagram of FIG. 27;

FIG. 28 depicts intermediate results of the second RUNTIME SIMULATOR method simulating the block diagram of FIG. 27;

FIG. 29 is a block diagram with one block having a control input which is formed on the display and in the simulator of FIG. 1A;

FIG. 30 is a block diagram of a unit delay block with a control input for "hold" which is formed on the display and is simulated in the simulator of FIG. 1A;

FIG. 31 is a block diagram of an integrator block which is formed on the display and is simulated in the simulator of FIG. 1A;

FIG. 32 is a block diagram of an integrator block with a control input for "reset" which is formed on the display and is simulated in the simulator of FIG. 1A;

FIG. 32A is a block diagram of a coefficient block with a control input "set" which is formed on the display and is simulated in the simulator of FIG. 1A;

FIG. 33 is a block diagram of an integrator block with two control inputs, one for "hold" and one for "reset" which is formed on the display and is simulated in the simulator of FIG. 1A;

FIG. 36 depicts intermediate results of a simulation of the block diagram of FIG. 34;

FIG. 39 depicts the intermediate results of a simulation of the block diagram of FIG. 38.

DETAILED DESCRIPTION

TABLE OF CONTENTS

I. AN OVERALL DESCRIPTION OF THE BLOCK DIAGRAM SIMULATOR
  A. A Simple Block Diagram of FIG. 2
  B. Update Output and Update State Procedures
  C. An Example of the Block Diagram Simulator Simulating a Filter Diagram of FIG. 3
    1) Assembly of a Computer Program Representative of the Block Diagram of FIG. 3
    2) Modeling State Blocks
    3) Execution of the Assembled Computer Program Representative of the Block Diagram of FIG. 3

II. SEQUENCE CONTROLLERS
  A. First Embodiment of the RESTRICTED SEQUENCER Method, FIGS. 5A, B and C
    1) Feedthrough List
    2) The RESTRICTED SEQUENCER Method of FIG. 5A
    3) ALL FEEDTHROUGH Method of, FIG. 5B
    4) SOME FEEDTHROUGH Method of FIG. 5C
    5) CODE GENERATION Method of FIGS. 6A and 6B
    6) Detailed Example of RESTRICTED SEQUENCER Method of FIGS. 5A, B and C
    7) Detailed Example of the RESTRICTED SEQUENCER Method of FIGS. 5A, B and C Failing to Sequence FIG. 8D
      (a) Solution—Multiple Feedthrough Lists Per Block
  B. First Embodiment of the GENERAL SEQUENCER Method of FIGS. 11A, B, C and D
    1) Detailed Example of the First Embodiment of the GENERAL SEQUENCER of Method FIGS. 11A, B, C and D
  C. Second Embodiment of the RESTRICTED and GENERAL SEQUENCER Methods of FIGS. 14A, B, C, D, E, F and G
    1) SEPARATE FUNCTIONALITY Method of FIG. 14B for One Update Output Procedure and One Feedthrough List Per Block
    2) SEPARATE FUNCTIONALITY Method of FIG. 14D for Multiple Update Output Procedures and Only One Feedthrough List Per Block
    3) SEPARATE FUNCTIONALITY Method of FIG. 14E for Multiple Update output Procedures and Multiple Feedthrough Lists Per Block
    4) SEQUENCER DRIVER Method of FIG. 14F
    5) SEQUENCER METHOD of FIG. 14F
    6) Example of the Second Embodiment of the RESTRICTED SEQUENCER Method of FIGS. 14A, B, C, F and G
    7) Detailed Example of the Second Embodiment of the GENERAL SEQUENCER Method of FIGS. 14A, B, E, F and G
  D. RUNTIME SEQUENCER Methods of FIGS. 21 and 26
    1) First Embodiment of the NUMBER OF SUBITERATIONS Method of FIG. 22A
    2) MAXIMUM CHAIN LENGTH Method of FIG. 22B
    3) Second Embodiment of the NUMBER OF SUBITERATIONS Method of FIG. 23
    4) Detailed Example of the RUNTIME SIMULATOR of FIGS. 21, 22A and 22B
    5) Second Embodiment of the RUNTIME SIMULATOR Method of FIGS. 26A and 26B
    6) Detailed Example of the Second Embodiment of the RUNTIME SIMULATOR Method of FIGS. 26A and 26B
  E. Control Input Simulation

DETAILED DESCRIPTION

I. AN OVERALL DESCRIPTION OF THE BLOCK DIAGRAM SIMULATOR

Figure 1A:
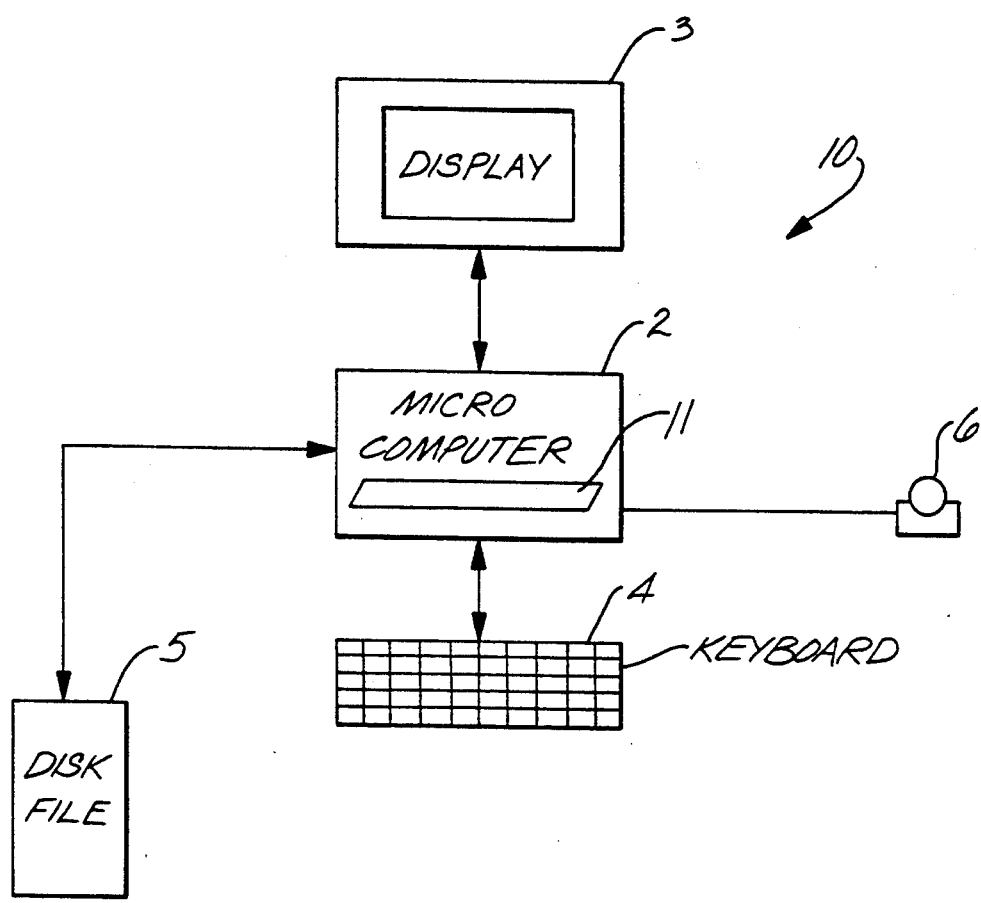
FIG. 1A is a schematic block diagram of a simulator for assembling a software computer program representative of a block diagram in accordance with the present invention.

FIG. 1A depicts a block diagram simulator for assembling and executing software computer programs representative of block diagrams. The simulator software is housed in a store 11 which is in the computer workstation platform 10. The platform 10 enables users to communicate with the simulator software. More particularly, FIG. 1A depicts a conventional platform including a microprocessor 2, display 3, keyboard entry 4, mouse 6 for communicating with the microcomputer 2 and auxiliary disk file 5. When the store 11 is loaded with software programs including the simulator's software to be described, the simulator or platform 10 is formed.

FIG. 1 depicts a combined block diagram of the computer programs, library, netlist and sequence list used by the platform 10 of FIG. 1A as well as the data flow for simulation. More particularly, BLOCK DIAGRAM EDITOR (BDE) 12 enables the designer to define a configuration of the block diagram on the screen display 3 (FIG. 1A). A BLOCK LIBRARY MANAGER 14, maintains a BLOCK LIBRARY STORE 14A which contains computer procedures, symbols and other information (to be described) representative of the blocks in the block diagram. NETLIST GENERATOR 16 is a computer program which causes platform 10 to assemble an interconnected list which is the first computer readable version of the block diagram specified by the designer and it is stored in the netlist store 16A. SIMULATION PROGRAM BUILDERS (SPB) 18 and 26 are computer programs that cause the platform 10 to construct and execute computer programs representative of the block diagrams on the screen display. SIGNAL DISPLAY EDITOR (SDE) 30 is a computer program that causes the platform 10 to edit and/or evaluate the signals generated by the simulation. Many of the computer programs listed above can also be represented as hard wired chips which separately control the operations of the platform 10. Designing logical circuit descriptions from computer programs is well known to those skilled in the art.

Platform 10 has the capability of enabling a user to maintain a large number of windows or displays for viewing on the screen so that the user can examine and obtain information from several module levels at the same time. The platform 10 also maintains a menu (not shown) of the various displays so that the user can select a particular display on the screen.

A designer specifies the topology of a proposed system in terms of blocks by using the BDE 12. The BDE 12 is a software package which enables the user to construct a block diagram with the mouse 6 and the keyboard 4 (FIG. 1A). The mouse 6 is a device used to designate blocks, make connections between blocks, etc., and is well known in the art. The LIBRARY STORE 14A is an extensive database of symbol drawings and computer procedures representative of the functions of each of the blocks. More particularly, the computer procedures are representative of functions or control functions or signal processing functions to be simulated. The execution of the computer procedures for any block causes the platform 10 to simulate the operation of the block. Execution of the computer procedures for all the blocks of a block diagram on the display causes the platform to simulate the operation of the over block diagram.

The signal processing procedures stored in the LIBRARY STORE 14A span a wide range of function complexity, starting with "primitive unit delay," summer and multiplier blocks and concluding with procedures that perform high-level functions such as adaptive processing. By way of example, a preferred embodiment of the invention includes procedures well known in the art for implementing the following types of functional blocks: DSP Kernal Blocks - Unit Delay, 2-Input Multiplier, 2-Input Adder, Constant, Coefficient; Linear Processing Blocks - Filter, Bulk Delay, Tapped Delay Line, FFT, Integrator, Differentiator, Multiple Input Summers; Non-Linear Processing Blocks-Quantizer, Clipper, Thresholder, Positive Rectifier, Negative Rectifier, Switch Out, Switch In, Max/Min Value Finder; Mathematical Blocks - $1/x$, $e^x$, $\ln(x)$, $\sin(x)$, $\cos(x)$, $\tan(x)$, $\operatorname{atan}(x,y)$, square root, $x^y$, $20\log_{10}(x)$, $\operatorname{abs}(x)$; Signal Generation/Storage/Re-Sampling - Signal Source, Signal Sink, Vector Signal Source, Vector Signal Sink, Write to Results File, Programmable Function Generator, Noise Generator, Impulse, Unit Step, File Constant; Vector Operations - Vector Sum, Vector Component Sum, Vector Dot Product, Vector Pointwise Multiply, Vector Scale, Vector Delay, Vector Reverse, Vector Split to Vectors, Vector Split to Scalers, Vector Joined to Vector, Scalers Joined to Vector; Flow of Control - Hold Value, 2-Input And, 2-Input Or, Inverter, Stop, Clock, Counter, Latch; Instruments - Tek 11400 Scope, Tek 5010 Function Generator. A more detailed description of each functional block is presented in a manual entitled "Signal Processing Worksystem User Guide-Document, Version O.O.", CAE Systems Inc. - Tektronix Inc., Chap. 4, pp. 1–281 (August 1987).

The block diagram created by the designer on the display is converted into a computer-readable form called a network list (netlist) under the control of the NETLIST GENERATOR 16. The techniques employed by the system for generating a netlist are well known in the art. Typically, the netlist contains a list of the inputs and outputs line connections and parameter values for each block. The SPB 18 and 26 cause the platform 10 to generate and execute computer programs representative of the block diagrams.

More particularly, SPB 18 contains three parts; a SEQUENCE LIST GENERATOR 20, a CODE GENERATOR 22, and a PROGRAM EXECUTOR 24. There are four different embodiments of the SEQUENCE LIST GENERATOR 20 to be discussed. The SEQUENCE LIST GENERATOR 20 controls the creation of a sequence list of procedure calls. The sequence list is maintained in a SEQUENCE LIST STORE 20A. The sequence list is then compiled into object code under control of the CODE GENERATOR 22. Either a simulation is preformed under control of the PROGRAM EXECUTOR or the compiled code is loaded in to another storage area of the platform or into storage of a separate system such as microprocessor chip 21. For example, microprocessor chip 21 can perform in a real time product environment to control the operations of the product (i.e., carburetor control, flight control, etc.)

SPB 26 is a RUNTIME SIMULATOR 28 which does not require the generation of a sequence list and it does not require code compilation. Instead, program code is preassembled and called when needed for execution.

After either SPB 18 or 26 is executed, the SDE 30 has a variety of editing commands that are used to analyze the resulting signals from a simulation. The SDE 30 is capable of performing; linear or non-linear processing, and spectral and statistical analysis of the signals. The SDE 30 is also capable of generating and manipulating signals that can be used as input signals to a simulation run. Although a detailed description of the SDE 30 is not provided, various embodiments of the SDE 30 are well known and available to those skilled in the art.

Briefly, what is disclosed is a method and apparatus using an automatic program generation computer for assembling a computer program representative of a functionally interactive and interconnected block diagram. The assembled program can either be executed for simulation of the block diagram or it can be processed for storage.

In the alternative, the method and apparatus may execute the program as it is assembled on a run-time basis and, thereby, simultaneously assemble and execute the program.

The block diagram created by a user on the screen display is a functional system, which has a plurality of interactively connected first and second system blocks or functionality blocks, forming the overall block diagram. Some of the blocks have an input, some have an output and some have both inputs and outputs. Some of the system blocks have at least one input which is functionally defined by an output of a system block. Some of the system blocks are second system blocks with delay or state blocks, each of whose operation, at one time, is dependent on the condition of the input at a prior time than the current time. Stated differently, the output is dependent on a prior input signal rather than the current input signal.

The LIBRARY STORE 14A includes a stored update state procedure corresponding to each second or state system block, which defines a "state" of the second or state system block as a function of its inputs. Also, each library block includes at least one stored update output procedure, which defines its output as a function of any of its inputs, and/or the state, if the system block is a second or state systems block. An example of the procedure calls and procedures are shown in FIG. 3C.

The LIBRARY STORE 14A also includes in each library block certain other information which is representative of the characteristics of the system block. This information includes, by way of example, a system block type, a list of all inputs to the system block, a list of all outputs from the system block and a feed-through list which lists all inputs which directly affect the output of the system block. More particularly, the feed-through list identifies all inputs to the corresponding system block and therefore update output procedure, which directly affects the output of the system block and are used as input to the update output procedure of the corresponding library block.

In operation, the platform 10 processes the representations of the characteristics of each of the blocks. The block diagram is converted into a sequence list of procedure calls, i.e., a list of the procedure calls for update state procedures (i.e., representations of update state procedures), if any, and separately, procedure calls for update output procedures (i.e., representations of update output procedures). When the procedure calls are compiled, the corresponding procedures are obtained from the library and expanded into object code ready for execution. Execution of the object code in the order depicted by the sequence list effectively simulates the operation of the block diagram.

The SEQUENCE LIST GENERATOR 20 is used for sequencing the procedure calls and storing them in the sequence list which is stored in the SEQUENCE STORE 20A. The stored sequence list in STORE 20A is subsequently used by the platform for obtaining the corresponding procedures (source code) from the STORE 14A which is processed by the CODE GENERATOR 22 for compiling object code. The object code may be executed by the microprocessor to simulate the operation of the block diagram using digitally coded representations of signals and to form output signals which may be displayed on the screen as depicted in FIG. 4. In the alternative, the object or machine code may be output, processed and then stored in the memory of another system such as a mainframe computer or a microprocessor chip 21 for controlling the operation of the respective system so as to simulate the operation of the block diagram.

In the RUNTIME SIMULATOR, a sequencer executes, for each of the blocks in a data dependent sequence, on the update state procedures (i.e., representations of update state procedures), if any, and update output procedures (i.e., representations of update output procedures). Additionally, each update state procedure is included in the sequence separate from the update output procedure for the corresponding state block.

The procedure calls are executed on a real-time basis to simulate the operation of the block diagram on the display.

A. A Simple Block Diagram of FIG. 2

Figure 2:
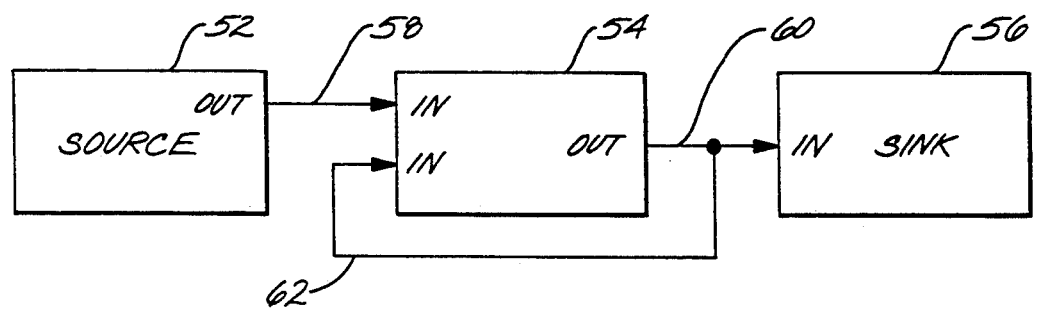
FIG. 2 is a simple block diagram having a feedback loop which is formed on the display and is simulated in the simulator of FIG. 1A.

FIG. 2 represents a simple block diagram having one feedback loop that has been created on the display by a user. Each block corresponds to a particular function to be performed by a software procedure which is stored in LIBRARY STORE 14A. The blocks 52, 54, and 56 are connected by lines 58, 60 and 62 and these interconnecting lines represent the transfer of data between the blocks. The output 58 of block 52 becomes the input 58 to block 54, and the output 60 of block 54 becomes the input 60 of block 56. The input 62 to block 54 is also an output of block 54. Data flows through the system from block 52 to block 56 when a simulation of the block diagram is performed.

The order in which each procedure representing each block is carried out must be carefully considered, to guarantee that the input data to each procedure representing a block is defined before the block's procedure can properly process the data. When a procedure for a block's output is produced by processing defined inputs for the block's procedure, the output is said to be "updated." Essentially, the term "updated" means that the signal information in the output of the particular block is defined.

Simulation of the block diagram in FIG. 2 in one prior art system involves calling the software procedures representative of the blocks in an order from the left most block to the right most block. This procedure is called "next block simulation." Assuming that "next block simulation" is used to simulate the block diagram, the procedure representative of source block 52 is called first, to produce output 58. Then the procedure for block 54 is called, however, this procedure could not be properly processed because input 62 is still not yet defined. Input 62 is part of a feedback loop and it will not be defined until block 54's output is updated. Stated differently, the only way the simulator could define input 62 is by processing the procedure for block 54. However, the procedure for block 54 cannot produce defined outputs until inputs 58 and 62 are both defined. Thus, the procedure for block 54 can never produce defined or updated outputs because input 62 will never be defined using this approach.

A solution to this dilemma would be to examine the delay properties of the blocks involved in the system. If block 54 had a delay property, the output to block 54 could be generated without having to have defined data at input 62. If block 54 has delay, i.e., is a second system block, then it must have memory, or a state. One way of adding a delay property to a block would be to add memory or a "state" to the block. (Blocks having delay are often called a "delay blocks" or "state blocks".) The procedure for the block can then process "state" information which had been previously stored and used generate defined or updated outputs for the first time step and before the state is updated.

B. Update Output and Update State Procedures

In the preferred embodiment, two computer procedures are provided for maintaining and processing the state of a block having a delay property. First, a computer procedure is provided for processing the inputs and/or the state of the block to produce defined outputs. This computer procedure, regardless of its function, is called the "update output" procedure for the output. The second procedure is solely for updating the state of the block once its inputs are defined. This procedure is called the "update state" procedure. Both procedures effectively model the operation of a state block which has a state. The designer of the "update output" and "update state" procedures must consider the function of the block in order to determine how the procedures should be represented. A more detailed discussion on the designer's design consideration will be provided in section I[C(2)]).

A significant portion of the invention relates to an apparatus and method for determining the proper sequence of software procedure calls to be made so that defined data is processed during a simulation, particularly when the block diagram (as in FIG. 2) to be simulated has delay blocks. The computer procedure calls control the steps performed by the computer for simulating the operation of a block. An update output procedure processes the inputs signals to a block to determine output signals from the block. For example, an update output procedure might be the procedure for multiplying a coefficient 'y' by an incoming signal to produce an output. Whereas, an update state procedure is for updating the state of a block. For example, the update state procedure for a unit delay block updates the state of the block with the current input signal to the block. The update output procedure for this block is a procedure for outputting the input signal stored in the state from the prior time step. For the purpose of providing background to the reader, the following discussion illustrates the procedure a hypothetical simulator would follow in order to model and simulate a more complex example which has state blocks by using the update output and update state procedures.

C. An Example of the Block Diagram Simulator Simulating a Filter Diagram of FIG. 3

Figure 3:
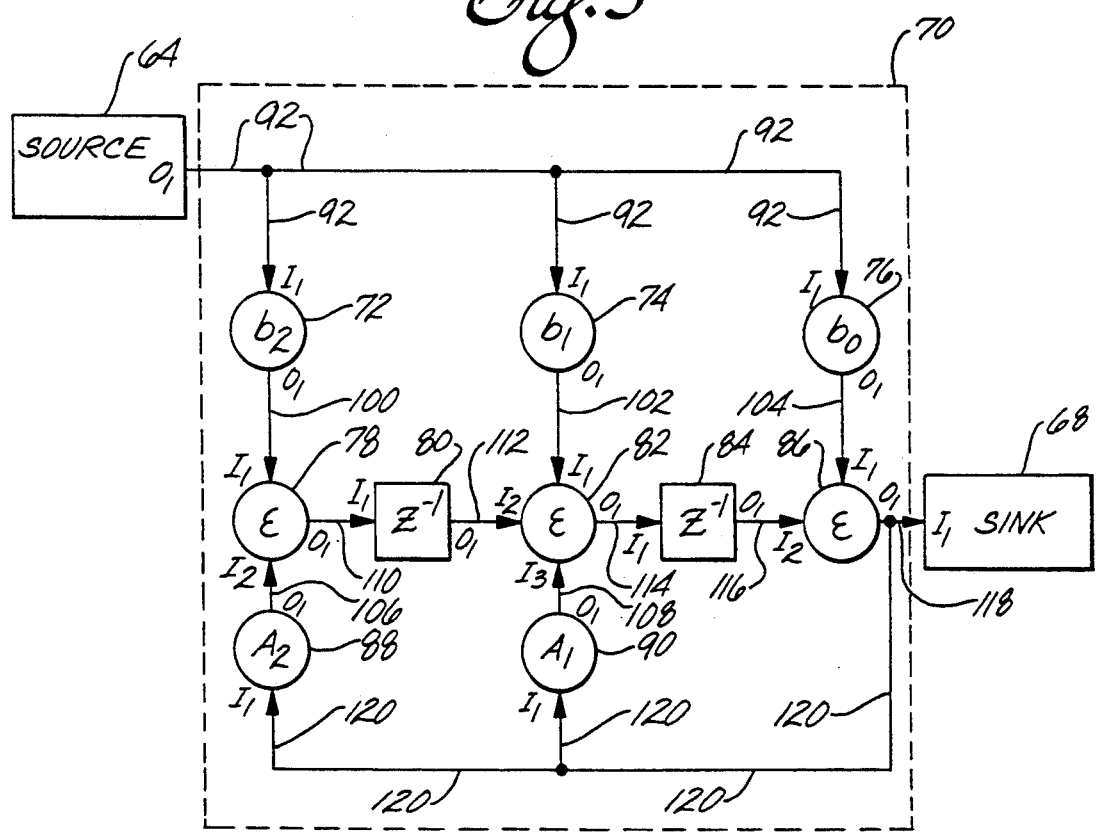
FIG. 3 is a block diagram of a signal processing filter arrangement which is formed on the display and in the simulator of FIG. 1A.

FIG. 3 is representative of a block diagram of a simple filter for cleaning up a signal. For example, this filter might be used to take noise out of a speech signal generated at source block 64. Sink 68 would contain a filtered version of the speech signal without the noise. Referring to FIG. 4, a screen display of the source and sink signals is shown. Signal 65 represents a speech signal prior to filtering, and signal 66 represents the speech signal after filtering.

The source block 64 generates signals and the coefficient blocks 72, 74 and 76 multiply the source signal by $B_2$, $B_1$, and $B_0$, respectively. Blocks 78, 82, and 86 are summer blocks for summing the inputs connected to the blocks. Blocks 88 and 90 are also coefficient blocks which multiply $A_2$ and $A_1$ by the signal which is fed back over line 120. The delay blocks 80 and 84 are "unit delay" blocks, meaning that their outputs are the value of the block's input or inputs from the previous time step. The output is a function of this previous information and the previous information can be preset so that when the system "starts up," the memory or state is loaded with the proper parameters to generate a defined output on the initial time step of execution.

1) Assembly of a Computer Program Representative of the Block Diagram of FIG. 3

Consider now a general example of how the SEQUENCE LIST GENERATOR 20 creates a sequence list to be stored in the SEQUENCE LIST STORE 20A, according to the present invention. First, a designer might use the keyboard 4 and mouse 6 (FIG. 1A) to design the block diagram of the filter shown in FIG. 3. Software of the BDE 12 enables the designer to direct lines and make interconnections on the screen display. Once the block diagram has been completed a netlist representation of the block diagram can be formed by the NETLIST GENERATOR 16. The netlist is a representation of the block diagram, which characterizes the block diagram for the platform 10. The netlist representation of the block diagram for FIG. 3 is shown in FIG. 3A. Each netlist element, each row of FIG. 3A) corresponds to a different block and the element contains four categories of information; a block function type, an instance number, inputs to the block and outputs from the block. The block function type is a computer-language description of the type of function (coefficient, "unit" delay, etc.) represented by the block. The instance number corresponds to the occurrence of a particular block in the block diagram. Instance numbers differentiate the blocks which have the same block type. For example, the coefficient block type is represented five times in the block diagram of FIG. 3, at 72, 74, 76, 88 and 90. The instance numbers enable the platform to differentiate the coefficient blocks from one another. If the blocks in the block diagram were all of different function types, then only the function type for the blocks is necessary to distinguish the blocks from one another. In the preferred embodiment, the instance numbers are included in the netlist regardless of whether they are actually utilized to differentiate the blocks.

Referring to FIG. 3A, a description of some of the elements in the netlist corresponding to FIG. 3 is now discussed. Specifically, element 2040 is a netlist description of the source block. The source block has an instance number 64, no inputs and an output $0_1$, which is connected to line 92. The next element, 2042 in the netlist, describes the interconnection of the coefficient block, $B_0$, in the block diagram (FIG. 3). In particular, the coefficient block, $B_0$, has an instance number 76, an input $I_1$ connected to line 92 and an output $0_1$ connected to line 104. Input $I_1$, to the coefficient block $B_0$, is connected to the same line as the output $0_1$ of the source block 64. This information enables the platform 10 to link the output of the source block to the input of the coefficient block $B_0$ 76. Referring to element 2044, the netlist description of the coefficient block, $B_1$, is shown. Coefficient block $B_1$ has an instance number 74, input $I_1$ connected to Line 92 and output $0_1$ connected to line 102. As in the case of the coefficient block, $B_0$, the coefficient block $B_1$ is also connected to line 92. The platform 10 also links up the output $0_1$ of the source block 64 to the coefficient block $B_1$, 74.

The netlist information shown in FIG. 3A enables the platform to characterize the entire filter diagram. Additional information may be contained on the netlist; however, for purposes of this application, only the information shown in FIG. 3A is necessary to characterizing the block diagram of FIG. 3 for simulation purposes.

Once the netlist has been generated by the NETLIST GENERATOR 16, an ordered list or sequence list of procedure calls for simulating the filter (FIG. 3) can be generated. The sequence list contains the proper order of procedure calls for referencing computer procedures stored in the LIBRARY STORE 14A. FIG. 3C depicts the computer procedures representative of the blocks in the filter block diagram (FIG. 3) which are stored in LIBRARY STORE 14A. Referring to FIG. 3B, the sequence list of procedure calls corresponding to the filter FIG. 3 is shown. Specifically, a list of fourteen procedure calls (in the C-LANGUAGE) are shown. The formation of the sequence list (FIG. 3B) is controlled by one of the four methods executed by the SEQUENCE LIST GENERATOR 20. Representative information feedthrough list, etc. (to be discussed), of each block in the LIBRARY STORE 14A is analyzed, along with the netlist information to determine the order in which the procedure calls are placed on the sequence list.

A general description of the strategy for generating the sequence list of procedure calls (FIG. 3B) is now discussed. First, the source block 64 does not have any inputs and thus requires no input signal to be generated before it can produce an output. Thus, the update output procedure call for this block is placed on the sequence list (2064, FIG. 3B) The next update output procedure calls placed on the sequence list are for the Z-blocks or unit delay blocks 80 and 84. These blocks do not require defined input data and therefore, can generate output data as long as their states have been preset (2066, 2068, FIG. 3B). Any one of the update output procedures calls for the coefficient blocks 72, 74, 76 can then be placed on the sequence list in any order (2070, 2072, 2074, FIG. 3B). Then the procedural call for summer block 86 (2076, FIG. 3B), followed by the procedure call for the coefficient blocks 88 and 90 (2078, 2080, FIG. 3B), followed by the procedure call for the summer blocks 78 and 82 (2082, 2084, FIG. 3B), followed by the procedure call for the sink block 68 (2086, FIG. 3B) are placed on the sequence list. The last procedural calls to be placed on the sequence lists are for updating the states of the Z-blocks 80 and 84 (2088, 2090, FIG. 3B).

CODE GENERATOR 22 assembles a computer program representative of the sequence list (FIG. 3B), by expanding each procedure call into the corresponding computer procedure stored in the LIBRARY STORE 14A. For example, the update output procedure call for the Z-block 3, is:

| UO_dly_spb | (param. 80. inputs 110, outputs 112, STATE 80) |
|---|---|
| (2066, FIG. 3B). | |

This procedure call corresponds to the computer procedure stored in the LIBRARY STORE 14A, which is:

| U_dly_spb | (param., input, output, state) |
|---|---|
| | spb_output → out = spb_state → past_value return |
| (2094, FIG. 3C). | |

The CODE GENERATOR 22 combines the information in the procedure call with the computer procedure stored in the Library.

The result is a computer procedure representative of the update output procedure for the Z-block 80 of FIG. 3 and it is:

| UO_dly_spb | (param. 80, inputs 110, outputs 112, STATE 80) |
|---|---|
| | spb_output → out = spb_state → past_value return |
| (2108, FIG. 3D). | |

This process of combining the information from the library with the information on the sequence list, is performed for each of the elements in the sequence list. Eventually, a computer program representing the steps for simulating the filter block diagram (FIG. 3) is formed, as shown in FIG. 3D.

2) Modeling State Blocks

Referring to FIG. 3D, a more detailed description for modeling a state block will now be discussed. The computer procedures for modeling the Z-block having instance #80 FIG. 3 is shown at rows 2108 and 2130 of the compiled computer program of FIG. 3D. Specifically, row 2108 represents the update output procedure, which causes the platform to generate outputs for the Z-block and line 2130 is the update state procedure for controlling the computer to update the state of the Z-block. The update state procedure saves the current input signal in a variable, spb_state PAST VALUE which is stored as the state of the block. This procedure is represented by the computer procedure:

| US_dly_spb | (param. 80, inputs 110, outputs NONE, STATE 80) |
|---|---|
| | spb_state → past_value = (spb_input → in) return |
| (2130, FIG. 3D). | |

In a separate procedure, the update output procedure for the unit delay block utilizes the input signal stored as the state of the block and outputs this input signal. This procedure is represented by the computer procedure:

| UO_dly_spb | (param. 80, inputs 110, outputs 112, STATE 80) |
|---|---|
| | spb_output → out = spb_state past_value |
| (2108, FIG. 3D). | |

For the very first time step of execution, the state variable of the Z-block is loaded with an initial input signal for processing the update output procedure associated with the block. Then, as shown in the expanded computer program of FIG. 3D, the update state procedure updates the information in the state variable with the current inputs to the block. It is important to note that the two procedures representative of the Z-block are separately represented in the compiled computer program of FIG. 3D. In fact, the update state procedure occurs at the end of the computer program when the inputs to the block are defined by the update output procedures which precede it in the program. By having separate procedures for updating the output and the state of the block, the Z-block is effectively modeled without having to maintain structures such as input and output buffers, etc.

In designing the computer procedures representative of Z-blocks, the designer considers the steps which are necessary for controlling the formation of only the outputs from the block and the steps which are necessary for updating the state of the block without affecting the output of the block. The update output procedures form the output from the delay block without affecting the state of the block. The update state procedure is a separate procedure which updates the "state" of the delay block (i.e., PAST VALUE of the Z-Block). The steps for sequencing the update output procedures and update state procedures for state blocks are separately controlled by seven sequence controllers discussed in detail in Part II of the detailed description.

3) Execution of the Assembled Computer Program Representative of the Block Diagram of FIG. 3

The execution of one iteration of the list of procedures shown in FIG. 3D is considered to be one-time step of a simulation. In other words, only one piece of data is processed at a time by the sequence of calls of FIG. 3D.

A detailed discussion of one-time step of the simulation of the filter diagram of FIG. 3D is now discussed. The computer procedure (2106, FIG. 3D) of source block 64 controls the steps for forming a signal for the first time step and the signal follows over line 92 to the coefficient blocks 72, 74, and 76, first system block, as described by the netlist (FIG. 3A). As mentioned above, the next call is for generating outputs for the Z-blocks 80, a second system block, and 84. The update output procedure (2108, FIG. 3D) for block 80 controls the formation of output 112 ($O_1$ connected to line 112) based on its preset state variable (80), and the update output procedure (2110, FIG. 3D) for Z-block 84, a second system block, controls the formation of output 116 based on its preset state variable. By having the outputs generated by the computer procedures for coefficient blocks 64, 80, and 84, first system block, (2112, 2114, 2116, FIG. 3D) the computer procedure for summer block 86, a first system block, has defined inputs at both inputs 104 and 116. The computer procedure for the summer block (2118, FIG. 3D) controls the formation of output 118 and this output is fed back via the feedback loop 120. The computer procedures (2120, 2122, FIG. 3D) for coefficient blocks 88 and 90, then control the multiplication of the feedback loop signal 120 by coefficients $A_2$ and $A_1$, respectively. Computer procedures (2124, 2126, FIG. 3D) for summer blocks 78 and 82 now have defined inputs. Specifically, computer procedure (2124, FIG. 3D) for summer block 78 has defined inputs 100 and 106 and it controls the formation of output 110. In addition, the computer procedure (2126, FIG. 3D) for the summer block 82, a first system block, has defined inputs 102, 112, and 108 and it controls the formations of output 114. At this stage in the simulation, all of the outputs have been updated for all of the blocks and the inputs to each of the blocks are defined for the first time step. The computer procedure for the sink block 68 (2128, FIG. 3D) controls the steps for storing of the resulting signal. The last step of simulating the block diagram (FIG. 3) is for updating the states of unit delay blocks 80 and 84. In this way, the next time step for the signal generated at source block 64, can be analyzed based on the previous input signals of the prior time step. The update state procedures (2130, 2132, FIG. 3D) control the steps for updating the states of unit delay blocks 80 and 84 by storing input signals from the current time step into their respective state variables.

This is basically how one class of filters, referred to as Infinite Inputs Response Filter, work. It reverts the output information from the prior time step and generates the new sources information based on the prior information and inputs. Without this capability, this type of filter would not be able to properly process data. Likewise, any type of block diagram which requires analyzing data from a prior time step for self-correcting purposes, requires a feedback loop and thus, requires at least one block having a delay property to accommodate the feedback loop.

II. SEQUENCE CONTROLLERS

Seven methods are now discussed for sequencing the procedure calls representative of the block diagrams with or without feedback loops. These methods are depicted in flow diagrams of FIGS. 5, 11, 14, 21, 22, 23 and 26. The figures depicting the seven methods are first, FIG. 5A, B and C, second, FIG. 11A, B, C and D, third, FIG. 14A, B, C, F and G, fourth, FIGS. 14A, B, D, F and G, fifth, FIGS. 14A, B, E, F and G (which are all for generating software algorithms representative of block diagrams, which can be executed at any time). sixth, FIG. 21, FIGS. 22A and B, FIG. 23, and seventh, FIGS. 26A and B, (which operate in a runtime scenario and they will not produce software programs representative of the blocks). The methods shown in FIGS. 5, 11 and 14 generate computer programs which can be processed for storage in a memory of a chip for causing the chip to simulate the block diagram.

A. First Embodiment of the RESTRICTED SEQUENCER Method, FIGS. 5A, B and C

Figure 5A:
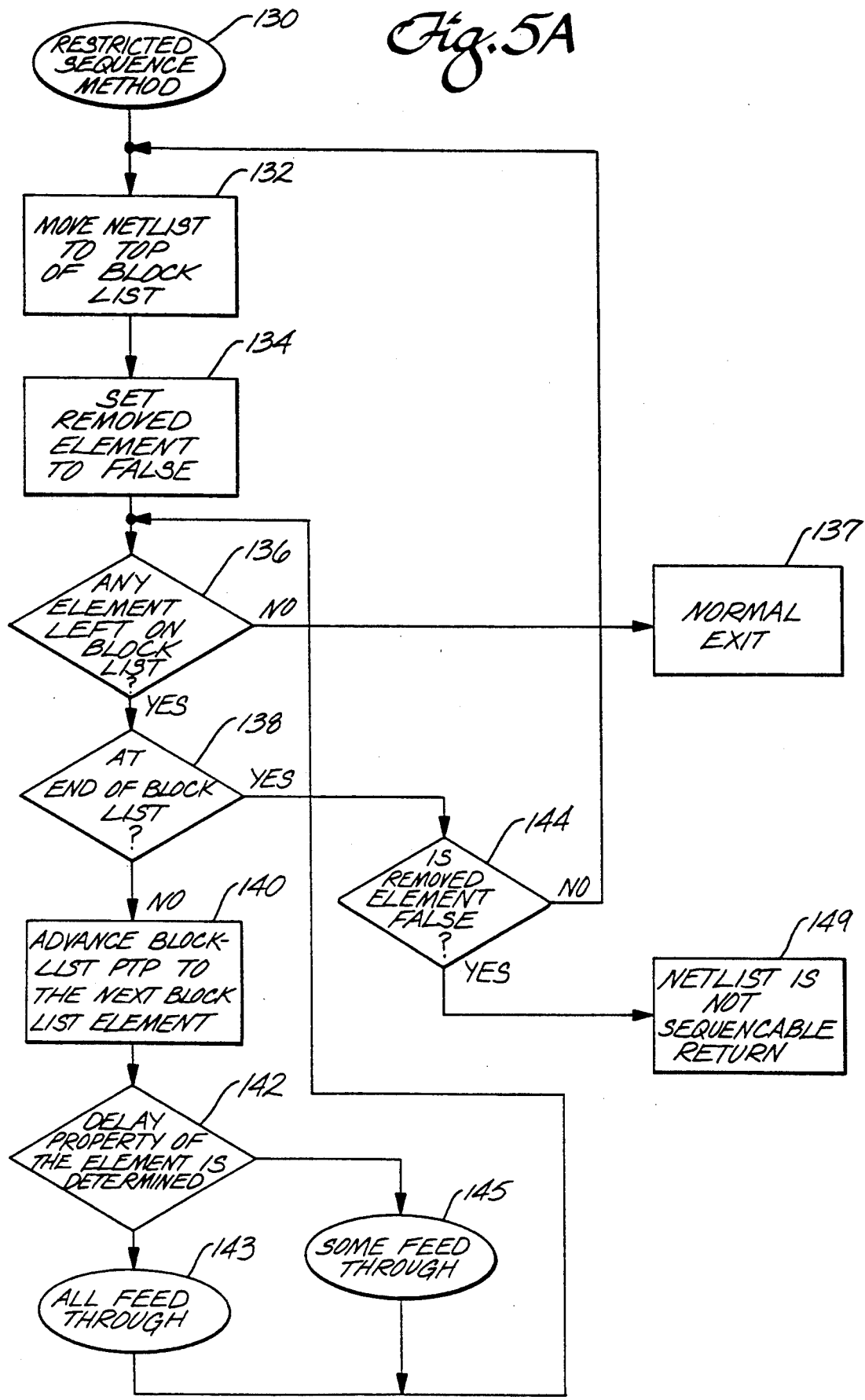
FIG. 5A is a flow diagram which depicts the sequence of operations of the simulator of FIG. 1A under control of the first RESTRICTED SEQUENCER method.

Referring more particularly to FIGS. 5A, B and C, the RESTRICTED SEQUENCER method is discussed for sequencing the computer procedure calls representative of a block diagram. This method takes a netlist representative of a block diagram as its input. As discussed above, the netlist specifies how the blocks are interconnected within the block diagram, the name of the procedural call in the library and any pre-set state parameters. This method builds a sequence list from the netlist so that the procedural calls produce correct information. Stated differently, the procedure calls are arranged so that when required, inputs to each of the computer procedures are driven by, or defined by outputs from other procedures. The method assumes that each of the blocks has a procedure for updating the output. The output procedure can be any characteristic function for processing none, one or more inputs and/or the state of the block. If the block has a state, a procedure for updating the state may also be used.

1) Feedthrough List

When an individual block is created, the block designer specifies the delay property for that particular block by determining which inputs of the block directly affect the outputs of the block. The user is RESTRICTED by the RESTRICTED SEQUENCER method in that he can only specify one delay property per block. In the GENERAL SEQUENCER method to be described, the designer specifies a delay property for each of the outputs of the block. A feedthrough list is provided for each block for defining the delay property of a block. The feedthrough list is a list of inputs which must be defined before the outputs to the block can be updated. A feedthrough list which contains all of the inputs of a block means that all the inputs must be defined before the update output procedure for the block can be processed. If there are no inputs on the feedthrough list, then the update output procedure for the block can be processed without having any defined inputs. If only some of the inputs of the input list (a list of the inputs to the block) are on the feedthrough list, then only some of the inputs must be defined before the update output procedure for the block can be processed. The designer of the computer procedure representative of the block considers which inputs must be defined before the block can be executed. When such inputs are determined, the designer lists these inputs on the feedthrough list associated with the block. In the general case, where there is a separate feedthrough list associated with each output of the block, the designer determines which inputs affect each output to the block and then places the inputs which affect the output on the feedthrough list which is associated with the particular output. The feedthrough list is defined by the designer, is then stored in the location in the Library Store 14A associated with the block.

By referring to the feedthrough list for each block, the Sequence List Generator determines the proper sequence of procedure calls to be placed on the sequence list. The first embodiment of the RESTRICTED SEQUENCER method in FIG. 5, examines the feedthrough list for each of the blocks to determine the order of executing each update output procedure and update state procedure associated with the block.

2) The RESTRICTED SEQUENCER Method of FIG. 5A

Figure 7:
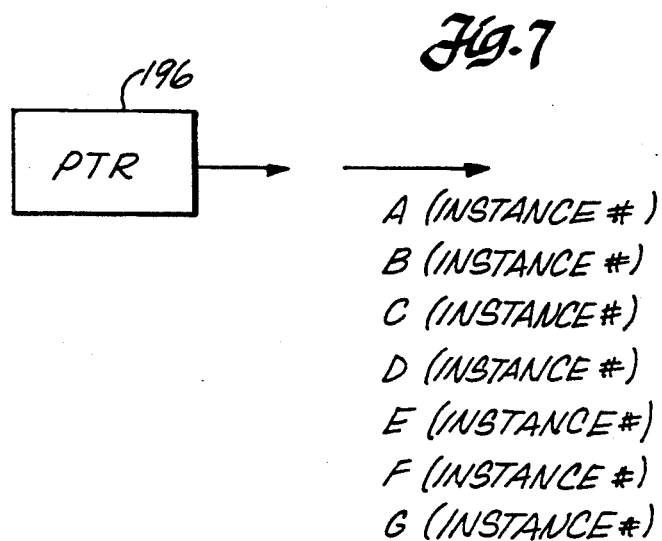
FIG. 7 schematically depicts a BLOCKLIST and a BLOCKLIST POINTER for keeping track of the sequence of operations of the simulator of FIG. 1A.

Referring to the flow diagram in FIG. 5A at block 132, a pointer stored in the platform memory is moved to the top of a blocklist to initialize processing. The blocklist is a dynamically changing structure maintained by the platform for keeping track of which block is currently being analyzed for sequencing purposes. The elements on the blocklist may be arranged in any order. Each element can be either a block type or instance number for identifying the block. The block type and/or the instance number are used for referencing the netlist element and library element associated with the block. When processing for a particular element in the blocklist is completed, the element is removed from the blocklist. FIG. 7 shows pointer 196 pointing to an address just prior to the first entry in the blocklist. The blocklist in FIG. 7 has seven elements and the first element on the blocklist is A (instance #) at 198.

Referring to the flow diagram in FIG. 5A, a REMOVED ELEMENT variable is set equal to "false" during block 134. This variable is used to keep track of whether or not the elements on the blocklist of the block diagram are sequenceable. In this way, the system is ensured not to go into an endless loop trying to sequence a non-sequenceable block diagram. At block 136, a determination is made of whether or not there are any elements left on the blocklist. If there are no elements left on the netlist, then processing is completed and the simulator resumes its normal processing at block 137. If there are elements left on the blocklist, during block 138 a determination is made of whether the pointer is at the end of the blocklist. If the pointer is at the end of the blocklist, then at block 144, the REMOVED ELEMENT variable is checked to see if it is set to "true". If the REMOVED ELEMENT variable is "false" then no elements on the blocklist have been sequenced in the last pass through the blocklist, and thus, it is determined that the computer programs representative of a block diagram to be simulated are not sequenceable. The system exits and resumes to its normal processing at block 149.

If the pointer 196 is not at the end of the blocklist, then at block 140, the pointer is advanced to the next element in the blocklist. During block 142, a determination is made as to the delay property of the block by examining the feedthrough list associated with the block. If all the inputs in the feedthrough list also appear in the input list of the block, then this block is an all feedthrough type and the ALL FEEDTHROUGH method (FIG. 5a) at block 143 is referenced and these blocks are referred as non-state blocks. However, if only some or none of the inputs in the feedthrough list appear in the input list to the block, then this block is a some feedthrough type block and the SOME FEEDTHROUGH method (FIG. 5C) during block 145 is referenced.

If the block is classified to be an all feedthrough type, this means that each of the inputs to the block must be defined before the procedure call for the block can be placed on the sequence list. Stated differently, for an all feedthrough block, the update output procedure for generating the outputs for the block cannot be placed on the sequence list until all the inputs to the block are defined.

"Some feedthrough" means that only some of the inputs to the block need to be defined before the output procedure for the block can be placed on the sequence list. These blocks have a "state" which effectively replaces some or all of the inputs and are therefore referred to as state blocks.

Figure 5B:
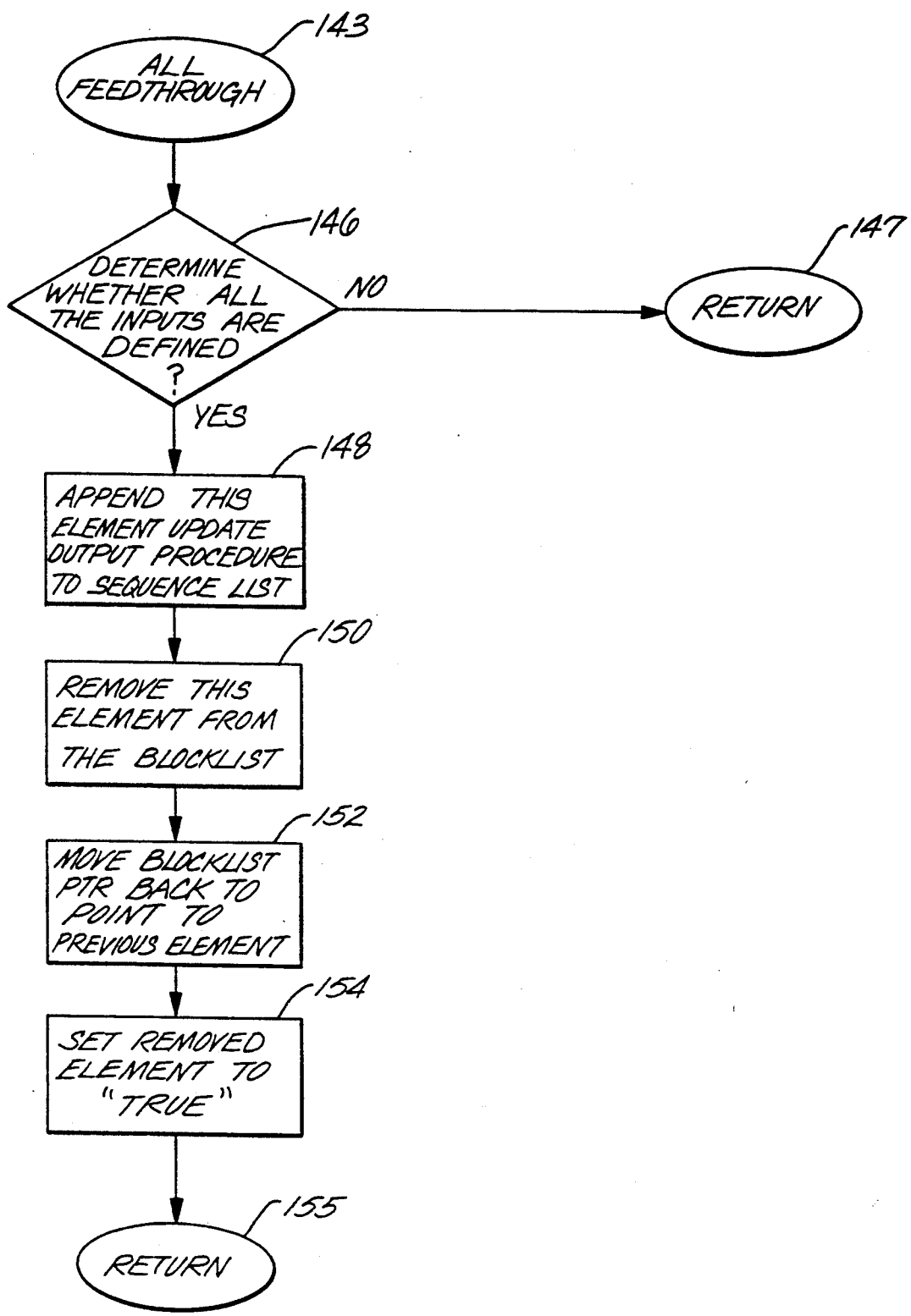
FIG. 5B is a flow diagram which depicts the sequence of operations of the simulator of FIG. 1A under control of the restricted ALL FEEDTHROUGH method referenced in FIG. 5A.

3) ALL FEEDTHROUGH Method of FIG. 5B

Assuming that the delay property of the block is an all feedthrough type, the ALL FEEDTHROUGH method (FIG. 5B) is entered at block 143. At block 146, the inputs to the block are analyzed to determine whether all of the inputs are defined. An input is defined if the input is driven by an update output procedure call which is stored in the sequence list. If not all of the inputs in the feedthrough list for the block are defined, then the processing returns at block 147 to block 136 of RESTRICTED SEQUENCER method (FIG. 5A) 113. If all of the inputs in the feedthrough of this block are driven by update output procedure calls in the sequence list, during block 148 the update output procedure call for this block is appended to the sequence list. At block 150, the element for this block is removed from the blocklist to show that the update output procedure representative of the block has been placed in the sequence list and therefore, it no longer needs to be sequenced. The netlist element for this block stays on the netlist. The netlist always stays the same unless the overall configuration of the block diagram changes. The blocklist pointer 196 of FIG. 7, moves back to the previous element in the blocklist at block 152. The REMOVED ELEMENT variable is set equal to "true" to ensure that the system is made aware that sequencing of the blocklist is still occurring. Processing then returns at block 155 to block 136 of the calling part of the RESTRICTED SEQUENCER method (FIG. 5A).

The calls for the update state procedure and update output procedure are stored in LIBRARY STORE 14A. The parameter information for the procedure call is stored in a netlist element associated with the block being analyzed. The information is combined into a procedure call and stored in the sequence list. A more detailed discussion regarding the netlist and library is described in Section I(B(2)).

4) SOME FEEDTHROUGH Method of FIG. 5

Referring back to block 142 of FIG. 5A, if the property of the block analyzed is a some feedthrough type, then the SOME FEEDTHROUGH method (FIG. 5C) is called at block 145. At block 156, the sequence list is scanned to determine whether or not the update output procedure call for the particular blocklist element being analyzed has been placed in the sequence list. If the update output procedure call has not been placed in the sequence list, then a procedure similar to the procedure for the ALL FEEDTHROUGH method is followed. First during block 158, the inputs in the feedthrough list corresponding to the block are analyzed to determine whether or not they are defined. The simulator determines whether or not the inputs in the feedthrough list are defined by determining if each of the inputs is driven by an update output procedure call stored in the sequence list. If all of the inputs in the feedthrough list are not defined, then at block 159 the processing returns to block 136 of the RESTRICTED SEQUENCER method (FIG. 5A). However, if the inputs in the feedthrough list are all defined during block 160, the update output procedure Call for the current block being analyzed are be placed on the sequence list. Then, during block 164, the REMOVED ELEMENT variable is set equal to "true". Processing will then return during block 165 to block 136 of the RESTRICTED SEQUENCER method (FIG. 5A).

Referring back to block 156 (FIG. 5C), if the update output procedure call for the particular element being analyzed has been previously placed on the sequence list, during block 166 a determination is made as to whether the inputs in the input list for the current blocklist element being analyzed are all defined. The inputs are defined when each of the inputs is driven by an update output procedure call which is stored in the sequence list. If all of the inputs in the input list to the block are not defined, then at block 167, processing will resume to block 136 of the RESTRICTED SEQUENCER method (FIG. 5A). If the inputs in the input list are defined, then the update state procedure call for this element will be placed on the sequence list at block 168.

The element for this block is removed from the blocklist during block 170, to ensure that the element is not analyzed a second time. During block 172, the blocklist pointer is pointed back to the preceding element and at block 174, the REMOVED ELEMENT variable is set equal to "true". Processing will then return at block 175 back to block 136 of the RESTRICTED SEQUENCER method (FIG. 5A).

At block 138, the blocklist pointer is checked to determine if it is at the end of the blocklist. If the pointer is at the end of the blocklist, then at block 144, the REMOVED ELEMENT variable is checked to see if it is "false." If the REMOVED ELEMENT variable is "false", then all the elements on the blocklist have been scanned at least once, and none of the elements have been placed on the sequence list. This means that the elements on the blocklist are not sequenceable, and the method will stop at block 149 with a message to the user stating that the block diagram is not sequenceable. However, if the REMOVED ELEMENT variable is "true", then at least one of the netlist elements has been placed on the sequence list, and therefore, the blocklist is still potentially sequenceable and block 132 is entered. At block 132, the pointer is moved back to the top of the blocklist. At block 134, the removed element is set equal to "false". The blocklist, at block 136, is then scanned to determine if there are any elements left. Assuming that there are no more elements left in the blocklist, block 137 is called to exit the routine.

The sequence list that is formed under control of the first embodiment of RESTRICTED SEQUENCER method above can then be used to assemble or compile a computer program. The computer program compiled can then be executed to perform a simulation of the block diagram.

Figure 6A:
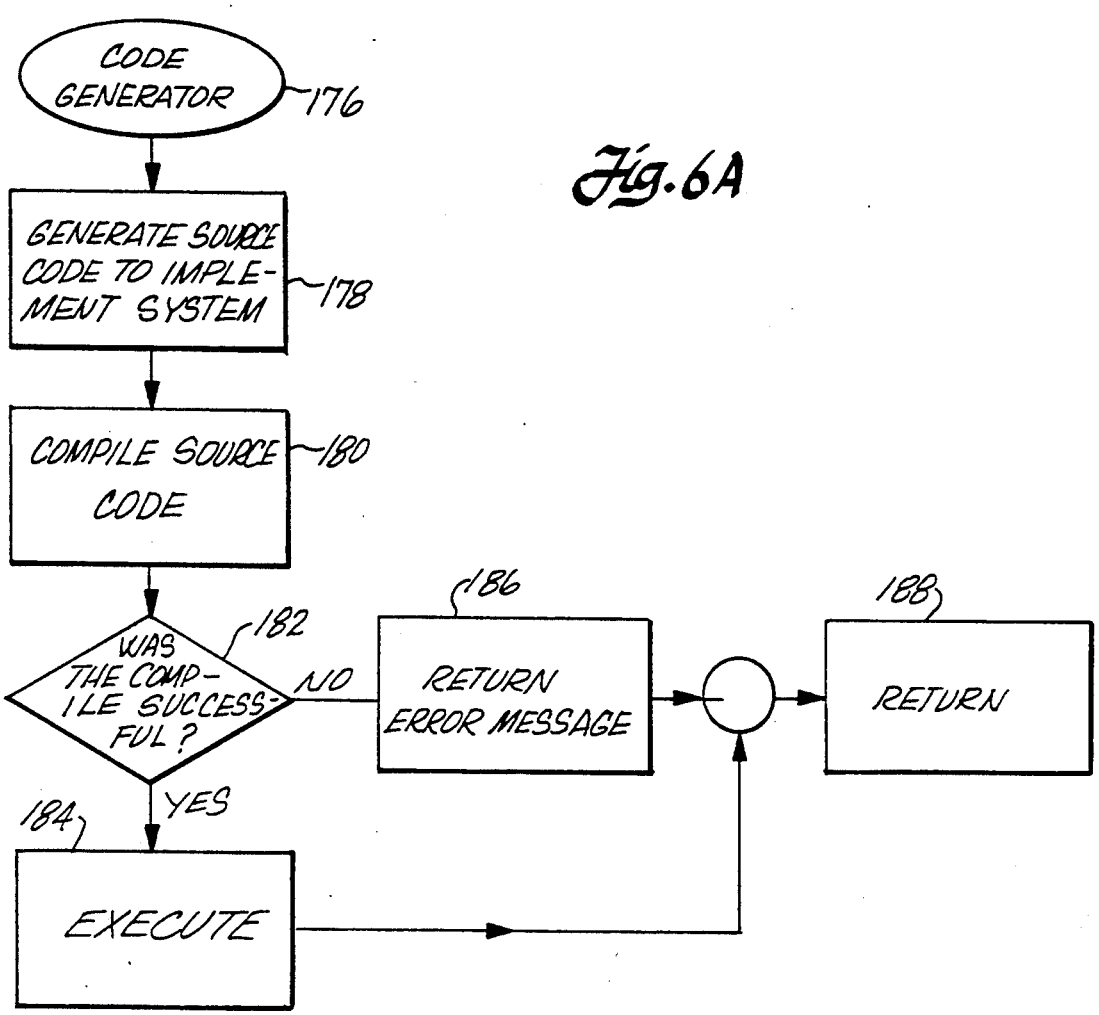
FIG. 6A is a flow diagram which depicts the sequence of operations of the simulator of FIG. 1A under control of the CODE GENERATOR method.
Figure 6B:
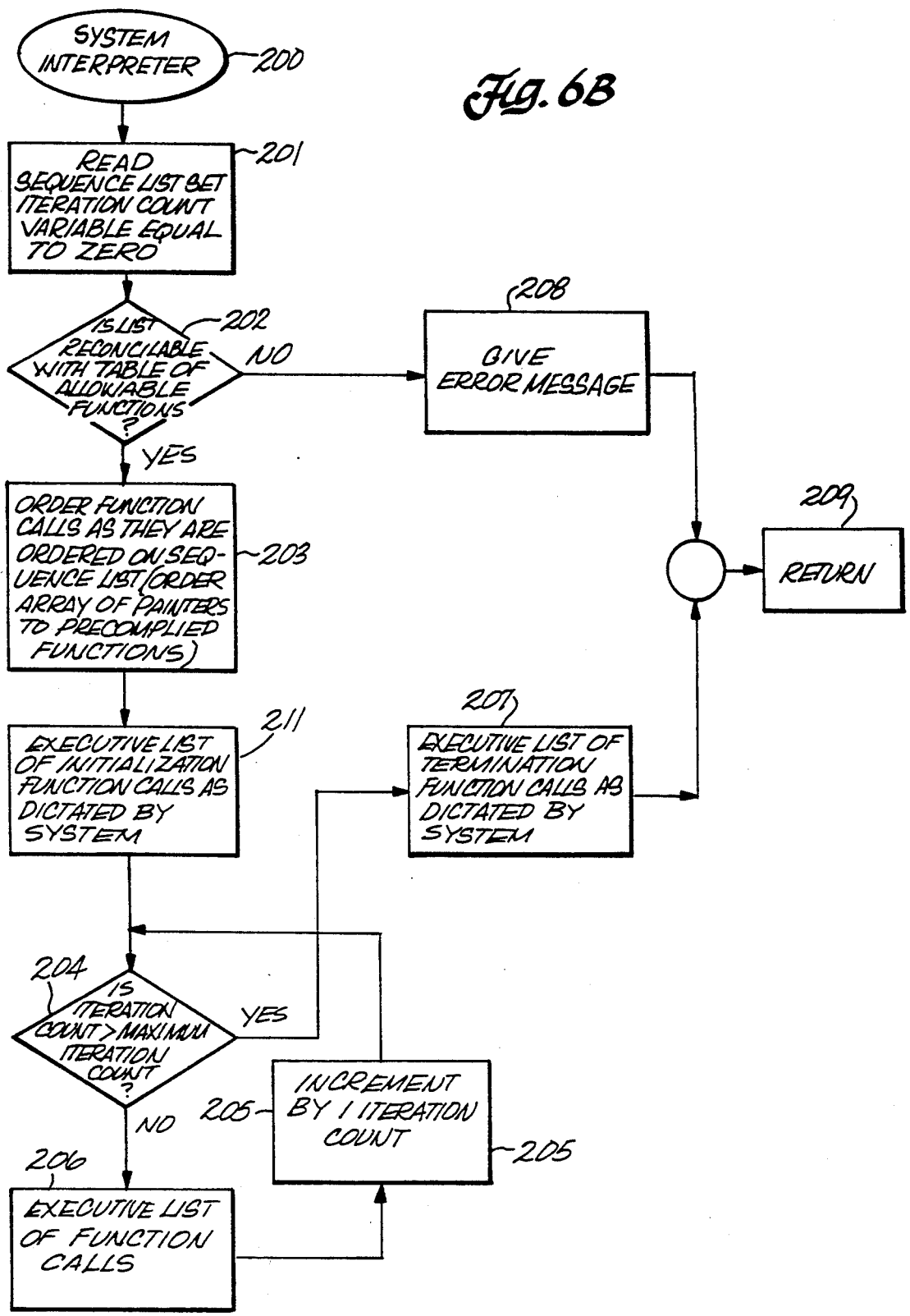
FIG. 6B is a flow diagram which depicts the sequence of operations of the simulator of FIG. 1A under control of the SYSTEM INTERPRETER method.

5) CODE GENERATION Method of FIG. 6A and 6B

In another embodiment of the RESTRICTED SEQUENCER method, the procedure calls representative of the blocks are executed during the formation of the sequence list; in this way, a simulation of the block diagram is performed while the procedure calls for the blocks are being sequenced.

FIGS. 6A and 6B, represent two methods for converting the sequence list, generated by any of the methods which form a sequence list, into computer programs. FIG. 6A, is a method for compiling the sequence list and executing the resulting computer program. FIG. 6B, is a method of precompiling the code and calling the precompiled code when it is needed.

The CODE GENERATOR method in FIG. 6A is one such embodiment for compiling and executing code. At block 178, the sequence list is converted into source code. Each entry on the sequence list represents the name in the LIBRARY STORE 14a (FIG. 1) of a computer procedure for updating the output or the update state associated with each entry on the sequence list. At block 180, the source code is compiled. Essentially, the source code is converted into low level code which the computer can execute. At block 182, the system determines whether or not the compiling was successful. If the compiling is not successful, at block 186, an error message will be generated and at block 188, processing will return to the calling program. Assuming that the compiling was successful, then at block 184, the code can be executed.

Execution is broken down into three phases: initialization, run, and termination. The initialization phase sets coefficient values and initial conditions for each block in the system. In the run phase, the procedure call of the mathematical operation which represents each block is called in the sequence determined by one of the sequence methods. When the particular block's computer procedure represented by the compiled code is performed by the system, the block's output has been updated. Each complete cycle of updating all of the functional blocks in the system being simulated is one iteration. An iteration represents one-time step of data processed through the simulated system. Typically, a simulation will process several time steps of data. The termination phase allows each of the routines representative of a block in the system to output information about its status at the end of the simulation. When the execution is completed, the system returns at block 188 to the calling program.

FIG. 6B, is a flow block diagram of the SYSTEM INTERPRETER method which orders a series of procedure calls of precompiled code. At block 201, the sequence list created by any of the sequence methods is read and an iteration count variable is set to 0. At block 202, the sequence list is scanned to determine if all of the calls on the sequence list are allowable procedure calls; the calls are compared with a table (not shown) of allowable procedures calls. If the calls in the sequence list do not reconcile with the table of allowable procedure calls, then an error message will be returned to the user at blocks 208 and 209. At block 203, each procedural call on the sequence list is converted into an address which points to the location of precompiled code representative of the procedure call. Stated differently, an array or list of pointers for the precompiled coded is formed. All procedure calls are precompiled in the system, so that the SYSTEM INTERPRETER method does not have to compile code. At block 211 the precompiled initialization procedures are executed according to the system initialization array using the list generated at block 203, with the exception of the update state procedures. Block 211 initializes the parameters and state of each computer procedure representative of each block in the block diagram being simulated.

The system will then execute the precompiled code in the order of procedure calls on the sequence list. At block 204, the iteration count number is compared to the number of maximum iterations preset by the designer. Assuming that the maximum number of iterations have not been performed, then at block 206, the procedure calls will be executed again. Block 206 basically represents one iteration of the run phase execution of the simulation. At block 205, the iteration count variable is incremented by one, and at block 204, the iteration count variable is checked against the maximum iteration count. Assuming that the iteration count is greater than the maximum iteration count, then during block 207, the precompiled termination procedures are executed according to the system termination array of pointers using the list generated at block 203, with the exception of the update state procedure, and at block 209, the system will return to its normal processing.

The CODE GENERATOR method illustrated in FIG. 6A, or the SYSTEM INTERPRETER method illustrated in FIG. 6B, can be used to simulate the procedure calls in the sequence list. An advantage of the CODE GENERATOR mode (FIG. 6A) over the SYSTEM INTERPRETER method (FIG. 8B), is that it results in a more efficient execution and uses less memory. The drawback to this strategy is that it takes time to generate and compile the source code. Whereas, the SYSTEM INTERPRETER method does not have to generate the source code and compile it because the generation and compilation of the source code has already taken place. The drawback of the SYSTEM INTERPRETER method is that a lot of memory has to be allocated for the precompiled code.

6) Detailed Example of RESTRICTED SEQUENCER Method of FIGS. 5A, B and C

Figure 8:
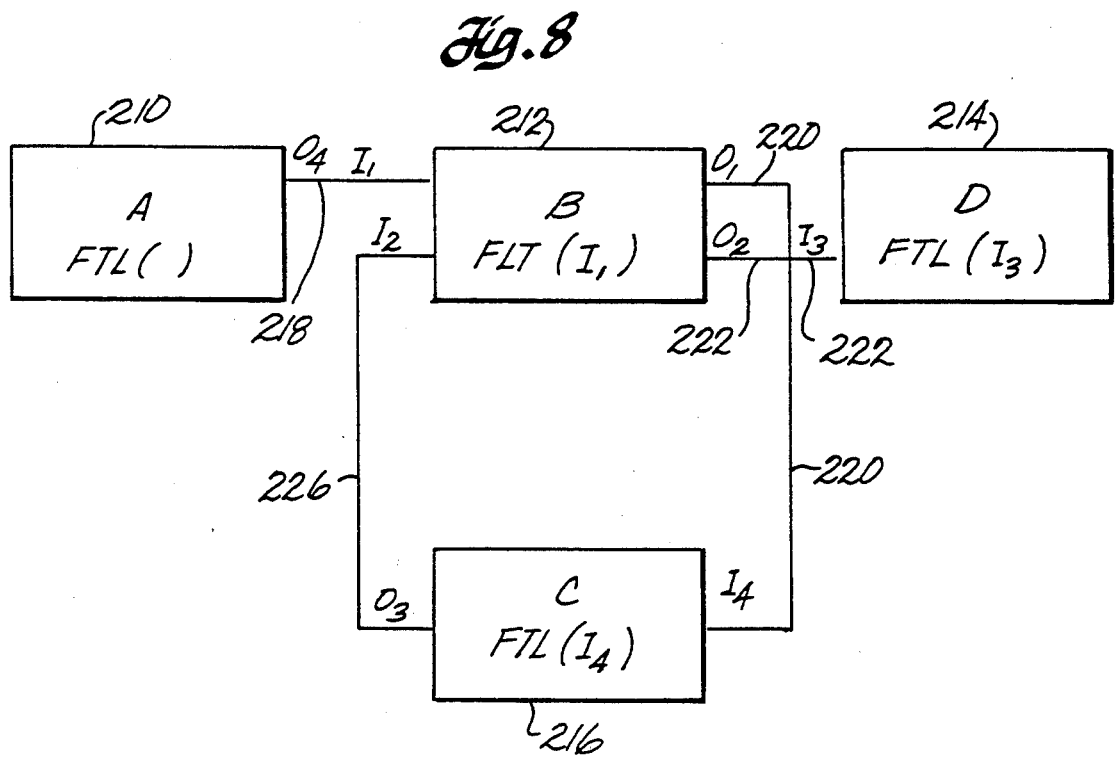
FIG. 8 is an alternate block diagram having a feedback loop which is formed on the display and is simulated in the simulator of FIG. 1A.

Referring to FIGS. 5A, 5B, and 5C, 8, 8A, 8B, 9A and B, a detailed example of the RESTRICTED SEQUENCER method is now discussed. FIG. 8 is a schematic block diagram, designed by a designer, on the screen display having one feedback loop 226 and a state block 212.

FIG. 8A is a netlist representation of the block diagram shown in FIG. 8. A detailed description for a netlist was earlier described in connection with FIG. 3A and thus, a detailed description of the netlist FIG. 8A will not be presented. FIG. 8B is a representation of the information stored in the LIBRARY STORE 14a for characterizing each computer procedure representative of each block in the block diagram of FIG. 8. In the preferred embodiments five categories of information are maintained in the store for each block: a feedthrough list, an update output procedure, an update state procedure (if the block is a state block), an input list and an output list. Depending on the system requirements, more information may be included if necessary.

The update output procedure for each block and the update state procedure for each state block are stored in their source code form. However, for simplicity, the update output procedure for a particular block will be represented by the name of the particular block (i.e., A, B, C, D, etc.) followed by the letters "UO" in brackets. Therefore, the update output procedure for element A is A(UO). Likewise, for each state block, the update state procedure will be represented by the name of the block (i.e., A, B, C, D, etc.) followed by the letters "US" in brackets. For example, as shown in FIG. 8B at 2144, block B has an update output procedure B(UO) and an update state procedure B(US).

Referring to FIGS. 8, 8A and 8B, a detailed description of the above diagram shown in FIG. 8 is presented. Block B (212, FIG. 8) has inputs $I_1$ and $I_2$ on its input list (2136, FIG. 8A) and has input I1 on its feedthrough list (2144, FIG. 8B). This block is classified as a state block or a some feedthrough type because only one of its inputs on the input list is on the feedthrough list. In other words, input $I_1$ must be defined before the procedure representative of block B (212, FIG. 8) can be executed. However, input $I_2$ does not have to be defined in order for block B to have its update output procedure "B(UO)" executed. Block B also has an internal state which must eventually be updated by an update state procedure "B(US)". Blocks D (214, FIG. 8) and C (216, FIG. 8) are considered to be all feedthrough blocks because their feedthrough lists have all of the inputs on their input lists. For example, block D (214, FIG. 8) has input $I_3$ on its feedthrough list and on its input list, which means that its update output procedure "D(UO)" cannot be processed until input $I_3$ has been defined (2148, FIG. 8B). Block A (210, FIG. 8) does not have any inputs, and therefore, there are no inputs on its feedthrough list (2142, FIG. 8B). This block is classified as an all feedthrough block and its update output procedure "A(UO)" can be executed without having any inputs defined. Blocks A, C and D do not have a state and thus, do not require an update state procedure. Referring to FIG. 8B, only state block B has an update state procedure "B(US)" in the update state procedure column.

FIGS. 9A and 9B, show the status of the blocklist and sequence list at each stage of sequencing the procedure calls for the block diagram in FIG. 8 by the first embodiment of the RESTRICTED SEQUENCER method. Each row of the figure represents a change in the status of either the blocklist pointer, blocklist or sequence list. The blocklist in row 226 (FIG. 9A) is shown having elements C, D, A and B (in that order). The RESTRICTED SEQUENCER method will sequence this list from any order of elements in the blocklist. For each element on the blocklist a corresponding element exists in the netlist representing the input list, the output list, the parameter list, and any other information which is required to describe interconnection of the block in the block diagram.

The first step in performing the RESTRICTED SEQUENCER method of FIG. 5A, moves the blocklist pointer to the top of the blocklist during block 132. Row 227 (FIG. 9A) shows the pointer at the top of the blocklist (the location just before the first entry in the list). At block 134 (FIG. 5A), the REMOVED ELEMENT variable is set to "false". During block 136, the blocklist is examined to determine if any elements are still left for processing. There are elements still left on the blocklist, specifically, C, D, A, and B, and processing continues at block 138. At block 138 a determination is made of whether or not the blocklist pointer is at the end of the block. The pointer is still at the top of the blocklist, as shown in row 221 of FIG. 9A. Thus, at block 140, the blocklist pointer is advanced to the next element on the blocklist as shown in row 228 of FIG. 9A. At block 142, the feedthrough list of element C is analyzed (2146, FIG. 8B). Element C has ALL feedthrough property because all the inputs on C's feedthrough list are the same as all of the inputs to the block, and, there, the ALL FEEDTHROUGH method (FIG. 5B) is entered at block 143. At block 146, FIG. 5B, a determination is made of whether all of the inputs on C's feedthrough list are defined. More particularly, the sequence list is checked to determine if $I_4$ is driven by an update output procedure call present on the sequence list. At this stage of processing, there are no entries on the sequence list, and therefore, input $I_4$ (2146, FIG. 8B) on C's feedthrough list is undefined.

Processing returns at block 147 to block 136 (FIG. 5A), in which a determination is made of whether there are any elements left on the blocklist. There are still elements left on the blocklist, so at block 138 a determination of whether the pointer is at the end of the blocklist is made. The pointer is not at the end of the blocklist, and at block 140 the pointer is advanced to the next element on the blocklist, element D (225, FIG. 9A). At block 142, an examination of the feedthrough list for element D (2148, FIG. 8B) is made to determine its delay property. Element D has input $I_3$ on its feedthrough list (2148, FIG. 8B) and it has input $I_3$ on its input list, which means that all of the inputs on the input list are the same as all the inputs of the block and therefore, block D is an ALL feedthrough type block. The ALL FEEDTHROUGH method 143, is entered at block 143.

During block 146, FIG. 5B, a determination is made that the input $I_3$ is not defined because at this time there are no update output procedure calls on the sequence list to drive input $I_3$. Processing returns at block 145 to block 136 (FIG. 5A) which examines whether or not there are any elements left on the blocklist; there are. At block 138, a determination is made that the blocklist pointer is not at the end of the blocklist and during block 140 the netlist pointer is advanced to the next element in the blocklist, element A (230, FIG. 9A). At block 142 of FIG. 5A, the feedthrough list is examined and it is determined that element A is an all feedthrough type because there are no inputs on element A's input list (2134, FIG. 8A).

The ALL FEEDTHROUGH method (FIG. 5B) is called, and at block 146 a determination of whether all the inputs to the block are defined is made. Because there are no inputs, no one input needs to be defined and thus, the update output procedure call for element A is appended to the sequence list at block 148 (232, FIG. 9A). At block 150 of FIG. 5B, element A is removed from the blocklist (234, FIG. 9A). At block 152 the blocklist pointer is moved back to the previous element in the blocklist (236, FIG. 9A). At block 154, the REMOVED ELEMENT variable is set equal to "true", and processing returns at block 155 to block 136 (FIG. 5A). At block 136, a determination of whether there are still elements left on the blocklist is made. There are still elements left on the blocklist, so at block 138 a determination of whether the pointer is at the end of the blocklist is made. The pointer is not at the end of the blocklist, so at block 140, the pointer is advanced to the next element on the blocklist, element B (238, FIG. 9A). At block 142 of FIG. 5A, the feedthrough list of element B is analyzed to determine its delay property. Element B has only input $I_1$ on its feedthrough list (2160, FIG. 8B). Element B has inputs $I_1$ and $I_2$ on its input list (2144, FIG. 8B). Therefore, this block can be updated when only input $I_1$ is defined. During block 142 of FIG. 5A, this element is classified as a some feedthrough element, and the SOME FEEDTHROUGH method (FIG. 5C) at block 145 is entered.

At block 156, in the SOME FEEDTHROUGH method (FIG. 5C), a determination is made that the update output procedure call for this element is not on the sequence list (238, FIG. 9A). Therefore, at block 158 a determination is made of whether all of the inputs on B's feedthrough list are defined. Element B has input $I_1$ (FIG. 8) on its feedthrough list (2144, FIG. 8B), and input $I_1$ (FIG. 8) is driven by an update output procedure call which is on the sequence list. Specifically, A's update output procedure call which drive is on the sequence list, and therefore, input $I_1$ is defined. At block 160 of FIG. 5C, B's update output procedure call is appended to the sequence list (240, FIG. 9A). At block 164, the REMOVED ELEMENT variable is set to "true", and processing is returned at block 165 to FIG. 5A at block 136. At block 136, a determination is made that there are elements still left on the blocklist, and at block 138, a determination is made that the blocklist pointer is at the end of the blocklist. At block 144, a determination is made that the REMOVED ELEMENT variable is not set equal to "false". The REMOVED ELEMENT variable was just set equal to "true" at block 164 (FIG. 5C) and thus, processing continues at block 132. If the removed element was "false", processing would exit and at block 144, an error would be returned illustrating that the blocklist for the block diagram of FIG. 8 is not sequenceable. At block 132, the blocklist pointer is moved to the top of the blocklist (242, FIG. 9A). At block 134, the REMOVED ELEMENT variable is set equal to "false" and at block 136, a determination is made that there are still elements left on the blocklist. At block 138, a determination is made that the blocklist pointer is not pointing to the end of the blocklist and at block 140, the pointer advances to the next element on the blocklist, element C (244, FIG. 9A). At block 142, the delay property of the block is examined to determine whether it is an ALL feedthrough type or a SOME feedthrough type. Element C is an ALL feedthrough type (as discussed above), and thus, the ALL FEEDTHROUGH method (FIG. 5B) is entered at block 143.

At block 146 of the ALL FEEDTHROUGH method, the inputs on the feedthrough list are analyzed to determine if they are defined. The only input in C's feedthrough list (2146 FIG. 8B) is input $I_4$ and it is defined. Input $I_4$ is driven by the update output procedure call of element B and it is on the sequence list (244, FIG. 9A). At block 148 (FIG. 5B), the update output procedure call for element C is placed on the sequence list (246, FIG. 9A). Then at block 150, element C is removed from the blocklist (248, FIG. 9A). The blocklist pointer is moved back to the previous element at block 152 (250, FIG. 9B) and the REMOVED ELEMENT variable is set equal to "true" at block 154. Processing returns to block 136 of FIG. 5A, where the blocklist is examined to see if there any elements on it. There are elements still on the blocklist, so at block 138, the pointer is examined to determine if it is at the end of the blocklist. The pointer is not at the end of the blocklist, and at block 140, the pointer is advanced to the next blocklist element, element D (252, FIG. 9A). The delay property of element D is examined at block 142, FIG. 5A. Element D is an ALL feedthrough type block and the ALL FEEDTHROUGH method (FIG. 5B) is entered at block 143.

At block 146 of the ALL FEEDTHROUGH method (FIG. 5B), the input on D's feedthrough list is determined to be defined because it is driven by element B's update output procedure call on the sequence list (252, FIG. 9B). The update output procedure call for element D is appended to the sequence list at block 148 (254, FIG. 9B). Element D is removed from the blocklist at block 150 (256, FIG. 9B). The blocklist pointer is moved back to point to the previous element of the blocklist at block 152 (258, FIG. 9B). At block 154, the REMOVED ELEMENT variable is set to "true" and processing returns at block 155 to block 136 of FIG. 5A. At block 136, a determination is made of whether there are any elements left on the blocklist. Element B still remains on the blocklist, and at block 138, the netlist pointer is examined to determine if it is pointing to the end of the blocklist. The blocklist pointer is currently at the top of the blocklist. At block 140, the pointer is advanced to the next netlist element, which is the last netlist element, element B (260, FIG. 9B). At block 142 it is determined that element B has a SOME feedthrough property and the SOME FEEDTHROUGH method 145 (FIG. 5C) is entered. At block 156 of FIG. 5C it is determined that element B's update output procedure call has been previously appended to the sequence list. During block 166, all the inputs in element B's input list are, examined to determine if any of the inputs are defined. The input list for element B contains input $I_1$ and input $I_2$ (2144, FIG. 8B). Input $I_1$ is driven by A's update output procedure call, which appears on the sequence list, and input $I_2$ is driven by element C's update output procedure call, which also appears on the sequence list. The update state procedure call for this element is appended to the sequence list at block 168 (262, FIG. 9B); at block 170, the element is removed from the blocklist (263, FIG. 9B). At block 172, the pointer is moved back to the preceding element in the blocklist (263, FIG. 9B). The REMOVED ELEMENT variable is set to "true" at block 174 and processing returns at block 175 to block 136 of FIG. 5A. At block 136 it is determined that there are no elements left on the blocklist and, thus, the first embodiment of the RESTRICTED SEQUENCER method exits at block 137.

The following procedure calls exist on the sequence list: A(UO), B(UO), C(UO), D(UO) and B(US) (263, FIG. 9(B). This sequence of procedure calls insures that the input data to each of the procedures is defined and thus, when executed in the order shown, a simulation of the block diagram of FIG. 8 is properly performed.

Figure 5C:
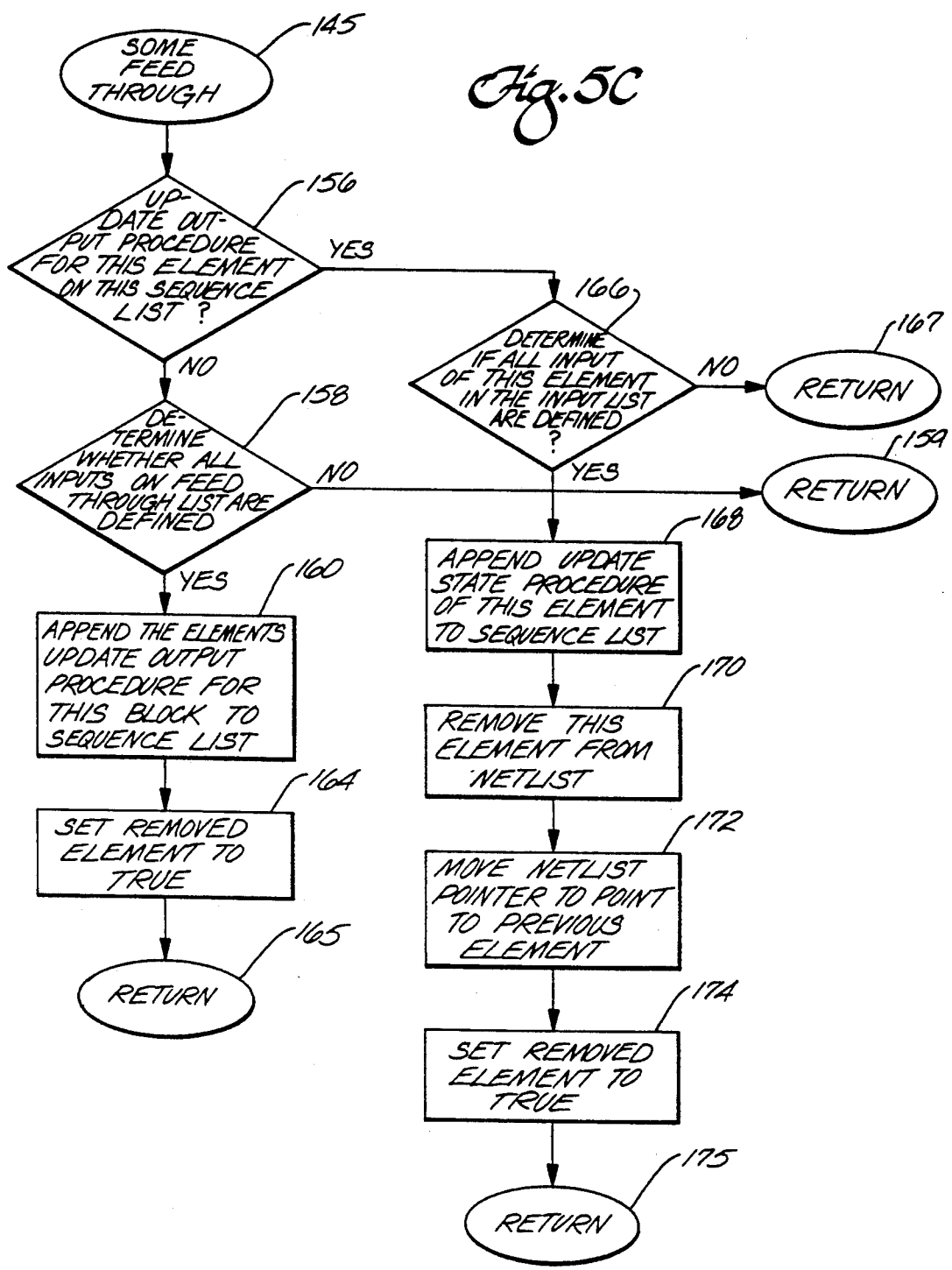
FIG. 5C is a flow diagram which depicts the sequence of operations of the simulator of FIG. 1A under control of the restricted SOME FEEDTHROUGH method referenced in FIG. 5A.

7) Detailed Example of the RESTRICTED SEQUENCER Method of FIGS. 5A, 5B and 5C Failing to Sequence FIG. 8D The RESTRICTED SEQUENCER method successfully sequenced the blocklist of elements for the block diagram shown in FIG. 8. In that example, block B's (212, FIG. 8) update output procedure call was placed in the sequence list when the input $I_1$ was driven by the update output procedure call for block A. However, if the feedthrough list for element B contained only input $I_2$, then the block diagram shown in FIG. 8A could not be sequenced by the RESTRICTED SEQUENCER method. This occurs because input $I_2$ will not be driven by element C's update output procedure call until element C has a defined input $I_4$. Element C will not have a defined input $I_4$ until the update output procedure call for output $O_1$ of element B is on the sequence list. Element B will not have its update output procedure call for $O_1$ placed on the sequence list until its input $I_2$, which is element B's feedthrough list, is driven by the update output procedure call for element C. Therefore, neither element C nor B can be placed on the sequenced list. This dilemma can never be resolved with the first embodiment of the RESTRICTED SEQUENCER method, and thus, FIG. 8C will be unsequenceable.

Figure 8C:
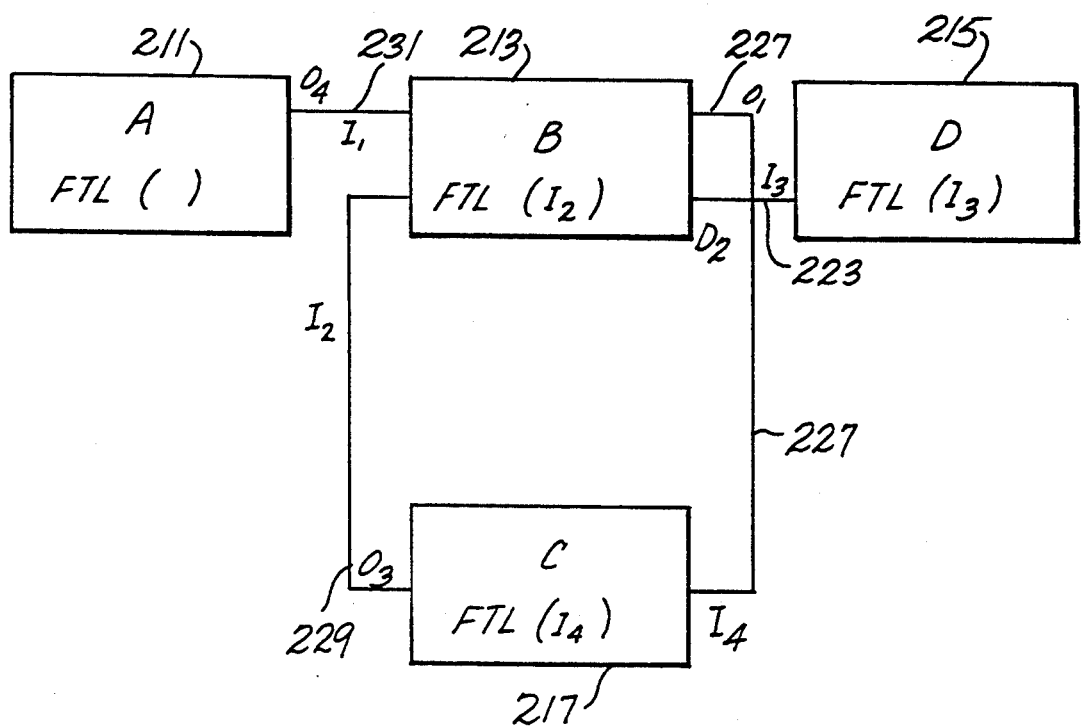
FIG. 8C schematically depicts another block diagram having a feedback loop which is formed on the display and is simulated in the simulator of FIG. 1A.

The following is a more detailed explanation of the first embodiment of the RESTRICTED SEQUENCER method demonstrating that it cannot sequence FIG. 8C when element B has only input $I_2$ on its feedthrough list.

Referring to FIGS. 5A, B, and C, FIG. 8C, 8D and 8E, FIG. 9A, and FIG. 10, the netlist generated is assumed to be the same netlist generated for FIG. 9. Specifically, the netlist shown in FIG. 8A is identical to the netlist shown in FIG. 8D. The library elements representative of each block are also the same except for the feedthrough list for element B (2160, FIG. 8E). The feedthrough list for element B has input $I_2$ (2160, FIG. 8E) instead of input $I_1$ (2144, FIG. 8B). The order of the blocklist is still C, D, A, and B. The examination for the blocklist for the elements C, D, and A, is precisely the same as in our original example. The elements C, D, and A have the same inputs and outputs and feedthrough lists as before. Therefore, the analysis of these blocks has not changed. In fact, rows 226 through 238 of FIG. 9A would occur in this example as well (267, FIG. 10) However, when the RESTRICTED SEQUENCER method begins to examine element B at block 142 of FIG. 5A, problems begin to occur. During block 142 of FIG. 5A, element B is determined to be a some feedthrough block so the SOME FEEDTHROUGH method at 145 is entered. At block 156 of FIG. 5C, the update output procedure call for element B is determined not to be on the sequence list (238, FIG. 9A). At block 158, a determination is made of whether all the inputs on element B's feedthrough list are defined. Element B has input $I_2$ on its feedthrough list (2160, FIG. 8B) and it is not currently driven by any update output procedure call on the sequence list. Processing returns at block 159 to block 136 of FIG. 5A, where the elements of the blocklist are examined to determine if there are any left. At this stage of processing, elements C, D, and B still remain on the blocklist, and thus, at block 138 a determination is made of whether the blocklist pointer is at the end of the blocklist. The blocklist pointer is currently at the end of the blocklist; it is pointing at element B. At block 144 REMOVED ELEMENT variable is determined to be set to "true" and processing continues at block 132. The blocklist pointer is moved to the top of the blocklist (268, FIG. 10) and the REMOVED ELEMENT variable is set equal to "false" at block 134. At block 136 a determination is made as to whether there are still elements left on the blocklist (C, D, and B) and at block 138 a determination is made as to whether the blocklist pointer is not at the end of the blocklist. Block 140 advances the blocklist pointer to the next blocklist element, element C (269, FIG. 10). At block 142, element C is determined to be an ALL feedthrough block, and the ALL FEEDTHROUGH method at block 143 is entered.

During block 146 of the ALL FEEDTHROUGH method (FIG. 5B), a determination is made that the inputs on element C's feedthrough list are not defined, and at block 147 processing returns to FIG. 5A to block 136. During block 136 it is determined that there are still elements left on the blocklist and at block 138, it is determined that the blocklist pointer is not at the end of the blocklist. At block 140, the netlist pointer is advanced to the next blocklist element, element D (270, FIG. 10). At block 142, element D is determined to be an ALL feedthrough type block and the ALL FEEDTHROUGH method at block 143 is entered. At block 146, of FIG. 5B, the inputs in element D's feedthrough list are determined not to be defined and at block 145, processing returns to block 136 of FIG. 5A. During block 136, it is determined that there are still elements on the blocklist and at block 138, it is determined that the blocklist pointer is not at the end of the blocklist. At block 140, the pointer is advanced to the next element on the blocklist, element B (272, FIG. 10). At block 142, element B is analyzed and it is determined that it is a SOME feedthrough block.

The SOME FEEDTHROUGH method at block 145 is entered, and at block 156 of FIG. 5C, it is determined that element B's update output procedure call has not been placed on the sequence list. At block 158, a determination is made that the inputs ($I_2$) on element B's feedthrough list are not defined; input $I_2$ (FIG. 8A) is driven by C's update output procedure call which has not been appended on the sequence list. Processing returns to block 136 of FIG. 5A during which it is determined that there are still elements left on the sequence list. At block 138, the blocklist pointer is determined to be pointing to the end of the blocklist, and at block 144 the REMOVED ELEMENT variable is checked to see if it is equal to "false". The REMOVED ELEMENT variable is equal to "false", and thus, at block 147 a message is returned to the calling program that the block diagram is not sequenceable (274, FIG. 10).

a) Solution—Multiple Feedthrough Lists Per Block

The "restriction" for the RESTRICTED SEQUENCER method (FIG. 5A, B, and C), is that only one feedthrough list can be supplied per block. In other words, each output procedure, assuming that there are more than one for a particular block, must be dependent upon the same feedthrough list. The dilemma we raised above occurs because the output procedure associated with output $O_1$ cannot be processed until the input on the feedthrough list has defined data. It was concluded that the RESTRICTED SEQUENCER method could not be used to define input $I_2$, an input in the feedback loop at FIG. 8. A solution to this dilemma would be to add additional feedthrough list which corresponds to each output in a particular block. Each feedthrough list will comprise a list of those inputs which directly affect only that output which is associated with the feedthrough list. By providing multiple feedthrough lists for each block, the block effectively has multiple delay properties. In this way, various outputs of the block can be processed at different stages of execution depending upon which inputs to the block are defined on the corresponding feedthrough lists.

B. First Embodiment of the GENERAL SEQUENCER Method FIGS. 11A, B, C and D

Figure 11A:
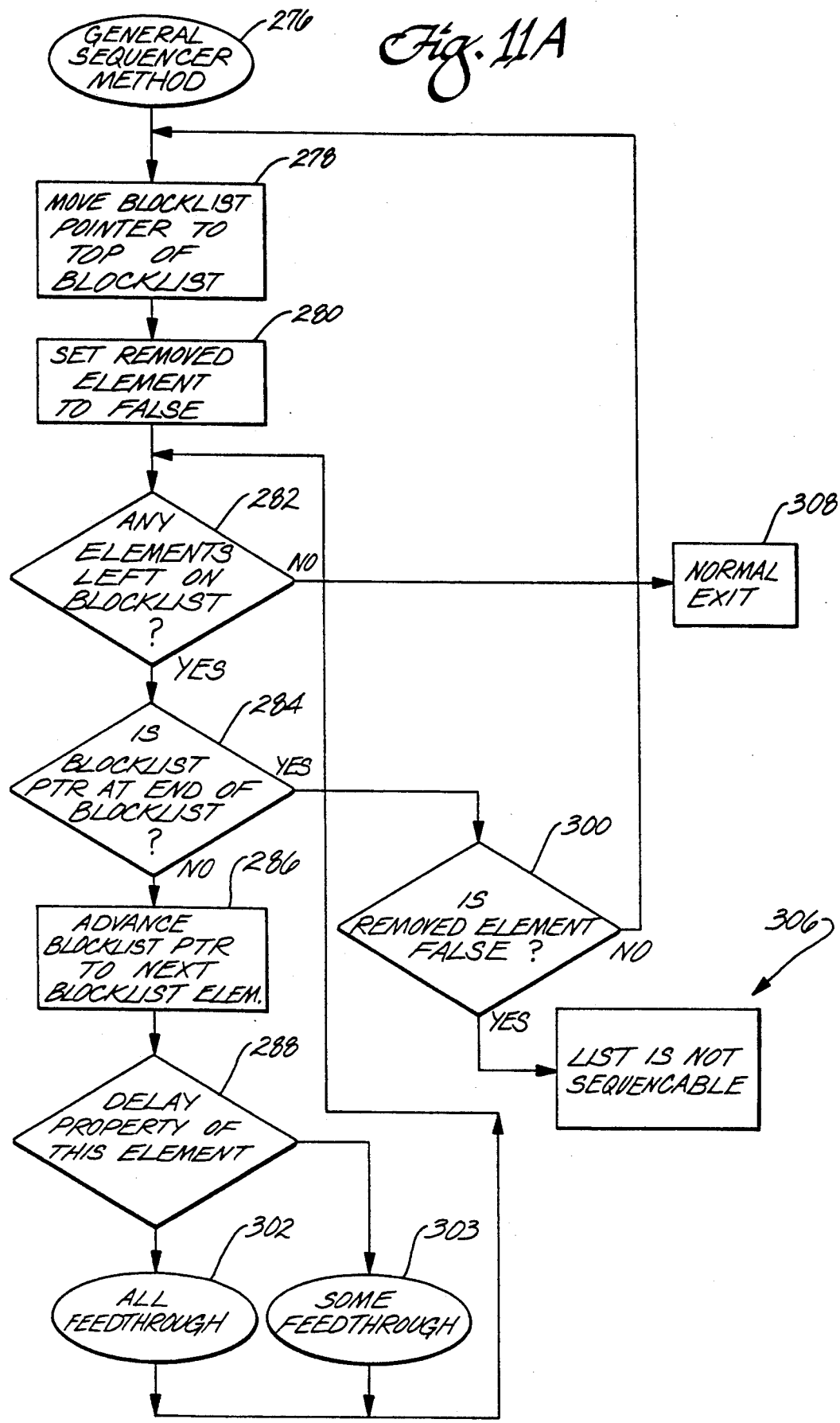
FIG. 11A is a flow diagram which depicts the sequence of operations of the simulator of FIG. 1A under control of the first GENERAL SEQUENCER method.

Referring to FIGS. 11A, B, C, and D, the first embodiment of the GENERAL SEQUENCER method is now discussed. The GENERAL SEQUENCER method accommodates blocks which have a feedthrough list associated with each output of a block instead of only one feedthrough list for all of the outputs of the block. The analysis of the SOME feedthrough type elements varies in that the feedthrough lists—one for each output—are analyzed instead of only one feedthrough list for the block.

FIG. 11A represents the general calling routine for the GENERAL SEQUENCER method which is identical to the calling routine of the RESTRICTED SEQUENCER method in FIG. 5A. Additionally, the ALL FEEDTHROUGH method in FIG. 11B for the GENERAL SEQUENCER method is precisely the same as the ALL FEEDTHROUGH method in the RESTRICTED SEQUENCER method in FIG. 5B. The difference in the RESTRICTED SEQUENCER method and the GENERAL SEQUENCER method occurs in FIGS. 11C and 11D. These figures represent the SOME FEEDTHROUGH method of the GENERAL SEQUENCER method which handles the analysis of multiple feedthrough lists corresponding to the outputs for a particular block, instead of only one feedthrough list for the block in the case of the RESTRICTED SEQUENCER of FIGS. 5A, B and C.

Assuming that the GENERAL SEQUENCER method is called at block 278, FIG. 11A, the blocklist pointer is moved to the top of the blocklist at block 278 and the REMOVED ELEMENT variable is set to "false" at block 280. As in the case of the RESTRICTED SEQUENCER method at block 282 a determination is made of whether or not there are any elements left on the blocklist and at block 284 a determination is made of whether or not the blocklist pointer is at the end of the blocklist. During Block 286, the netlist pointer is advanced to the next blocklist element and at block 288 the delay property of the particular element being analyzed is determined. At this point, if the delay property of the particular element being analyzed is an all feedthrough type, then the ALL FEEDTHROUGH method (FIG. 11B) is entered at block 302. However, if the delay type is a SOME feedthrough type, then SOME FEEDTHROUGH method is entered at block 303 (FIG. 11C).

The GENERAL SEQUENCER method keeps track of which feedthrough list of which element is last analyzed by maintaining an output list associated with the element and pointing to the output whose feedthrough list is currently being analyzed. The output list is obtained from either the netlist or the library.

Figure 11B:
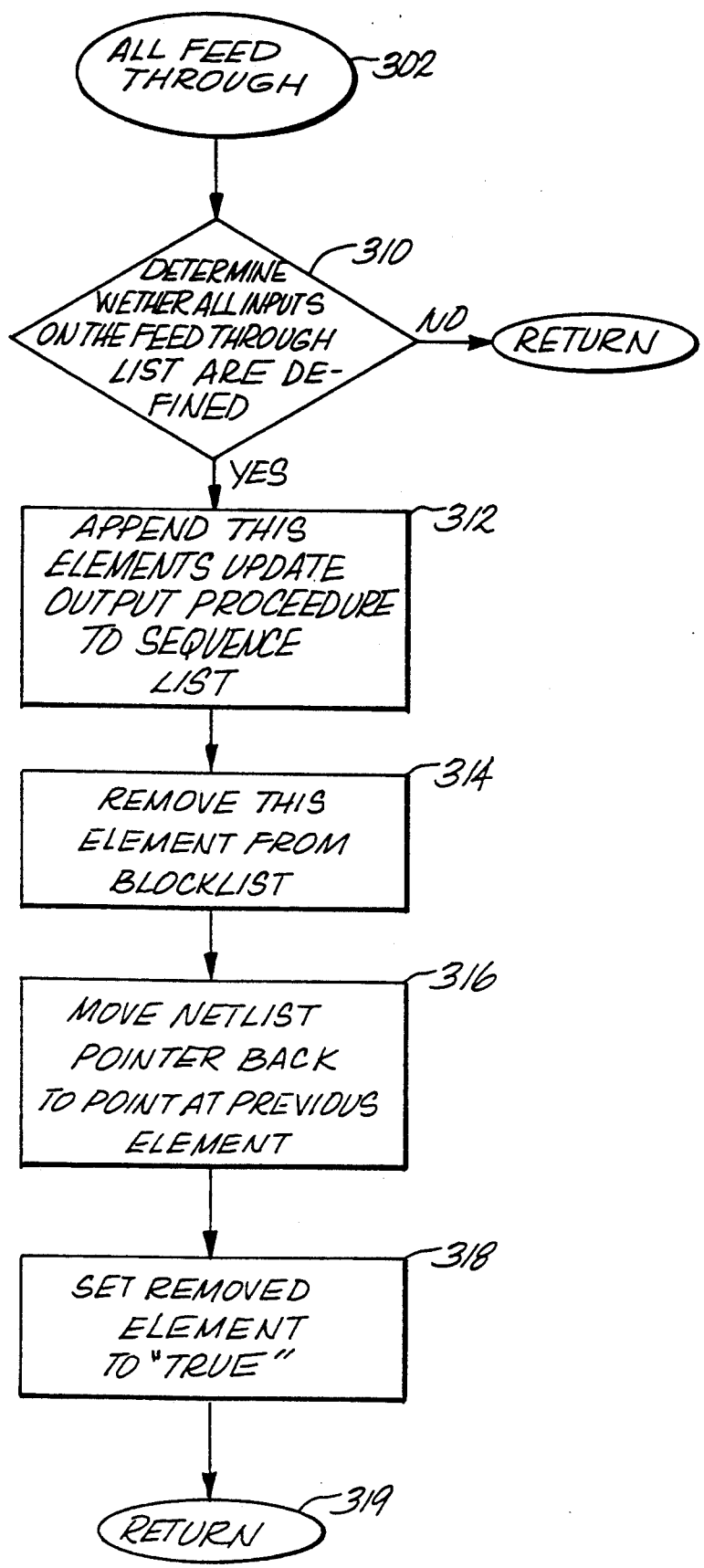
FIG. 11B is a flow diagram which depicts the sequence of operations of the simulator of FIG. 1A under control of the ALL FEEDTHROUGH method referenced in FIG. 11A.
Figure 11C:
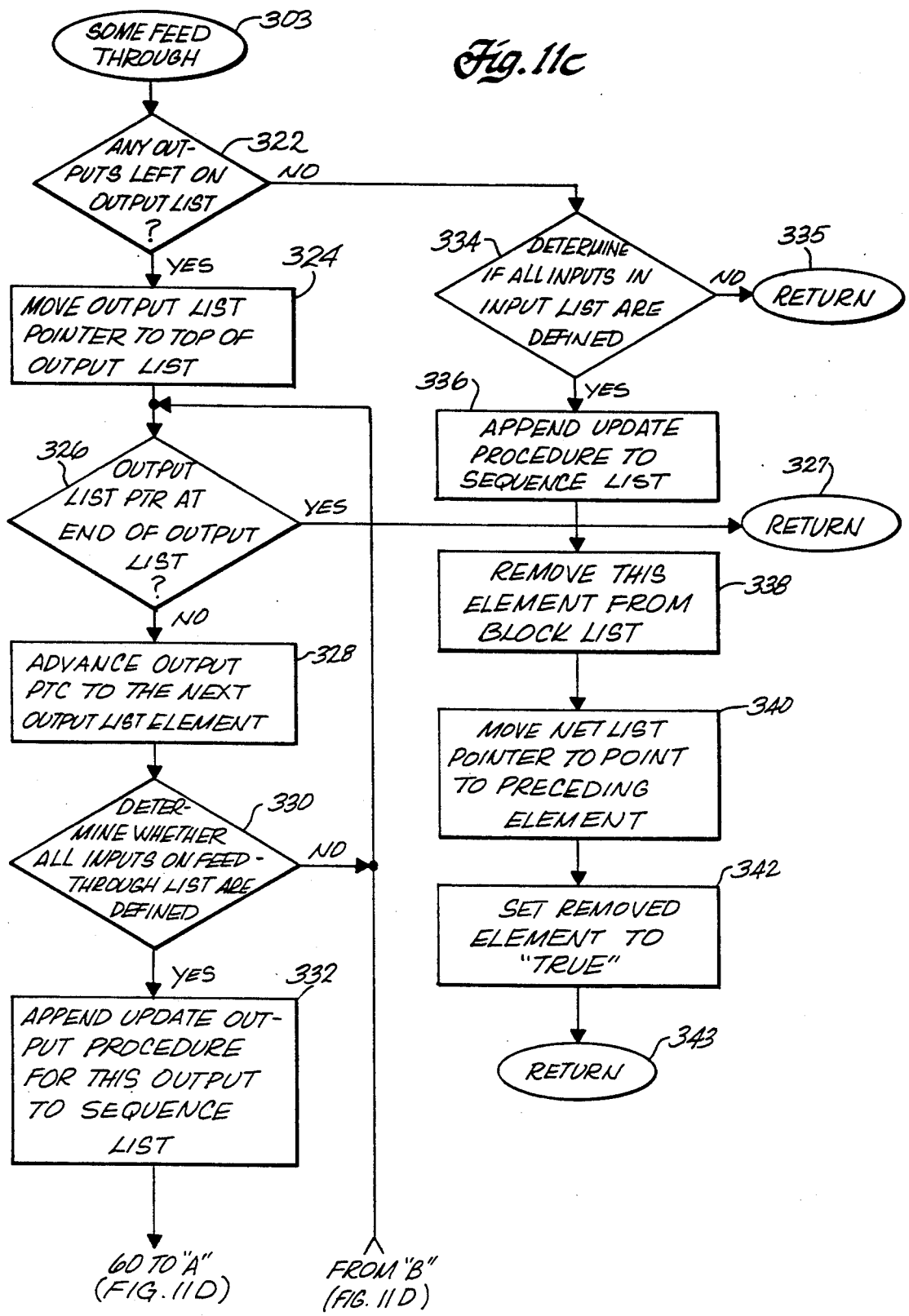

At block 322 of FIG. 11C, the output list of the element is examined to see if it contains any outputs or elements. If the output list is not empty, then at block 324 a new pointer is initialized which points to the top of the output list.

At block 326 the pointer is examined to determined if it is at the end of the output list. If the pointer is at the end of the output list, then processing returns at block 327 to block 282 of FIG. 11A. However, if the pointer is not at the end of the output list, then at block 328 the pointer is advanced to the next output list element. At block 330, all the inputs on the feedthrough list associated with this particular output are examined to determine if they are defined. The procedure for determining whether or not the output is defined is the same as the procedure for the RESTRICTED SEQUENCER method. An input is defined if it is driven by an update output procedure call which is on the sequence list. If all of the inputs in the particular feedthrough list are not defined, then at block 326 a determination is made of whether or not the output list pointer is pointing to the end of the list. Assuming that the output list pointer is not pointing to the end of the list, then at block 328, the pointer is advanced to the next output list element. The feedthrough list for this element is examined to determine whether or not the inputs in its feedthrough list are defined. Assuming that the inputs in the feedthrough list are defined, the update output procedure call, associated with the particular output, is appended to the sequence list. At block 344 (FIG. 11D) the output which had its feedthrough list analyzed is removed from the output list and at block 346, the output list pointer is moved to the preceding output in the output list. At block 348 the REMOVED ELEMENT variable is set to "true", and processing resumes to block 326 of FIG. 11C, at which a determination is made of whether the pointer of the output list is pointing to the end of the list. This step is conducted in order to determine whether all of the feedthrough lists associated with each output for the block have been analyzed. If all the feedthrough lists associated with each output of a particular block have been analyzed, then at block 327 processing returns to the calling part of the GENERAL SEQUENCER method to block 282 of FIG. 11A.

Referring back to block 322 of FIG. 11C, if there are no outputs left on the output list for this element, a determination is made at block 234 of whether all of the inputs in the input list are defined. If the inputs on the input list are not all defined, then processing returns to the calling part of the GENERAL SEQUENCER method at block 282 of FIG. 11A. Assuming that all of the inputs to the input list are defined, at block 336 the update state procedure for this block is appended to the sequence list. At block 338, this element is removed from the blocklist and at block 340 the blocklist pointer is moved to point to the preceding element on the blocklist. At block 342, the REMOVED ELEMENT variable is set to "true" and processing returns to the calling part of GENERAL SEQUENCER method at block 282 of FIG. 11A.

1) Detailed Example of the First Embodiment of the GENERAL SEQUENCER Method of FIGS. 11A, B, C and D Referring now to FIGS. 8A, 11A, 11B, 11C, 11D, 12A, 12B, 12C and 12D, 13, 13A and 13B, a detailed description of an example of the first embodiment of the GENERAL SEQUENCER method is now discussed. In FIG. 10, it was shown that the RESTRICTED SEQUENCER method failed to sequence the block diagram of FIG. 8A, because element B had a feedthrough list with only input $I_2$.

The first embodiment of the GENERAL SEQUENCER method accommodates this situation by providing a separate feedthrough list for each output of the block. The blocklist generated for this example is assumed to be the same randomly ordered blocklist. Specifically, the blocklist is C, D, A and B (350, FIG. 12A). The GENERAL SEQUENCER method requires an output list at least for those elements which are classified as some feedthrough elements.

FIGS. 12 A, B, C, and D are tables of intermediate results provided for depicting changes in the status of the blocklist pointer, the blocklist, the output list pointer, the output list and the sequence list.

Figure 13:
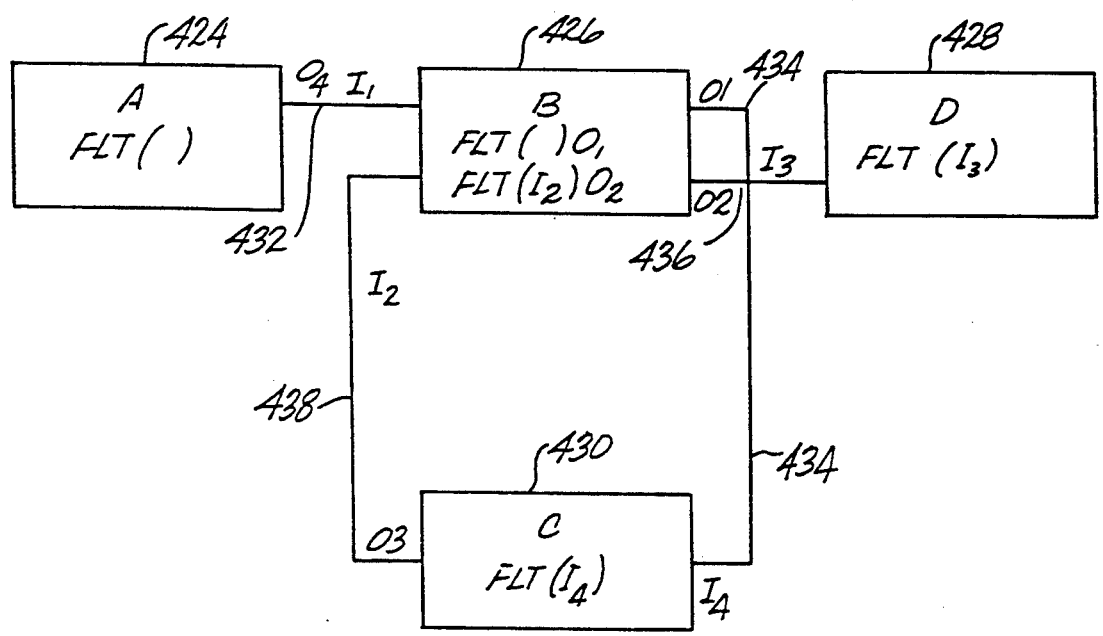
FIG. 13 is a further block diagram having a feedback loop which is formed on the display and is simulated in the simulator of FIG. 1A.

FIG. 13 is a slightly revised diagram of FIG. 8A. FIG. 13A is the netlist for FIG. 13 which is identical to the netlist of FIG. 8D. Additionally, FIG. 13B is the contents of the LIBRARY STORE for the block diagram of FIG. 13, which is the same as the LIBRARY STORE of FIG. 8C, except that element B has an additional feedthrough list, "none ($O_1$)" which is associated with output $O_1$ (2176, FIG. 13B). Output $O_1$ has a NULL feedthrough list ("none ($O_1$)") and output $O_2$ has a feedthrough list with only input $I_2$ on it (2176, FIG. 13B). Elements C and D are ALL feedthrough type blocks as they were in FIG. 8. Also element A is a some feedthrough type, as it was in FIG. 8.

The method of the GENERAL SEQUENCER (FIG. 11), sequencing the procedure calls representative of FIG. 13A, is now discussed in detail. At block 278, the blocklist pointer is moved to the top of the blocklist as shown at 352 of FIG. 12A. At block 280 of FIG. 11(A) the REMOVED ELEMENT variable is set to "false" and at block 282 a determination is made of whether there are still elements left on the blocklist. Specifically, the blocklist still has elements C, D, A, and B on it. At block 284, the netlist pointer is determined not to be at the end of the blocklist, and therefore, at block 286 the pointer is advanced to the next blocklist element, element C (354, FIG. 12A). At block 288 of FIG. 11A the feedthrough list and input list (2178, FIG. 13B) for element C are analyzed and the delay property of element C is determined to be an ALL feedthrough type, and thus, the ALL FEEDTHROUGH method (FIG. 11B) at block 302 is called. Element C is an ALL FEEDTHROUGH type because all of inputs on its input list are on its feedthrough list. At block 310 of FIG. 11B, the inputs on element C's feedthrough list are examined and it is determined that they are not defined because no update output procedure call have been placed on the sequence list. Processing returns at block 311 to block 282 of FIG. 11A to determine whether or not there are still any elements left on the blocklist. There are still elements left on the blocklist so processing continues at block 284 to determine whether or not the blocklist pointer is at the end of the blocklist. The blocklist pointer is not at the end of the blocklist, so at block 286 the blocklist pointer is advanced to the next element on the blocklist, element D (356, FIG. 12A). At block 288, the feedthrough list and the input list (2180, FIG. 13B) for element D are examined and it is determined that element D is an ALL feedthrough type and thus, the ALL FEEDTHROUGH method (FIG. 11B) at block 302 is entered.

At block 310 of the ALL FEEDTHROUGH method of FIG. 11B, it is determined that all of the inputs on element D's feedthrough list are not defined, so processing returns at block 311 to block 282 of FIG. 11A. At block 282 it is determined that there are still elements on the blocklist and at block 284 it is determined that the blocklist pointer is not at the end of the blocklist. At block 286, the blocklist pointer is advanced to the next element, element A (358, FIG. 12A). During block 288, it is determined that the delay property for element A is an ALL FEEDTHROUGH type because there are no inputs on its input list (element A has a NULL feedthrough list, 2174, FIG. 13) and the ALL FEEDTHROUGH method (FIG. 11B) 302 is entered.

At block 310, it is determined that there are no inputs on A's feedthrough list and thus, element A does not need defined inputs. At block 312, A's update output procedure call is appended to the sequence list (358, FIG. 12A). At block 314, element A is removed from the blocklist (362, FIG. 12A) and at block 316 the blocklist pointer is moved to the previous element on the blocklist, element D (364, FIG. 12A). The REMOVED ELEMENT variable is set equal to "true" at block 318 and processing resumes at block 282 in FIG. 11A. At block 282, it is determined that there are elements still left on the blocklist and at block 284 the blocklist pointer is determined not to be at the end of the blocklist. At block 286, the netlist pointer is advanced to the next element on the blocklist, element B (368, FIG. 12A). At block 288, element B is determined to be a some feedthrough type and calls the SOME FEEDTHROUGH method at block 303.

At block 322 of the SOME FEEDTHROUGH method (FIG. 11C) it is determined that there are still outputs on the output list for element B. Specifically, output $O_1$ and output $O_2$ (2176, FIG. 13B) still remain. At block 324, the output list pointer is moved to the top of the output list (370, FIG. 12B) and at block 326, the output list pointer is determined not to be at the end of the output list. At block 328, the output list pointer is advanced to the next output list element, which is output $O_1$ (372, FIG. 12B). During block 330, a determination is made that all of the inputs on the feedthrough list, associated with output $O_1$, are defined. Output $O_1$'s feedthrough list is a NULL feedthrough list and thus, requires no inputs to be defined before element B's output procedure call for output $O_1$ can be appended the sequence list. Therefore, at block 332, element B's output procedure call for output $O_1$ is appended on the sequence list (374, FIG. 12B). Output $O_1$ is removed from the output list at block 344 (376, FIG. 12B) and at block 346 the output list pointer is moved to point to the preceding element in the output list (378, FIG. 12B). At block 348, the REMOVED ELEMENT variable is set to "true" and processing returns to block 326 of FIG. 11C, during which it is determined that the output list pointer is not at the end of the output list. The output list pointer is at the top of the output list so at block 328, the output list pointer is advanced to the next output list element, which is output $O_2$ (380, FIG. 12B). At block 330 a determination is made of whether all of the inputs on output $O_2$'s feedthrough list are defined. Output $O_2$'s feedthrough list contains input $I_2$ (2176, FIG. 13B), which is driven by element C's update output procedure call, which is not on the sequence list and thus, $I_2$ is not defined. At block 326, it is determined that the output list pointer is at the end of the output list and processing returns at block 327 to block 282 of FIG. 11A.

During block 282, a determination is made that there are still elements on the blocklist, specifically, C, D, and B. At block 284, the blocklist pointer is determined to be at the end of the blocklist (380, FIG. 12B) and at block 300, the REMOVED ELEMENT variable is checked to determine whether or not it is "true" or "false". The REMOVED ELEMENT variable was set equal to "true" at block 348 and thus, at block 278, the blocklist pointer is moved back to the top of the blocklist (382, FIG. 12B). At block 289, the REMOVED ELEMENT variable is set to "false", and at block 282 a determination is made that there are still elements left on the blocklist. During block 284 the blocklist pointer is determined not to be at the end of the blocklist, and at block 286, the blocklist pointer is advanced to the next element on the blocklist, element C (384, FIG. 12B). At block 288, the delay property of element C is determined to be an ALL FEEDTHROUGH type and the ALL FEEDTHROUGH method (FIG. 11B) at block 302 is entered.

At block 310 of the ALL FEEDTHROUGH method of FIG. 11B, the inputs on element C's feedthrough list (2178, FIG. C) are determined to be defined. Element C has input $I_4$ on its feedthrough list which is driven by the update output procedure call for element B's output $O_1$, which appears on the sequence list. Thus, at block 312 of FIG. 11B, element C's update output procedure call is appended to the sequence list (386, FIG. 12B). Block 314 removes the element C from the blocklist (388, FIG. 12B) and the blocklist pointer is moved back to point to the previous element on the blocklist (390, FIG. 12C). At block 318, REMOVED ELEMENT variable is set to "true" and processing returns at block 319 to block 282 of FIG. 11A.

At block 282, a determination is made that there are still elements on the blocklist, specifically, D and B (390, FIG. 12C), and during block 284, the netlist pointer is determined not to be at the end of the blocklist. At block 286, the blocklist pointer is advanced to the next element on the blocklist, element D (392, FIG. 12C). At block 288, element D's delay property is determined to be an ALL FEEDTHROUGH type and thus, ALL FEEDTHROUGH method (FIG. 11B) at block 302 is entered.

At block 310 of the ALL FEEDTHROUGH method of FIG. 11B, a determination is made that the inputs on D's feedthrough list are not defined. Element D has input $I_3$ on its feedthrough list (2180, FIG. 13B). Input $I_3$ will be defined when element B's update output procedure for output $O_2$ (2180, FIG. 13B) 13) is updated. At this time, element B's update output procedure call associated with $O_2$ has not been added to the sequence list (392, FIG. 12C), and thud, element D's update output procedure call cannot be appended to the sequence list. Processing returns at block 311 to block 282 of FIG. 11A, during which it is determined that there are still elements on the blocklist.

At block 284, the blocklist pointer is determined not to be at the end of the blocklist, and at block 286 the blocklist pointer is advanced to the next element on the blocklist, element B (400, FIG. 12C). Element B is a SOME FEEDTHROUGH type and at block 288, the SOME FEEDTHROUGH method (FIG. 11C), is entered. At block 322 of the SOME FEEDTHROUGH method of FIG. 11C, a determination is made that there is still one output left on element B's output list. Specifically, output $O_2$ remains on element B's output list. At block 324, the output list pointer is moved to the top of the output list (402, FIG. 12C) and at block 326 a determination is made that the output list pointer is not at the end of the output list. During block 328, the output pointer is advanced to the next output on B's output list, output $O_2$. At block 330, it is determined that input $I_2$ on output $O_2$'s feedthrough list is defined. Input $I_2$ is driven by the update output procedure call of element C, which is on the sequence list, and thus, input $I_2$ is defined. At block 332 (FIG. 11C), the update output procedure call associated with output $O_2$ of element B is placed on the sequence list (406, FIG. 12C) and at block 344 (FIG. 11D) Output $O_2$ is removed from element B's output list (408, FIG. 12C). At block 348 (FIG. 11D) the REMOVED ELEMENT variable is set to "true" and processing returns to block 326 of FIG. 11C. At block 326, the output list pointer is determined to be at the end of the output list and thus, processing returns at block 327 to block 282 of FIG. 11A.

During block 282 of FIG. 11A it is determined that there are still elements on the blocklist, specifically, elements D and B. At block 284, the blocklist pointer is determined to be at the end of the blocklist and at block 300 the REMOVED ELEMENT variable is set to "true". During block 278, the blocklist pointer is moved to the top of the blocklist (410, FIG. 12C). The REMOVED ELEMENT variable is set to "false" at block 280 and at block 282 it is determined that there are still elements left on the blocklist. At block 284, the blocklist pointer is checked to see if it is at the end of the blocklist, and at block 286, the blocklist pointer is advanced to the next element on the blocklist, element D. At block 288, an all feedthrough type, element D's delay property is determined and the ALL FEEDTHROUGH method (FIG. 11B) at block 302 is entered.

At block 310 of the ALL FEEDTHROUGH method of FIG. 11B it is determined that the input $I_3$ is on element D's feedthrough list (2180, FIG. 13A). Input $I_3$ is the only input on element D's input list and it is driven by element B's update output procedure call for $O_2$ which appears on the sequence list. Thus, input $I_3$ is defined and element D's update output procedure call is appended to the sequence list at block 312 (412, FIG. 12C). During block 314, element D is removed from the blocklist (414, FIG. 12C) and at block 316, the blocklist pointer is moved back to the previous element on the blocklist (416, FIG. 12D). The REMOVED ELEMENT variable is set equal to "true" at block 318 and at block 316, processing returns to block 282 of FIG. 11A.

At block 282, a determination is made that there is still one element left on the blocklist (element B) and at block 284, it is determined that the blocklist pointer is not pointing to the end of the blocklist. The blocklist pointer is advanced to element B at block 286 and at block 288, it is determined that element B's feedthrough property is a SOME feedthrough type. The SOME FEEDTHROUGH method (FIG. 11C) at block 303 is entered.

At block 322 of the SOME FEEDTHROUGH method of FIG. 11C, a determination is made that there are no outputs on element B's output list, and at block 334 it is determined that the inputs in element B's input list are defined. Element B has input I, and input $I_2$ on its input list and both are driven by element A's and element B's respective update output procedure calls, which appear on the sequence list. Thus, both inputs are defined and at block 336 element B's update state procedure call is appended to the sequence list (420, FIG. 12D). At block 338 (FIG. 11C), element B is removed from the netlist (422, FIG. 12D), and at block 334 the REMOVED ELEMENT variable is set to "true". Processing returns to block 282 of FIG. 11A, during which it is determined that there are no elements left on the blocklist and at block 308 a normal exit from the first embodiment of the GENERAL SEQUENCER method is performed.

Referring to row 422 of FIG. 12(d), the resulting sequence list is shown. The procedure calls can then be expanded in to the procedures stored in the library space 14A to form the computer program representative of the block diagram. The execution of the computer program effectively simulate the diagram it represents.

C. Second Embodiment of the RESTRICTED and GENERAL METHODS (FIGS. 14A, B, C, D, E, F and G FIGS. 14A, B, C, D, E, F, and G represent the second embodiments of the RESTRICTED SEQUENCER and the GENERAL SEQUENCER methods. Specifically, FIGS. 14A, B, C, D, F and G are for the second embodiment of the RESTRICTED SEQUENCER methods and FIGS. 14A, B, E, F and G are the second embodiment of the GENERAL SEQUENCER methods. Essentially, these embodiments are also methods for constructing a sequenced list; however, the steps performed are different. The methods, to be discussed in more detail, essentially construct an expanded netlist, which relinquishes the step of having to determine the delay property of an element during actual sequencing. The delay property of each of the blocks is examined when the expanded netlist is constructed, whereas in the first embodiments, the delay properties of the blocks were analyzed during sequencing. The advantage of the second embodiments over the first embodiments is that it processes the sequence list more efficiently.

Figure 14A:
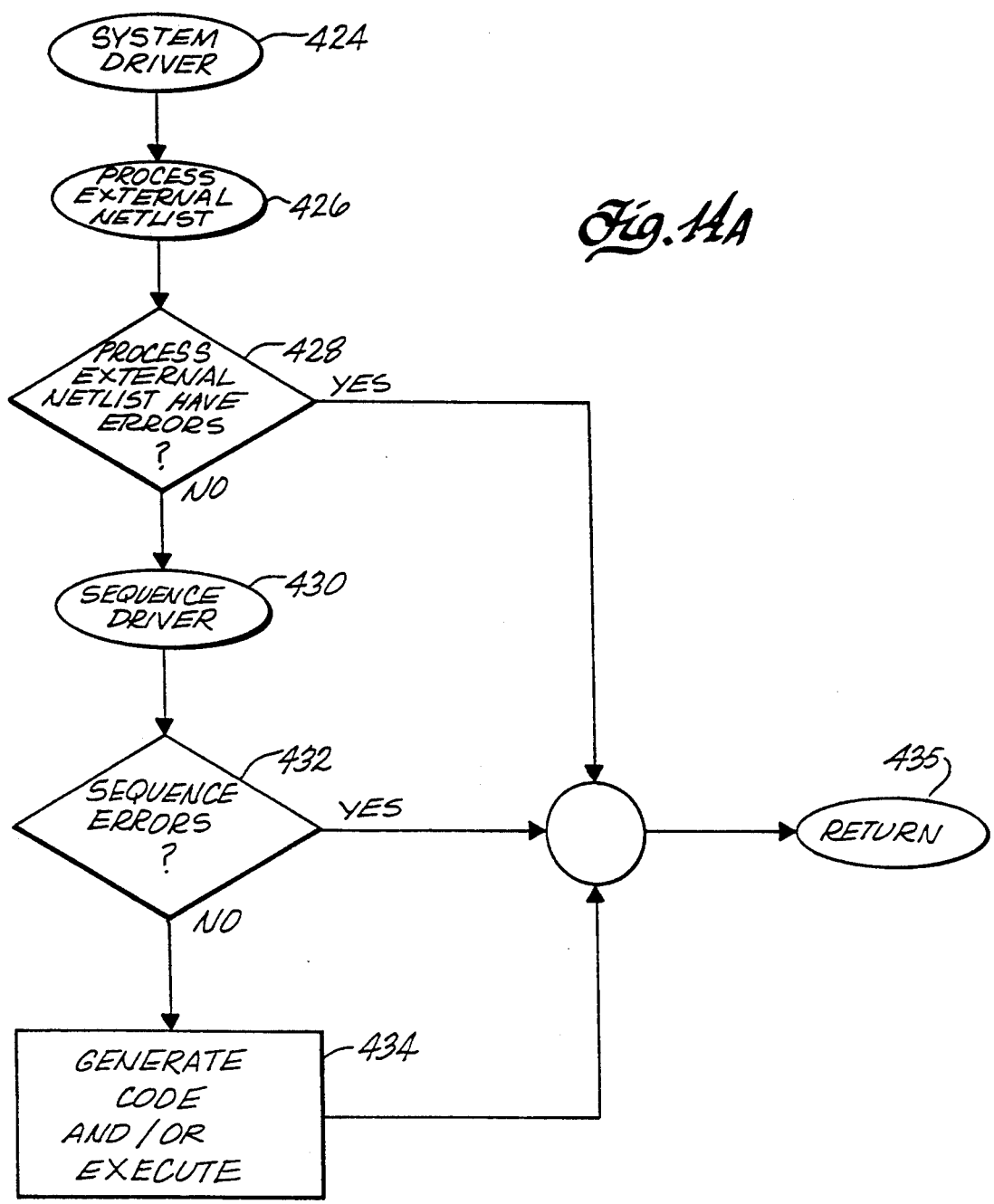
FIG. 14A is a flow diagram which depicts the sequence of operations of the simulator of FIG. 1A under control of the second RESTRICTED and GENERAL SEQUENCER methods.

FIG. 14A is an overall block diagram of the SYSTEM DRIVER for initiating the proper sequence of procedure calls for both of the second embodiments of the RESTRICTED and GENERAL methods. The PROCESS EXTERNAL NETLIST method (FIG. 14B) is called at block 426 to take the initial netlist, also called "external netlist", and convert it into an expanded version or "internal netlist". An example of an internal or external netlist is found in FIG. 15B and an example of an expanded or internal netlist is shown in FIG. 15E. A more detailed discussion of these figures will be discussed in connection with FIGS. 16 and 19, which detail the step for expanding the external netlist. If a particular element on the external netlist corresponds to a state block, these methods separate the functionality of the element into two component elements. The first element corresponds to the update output procedure call and the second element to the update state procedure call. The new elements are reflected on the internal netlist. Block 428 determines whether the construction of the internal netlist, by PROCESS EXTERNAL NETLIST method (FIG. 14B), generated any errors; if it did, then the system returns to the calling program at block 435 with an error message. Assuming that there are no errors, at block 430, the SEQUENCER DRIVER method is entered to sequence the elements on the internal netlist (FIG. 14E). At block 432, the results of the SEQUENCER DRIVER method are reviewed to determine if the SEQUENCER DRIVER method generated any errors. If an error was generated during the SEQUENCER DRIVER processing, then at block 432, the system returns to the calling program with an error message. Assuming that no errors occurred during processing, the sequence list generated by the SEQUENCER DRIVER method at block 430 is compiled into a low-level computer object code which can be optionally executed at block 434. Stated differently, the generated sequence list can be expanded and executed immediately after it is generated, or stored for later execution in the memory of system or a separate external storage medium such as a chip.

Figure 14B:
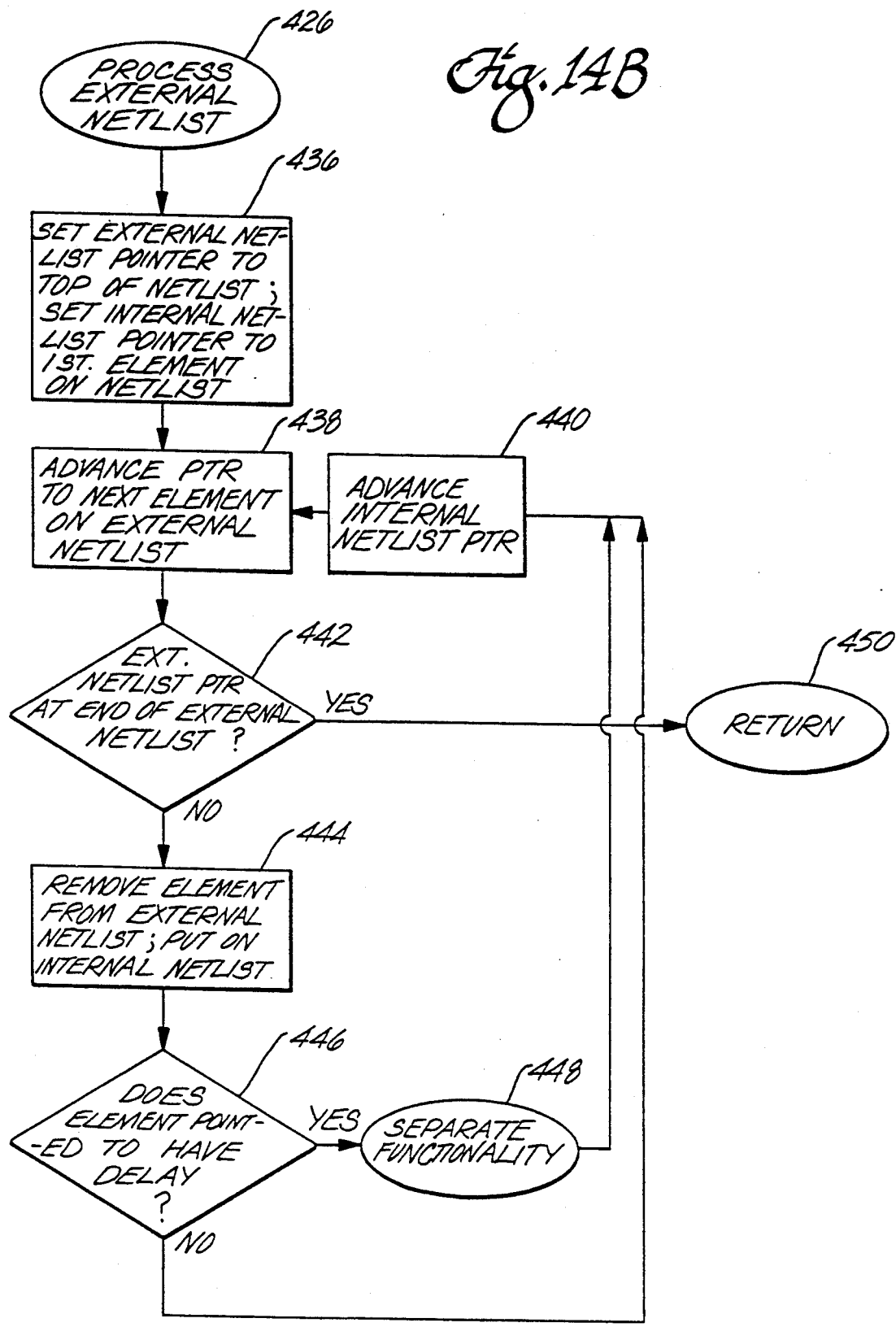
FIG. 14B is a flow diagram which depicts the sequence of operations of the simulator of FIG. 1A under control of the PROCESS EXTERNAL NETLIST method which is referenced by FIG. 14A.

FIG. 14B is a flow block diagram of the PROCESS EXTERNAL NETLIST method. In order to keep track of the formation of the internal netlist two separate pointers are maintained, one for the internal netlist and one for the external netlist. The pointers are initialized at block 436. The external netlist pointer is set to the top of the external netlist. The top of the netlist is considered to be the logical address just before the first element in the external netlist. The internal netlist pointer is set to the first location of the netlist. At block 438, the netlist pointer is advanced to the next element on the external netlist, and at block 442 a determination is made of whether the external netlist pointer is at the end of the external netlist. If the pointer is not pointing to the end of the external netlist, then at block 444 the element is removed from the external netlist and moved to the internal netlist. At block 446 a determination is made as to whether the element pointed to on the internal netlist corresponds to a state block. Assuming that the element pointed to corresponds to a state block, the SEPARATE FUNCTIONALITY method is entered at block 448 (FIG. 14C, 14D or 14E) to expand the external netlist element into separate elements (or procedure calls) on the internal netlist.

The SYSTEM DRIVER method (FIG. 14A) and the PROCESS EXTERNAL NETLIST method (FIG. 14B), work generically for both second embodiments; the RESTRICTED SEQUENCER method and the GENERAL SEQUENCER method. However, the SEPARATE FUNCTIONALITY method at block 448 of FIG. 14B will vary depending on whether the sequencing is done for the RESTRICTED or the GENERAL case. In the RESTRICTED case, the SEPARATE FUNCTIONALITY method follows the flow block diagrams of either FIGS. 14C or 14D, depending on whether the block outputs are associated with the same or differing feedthrough lists. In the GENERAL case, the SEPARATE FUNCTIONALITY method follows the flow block diagram in FIG. 14E.

Once the SEPARATE FUNCTIONALITY method has expanded the external netlist element, at block 440 of FIG. 14B the internal netlist pointer is advanced to the next empty location in the internal netlist. Returning to block 446, if it is determined that the netlist element analyzed does not correspond to a state block, then the SEPARATE FUNCTIONALITY method is not called and block 440 advances the internal netlist pointer to the next location in the internal netlist. In either case, during block 438 the external netlist pointer is advanced to next element in the external netlist. This process of analyzing the elements on the internal netlist and calling or not calling the SEPARATE FUNCTIONALITY method is continued until the pointer is determined to be at the end of the external netlist at block 442. When this occurs, processing returns at block 450 to block 428 of FIG. 14A to continue processing of the SYSTEM DRIVER method.

Figure 14C:
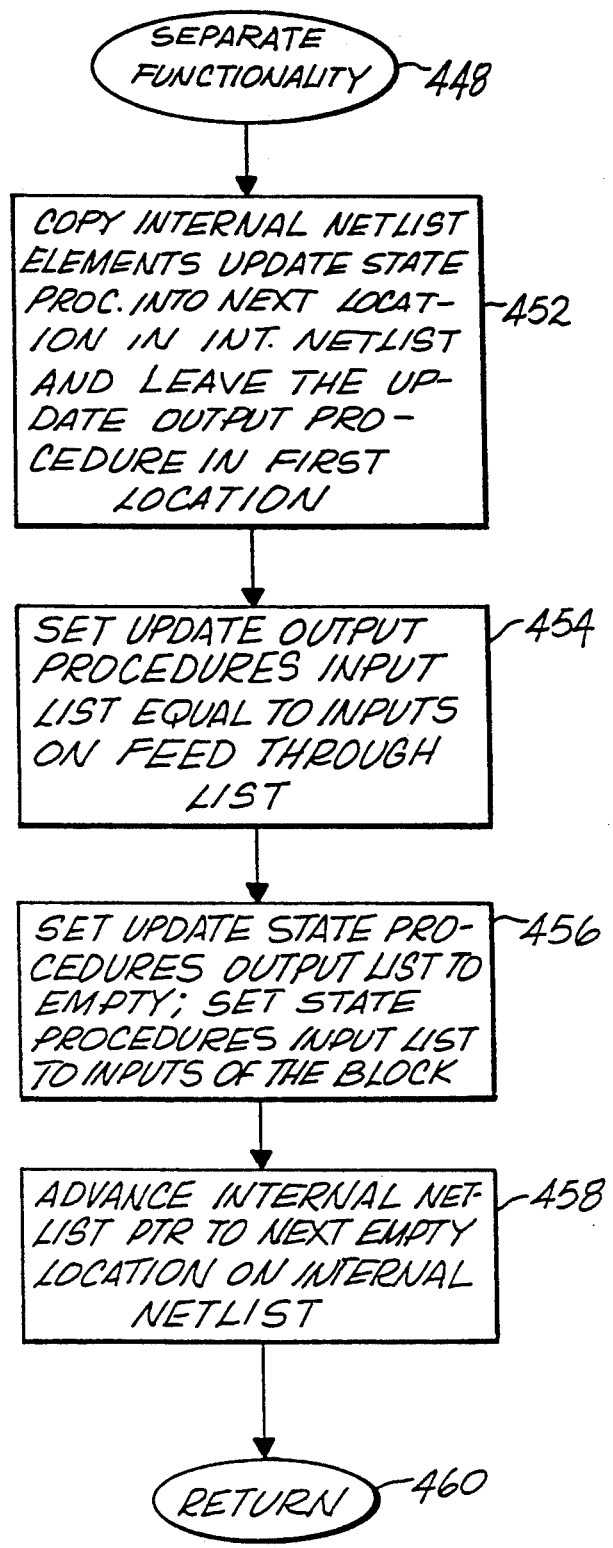
FIG. 14C is a flow diagram which depicts the sequence of operations of the simulator of FIG. 1A under control of the SEPARATE FUNCTIONALITY method referenced by FIG. 14B in the RESTRICTED CASE when there is only one update output procedure and only one feedthrough list per block.

1) SEPARATE FUNCTIONALITY method of FIG. 14B for One Update Output Procedure and One Feedthrough List Per Block FIG. 14C is a flow block diagram of the SEPARATE FUNCTIONALITY method for the second embodiment in the RESTRICTED case when the element being analyzed is a state block which has one output update procedure and one feedthrough list. At block 452, the update state procedure call of the internal netlist element is copied into the next location in the internal netlist and the update output procedure call for the internal netlist element is left in the first location. Stated differently, this step creates a first internal netlist element defining the update output procedure call of that element, and a second internal netlist element defining the update state procedure call for the same element. The purpose of this step is to separate the functionality of the block into separated entries or elements on the internal netlist. At block 454, update output procedure call's input list is set equal to the inputs on the element's feedthrough list. At block 456, the update state procedure call's output list is set to empty and its input list is set to the inputs of the block. The update state procedure needs the inputs to the block in order to properly update the state. The internal netlist pointer is advanced to the next element location on the internal netlist at block 458, which is empty. Processing returns at block 460 to block 440 of the PROCESS EXTERNAL NETLIST method (FIG. 14B).

Figure 14D:
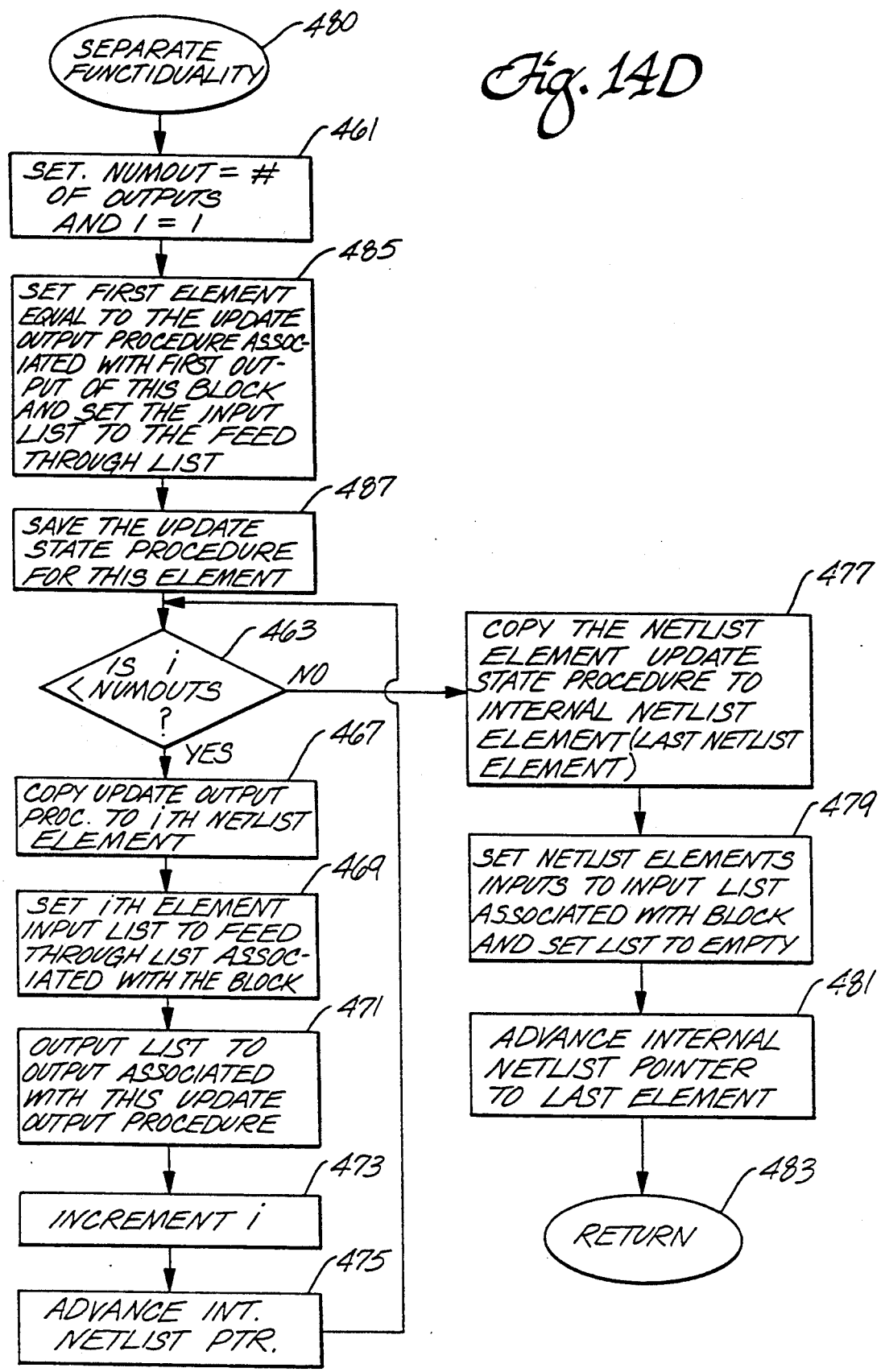
FIG. 14D is also a flow diagram which depicts the sequence of operations of the simulator of FIG. 1A under control of the SEPARATE FUNCTIONALITY method referenced by FIG. 14B in the RESTRICTED CASE when there are multiple update output procedures and only one feedthrough list for the block.

2) SEPARATE FUNCTIONALITY Method of FIG. 14D for Multiple Update Output Procedures and Only One Feedthrough List Per Block The SEPARATE FUNCTIONALITY method of FIG. 14C assumes that there is only one update output procedure (discussed above) associated with all of the outputs from the state block and that each output is associated with an identical feedthrough list. The SEPARATE FUNCTIONALITY method of FIG. 14D accounts for the RESTRICTED case when there are multiple update output procedures associated with the state block and each output is associated with an identical feedthrough list. The output procedures call are copied into the next location of the internal netlist and each of the input lists for these new internal netlist elements is set equal to only one feedthrough list associated with all of the update output procedure calls.

FIG. 14D is a detailed flow diagram of the procedure for accommodating the multiple outputs in the RESTRICTED case wherein each has its own update output procedure (but only one feedthrough list for the block). At block 461, the variable NUMOUT is set equal to the number of outputs of a particular block and incrementer i is set equal to 1. The increment i is set to 1 in order to account for a first internal netlist element currently stored on the internal netlist. The first internal netlist element is set equal to the update output procedure associated with the first output to the block, and it has an input list equal to the feedthrough list associated with the block. At block 487, the definition (location, address) of the update state procedure call is saved for future reference. At block 463, the variable i is checked to see if it is greater than the number of outputs to the block. During block 467, the update output procedure call associated with the next output in the block is copied into the next location of the internal netlist. The input list associated with this new element is set equal to the feedthrough list associated with the block at block 469. At block 471, the output list for the new element is set equal to the output associated with the update output procedure in the new element. Incrementer i is incremented by 1 at block 473, and at block 478 the internal netlist pointer is advanced to the new element location. This process continues until all of the outputs and their associated update output procedure calls are associated with their own separate internal netlist elements. When i is equal to NUMOUTS, the update output procedures have all been placed on the internal netlist. At block 471, the update state procedure call, which was saved at block 487, is placed into the last location on the internal netlist. At block 479, the inputs to this internal netlist element are set equal to the input list associated with the state block. Block 481 advances the internal netlist pointer to this last element and block 483 returns processing back to the PROCESS EXTERNAL NETLIST method (FIG. 14D).

3) SEPARATE FUNCTIONALITY Method of FIG. 14E Multiple Update Output Procedures and Multiple Feedthrough Lists.

FIG. 14E is a flow block diagram for the SEPARATE FUNCTIONALITY method in the general case. This method is almost identical to the SEPARATE FUNCTIONALITY method in the RESTRICTED CASE (FIG. 14D). However, this method accounts for the fact that there is a separate feedthrough list associated with each update output procedure.

At block 462, the variable NUMOUTS is set equal to the number of outputs of a particular block to be analyzed and incrementer i is set equal to 1. At block 484, the first element is set equal to the update output procedure call associated with the first output and its input list is set equal to the feedthrough list associated with the output. At block 491, the definition of the update state procedure call is saved for future reference at block 476. During block 464, a determination of whether incrementer i is greater than NUMOUTS is made. At block 466, the update output procedure call for the next output is copied into the next location in the internal netlist. At block 468, the input list for the new internal netlist element is set equal to the feedthrough list associated with the output. At block 470, the output list for the new internal netlist element is set equal to the output for this update output procedure call. During block 472, variable incrementer i is set, and at block 474 the internal netlist pointer is advanced to the next empty location on the internal netlist. This process continues until all the update procedure calls associated with the various outputs have been placed on the internal netlist. Block 476 is entered after all of the update output procedure calls have been placed on the internal netlist. At block 476, the saved update state procedure call is copied into the last internal netlist location. At block 478, the update state procedure call's input list is set equal to the input list for the block, and at block 480 the internal netlist pointer is copied to the next empty location in the internal netlist. At block 482, processing returns to the PROCESS EXTERNAL NETLIST method in FIG. 14B.

Figure 14F:
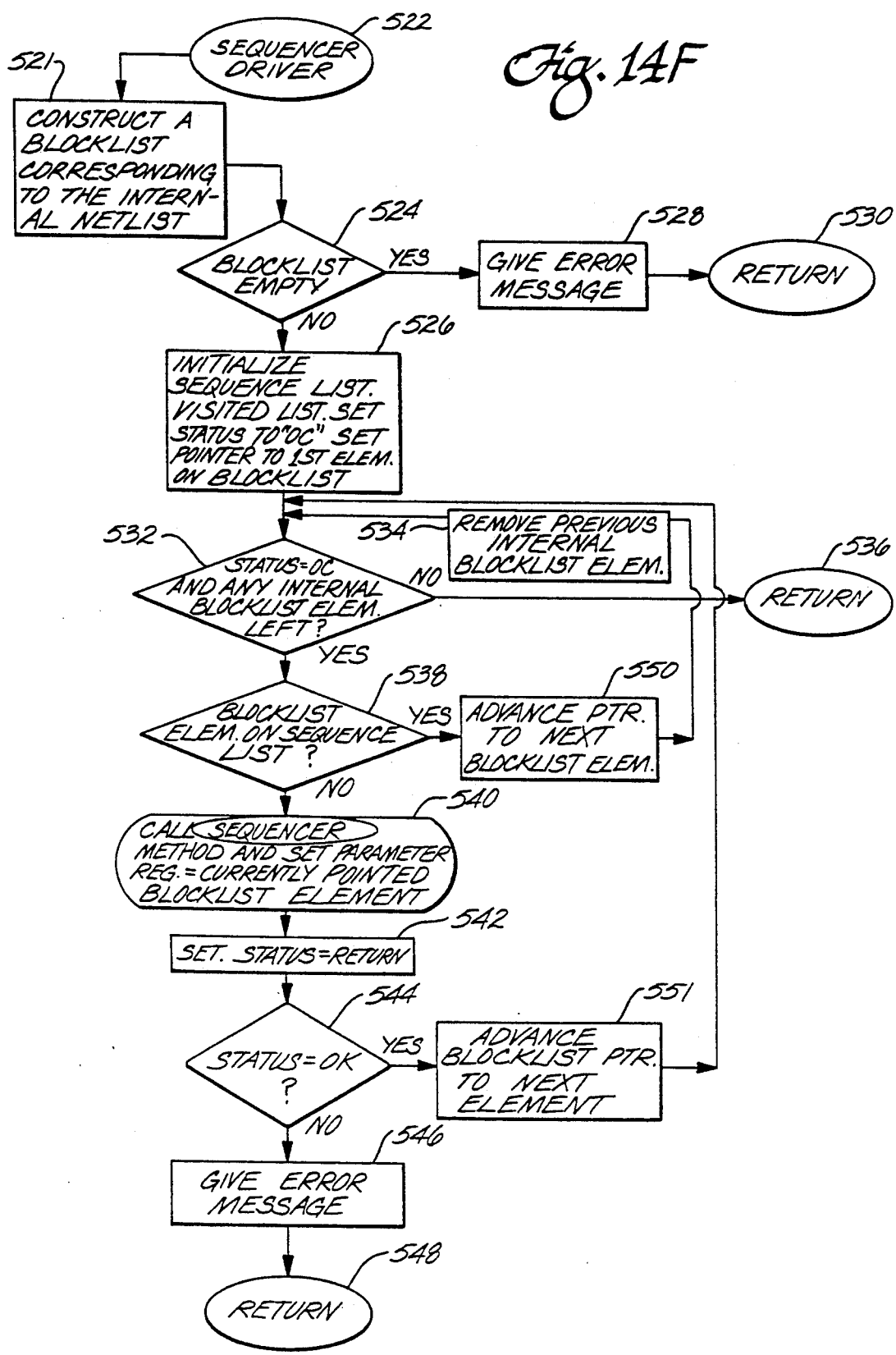
FIG. 14F is a flow diagram which depicts the sequence of operations of the simulator of FIG. 1A under control of the SEQUENCER DRIVER method referenced by FIG. 14A.

4) SEQUENCER DRIVER method of FIG. 14F

FIG. 14F is a flow block diagram for the SEQUENCER DRIVER method. The SEQUENCER DRIVER method has two purposes. First, the SEQUENCER DRIVER method ensures that various lists (sequence list, blocklist, visited list (to be discussed), input list, etc.) are initialized. Second, the SEQUENCER DRIVER checks the results of the SEQUENCER method (FIG. 14G) to ensure that sequencing has occurred properly. The SEQUENCER DRIVER method references a blocklist in order to keep track of which block or element is presently being processed. Each element on the blocklist is the name of the element listed in the internal netlist to be processed. Stated differently, the blocklist is a shorthand of the internal netlist with only enough information for identifying the elements being analyzed. The elements on the blocklist are referenced by a blocklist pointer. The elements are removed one at a time from the blocklist after each element has been processed by the SEQUENCER method (FIG. 14G). The blocklist is formed at block 521 after the internal netlist has been constructed by the PROCESS INTERNAL NETLIST method (FIG. 14B).

Referring to the SEQUENCER DRIVER method (14F) at block 524, the blocklist is checked to see if it is empty. If the blocklist is empty, then an error is given to the user at block 528 and processing returns at block 530 to block 432 of FIG. 14A. The error occurs when the SEQUENCER DRIVER tries to sequence an empty blocklist. At block 526 the sequence list and the visited list are initialized. The visited list keeps track of whether or not a particular element on the blocklist has been processed in order to ensure that an endless loop does not occur. Also, at block 526 a STATUS variable is set equal to "okay" and the blocklist pointer is set to the first element in the blocklist. At block 532 the STATUS variable is checked to see if it is equal to "okay" and whether there are still internal netlist elements on the blocklist. If there are no blocklist elements, then at block 432 processing returns at block 536 to the SYSTEM DRIVER method (FIG. 14A). However, if there are blocklist elements, then at block 538 the current blocklist element is checked to determine if it appears on the sequence list.

If the current blocklist element is already on the sequence list, then at block 550 the blocklist pointer is advanced to the next blocklist element, and at block 534 the previously pointed to blocklist element is removed from the blocklist. Assuming that the blocklist element does not appear on the sequence list, at block 540 (FIG. 14G), the SEQUENCER method is entered to place the currently pointed to blocklist element on the sequence list. At block 540, a PARAMETER REGISTER is also set equal to the location of the currently pointed to blocklist element. Contents of the PARAMETER REGISTER are utilized by the SEQUENCER method at block 486 (FIG. 14G). After the SEQUENCER method's processing is completed, at block 542 of FIG. 14F, STATUS variable is set equal to a RETURN variable which is set in the SEQUENCER method (FIG. 14G). At block 544, a determination is made of whether the STATUS variable is equal to "okay", and if it is, at block 551, blocklist pointer is advanced to the next blocklist element location and processing continues for this element at block 532. If the STATUS variable is not equal to "okay", then at blocks 546 and 548, an error message is delivered to the SYSTEM DRIVER method (FIG. 14A). if all of the blocklist elements have been sequenced, then processing returns at block 536 to the SYSTEM DRIVER method (FIG. 14A) at block 432.

5) SEQUENCER Method of FIG. 14F

FIG. 14G is a detailed flow diagram of the SEQUENCER method which was entered by the SEQUENCER DRIVER method (FIG. 14F) at block 540. Briefly, the SEQUENCER method traces each input of each blocklist element to an update output procedure call of a second blocklist element (driving the blocklist element) which drives and defines the input of the first blocklist element. The inputs of the driving element are then traced to the next update output procedure call which defines this input. This procedure follows until the next update output procedure call is a block having a null feedthrough list or a block currently on the sequence list. Once all the inputs have been traced to update output procedure calls, the SEQUENCER method places the update output procedure calls on the sequence list in the order of the last traced update output procedure call first. This procedure ensures that the update output procedure calls are sequenced in an order which defines all of the inputs when the update output procedures for each procedure call are executed. After all the inputs for a state block are defined, the update state procedure for that block is placed on the sequence list.

FIG. 14G is a detailed flow diagram for the SEQUENCER method. Block 484 sets a RETURN variable equal to "okay," which denotes that sequencing of the current element pointed to on the blocklist is properly occurring. The contents of the POTENTIAL SEQUENCE LIST ELEMENT ("PSLE") pointer is set equal to the PARAMETER REGISTER (540, FIG. 14F). At block 488, the PSLE pointed to by the PSLE-pointer is checked to see if it is presently on the sequence list. Assuming that the element pointed to is not on the sequence list, then at block 490 a determination is made of whether the element pointed to is on the visited list. The visited list is a list of elements which were analyzed previously to determine if they could be placed on the sequence list. The fact that an element is on the visited list flags the system that this element was visited and it was not sequenceable.

If the element appeared on the visited list, then a SEQUENCER error will be generated at block 504. This error occurs because the element presently being analyzed was analyzed once before and it was found not to be sequenceable, thus, the blocklist is considered not to be sequenceable. If the element is not on the visited list, the element is placed on the visited list at block 492. At block 494, an input list pointer is set to the beginning of the input list for the element being checked.

The input list associated with each element is stored by the PROCESS EXTERNAL netlist method (FIG. 14B). An input list pointer is provided for keeping track of which input is currently being processed and traced by the system. At block 496, the RETURN variable is checked to determine if it is set equal to "okay" and if the input list pointer is examined to see if it still points to an input and not to an empty location. Assuming that the pointer points to an input and that the RETURN variable is equal to "okay", then a recursive call is made at block 498. Specifically, at block 500, the current function context is pushed onto a stack. The current function context includes the value of the RETURN variable, the contents of the PSLE- pointer and the pointer to the input list. At block 502, the blocklist element that drives the currently pointed input is placed into the PARAMETER REGISTER.

The SEQUENCER method is recursively called to analyze the blocklist element which drives the presently pointed to input of the PSLE currently on the stack. At block 484, the RETURN variable is set equal to "okay". At block 486, the PSLE-pointer is set equal to the PARAMETER REGISTER which contains the blocklist element which drives the input currently on the stack. At block 488, a determination is made of whether or not this element is on the sequence list. Assuming that this element is not on the sequence list (block 488), the element is checked to see if it is on the visited list (block 490). If the element is not on the visited list, it is placed on the visited list at block 492. At block 494, the input list pointer is set to the beginning of this PSLE's input list, and at block 496, a determination is made of whether there are any inputs in the input list and whether the RETURN variable is equal to "okay". If there are inputs on the input list, and the RETURN variable is equal to "okay", then another recursive call at block 498 is made to analyze the blocklist element which drives the current input being analyzed. If there are no more inputs or if RETURN is not equal to "okay", then block 523 is entered to determine if the RETURN variable is equal to "okay". If the RETURN variable is equal to "okay", then at block 525, the procedure call for the blocklist element pointed to by the PSLE-pointer is placed on the sequence list. At block 527, the element is then taken off the visited list, and at block 529 the element is removed from the blocklist. Processing continues at block 510 (to be discussed). Returning to block 522, if the RETURN is not equal to "okay", then processing continues to block 510 anyway.

Block 510 is entered to determine if the stack is empty. Assuming that the stack currently holds the function context for a number of elements, the recursive return procedure at block 514 is called. At block 516 the current RETURN variable is placed into a system register, so that when the contexts is popped from the stack, the current contents of the RETURN variable is not lost. At block 518, the context is popped from the stack, which essentially brings back the old contents of the PSLE-pointer, the pointer to the input list element, and the RETURN variable which were all stored when the recursive call at block 498 was made. During block 520 the RETURN variable with the content of the system register is restored at block 516. At block 508 the input list pointer is advanced to the next input of the blocklist element which was just popped off the stack. At block 496 the RETURN variable is checked to see if its data is "okay" and to determine whether there are still inputs left to be analyzed. Assuming that there are no inputs to be analyzed, then at block 523, the RETURN variable is checked to determine if it is still "okay". Assuming that the RETURN variable is "okay", then at block 525, this blocklist element which was popped from the stack will have its corresponding procedure call added to the sequence list. The blocklist element will be taken off the visited list at block 527 and removed from the blocklist at block 529. At block 510 the stack is checked to determine if it is empty. Assuming, at this time, that the stack is empty, block 512 is entered to return processing to the SEQUENCER DRIVER method (FIG. 14F).

Returning to block 522, if the RETURN variable is not equal to "okay" (i.e., previous recursive call did not return "okay"—see blocks 510, 514, 516, 518 and 520), processing continues at block 510. Assuming that the stack is now empty, block 512 is entered to return processing to the SEQUENCER DRIVER method (FIG. 14F).

Figure 15A:
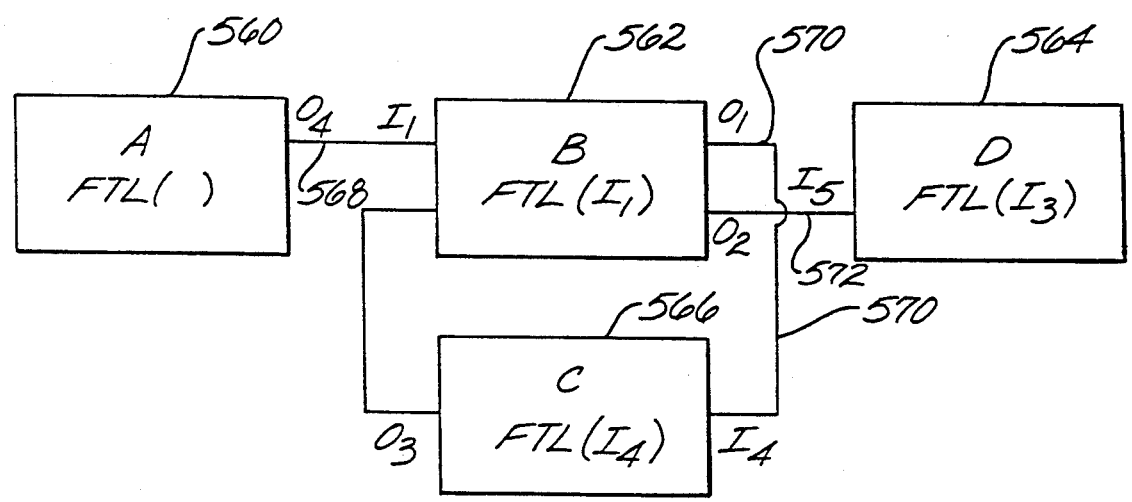
FIG. 15A is still another block diagram having a feedback loop which is formed on the display and is simulated in the simulator of FIG. 1A.
Figure 15D:
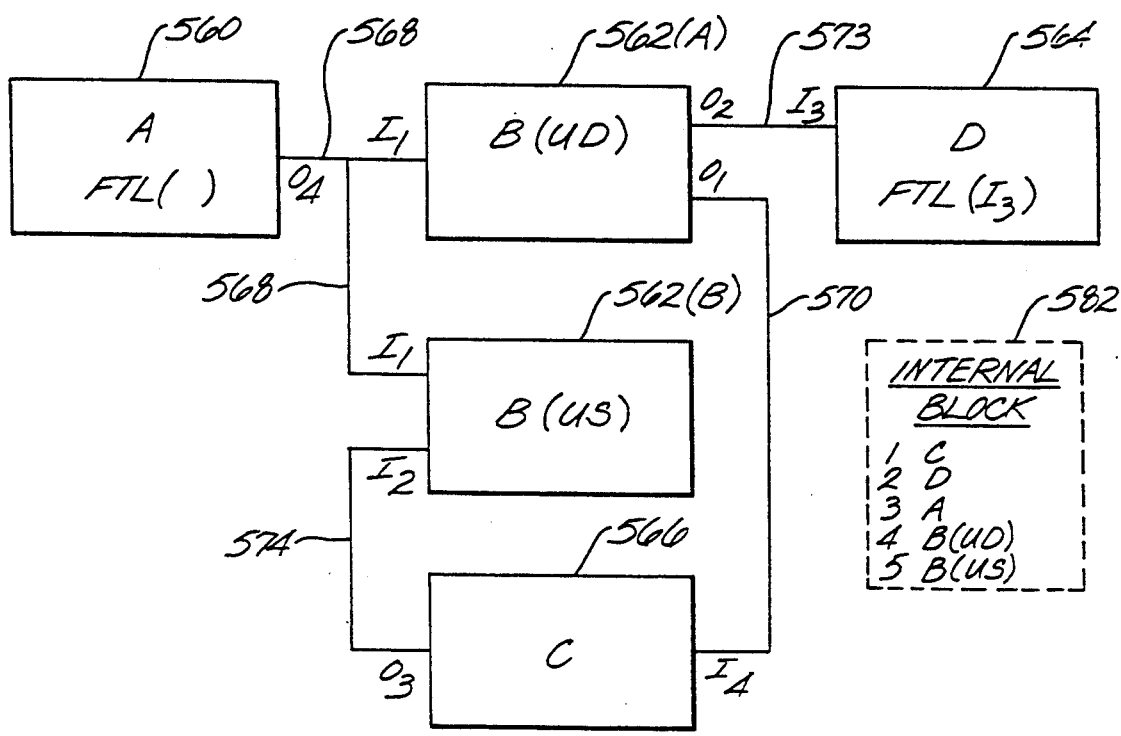
FIG. 15D is an "expanded" version of the block diagram of 15A which is simulated by the simulator of FIG. 1A.

6) Detailed Example of the Second Embodiment of the RESTRICTED SEQUENCER Method of FIG. 14A, B, C, F and G Returning to FIGS. 14A, B, C, F and G, 15A, B, C, D and E, 16A, B, C and D, an example of the second embodiment of the RESTRICTED SEQUENCER method is now discussed. FIG. 15A is a block diagram assembled by a designer on the screen display, and it is ready for simulation. To simulate the block diagram in FIG. 15A, a call is initiated to the SYSTEM DRIVER method at block 424 of FIG. 14A. PROCESS EXTERNAL NETLIST method at block 426 is then called to construct an internal netlist as shown in FIG. 15E, from the external netlist (as shown in FIG. 15B). The external netlist list that (FIG. 15B) is representative of the block diagram FIG. 15A. Whereas the internal netlist (FIG. 15E) is representative of the logical block diagram in FIG. 15D which is constructed by the PROCESS INTERNAL NETLIST method (FIG. 14B). The information which characterizes each block in the block diagram of FIG. 15A and FIG. 15D, is stored in the library and depicted in FIG. 15C. The internal netlist which is constructed will be analyzed by the SEQUENCER DRIVER method (FIG. 14F) and the SEQUENCER method (FIG. 14G). A representation of the internal or expanded netlist is shown in FIG. 15E.

FIG. 16 is a results table which depicts the construction of the internal netlist (FIG. 15E) from the external netlist (15B) by the PROCESS INTERNAL NETLIST method (FIG. 14B). Each row of the results table (FIG. 16) represents a change in either the external or internal netlists.

The PROCESS EXTERNAL NETLIST method (FIG. 14B) begins constructing the internal netlist at block 436 which sets the external netlist pointer to the top of the external netlist (584, FIG. 16) and the internal netlist pointer to the first location of the internal netlist. At block 438, the external netlist pointer is advanced to the next element in the external netlist (586, FIG. 16). At block 442 it is determined that the pointer is not at the end of the netlist, elements C, D, A and B are still on the external netlist (586, FIG. 16). At block 444, element C is transferred from the external netlist to the internal netlist and pointed to the internal netlist pointer (588, FIG. 16). At block 446, it is determined that element C does not have a delay property, which is ascertained from the feedthrough information of the block, which is stored in the LIBRARY STORE (2149, FIG. 15C). Element C is an all feedthrough type block; element C has input $I_4$ on its input list, and this input is on element C's feedthrough list. At block 440, the internal netlist pointer is advanced from element C to the next location (590, FIG. 16). At block 438, the external netlist pointer is advanced to the next element on the external netlist, element D (590, FIG. 16). At block 442, a determination is made that the pointer for the external netlist is not pointing to the end of the external netlist, and at block 442, element D is removed from the external netlist and placed on the internal netlist (592, FIG. 16). At block 446 it is determined that element D does not have a delay property because element D is an all feedthrough type block; element D has one input on its input list, $I_3$, and this input is on elements D's feedthrough list. At block 440, the internal netlist pointer is advanced to the next location in the internal netlist (592, FIG. 16). At block 438, the external netlist pointer is advanced to point to element A at block 438 (594, FIG. 16). During block 442 it is determined that the external netlist pointer is not at the end of the external netlist, and at block 440 element A is removed from the external netlist and placed on the internal netlist (596, FIG. 16). At block 446, a determination is made that element A does not have a delay property because it is an all feedthrough type block (2190, FIG. 15C). Element A does not have any inputs, and thus, by default, it is an all feedthrough block. At block 440, the internal netlist pointer is advanced to point to the next element in the internal netlist (605, FIG. 16). At block 438, the external netlist pointer is advanced to point to element B (598, FIG. 16). At block 442 a determination is made that there is still one element left on the external netlist, element B. At block 444, element B is removed from the external netlist and placed on the internal netlist (607, FIG. 16). During block 446, it is determined that element B has a delay property, so the SEPARATE FUNCTIONALITY method (FIG. 14C) for the RESTRICTED case is entered at block 448. By referring to the LIBRARY STORE 15C, element B is determined to have only one of its inputs on its input list on its feedthrough list (2192, FIG. 15C). Namely, inputs $I_4$ and $I_2$ are on element B's input list, however only input $I_1$ is on element B's feedthrough list. Thus, this is a some feedthrough or state block.

Referring to the SEPARATE FUNCTIONALITY method (FIG. 14C), at block 452, element B's update output procedure call and update state procedure call are placed as separated elements in the internal netlist. A copy of the update state procedure call of element B is copied into the location following the original entry in the internal netlist (601, FIG. 16). At block 454, the first element's update output procedure call's inputs are set equal to the inputs on the block's feedthrough list (601, FIG. 16). At block 456, element B's update state procedure calls output list is set equal to empty, and the input list is set to the inputs of the block (601, FIG. 16). At block 458, the pointer to the internal netlist is moved to the next location (599, FIG. 16), and processing returns to PROCESS EXTERNAL NETLIST method (FIG. 14B) at block 460.

At block 440 of FIG. 14B, the internal netlist pointer is advanced to point to the next location. At block 438, the external netlist pointer is advanced to the next element location in the external netlist. At block 442, that the external netlist is determined to have no more elements, and processing returns to the SYSTEM DRIVER method (FIG. 14A) at block 450.

As a result of the PROCESS EXTERNAL NETLIST method of FIG. 14B, a new block diagram of the block diagram (FIG. 15B) has been effectively constructed. This block diagram is logically created from the information stored on the internal netlist at row 599 of FIG. 16. In reality, the designer does not see this construction of the block diagram, or even any of the netlist information.

The internal netlist shown in FIG. 15E is essentially an expanded external netlist shown in FIG. 15A. The additional elements on the internal netlist account for the update output procedure call (2200, FIG. 15E) and the update state procedure call (2202, FIG. 15E) for element B. Element B's update output procedure has input $I_1$ and outputs $O_1$ and $O_2$ (2200, FIG. 15E). Element B's update state procedure has input list of $I_1$ and $I_2$ and no outputs (2202, FIG. 15G). Elements A, C and D remain the same. The principal purpose for constructing the internal netlist (FIG. 15E) was to create a logical block diagram which does not have any blocks with a delay property. Effectively, element B's functionality has been separated so that the delay property in this block no longer exists. In other words, none of the inputs to any of the blocks will be delayed in actual processing. Thus, the steps for sequencing do not require analyzing whether a block is a state block which has delay property, as in the case of the first embodiments of the RESTRICTED and GENERAL SEQUENCER methods (FIGS. 5 and 11).

The PROCESS EXTERNAL NETLIST method (FIG. 14B) returns at block 450 to block 428 of the SYSTEM DRIVER method (FIG. 14A). During this block it is determined that no errors occurred in creating the internal netlist, and the SEQUENCER DRIVER method (FIG. 14F) is called to sequence the elements of the internal netlist constructed by the PROCESS EXTERNAL NETLIST method. At block 521, a blocklist is constructed of only the names of the blocks in the internal netlist to be processed. The purpose of the blocklist is for keeping track of the element in the internal netlist which is presently being processed. A representation of the blocklist is shown in FIG. 17A at row 591. At block 524 (FIG. 14F) it is determined that the blocklist is not empty. At block 526, the sequence list, the visited list are initialized, the STATUS variable is set to "okay", and the pointer to the blocklist is set to the first element in the blocklist, element C (591, FIG. 17A).

FIG. 17A is a tabular depiction of the various stages for constructing a sequence list from the blocklist via the SEQUENCER DRIVER method (FIG. 14A). The table is broken up into four columns, the first column being the pointer for the blocklist, the second column being the blocklist, the third column is a stack for temporary storage, the fourth column is an input list for each of the elements (obtained from the internal netlist FIG. 15E), and the last column is the constructed sequence list. Brackets [ ] are used in various locations throughout the table to symbolize that "this" input or element is the input or element currently being analyzed.

At block 532, of the SEQUENCER DRIVER method (FIG. 14F), it is determined that the STATUS variable is set to "okay" and that there are still more blocklist elements on the blocklist (591, FIG. 17A). At block 538, the element pointed to on the blocklist, element C, is checked to determine if it is on the sequence list. Element C is not on the sequence list, and the SEQUENCER method (FIG. 14G) at block 540 is entered. At block 540, the parameter register is set equal to the location of the currently pointed to blocklist element, element C.

Referring to FIG. 14G, at block 484 of the SEQUENCER method, the return variable is set to "okay", and at block 486, the POTENTIAL SEQUENCE LIST ELEMENT (PSLE) is set to the contents of the PARAMETER REGISTER. Currently the contents of the PARAMETER REGISTER holds the blocklist location for element C. At block 488, it is determined that element C is not on the sequence list, and at block 490 it is determined that element C is not on the visited list, and at block 492 element C is placed on the visited list. At block 494, the input list pointer is set to the beginning of element C's input list (593, FIG. 17A) which is sorted in C's internal netlist (2204, FIG. 15E), which is stored in an area of memory. Element C only has one input on its input list, $I_4$ (2204, FIG. 15E). At block 496, a determination is made that the RETURN variable is set equal to "okay", and the input list pointer is pointing to input $I_4$. Block 498 is entered to trace back to the update output procedure call which drives input $I_4$. Specifically, at block 500, the current function context for element C is pushed onto the stack (595, FIG. 17A), and at block 502 the element which drives input $I_4$ is placed into the PARAMETER REGISTER. Element B's update output procedure call (595, FIG. 17A) is the element which drives input $I_4$.

Processing returns at block 484, during which the RETURN variable is set equal to "okay", and at block 486, the PSLE pointer is set equal to the current contents of the PARAMETER REGISTER, element B's update output procedure call. At block 488, a determination is made that element B's update output procedure call is not on the sequence list, and at block 490 that element B's update output procedure call is determined not to be on the visited list. During block 492, element B's update output procedure call is placed on the visited list, and at block 494 the input list pointer is set to the beginning of element B's update output procedure call's input list (597, FIG. 17A). Element B's update output procedure call's input list is retrieved from the internal netlist (2200, FIG. 15E). At block 496 the return variable is determined to be equal to "okay" and it is checked to see whether the input list pointer is still pointing at an input, $I_4$. The pointer is pointing at $I_1$. Block 498 is entered to trace back to the update output procedure call which drives input $I_1$. Specifically, at block 500 the current function context for element B's update output procedure call is pushed onto the stack (601, FIG. 17A). At block 502, the location of the update output procedure call which drives input $I_1$ of element B's update output procedure call is placed into the PARAMETER REGISTER. Element A drives input $I_1$ of element B's update output procedure, so its location is placed into the parameter register. Processing returns to block 484 during which the return variable is set equal to "okay", and at block 486, the internal netlist pointer is set equal to the contents of the parameter register. At block 488, a determination that element A is not on the sequence list is conducted, and at block 490, a determination is made that element A is not on the visited list. At block 492, element A is placed on the visited list, and at block 492, the input list pointer is set to the beginning of A's input list (602, FIG. 17A). Element A is a source block, which means that it does not have inputs and, thus, its input list is empty (602, FIG. 17A). At block 496, the return variable is determined to be equal to okay and that there are no inputs in element A's input list. At block 523, the return variable is determined to be equal to "okay", and at block 525, element A is placed on the sequence list (603, FIG. 17A). At block 527, element A is taken off the visited list, and at block 529 element A is removed from the blocklist (604, FIG. 17B).

At block 510 the contents of the stack are checked and it is determined that it is not empty. The stack currently contains pointer information for element B's and C's update output procedure calls (604, FIG. 17B). Block 514 is entered to recursively return the last element which was placed on the stack. Specifically, at block 516 the current value for the RETURN variable is placed into a system register for temporary storage, and at block 518, the context information for element B's update output procedure call if popped off the stack (606, FIG. 17B). The stack operates as a LIFO storage buffer; the last element in the stack is the first element out of the stack. Element B was the last context information placed on the stack, so it is the first element that gets popped from the stack. At block 502, the contents of the RETURN variable is stored with the current contents stored in the system register. At block 508, the input list pointer is advanced to the next input in element B's update output procedure call's input list. There are no more inputs in element B's update output procedure call's input list. At block 496 the RETURN variable is checked to determine if it is equal to "okay" and a determination is made that the input list pointer is not pointing at an input. At block 523, the return variable is determined to be equal to "okay", and at block 525, element B's update output procedure call is placed at the end of the sequence list (608, FIG. 17B). At block 527, element B's update output procedure call is taken off the visited list, and at block 529, element B's update output procedure call is removed from the blocklist (610, FIG. 17B). At block 510, the stack is checked to determine if it is empty. The stack still contains information for element C and thus the recursive return procedure, at block 514 is entered.

Specifically, at block 516, the current contents of the RETURN variable are placed into a system register, and at block 518, the pointer information for element C is taken off the stack (612, FIG. 17B). At block 520, the contents of the RETURN variable is restored with the currently stored contents of the system register. At block 508, the input list pointer is advanced to the next input on element C's input list. At block 496, the RETURN variable is checked to determine if it is equal to "okay" and it is determined that the input list pointer is not pointing to an input. At block 523, the RETURN variable is determined to be equal to "okay", and at block 525, element C update output procedure call is placed at the end of the sequence list (614, FIG. 17B). At block 527, element C is taken off the visited list, and at block 529 element C is removed from the blocklist (616, FIG. 17B). At block 510, the stack is checked to see if it is empty. The stack is currently empty, so processing returns at block 512 to the SEQUENCER DRIVER method (542, FIG. 14F).

At block 542, of the SEQUENCER DRIVER method the STATUS variable is set equal to the current contents of the RETURN variable, and at block 544, the status in the RETURN variable is determined to have been set to "okay". At block 551, the blocklist pointer is advanced to the next element in the blocklist (617, FIG. 17B). The next element in the blocklist is element D. Processing continues at block 532, during which it is determined that the STATUS variable is set equal to "okay" and that there are still more elements on the internal netlist. At block 538, a determination is made that element D is not on the sequence list and the SEQUENCER method at block 540 (FIG..14F) is entered. At block 540, the PARAMETER REGISTER is set equal to the currently pointed blocklist element, element D.

At block 484, of the SEQUENCER method (FIG. 14G) the RETURN variable is set equal to "okay", and at block 486 the contents of the PSLE pointer is set to the contents of the PARAMETER REGISTER, which has been set to the location of element D. At block 488, element D is determined not to be on the sequence list, and at block 490, element D is determined not to be on the visited list. At block 492, element D is placed on the visited list, and at block 494, element D's input list pointer is set to the beginning of its input list (618, FIG. 17B). At block 496, a determination is made that the RETURN variable is equal to "okay" and that the input list pointer points to a valid input. $I_3$. A recursive call, at block 498, then traces to the update output procedure call which drives input $I_3$ of element D.

Specifically, at block 500, the current function context for element D is pushed onto the stack (620, FIG. 17B). At block 502, element B's update state procedure call pointer information is placed into the PARAMETER REGISTER (620, FIG. 17B). Processing returns for this recursive call at block 484, which sets the RETURN variable equal to "okay". The PSLE pointer is set equal to the contents of the PARAMETER REGISTER at block 486, and at block 488, element B's update state procedure call is not found to be on the sequence list. At block 490, it is determined that element B's update state procedure call is not on the visited list, and at block 492, element B's update state procedure call is placed onto the visited list. During block 494, the input list pointer for element B's update state procedure call is set to the beginning of its input list. The pointer is pointing at input $I_1$ of element B's update output procedure call (622, FIG. 17C). During block 496, a determination is made that the RETURN variable is set equal to "okay" and that the input list pointer points at an input $I_1$. The pointer to element B's update state procedure call and the PSLE pointer to input $I_1$ are pushed onto the stack at block 500 (624, FIG. 17C). During block 502, the PSLE information for the element which drives input $I_1$ of element B's update state procedure call is placed into the PARAMETER REGISTER (shown by brackets around A on the sequence list 626, FIG. 17C). Processing continues at block 484, which sets the RETURN variable equal to okay. The internal netlist pointer is set equal to the parameter register during block 486 and element A is determined to be on the sequence list at block 488. During block 510, the stack is checked to determine if it is empty. The stack currently has context information on element B's update state procedure call and for the update output procedure call for element D. Thus, the recursive return procedure is called at block 514.

Specifically, during block 516, contents of the RETURN variable is placed into the system register, and at block 518, the context for element B's update state procedure call is popped off the stack (628, FIG. 17C). At block 520 the contents of the RETURN variable is restored to the contents of the system register. At block 508, the pointer of the input list is advanced to the next input of element B's update state procedure call, input $I_2$ (630, FIG. 17C). During block 496, the RETURN variable is determined to be equal to "okay" and that the input list pointer points to input, $I_2$. The recursive method 498 is then called, and traces the update output procedure call which drives input $I_2$ of element B's update state procedure call. The element C drives element B's update state procedure call's input $I_2$.

The recursive call requires that the context for element B's update state procedure call and input $I_2$ be pushed onto the stack during block 500 (632, FIG. 17C). During block 502, the pointer information for element C is placed into the parameter register (633, FIG. 17C). Processing continues at block 484. During block 484, the RETURN variable is set equal to "okay", and during block 486, the PSLE pointer is set equal to the contents of the PARAMETER REGISTER. During block 488, it is determined that element C is on the sequence list, and during block 510, the contents of the stack is checked to see if it is empty. The stack is not empty—it contains context information on both element B's update state procedure call and on element D's update output procedure call. The recursive return procedure of block 514 is then entered. Specifically, during block 516, the contents of the RETURN variable is placed into a system register and at block 538, the context for element D's update state procedure call is popped from the stack (634, FIG. 517). During block 520, the RETURN variable for the current contents of the system register is restored, and at block 508, the input list pointer is advanced to the next location in element B's update state procedure's input list (635, FIG. 17C). During block 496, it is determined that the RETURN variable is set equal to "okay", and that the input list pointer does not point at an input. At block 523, it is determined that the RETURN variable is equal to "okay", and at block 525, element B's update state procedure call is placed at the end of the sequence list (636, FIG. 17D). Element B's update state procedure call is removed from the visited list at block 527, and element B's update state procedure call entry is removed from the block at block 529 (638, FIG. 17D).

The stack is checked to determine if it is empty at block 510. The stack is not currently empty. Element D's context information remains on the stack; thus, the recursive return procedure at block 514 is entered. During block 516, the contents of the RETURN variable is placed into the system register and at block 518, the context information for element D is popped off the stack (640, FIG. 17D). During block 520, the RETURN variable information with the current contents of the system register is restored, and at block 508, the input list pointer is advanced to the next input in element D's input list (641, FIG. 17D). At block 496, the RETURN variable is determined to be equal to "okay" and the input list pointer is determined not to point to an input. During block 523, the RETURN variable is determined equal to "okay", and during block 525, element D is placed at the end of the sequence list (642, FIG. 17D). During block 527, element D is removed from the visited list, and during block 529, element D is removed from the internal netlist (644, FIG. 17D). During block 510, it is determined that the stack is empty and at block 512, processing returns to the SEQUENCER DRIVER method at block 542 of FIG. 14F.

During block 542, of FIG. 14F, it is determined that the STATUS variable is equal to the contents of the RETURN variable, and the STATUS variable is checked to see if it is equal to "okay". The STATUS variable is equal to "okay", and during block 551, the blocklist pointer is advanced to the next location in the blocklist. There are no more elements in the blocklist and thus, at block 532, the return procedure at block 536 is entered to restore processing to the SYSTEM DRIVER method at block 432 of FIG. 14A. At block 432, it is determined that there are no sequence errors in the sequencing of the block diagram of FIG. 15A. During block 434, code representative of the procedure calls on the sequence list is generated, and this code can be executed or stored for later execution. Processing returns at block 436 to the call routine.

Figure 18A:
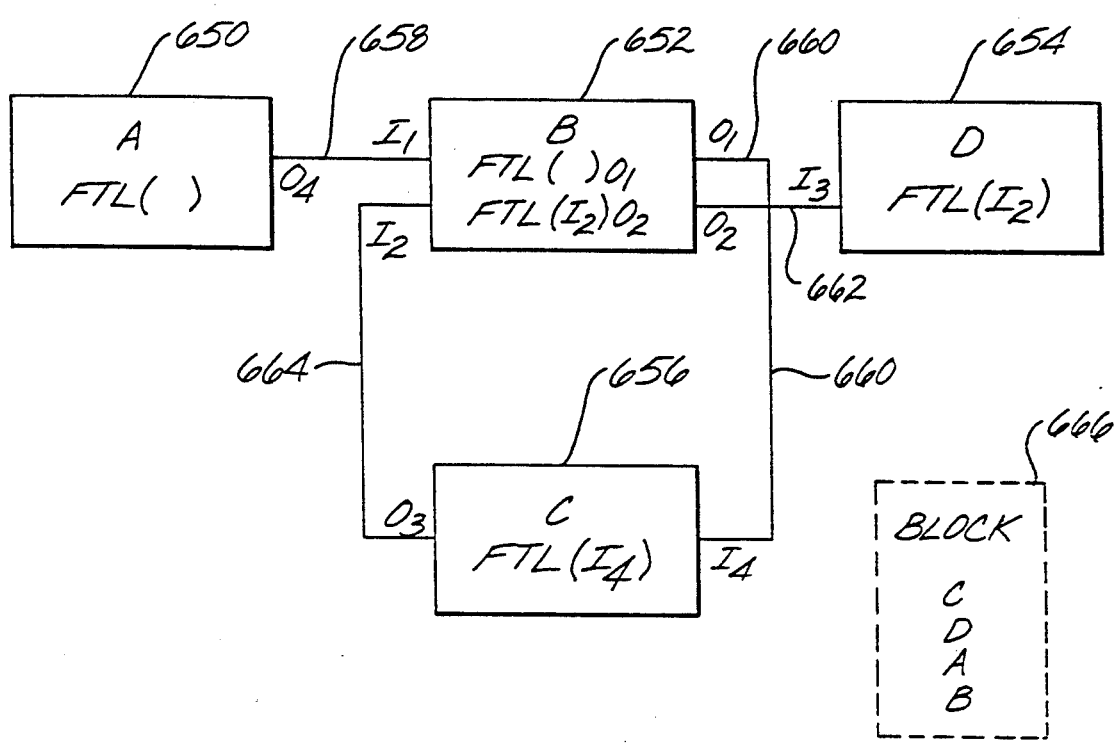
FIG. 18A is another block diagram having a feedback loop which is formed on the display and is simulated in the simulator of FIG. 1A.
Figure 18D:
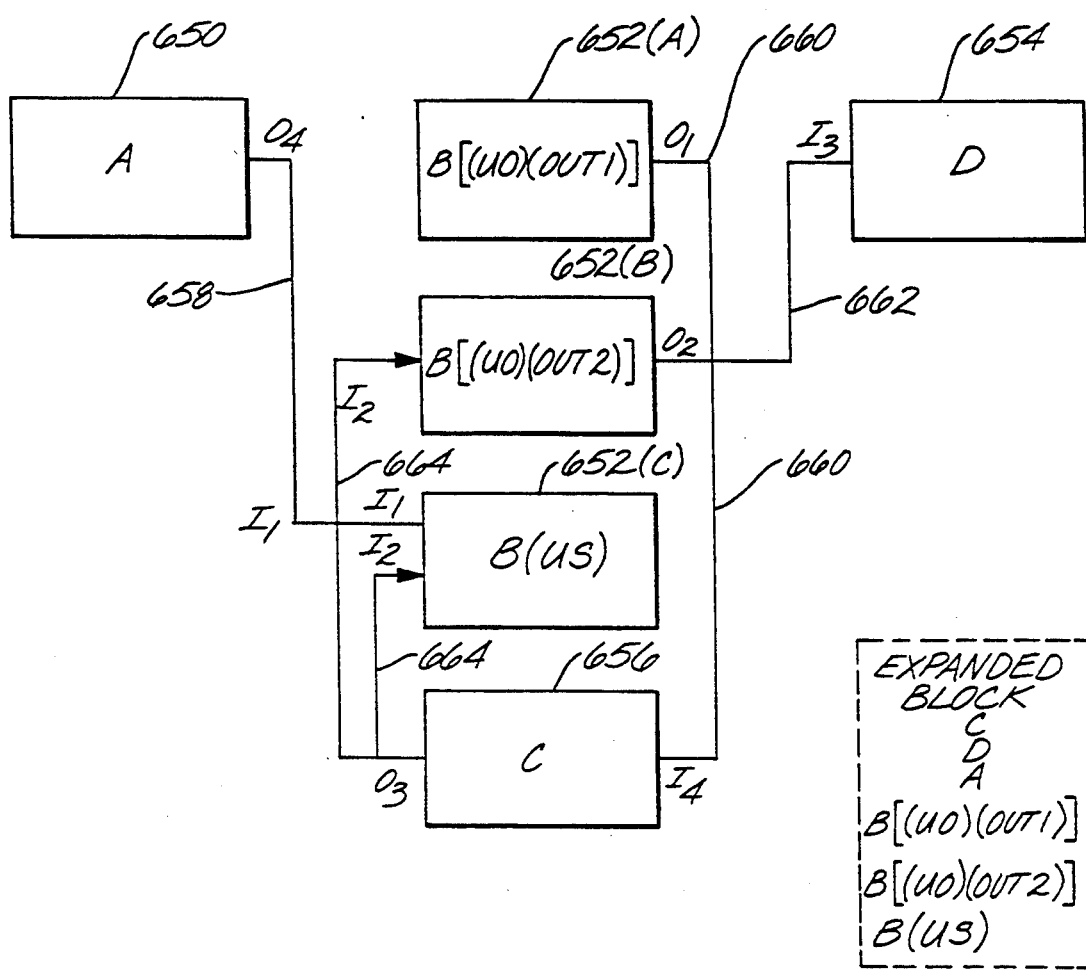
FIG. 18D is an "expanded" version of the block diagram of FIG. 18A which is simulated by the simulator of FIG. 1A.

7) Detailed Example of the Second Embodiment of the GENERAL SEQUENCER Method of FIGS. 14A, B, E, F and G Referring to FIGS. 14A, B, E, F and G, 18A and B, 19, 20A, B, C and D, a detailed example of the second embodiment for the GENERAL case is now discussed. Referring to FIG. 18A, blocks 650, 652, 656, and 654 correspond to the netlist (or external netlist to distinguish from the internal netlist) elements A, B, C, and D, respectively. The external netlist representative of the block diagram is shown in FIG. 18B. Again, the ordering of the external netlist is randomly determined. Element A has a null feedthrough list (2226, FIG. 18C) and output $O_4$. Element B is a state block having inputs $I_1$ and $I_2$, and outputs $O_1$ and $O_2$. Element B's output $O_1$ has a null feedthrough list, and element B's output $O_2$ has input $I_2$ on its feedthrough list as shown in the LIBRARY STORE at 2228 of FIG. 18C. Element C has input $I_4$ and output $O_3$. Input $I_4$ is on element C's feedthrough list (2230, FIG. 18C). Element D has input $I_3$, and input $I_3$ is on element D's feedthrough list (2232, FIG. 18C).

To properly sequence the procedural calls representative of the block diagram of FIG. 18A, the SYSTEM DRIVER method is initiated (FIG. 14A) at block 424. During block 426, the PROCESS EXTERNAL NETLIST method (FIG. 14B) is called to generate an expanded version of the external netlist (or internal netlist). FIG. 18B is a logical representation of the block diagram FIG. 18A, which is represented by the internal netlist of FIG. 18E. The activity associated with processing the PROCESS EXTERNAL NETLIST method is shown in FIG. 19. There are eight columns., one for the external netlist pointer, a second for the external netlist, a third and fourth for the inputs and outputs of each element in the external netlist, a fifth for the internal netlist pointer, a sixth column for the resulting internal netlist and the seventh and eighth for the inputs and outputs of the elements on the internal netlist.

Referring to FIG. 14B of the PROCESS EXTERNAL NETLIST method, at block 436, the external netlist pointer and the internal netlist pointer are set to the top of both lists, the external and internal netlists (692, FIG. 19). During block 438, the pointer is advanced to the next external netlist element, element C (694, FIG. 19). During block 442, it is determined that the external netlist pointer is not pointing to the end of the external netlist; elements C, D, A and B still remain on the external netlist. During block 444, element C is removed from the external netlist and it is placed on the internal netlist (696, FIG. 19). Block 446 determines that element C does not have a delay property (it is not a state block) and at block 440, the internal netlist pointer is advanced to element C, and during block 438, the external netlist pointer is advanced to element D (698, FIG. 19). During block 442, the pointer is determined not to be pointing to the end of the external netlist and at block 444, element D is removed from the external netlist and it is placed on the internal netlist (700, FIG. 19). During block 446, it is determined that element D does not have a delay property and at block 440, the internal netlist is advanced to element D. At block 438, the external netlist pointer is advanced to the next element on the external netlist, element A (702, FIG. 19). At block 442, it is determined that the external netlist pointer is not pointing to the end of the netlist, elements A and B remain, and at block 444, element A is removed from the external netlist and it is placed on the internal netlist (704, FIG. 19). At block 446, a determination is made that element A does not have delay property and at block 440, the internal netlist pointer is advanced to element A (705, FIG. 19). During block 438, the external netlist pointer is advanced to element B (705, FIG. 19). During block 442, the external pointer is determined not to be at the end of the external list and at block 440, element B is removed from the external netlist and it is placed on the internal netlist (706, FIG. 19). During block 446, it is determined that element B has delay property, and at block 448 the SEPARATE FUNCTIONALITY method (FIG. 14E) for generating the internal netlist elements representative of element B is entered. The SEPARATE FUNCTIONALITY of FIG. 14E is entered in order to properly process element B in the general case.

During block 462, of FIG. 14E, the variable NUMOUTS is set equal to the number of outputs to element B. At block 462, the incrementer counter is set to 1. Block 484 sets the first element equal to the update output procedure call associated with the output $O_1$ and sets its input list equal to the feedthrough list associated with the output $O_1$ (708, FIG. 1A). Block 491 saves the definition of the update state procedure call for future reference. At block 464, it is determined that incremental counter I is still less than the number of outputs to element B. During block 466, the update output procedure call associated with $O_2$ is copied into the element represented by element B. During block 468, the inputs to element B's update output procedure call are set. The inputs are set equal to the inputs on output $O_2$'s feedthrough list (708, FIG. 1A). During block 470, the output list of element B's update output procedure call for output $O_2$ is set equal to output $O_2$. During block 472, I is incremented and at block 474, the internal netlist pointer is advanced (708, FIG. 19). At block 464, it is determined that I is greater than NUMOUTS, and at block 476, the internal netlist elements update state procedure call is copied into the last netlist element location (710, FIG. 19). At block 478, element B's update output state procedures call's input list is set equal to the inputs in element B's input list, $I_1$ and $I_2$. During block 480, the internal netlist pointer is advanced to the last element of the internal netlist (712, FIG. 19), and at block 482, processing returns to the PROCESS EXTERNAL NETLIST method at block 440 (FIG. 14B). During block 440, the internal netlist pointer is advanced to the next location in the internal netlist, and at block 438, the external netlist pointer is advanced to the next external netlist element. At block 442, it is determined that the external netlist pointer now points to the end of the external netlist, and at block 450, processing returns to the SYSTEM DRIVER method at block 428 (FIG. 14A). During block 428, a determination is made that there were no errors in the execution of the PROCESS EXTERNAL NETLIST method (FIG. 14B), and at block 430 the SEQUENCER DRIVER method (FIG. 14F) is entered.

FIG. 18B is a logical representation of the internal netlist. Blocks 650, 654, and 656, which corresponding to elements A, D, and C on the internal netlist, have not been changed. Block A still has output $O_4$, block D has input $I_3$, and block C has input $I_4$ and output $O_3$. The state block B has now been expanded into three blocks representative of the update output procedure calls and the update state procedure calls associated with the state block. Block B[UO(OUT1)] corresponds to element B's update output procedure call associated with output $O_1$. This block has output $O_1$ on its output. Block B[UO(OUT2)] corresponds to element B's update output procedure call associated with output $O_2$. This block has $O_2$ on its output list and $I_2$ on its input list. Block B(US) corresponds to element B's update state procedure call, and it has inputs $I_1$ and $I_2$, on its input list. The information above is stored on internal netlist as shown in FIG. 18E.

Referring now to FIGS. 14F and G, 20A, B, C and D, a detailed description of a SEQUENCER DRIVER method (FIG. 14F) and SEQUENCER method (FIG. 14B) for sequencing the internal netlist (FIG. 18A) is now discussed. During block 521, a shorthand version or blocklist of the internal netlist of FIG. 18B is constructed. During block 524 of FIG. 14F, a determination is made that the internal netlist as constructed by the PROCESS EXTERNAL NETLIST method (FIG. 14B) is not empty. During block 526, the sequence list, and visited list, are initialized the STATUS variable is set equal to "okay", and the pointer is set equal to the first element on the blocklist. FIGS. 20A, B and C are results tables which depict the changes which occur to the blocklist pointer, the blocklist, the stack, the input lists, and the sequence list.

Row 714 of FIG. 20A depicts the blocklist pointer pointing to the first element, element C, of the blocklist. During block 532, a determination is made that the STATUS variable is equal to "okay", and that there are still elements to be analyzed on the internal netlist. At block 538, a determination is made that the blocklist element pointed to, element C, is not on the sequence list. The SEQUENCER method (FIG. 14G) is entered at block 540. At block 540, the PARAMETER REGISTER for the SEQUENCER method is set equal to the pointer of element C.

Referring to the SEQUENCER method of FIG. 14G at block 484, the RETURN variable is set equal to "okay", and at block 486, the PSLE pointer is set equal to the contents of the PARAMETER REGISTER. The PSLE pointer is represented by the brackets around element C and input $I_4$ in row 716 of FIG. 20A. During block 488, it is determined that element C is not on the sequence list, and at block 490, it is determined that element C is not on the visited list. At block 492, element C is placed on the visited list, and at block 494, the input list pointer for element C is set to the beginning of the input list for element C (716, FIG. 20A). During block 496, a determination is made that the RETURN variable is set equal to "okay", and that there are more inputs in element C's input list, $I_4$. Recursive method 498 is called to trace the update output procedure call which drives input $I_4$. Specifically, during block 500, the current function context of element C is pushed onto the stack (718, FIG. 20A). At block 502, the element which drives input $I_4$, element B's update output procedure call associated with output $O_1$, placed into the PARAMETER REGISTER. During block 484, the RETURN variable is set equal to "okay", and during block 486, the PSLE pointer is set equal to the contents of the PARAMETER REGISTER (720, FIG. 20A). During block 488, a determination is made that element B's update output procedure call associated with output $O_1$, is not on the sequence list, and at block 490, it is determined that element B's update output procedure call associated with output $O_1$, is not on the visited list. During block 492, element B's update output procedure call associated with output $O_1$, is placed onto the visited list. During block 492, the input list pointer is set to the beginning of the input list associated with element B's update output procedure call for output $O_1$ (722, FIG. 20A). During block 496, a determination is made that the RETURN variable is equal to "okay" and that there are no inputs in element B's output procedure call for output $O_1$'s input list. During block 523, a determination is made that the RETURN variable is set equal to "okay", and during block 525, element B's update output procedure for output $O_1$ is placed on the sequence list (722, FIG. 20A). During block 527, this element is taken off of the visited list and at block 529, this element is removed from the blocklist (724, FIG. 20A). During block 510, the stack is checked to determine if any elements remain. The context for element C is on the stack; thus, the recursive return method at block 514 is called.

During block 516, the contents of the RETURN variable is placed into the system register, and during block 518, the contents for element C is popped off of the stack (726, FIG. 20A). During block 520, the contents of the RETURN variable is restored to be equal to the contents of the system register, and at block 508, the input list pointer for element C is advanced to the next input (728, FIG. 20A). During block 496, a determination is made that the RETURN variable is equal to "okay", and that there are no more elements to be pointed to in element C's input list. During block 523, a determination is made that the RETURN variable is equal to "okay", and at block 525, element C is placed at the end of the sequence list (730, FIG. 20A). During block 527, element C is removed from the visited list and during block 529, element C is removed from the blocklist (732, FIG. 20A). During block 510, it is determined that the stack is now empty and at block 512, processing returns to the SEQUENCER DRIVER method (FIG. 14F) at block 542.

During block 542, the STATUS variable is set equal to the contents of the RETURN variable and at block 544, a determination is made that the STATUS variable is equal to "okay". During block 551, the internal netlist pointer is advanced to the next element in the internal netlist, element D. At block 542, a determination is made that the STATUS variable is equal to "okay", and that there are still more internal netlist elements on the internal netlist. During block 538, a determination is made that element D is not on the sequence list and at block 540, the SEQUENCER method is entered (FIG. 14G). During block 540 of FIG. 14F, the PARAMETER REGISTER is set equal to the blocklist pointer for element D.

During block 484, of the SEQUENCER method (FIG. 14G) the RETURN variable is set equal to "okay", and at block 484, the PSLE pointer is set equal to the PARAMETER REGISTER (736, FIG. 20B). At block 488, a determination is made that element D is not on the sequence list and at block 490, a determination is made that element D is not on the visited list. During block 492, element D is placed on the visited list and at block 494 the input list pointer is set to the beginning of element D's input list (736, FIG. 20B). During block 496, a determination is made that the RETURN variable is equal to "okay", and that there is an input pointed to in element D's input list, $I_3$ (736, FIG. 20B). The recursive method 498 is entered to trace the update output procedure call which drives input $I_3$ of element D. Specifically, during block 500, element D's function context is pushed onto the stack (738, FIG. 20D). During block 502, the location of element A on the blocklist, which drives input $I_3$ is placed into the PARAMETER REGISTER.

Processing continues at block 484, during which the RETURN variable is set equal to "okay" and at block 486, during which the PSLE pointer is set equal to the PARAMETER REGISTER (742, FIG. 20D). During block 488, a determination is made that element A is not on the sequence list and at block 490, a determination is made that element A is not on the visit list. During block 492, element A is placed on the visit list, and at block 494, the input list pointer is set to the beginning of element A's input list. At block 496, a determination is made that the RETURN variable is equal to "okay", and that there are no inputs in element A's input list. At block 423, it is determined that the RETURN variable is equal to okay, and at block 425, element A is placed at the end of the sequence list (742, FIG. 20B). During block 527, element A is taken off of the visited list, and during block 529, element A is removed from the blocklist (744, FIG. 20B).

During block 510, a determination is made that the stack is not empty and the recursive return procedure of block 514 is entered to pop the function context for element D of f the stack. Specifically, during block 516, the current contents of the RETURN variable is placed into the system register. During block 518, the context of element D is popped off of the stack (746, FIG. 20B). During block 520, the contents of the RETURN variable is restored equal to the current contents of the system register, and at block 508, the input list pointer of element D is advanced to the next input (748, FIG. 20B). During block 496, the RETURN variable is determined to be equal to "okay", and that there are no more inputs in element D's input list. At block 523, it is determined that the RETURN variable is equal to "okay", and at block 525, element D is placed at the end of the sequence list (750, FIG. 20B). At block 527, element D is taken off the visited list and at block 529, element D is removed from the blocklist (752, FIG. 20B). During block 510, it is determined that the stack is now empty and at block 512, processing returns to the SEQUENCER DRIVER method (FIG. 14F) at block 542.

During block 542 of the SEQUENCER DRIVER method (FIG. 14G) the STATUS variable is set equal to the RETURN variable and at block 544, it is determined that the STATUS variable is equal to "okay". During block 551, the blocklist pointer is advanced to the next element, element D's update output procedures call for output $O_2$. During block 532, a determination is made that the STATUS variable is equal to "okay", and that there are still more elements on the blocklist. During block 538, a determination is made that element D's update output procedure call for output $O_2$ is not on the sequence list, and at block 540 the SEQUENCER method is initiated (FIG. 14G). At block 540, the PARAMETER REGISTER is set equal to the internal netlist pointer for element D's update output procedure call for output $O_2$. During block 484 of FIG. 14G, the RETURN variable is set equal to "okay", and at block 486, the PSLE pointer is set equal to the PARAMETER REGISTER (756, FIG. 20C). At block 488, it is determined that element B's update output procedure call for output $O_2$ is not on the sequence list, and at block 490, it is determined that this element is not on the visited list either. During block 492, this element entry is placed onto the visited list, and during block 494, the input list pointer for this element is set equal to the beginning of the input list (756, FIG. 20C). During block 496, a determination is made that the RETURN variable is equal to "okay", and that there are still more inputs on this element's input list. The recursive method 498 is entered to trace for the update output procedure call which drives input $I_2$. Specifically, at block 500, the context for element B's update output procedure call for output $O_2$ is pushed onto the stack (758, FIG. 20C). During block 502, element C's location is placed into a PARAMETER REGISTER. Processing recursively continues at block 484, during which the RETURN variable is set equal to "okay", and during block 486, the internal netlist pointer is set equal to the contents of the PARAMETER REGISTER. During block 488, a determination is made that element C is on the sequence list, and at block 510, a determination is made that there is still one element left on the stack (758, FIG. 20C). The recursive return method 514 is called to pop off the current element on the stack, element B's update output procedure call for output $O_2$.

Specifically, during block 516, contents of the RETURN variable are placed into the system register, and at block 518, element B's update output procedure call for output $O_2$ is popped off of the stack (762, FIG. 20C).

During block 520, the current contents of the system register is restored and at block 508 the input list pointer is advanced to the next input of element B's update output procedure call for output $O_2$ (764, FIG. 20C). During block 496, a determination is made that the RETURN variable is equal to "okay", and that there are no inputs on this element's input list. At block 523, a determination is made that the RETURN variable is equal to "okay", and at block 525, this element is placed at the end of the sequence list (766, FIG. 20C). During block 527, element B's update output procedure call for output $O_2$ is removed from the visited list and removes it from the blocklist (768, FIG. 20C). During block 510, a determination is made that the stack is now empty, and at block 512, processing returns to the SEQUENCER DRIVER method (FIG. 14F) at block 542. During block 542, the STATUS variable is set equal to the RETURN variable, and at block 544, it is determined that the STATUS variable is equal to "okay". During block 551, the blocklist pointer is advanced to element B's update state procedure call, and at block 532, a determination is made that the STATUS is equal to "okay", and that there is still an element left on the blocklist, B(US). During block 538, a determination is made that element B's update state procedure call is not on the sequence list, and at block 540 the SEQUENCER method is initiated (FIG. 14G). During block 540, the PARAMETER REGISTER is set equal to element B's update state procedure call's pointer location.

During block 484 of FIG. 14G, the RETURN variable is set equal to "okay", and during block 486 the PSLE pointer is set equal to the contents of the PARAMETER REGISTER (770, FIG. 20C). During block 488, a determination is made that element update state procedure is not on the sequence list, and during block 490, it is determined that element B's update state procedure call is also not on the visited list. During block 492, this element is placed onto the visited list. During block 494, the input list pointer for element B's update state procedure call is set to the beginning of its input list (772, FIG. 20C). During block 496, a determination is made that the RETURN variable is equal to "okay", and if there are still more elements on element B's update state procedure call's input list. The recursive method is called to trace the update state procedure call which drives input $I_1$. Specifically, during block 500, the context of element B's update state procedure call is pushed onto the stack (774, FIG. 20D). During block 502, element A's pointer location is placed into the PARAMETER REGISTER. At block 484, the RETURN variable is set equal to "okay", and at block 486, the PSLE pointer is set equal to the contents of the PARAMETER REGISTER (776, FIG. 20D). During block 488, a determination is made that element A is on the sequence list, and during block 410, the stack is checked and it is determined that element B's update state procedure call is presently on the stack. The recursive return procedure 514 is entered to remove element B's update state procedure call from the stack. Specifically, during block 516, the contents of the RETURN variable is placed into the system register, and during block 518, the context of element B's update state procedure call is popped off of the stack (778, FIG. 20D). During block 520, the contents of the RETURN variable is restored with the current contents of the system register, and at block 508 the input list pointer associated with element B's update state procedure call is advanced to the next input, $I_2$ (780, FIG. 20D). During block 496, a determination is made that the RETURN variable is equal to "okay", and that there are still more inputs on element D's update state procedure call's input list.

The recursive method 498 is called to trace the update output procedure call which drives input $I_2$. Specifically, during block 500, the context for element B's update state procedure call is pushed onto the stack (782, FIG. 20D). During block 502, element C's pointer location is placed into the PARAMETER REGISTER and processing continues at block 484 during which the RETURN variable is set equal to "okay". At block 486, blocklist pointer is set equal to the contents of the PARAMETER REGISTER (784, FIG. 20D). During block 488, a determination is made that element C is on the sequence list. At block 510, a determination that element B's update state procedure call is on a stack. The recursive return procedure 514 is entered to take element B's update state procedure call off of the stack. Specifically, at block 516, the contents of the RETURN variable is placed into the system register, and at block 518, the context for element B's update state procedure call is popped from the stack (786, FIG. 20D). During block 520, the contents of the RETURN variable is set equal to the current contents of the system register, and during block 508 the input list pointer is advanced to the next input of element B's update state procedure (788, FIG. 20D). At block 496, the RETURN variable is determined to be equal to "okay", and that there are no more inputs on element B's update state procedure call's input list. During block 523, a determination is made of whether the RETURN variable is equal to "okay", and at block 525 element B's update state procedure is placed at the end of the sequence list (790, FIG. 20D). During block 525, element B's update state procedure call is removed from the visited list, and during block 529, element B's update state procedure call is removed from the blocklist (800, FIG. 20D). During block 510, a determination is made that there are now no elements left on the stack, and during block 512, processing returns to the SEQUENCER DRIVER method (FIG. 14F) at block 542.

During block 542 of the SEQUENCER DRIVER method (FIG. 14F), the STATUS variable is set equal to the contents of the RETURN variable, and at block 544, a determination is made that the STATUS variable is equal to "okay". During block 550, the blocklist pointer is advanced to the next element on the internal blocklist, there are none. During block 532, a determination is made that the STATUS variable is equal to "okay", and that there are no more elements on the blocklist. Processing returns at block 536 to the SYSTEM DRIVER method (FIG. 14A) at block 432.

During block 432 of the SYSTEM DRIVER method, a determination is made that there were no sequence errors during processing of the SEQUENCER DRIVER method (FIG. 14F). During block 434, the code representative of the sequence list is generated. In addition, during block 434, the code generated can be executed to simulate the block diagram of FIG. 18A. After the simulation is run, processing returns to the calling program at block 436.

D. RUNTIME SEQUENCER Methods of FIGS. 21 and 26

To this point, the simulators which were discussed used four kinds of sequencing algorithms, restricted types—FIGS. 5A, B, and C; 14A, B, C, D, F, and G;

and the general types—FIGS. 11A, B, C, and D; and 14A, B, E, F, and G, which created a sequenced list of software procedure calls. These software procedure calls could be represented as a list of starting addresses to precompiled procedures (i.e., subroutines), or could be source code consisting of subroutine calls to programs representative of the blocks. Either form of procedure calls may be executed to simulate a block diagram.

Figure 21:
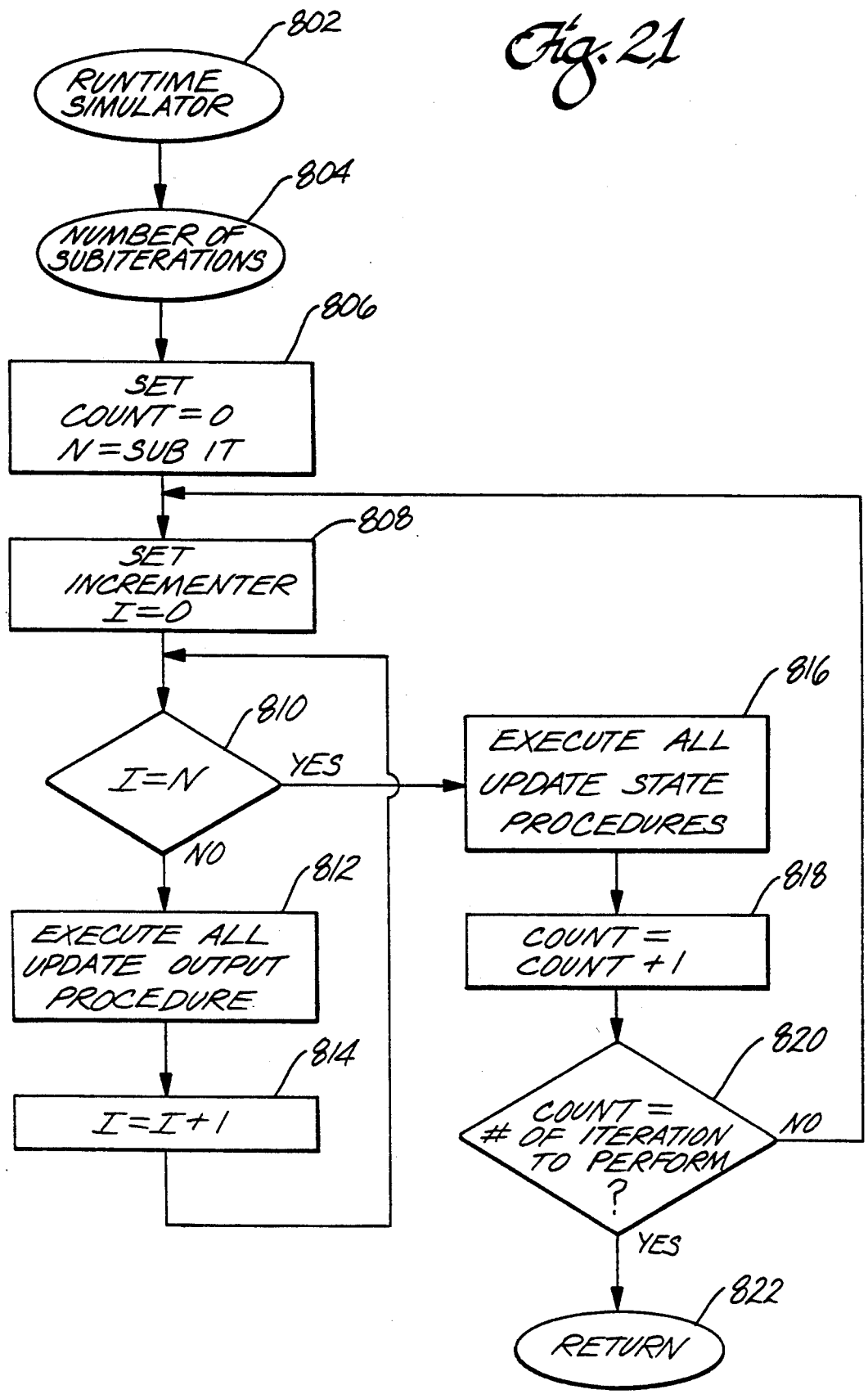
FIG. 21 is a flow diagram which depicts the sequence of operations of the simulator of FIG. 1A under control of the first RUNTIME SIMULATOR method.

FIGS. 21 and 26 are flow-block diagrams of the RUNTIME SEQUENCER algorithms. These algorithms do not create a sequenced list of software procedure calls or precompiled code to be executed. Instead, they execute the update output procedures representative of the blocks many times during a single time step, until the block's output values stop changing. After this, each block's update state procedure is called. The advantage of the runtime simulators over the simulators discussed previously is that they will often lead to a simplified real-time implementation.

Figure 26A:
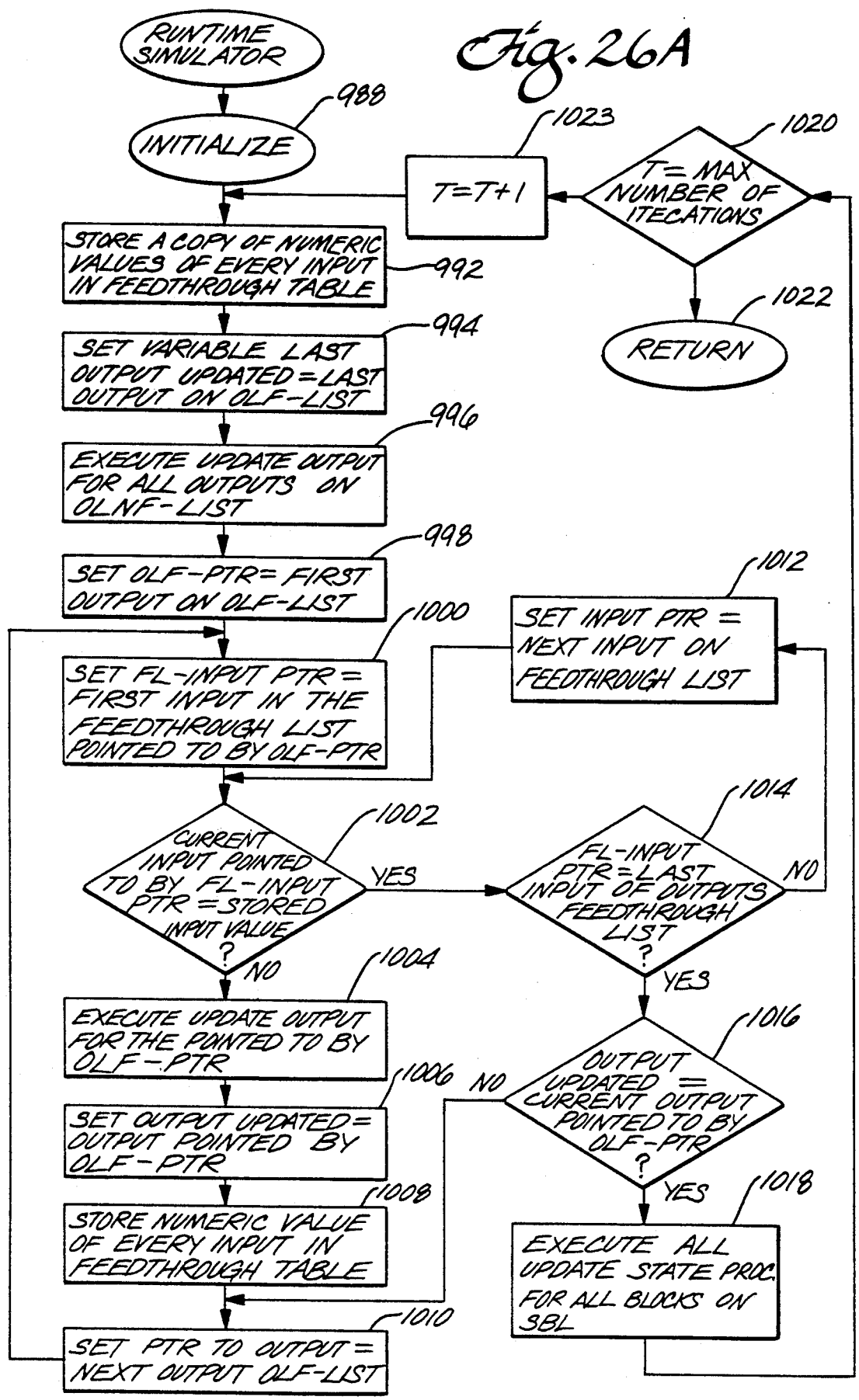
FIG. 26A is a flow diagram which depicts the sequence of operations of the simulator of FIG. 1A under control of the second RUNTIME SIMULATOR method.
Figure 26B:
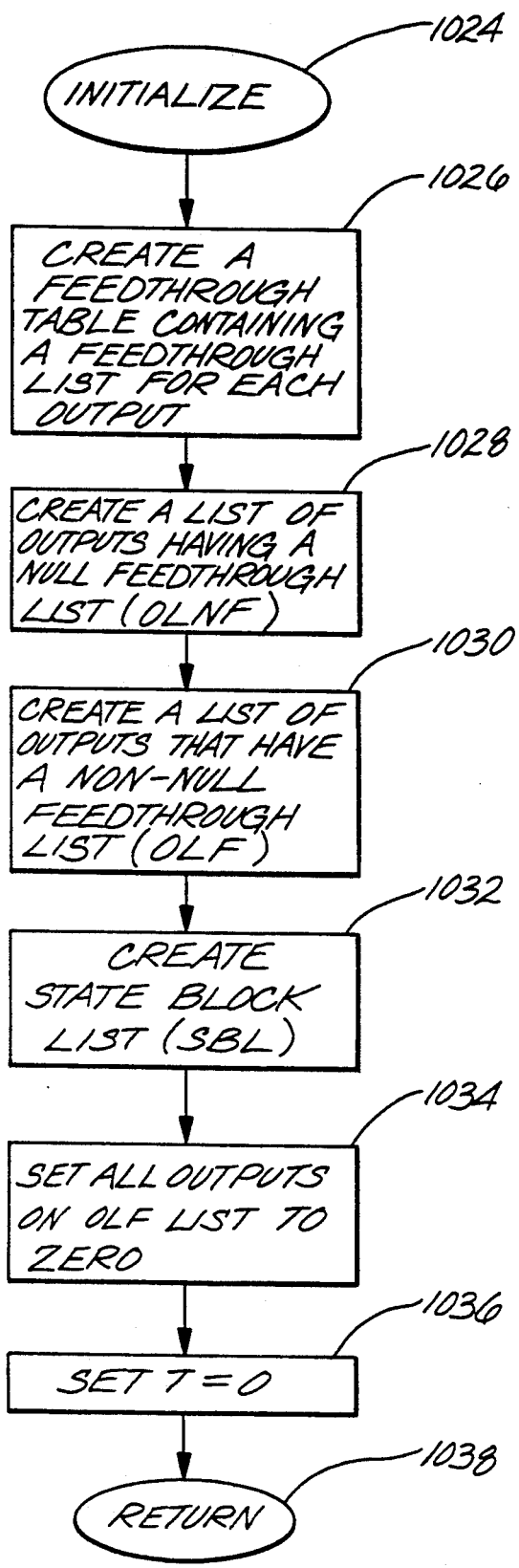
FIG. 26B is a flow diagram which depicts the sequence of operations of the simulator of FIG. 1A under control of the INITIALIZE method referenced in FIG. 26A.

FIGS. 21 and 26A and 26B are two embodiments of RUNTIME SIMULATORS. The RUNTIME SIMULATORS also model state blocks with two separate procedure calls; one or more update output procedures and an update state procedure. Both RUNTIME SIMULATORS require that the update output procedure for each of the blocks be processed several times per time step (or iteration). Essentially, the purpose of the RUNTIME SIMULATOR is to execute the update output procedures until there are no more changes to the inputs of each of the blocks. Stated differently, the update output procedures are executed until all output values do not change for at least one time step. When this occurs, both RUNTIME SIMULATORS, FIGS. 21 and 26, call the update state procedures associated with the blocks which have a state and implement them once per time step. This same procedure is followed for each time step of a simulation. The only disadvantage of both RUNTIME SIMULATORS is that they are computationally inefficient. This means that more data processing must be done when simulating a specific system than would be required by the non-RUNTIME SIMULATORS. Often dedicated hardware consisting of a collection of modules that can each be programmed is used to perform specific functions. The RUNTIME SIMULATORS offer the significant advantage of being able to implement a system on such a collection of modules, using a minimum of data flow and module control. This results in hardware simplification and corresponding overall processing gain.

Figure 22A:
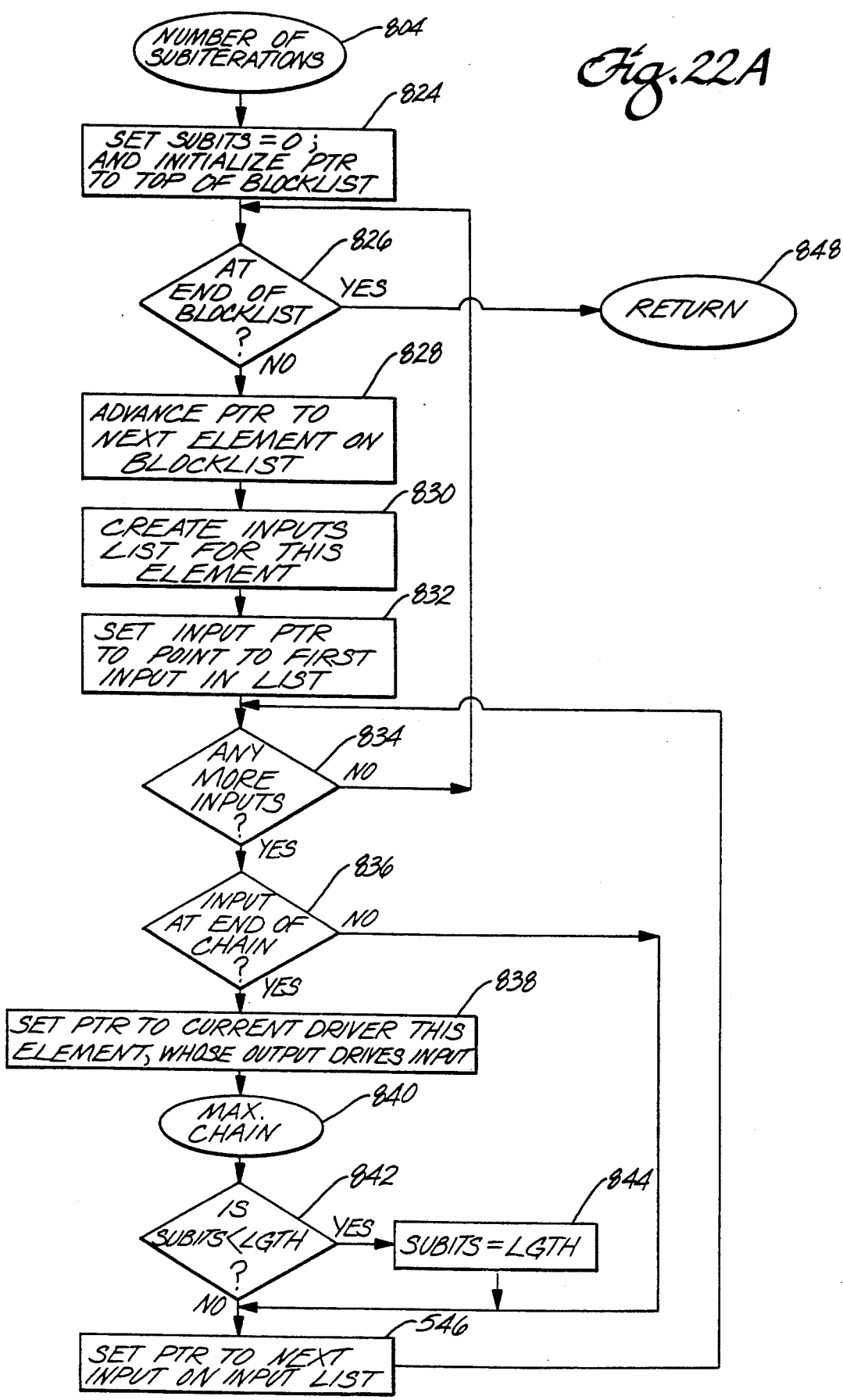
FIG. 22A is a flow diagram which depicts the sequence of operations of the simulator of FIG. 1A under control of the first NUMBER OF SUBITERATIONS method referenced in FIG. 21.

1) First Embodiment of NUMBER OF SUBITERATIONS Method of FIG. 22A

FIG. 21 is a flow-block diagram of a RUNTIME SIMULATOR which executes the update output procedures for a particular block "N" times during a time step. "IN" is a predetermined number of executions or subiterations per time step. "N" is determined by the methods shown in FIGS. 22A and 22B and FIG. 23. Correctly selecting the value of "N" guarantees that the outputs of all of the blocks in the diagram will settle down before the update state procedures for each of the blocks having state are executed. Specifically, referring to block 804 of FIG. 21, subroutine NUMBER OF SUBITERATIONS (FIGS. 22A and 22B) is entered to calculate the number "N" of subiterations to execute the update output procedures for each block pretime step.

During block 806, a COUNT variable is set equal to zero, and N is set equal to SUBITS; SUBITS is equal to the number of subiterations to be performed per time step (calculated by the NUMBER OF SUBITERATIONS method (FIGS. 22A, 22B and 22C)). During block 808, an incrementer I is set equal to zero, and during blocks 810, 812, and 814, the update output procedures are executed "N" times. Specifically, during block 810, a determination is made of whether incrementer I is equal to N, the number of subiterations. If I is not equal to N, then during block 812, all of the update output procedures for the block diagram are executed, and during block 814, I is incremented by one. This process continues for N iterations. When incrementer I is equal to N, the update state procedures for all of the blocks having a state are executed during block 816.

During block 818, the count is incremented by one, and if count is equal to the preset number of time steps for the simulation to perform, then processing returns at block 822 to its normal processing. However, if count is less than the number of iterations to be performed, then processing continues at block 808. The simulation will continue to process each update output procedure N subiterations per time step, and then an update state procedure for as long as the count variable is less than the number of iterations specified by the user.

During block 824 of FIG. 22A, the variable SUBITS is set equal to zero and a pointer is set to the top of the blocklist. The blocklist is a shorthand version of the netlist for keeping track of which element is presently being analyzed by the system. The pointer points to a location just before the first element in the blocklist. During block 826, a determination is made of whether the pointer is at the end of the blocklist. If it is, then processing returns to the RUNTIME SIMULATOR method at block 848. If the pointer is not at the end of the blocklist, then at block 828, the pointer is advanced to the next element in the blocklist. During block 830, an input list for this element is created, and during block 832, an input pointer is set to the first input in the input list. During block 834, a determination is made of whether there are any more inputs in this input list. If there are no more inputs in the input list, then processing loops back through blocks 826, 828, 830, and 832 for pointing to the next element in the blocklist and for setting up the pointer to its input list. If there are more inputs in the input list, then during block 836, a determination is made of whether the input is connected to a block which is at the end of a chain. A "chain" is designed to be a consecutive connection of blocks in which the output of the block, at the beginning of the chain, can directly affect the input of the block ending the chain.

The number of blocks in a consecutive CHAIN is the number of subiterations necessary to execute each update output procedure before all the inputs and outputs are defined. This is so, because each subiteration guarantees that at least one of the inputs which needs to be defined in the CHAIN is updated. By the end of the Nth subiteration, all of the inputs which need to be defined in the block diagram have been defined. Thus, when the outputs to the update output procedures become defined, the update state procedures for the blocks having a state can then be executed. There are three conditions for determining whether an input is connected to a block that is at the end of a CHAIN. The first is when the input is connected to a block that has no outputs; for example, that having no outputs is a sink block. The second condition is when the inputs are connected to a block that has outputs, but the outputs are not connected. The third condition is when the input is not in any feedthrough list for the block to which it is connected. This means that this input does not directly affect any output of the block. Assuming that the input does not have any one of these three conditions, during block 846, the input list pointer is set to the next input in the input list. Processing returns to block 834 during which it is determined whether there are any more inputs in the input list. If there are none, then the processing continues at block 826 through block 832, during which the blocklist pointer is moved to the next element on the blocklist.

Figure 22B:
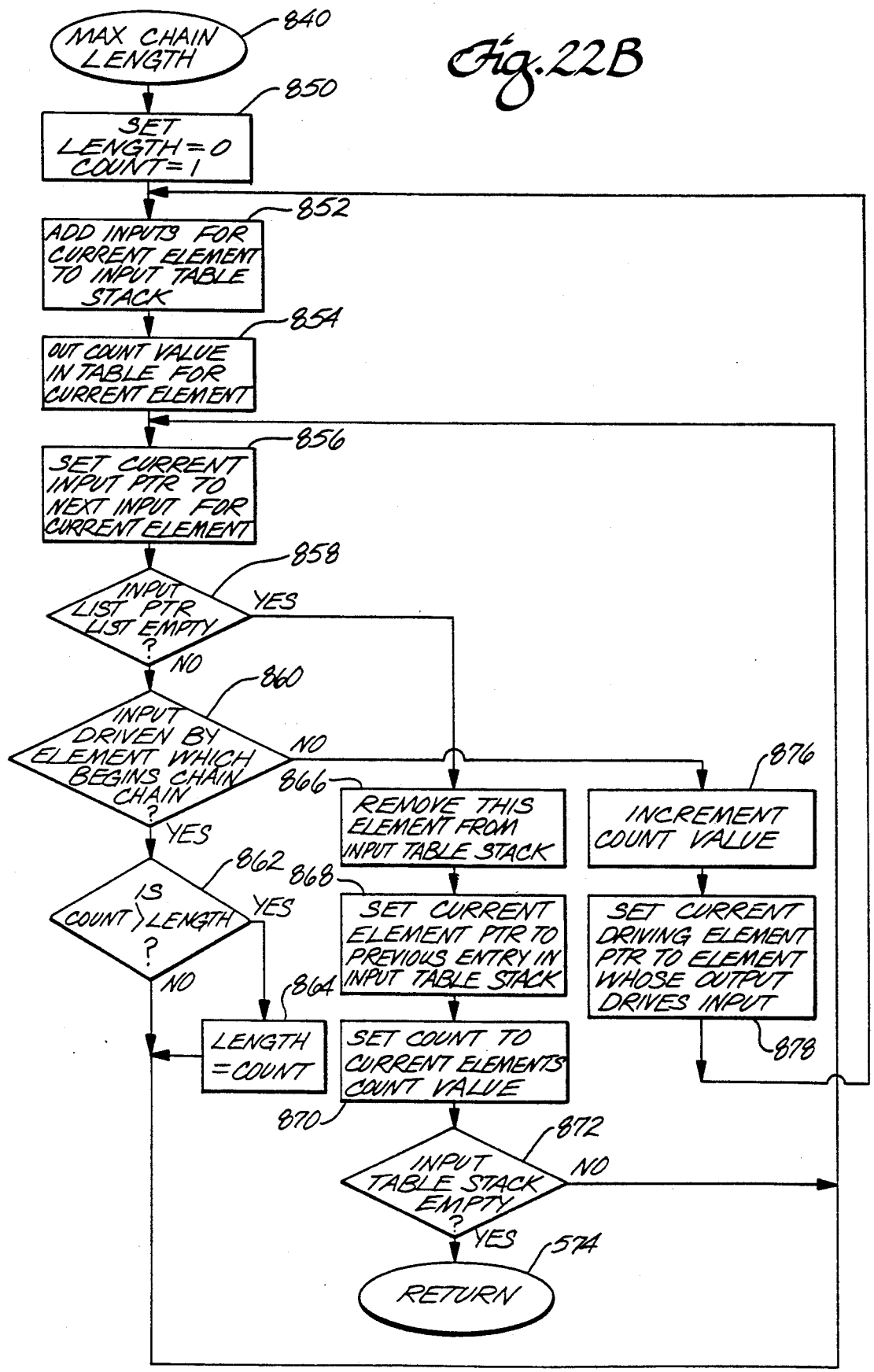
FIG. 22B is a flow diagram which depicts the sequence of operations of the simulator of FIG. 1A under control of the DETERMINE MAXIMUM CHAIN method referenced in FIG. 22A.

Referring back to block 836, if it is determined that the input is at the chain, then the number of blocks in this CHAIN is calculated. First, during block 838, a pointer is set to the current element which drives the input. At block 840, the MAXIMUM CHAIN LENGTH method (FIG. 22B) is called to determine the number of blocks which are consecutively connected and which have an input in the CHAIN which directly affects an output in the CHAIN. Once the length of a particular CHAIN is determined, during block 842, the preset subiteration (SUBITS) variable is checked to determine if it is less than the length determined by the MAXIMUM CHAIN LENGTH method (FIG. 22B). If SUBITS is less than the length returned, then SUBITS is set equal to the length variable at block 844. If SUBITS is not less than length, then it stays the same and during block 846, the input list pointer is set to the next input for the currently pointed-to element in the blocklist. Processing returns to block 834, during which it is determined whether or not there are any inputs left on the input list. If there are, then during block 836, a determination is made of whether the input is at the end of a CHAIN. If there are no more inputs left for this particular element, then processing returns at block 826, during which the blocklist pointer is moved to the next element on the blocklist. This process continues until all of the elements on the blocklist have been traversed. When all of the elements have been traversed, at block 848, system will return to the RUN-TIME SIMULATOR method (FIG. 21).

2) MAXIMUM CHAIN LENGTH Method of FIG. 22B

MAXIMUM CHAIN LENGTH algorithm simply returns the maximum length of all CHAINS which start from the netlist element determined to be at the end of the chain during the NUMBER OF SUBITERATIONS method (FIG. 22A). MAXIMUM CHAIN LENGTH method is called for each blocklist element which is determined to be at the end of the CHAIN. The MAXIMUM CHAIN LENGTH method effectively manipulates a stack called the INPUT TABLE STACK. This stack keeps track of the elements which are currently being considered and the maximum count value for the longest CHAIN from this element.

Specifically, referring to block 850 of FIG. 22B, a variable LENGTH and a variable COUNT are set respectively to zero and one. The LENGTH is responsible for returning the maximum length of a CHAIN which starts from the blocklist element currently pointed to in the NUMBER OF SUBITERATIONS method. The VARIABLE COUNT keeps track of the running count of the number of blocks which are found to be in the CHAIN under consideration.

During blocks 852, 854, and 856 of FIG. 22B, the various pointers and variables to be maintained by the INPUT TABLE STACK are set. Specifically, during block 852, the current driving element is added to the INPUT TABLE STACK for the input presently being pointed to by the input list pointer. The inputs for the driving element are also placed in the stack. During block 854, the current value of the COUNT variable is placed into the stack, and during block 856, a pointer is set which points to the input list of the current driving element to the first input for this element. At block 858, a determination is made of whether the input list pointed to for the current driving element is empty. If the input list is not empty, then during block 860, a determination is made Whether the present input is driven by an element that is at the beginning of a CHAIN. There are three conditions when an input is considered to be driven by an element which is at the beginning of a CHAIN. First, if the input is connected to a block which does not have any inputs (for example, a source block); second, if the input is connected to a block that does not have any connected inputs (this block is also a sink block); or third, an output which has a null feedthrough list.

Assuming that the input is considered to be at the beginning of a new CHAIN, then during block 862, a determination is made of whether the present value of the COUNT variable is greater than the present contents of the LENGTH variable. If COUNT is greater than LENGTH, then processing resumes at block 856 which sets the input pointer in the stack to the next input for the current driving element. If the COUNT variable is greater than the LENGTH variable, then the LENGTH variable is set equal to the COUNT variable. This step effectively keeps track of the maximum CHAIN length uncovered. Processing then returns back to block 856 during which the input list pointer is incremented to the next input for the current driving element. In either case, during block 858, a determination is made of whether the input list for the current driving element is empty.

Assuming at this stage that the input list is empty, then during block 866, this element is removed from the input table stack. At block 868, the current element pointer in the input table is set to the previous entry in the input table, and at block 870, the COUNT variable is set equal to the current driving element's COUNT value. If the input list table is empty, then at block 872, processing returns to the NUMBER OF SUBITERATIONS method (FIG. 23) at block 842. However, if there are still more inputs in the INPUT TABLE STACK, then processing continues at block 856, during which the input list pointer is set to the next input for the currently pointed-to element on the INPUT TABLE STACK. Assuming that at block 858, it is determined that the input list for this block is not empty, then at block 860, the input presently pointed to is analyzed to determine if it is at the beginning of a CHAIN. If this input is not at the beginning of a CHAIN, then at block 876, the COUNT value is incremented by one and at block 878, the current element pointer is set to the element which drives the currently pointed-to input. Processing resumes at blocks 852, 854 and 856 during which the information for this element is placed onto the stack. The various CHAINS connected to this element are analyzed to determine which CHAIN has the longest length. In the end, all CHAINS that are connected to the input of the netlist element initially pointed to by the NUMBER OF SUBITERATIONS method are analyzed, and the value of the longest CHAIN is returned to the NUMBER OF SUBITERATIONS method at block 842 (FIG. 22A). The NUMBER OF SUBITERATIONS method will then look to the next input in the input list for the particular element currently pointed to, and the MAXIMUM CHAIN method will be called again to determine if there is a CHAIN of consecutive blocks which is greater than the last length stored.

Figure 23:
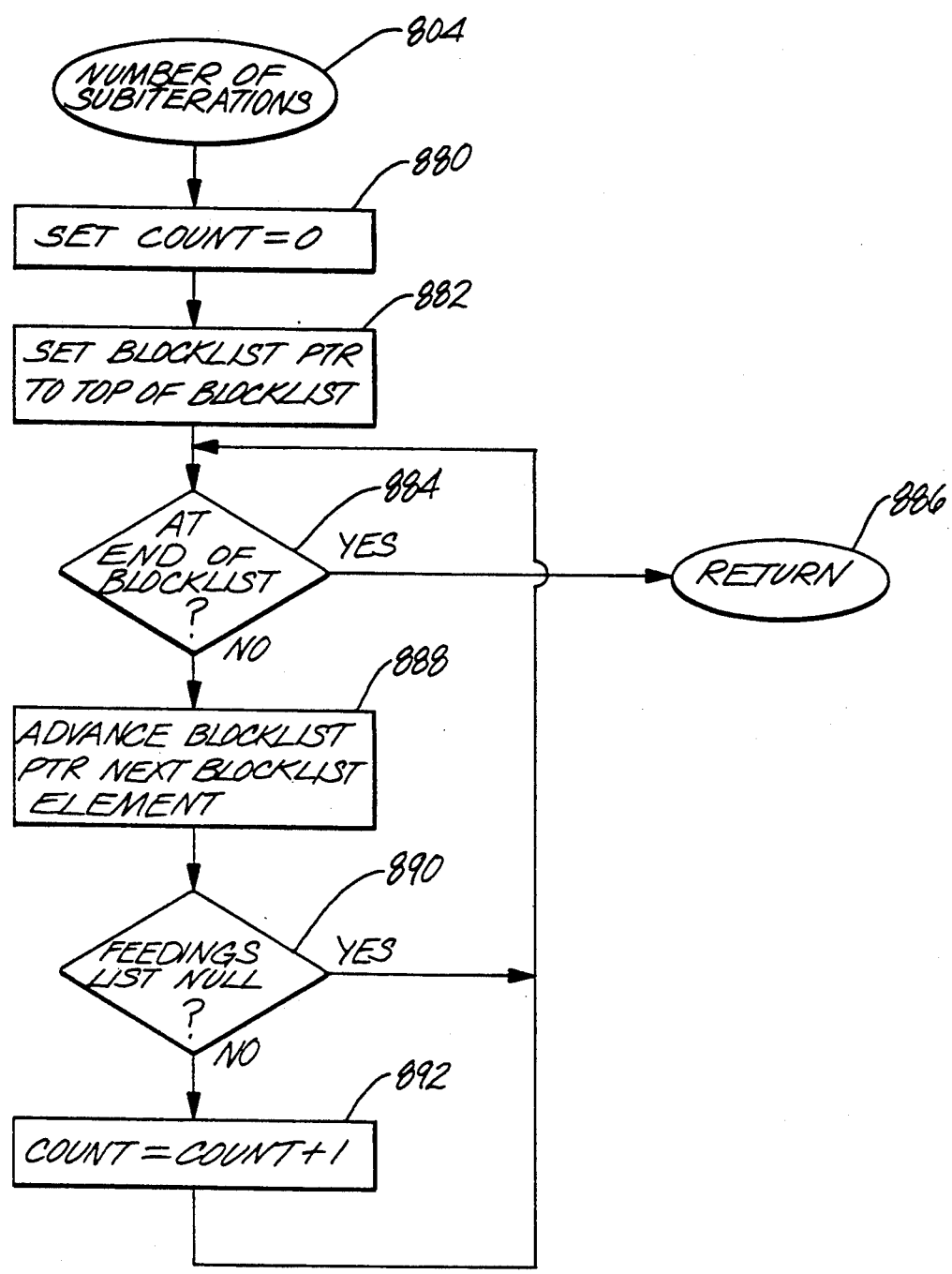
FIG. 23 is a flow diagram which depicts the sequence of operations of the simulator of FIG. 1A under control of the second NUMBER OF SUBITERATIONS method referenced in FIG. 21.

3) Second Embodiment of the NUMBER OF SUBITERATIONS method of FIG. 23

FIG. 23 is a second embodiment of a method for determining the number of subiterations for the RUNTIME SIMULATOR method of FIG. 21 to perform. This algorithm calculates the number of subiterations by determining the number of blocks that have no feedthrough lists. This algorithm is sub-optimal because it will always cause the runtime simulator to perform more subiterations than is necessary for the algorithm to work.

Referring to FIG. 23, a more detailed discussion of the second embodiment of NUMBER OF SUBITERATIONS is now discussed. At block 880 of FIG. 23, the COUNT variable is set equal to zero. During block 882, the blocklist pointer is set to the top of the blocklist. During block 884, a determination is made of whether the blocklist pointer is at the end of the blocklist, and if it is not, then during block 888, the blocklist pointer is advanced to the next blocklist element. During block 890, the feedthrough list for this element is examined to determine if it is null. If it is, then processing loops through blocks 884 and 888 to examine the next blocklist element. If the feedthrough list is not null, then during block 892, the COUNT variable is incremented by one, and the processing continues at block 884. During block 884, the blocklist pointer is checked to determine if it is at the end of the blocklist; assuming that it isn't, during blocks 888 and 890 the blocklist pointer is advanced to the next blocklist element and its feedthrough list is checked to see if it is null. If the pointer is at the end of a netlist, then processing returns at block 886 to the RUNTIME SIMULATOR method (FIG. 21).

A third embodiment of the algorithm for determining the number of subiterations for the RUNTIME SIMULATOR method is simply to calculate the number of blocks in the block diagram and use this number as the number of subiterations to be performed per time step. This method is the least efficient of the three embodiments because it always calculates more iterations than are necessary. However, this approach results in a method for simulating block diagrams where the delay properties of the block need not be specified.

4) Detailed Example of the RUNTIME SIMULATOR of FIGS. 21, 22A and 22B

Figure 24:
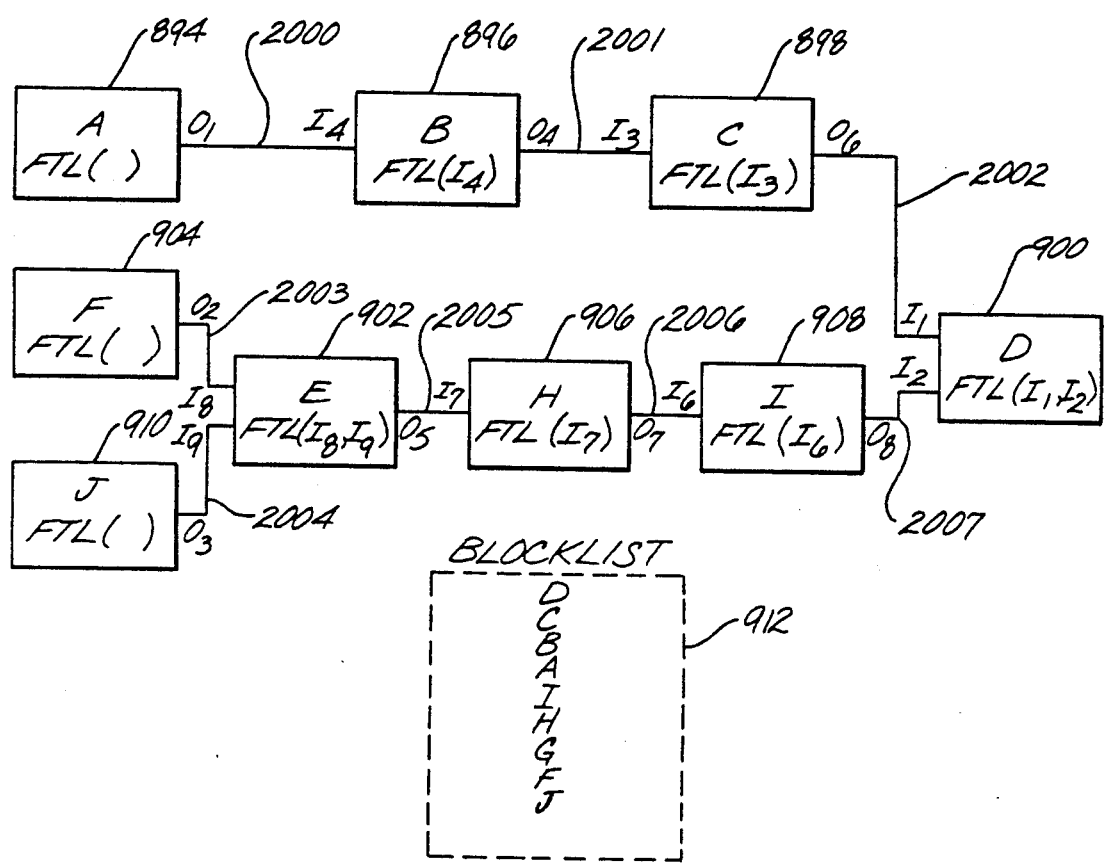
FIG. 24 is a further block diagram which is formed on the display and is simulated in the simulator of FIG. 1A.

Referring now to FIGS. 21, 22A and B, 24, 25A, B, C, and D, a detailed example of a runtime simulation is discussed. FIG. 24 is a simple example of a block diagram constructed on the display screen to be simulated by the runtime simulator method of FIGS. 21, 22A and 22B. Blocks A894, F904, and S910 are source blocks which have null feedthrough lists. Block D900 is a sink block which has a feedthrough list with input $I_1$ and input $I_2$ on it. Block B896 has input $I_4$ on its feedthrough list, and block C898 has input $I_3$ on its feedthrough list. Block I908 has input $I_6$ on its feedthrough list, and block H906 has input $I_7$ on its feedthrough list. Block G902 has input $I_8$ and input $I_9$ on its feedthrough list. The arbitrary configuration of the netlist for this block diagram is shown in FIG. 24A and the corresponding blocklist is shown at 912 of FIG. 24. FIGS. 25A, B, C and D depict the various states of operation of the pointers, lists, etc. which are affected by the NUMBER OF SUBITERATIONS method (FIG. 22A) and the MAXIMUM CHAIN LENGTH method (FIG. 22B). Specifically, FIG. 25A has five columns; a first column for the blocklist element. A second column for the blocklist element inputs, and the pointer to these inputs, is depicted by brackets. A third column depicts which element is the current driving element, a fourth column for pointing to the current driving element's inputs, and a fifth column for a COUNT variable which keeps track of the number of blocks in the longest chain.

To simulate the block diagram shown in FIG. 24, the RUNTIME SEQUENCER method (FIG. 21) is entered. At block 804, the NUMBER OF SUBITERATIONS method (FIG. 22A and 22B) is entered to determine the number of times to execute the update output procedures per time step. Referring to FIG. 22A, during block 824, the variable SUBITS is set equal to zero and the blocklist pointer is set to the top of the blocklist. During block 826, a determination is made that the pointer is not pointing to any element in the list, and at block 828 the blocklist pointer is advanced to the next element on the blocklist (913, FIG. 25A). The first element on the netlist has been arbitrarily set to element D (primarily for illustrative purposes). During block 830, an input list is created for this element (914, FIG. 25A). The input list for this element is retrieved from the netlist shown in FIG. 24A. During block 832, the input pointer is set to the first input in the list (916, FIG. 25A as shown by the brackets surrounding $I_1$). During block 834, a determination is made that there are still inputs on element D's input list, and during block 836, a determination is made that input $I_1$ is at the end of a CHAIN. Specifically, input $I_1$ is connected to a block that does not have any outputs, and thus, it is considered to be an input at the end of the CHAIN. During block 838, a pointer is set to the current element which drives input $I_1$; this pointer contains element C (918, FIG. 25A). During block 840, the maximum chain length which ends at element D extending from input $I_1$ is determined.

Referring to the MAXIMUM CHAIN LENGTH method (FIG. 22B) at block 850, the LENGTH variable is set equal to zero and the COUNT variable is set equal to one. During blocks 852, 854, and 856, the remaining portions of the INPUT TABLE STACK are formed. Specifically, during block 852, element C's input is placed on the stack, and during block 854, the current value for COUNT is placed on the stack. During block 856, the first input in C's input list is pointed at (920, FIG. 25A as shown by the brackets surrounding $I_3$). At block 858, a determination is made that the input list for element C is not empty and at block 860, a determination is made that $I_3$ is not driven by an element which begins a new CHAIN. At block 876, the value of COUNT is incremented by one, and at block 878, the current element pointer is set to element B which drives input $I_3$. During blocks 852, 854, and 856, element B's, input $I_4$ and the present COUNT value, 2, are added to the stack (922, FIG. 25A). During block 858, a determination is made that the input list for element B is not empty, and at block 860, a determination is made that $I_4$ is driven by an element which begins a new CHAIN. Specifically, element A is a source block and has a null feedthrough list. During block 862, a determination is made that COUNT is greater than LENGTH, and during block 864, length is set equal to 2. Processing returns to block 856 during which the input list pointer is incremented for element B to the next input (924, FIG. 25A). During block 858, it is determined that the input list is empty, and block 866 removes element B from the INPUT TABLE STACK (926, FIG. 25A). During block 868, the current element pointer is set to the previous element in the INPUT TABLE STACK as shown in FIG. 25A at 926 by the brackets around element C and its input $I_3$. During block 870, the COUNT variable is set equal to the current element's COUNT value which is 1 (926, FIG. 25A). During block 872, a determination is made that there are still inputs in the INPUT TABLE STACK, element C's remain. Processing continues at block 856, during which the input list pointer for element C is incremented to the next input (928, FIG. 25A). During block 858, a determination is made that the input pointer points to an empty location and at block 866, element C is removed from the INPUT TABLE STACK (930, FIG. 25A).

At block 868, the current element is set to the previous entry in the INPUT TABLE STACK; there are no more entries in the INPUT TABLE STACK. At block 870, the COUNT variable is set equal to the current element's COUNT value, and at block 872, a determination is made that there are no more entries in the INPUT TABLE STACK. Thus, at block 874, processing returns to NUMBER OF SUBITERATIONS method (FIG. 22A) at block 842.

At block 842 of the NUMBER OF SUBITERATIONS method (FIG. 22A), a determination is made that the variable SUBITS is less than the variable length returned from the MAXIMUM CHAIN LENGTH method (FIG. 22B). During block 844, the variable SUBITS is set equal to LENGTH, and at block 846, the pointer is set to the next input of element D (932, FIG. 25B). At block 834, a determination is made that there are more inputs in element D's input list, and at block 836 it is determined that $I_2$ is also at the end of a CHAIN. $I_2$ is connected to element D, and, as stated before, it has no outputs and thus, $I_2$ is at the end of a CHAIN.

During block 838, the current element pointer is set in the stack to the next element in the blocklist which drives input $I_2$, element I. The MAXIMUM CHAIN LENGTH method (FIG. 22B) is entered to determine the maximum chain from input $I_2$. Referring now to FIG. 22B at block 850, the variable LENGTH is set equal to zero, and the variable COUNT is set equal to one. During blocks 852, 854, and 856, the first entry in the INPUT TABLE STACK is set up. Specifically, during block 852, the current element pointer is set to element I (934, FIG. 25B). At block 854, the current value for COUNT is placed on the table, and at block 856, the pointer is set to the first input in element I's input list (936, FIG. 25B). At block 858, a determination is made that the input list for element I is not empty, and at block 860, a determination is made that $I_6$ is not driven by a block which begins a new CHAIN. During block 876, the value of the variable count is incremented by one, and at block 878, the current element pointer is set to the blocklist element which drives input $I_6$, element H. The necessary information for the INPUT TABLE STACK is placed on the table at blocks 852, 854, and 856 as shown in FIG. 25B at 938. At block 858, a determination is made that the input list pointer for element H is not empty, and at block 860, it is determined that input $I_6$ is not driven by a block at the beginning of a new CHAIN. During block 876, the value for the variable COUNT is incremented by one, and at block 878, the current element pointer is set to element H which drives input $I_6$ to element I. Processing continues by placing element H, input $I_7$ and the current COUNT value on the INPUT TABLE STACK at blocks 852, 854, and 856 (938, FIG. 25B). During block 858, a determination is made that the input list for element H is not empty, and at block 860, it is determined that the element which drives $I_7$ is not at the beginning of any CHAIN. At block 876, the value of the COUNT variable is incremented by one, and at block 878, the current element pointer is set to element G.

Element G, inputs $I_8$ and $I_9$, and the current value of COUNT, are placed on the INPUT TABLE STACK blocks 852, 854, and 856. During block 856, the input pointer for element G is set to $I_8$. This is shown in FIG. 25B at 940 by brackets around $I_8$. At block 858, it is determined that there are still inputs pointed to by the input list pointer, and at block 860, a determination is made that the element which drives input $I_8$ is at the beginning of a new CHAIN. Specifically, element G is driven by element F, and element F is a source block, which has no inputs and has a null feedthrough list. At block 862, a determination is made that the content of the variable COUNT is greater than the content of the variable LENGTH. COUNT is equal to 3, and LENGTH is equal to 0. At block 864, LENGTH is set equal to the content of COUNT, and processing continues at block 856 which increments the input list pointer to the next input of element G, $I_9$ (FIG. 25B, 942). During block 858, a determination is made that the input list pointer is not pointing to an empty location and, at block 860, a determination is made that the element which drives input $I_9$ is at the beginning of a CHAIN. Specifically, element J is a source block which does not have any inputs, and it has a null feedthrough list. At block 862, a determination is made that COUNT is not greater than LENGTH, COUNT is equal to 3 and LENGTH is equal to 3. Processing continues at block 856, which increments the input list pointer to the next location of the input list (944, FIG. 25B). During block 858, a determination is made that the input list pointer presently points to an empty location, and at block 866, element G is removed from the INPUT TABLE STACK. At block 868, the current element pointer is set to the previous entry in the input table. During block 870, the value for the COUNT variable is set equal to the current element's COUNT value, which was 2 (946, FIG. 25B). At block 872, a determines that there are still entries in the INPUT TABLE STACK, and processing continues at block 856, which increments the input list pointer of the current element (948, FIG. 25B). During block 858, it is determined that the current element input list pointer points to an empty input location, and at block 866, this element is removed from the stack (950, FIG. 25B) During block 868, the current element pointer is set to the previous entry in the INPUT TABLE STACK and at block 870 sets the COUNT variable is set equal to the current element's COUNT value (950, FIG. 25B). At block 872, a determination is made that there are still entries in the INPUT TABLE STACK, and processing continues at block 856, which increments the current input list's pointer by 1 (952, FIG. 25C). During block 858, a determination is made that the input list pointer points to an empty location and at block 866, this element is removed from the input list table (954, FIG. 25C). During block 868, the current element pointer is set to the previous entry in the INPUT TABLE STACK, and at block 870, the COUNT variable is set to the current element's COUNT value. During block 872, it is determined that there are no more entries in the INPUT TABLE STACK, and at block 874, processing returns to NUMBER OF SUBITERATIONS method (FIG. 22A) at block 842.

At block 842 of the NUMBER OF SUBITERATIONS method (FIG. 22A), a determination is made that the variable SUBITS is less than the variable LENGTH; SUBITS is equal to 2, and LENGTH is equal to 3. During block 846, the input list pointer is incremented to the next input of element D (956, FIG. 25C). At block 834, a determination is made that there are no more inputs pointing to an input list pointer for element D, and during block 826, a determination is made that the netlist pointer is not at the end of the netlist. The pointer is still at the top of the netlist, and at block 828, the netlist pointer is advanced to the next netlist element, element C.

During block 830, an input list for element C is obtained from the netlist (2262, FIG. 24A), and at block 832, the input list pointer is set to element C's first input, $I_3$ (958, FIG. 25C). During block 834, it is determined that there are inputs pointed to by the input list pointer, and during block 836, it is determined that element C is not at the end of a CHAIN. During block 846, the input list pointer is set to the next input on element C's input list, and at block 834, a determination is made that there are now no more inputs pointed to by the input list pointer (960, FIG. 25C). During block 826, a determination is made that the blocklist pointer is not at the end of the blocklist, and at block 828, the blocklist pointer is advanced to the next blocklist element, element B.

During block 830, an input list for element B is obtained from the netlist (2260, FIG. 24A), and at block 832, the input list pointer is set to element B's first input (962, FIG. 25C). At block 834, a determination is made that there are still inputs pointed to by the input list pointer, and at block 836, it is determined that element B is not at the end of the CHAIN. During block 846, the input list pointer is set to the next input in B's input list, and during block 834, it is determined that there are now no more inputs pointed to by the input list pointer (964, FIG. 25C). At block 826, a determination is made that the pointer is not at the end of the blocklist, and at block 828, the blocklist pointer is advanced to the next element on the blocklist element A. During block 830, an input list for element A is obtained from the netlist (2258, FIG. 24A), and at block 832, the input list pointer is set to element A's first input (966, FIG. 25C). During block 834, it is determined that there are no inputs for element A; element A is a source block.

During block 826, a determination is made that the blocklist pointer is not at the end of the blocklist and the blocklist pointer is advanced to the next element, element I, during block 830, an input list for element I is obtained from the netlist (2272, FIG. 24A), and at block 832, the input list pointer is set to element I's first input, $I_6$ (968, FIG. 25C). During block 834, it is determined that there is an input pointed to by the input list pointer for element I and at block 836, a determination is made that this input is not at the end of the CHAIN. During block 846, the input list pointer is moved to the next input for element I and during block 834, a determination is made that the input list pointer does not point to another input (920, FIG. 25C). During block 826, a determination is made that the blocklist pointer is not at the end of the blocklist, and at block 828, the blocklist pointer is advanced to the next blocklist element, element H. During block 830, an input list for this element is obtained from the netlist (2270, FIG. 24A), and at block 832, the input list pointer is set to point to element H's first input (972, FIG. 25D). During block 834, a determination is made that there are inputs pointed to by the input list pointer, and at block 836, a determination is made that this input is not the end of a CHAIN. During block 846, the input list pointer is incremented to the next input for element H, and at block 834, a determination is made that there are no inputs for element H (974, FIG. 25D).

During block 826, it is determined that the blocklist pointer is not at the end of the blocklist, and at block 828, the blocklist pointer is advanced to the next element, element G. During block 830, an input list for element G is obtained from the netlist (2268, FIG. 24A), and during block 832, the input list pointer is set to the first input of element G, $I_8$ (976, FIG. 25D). During block 834, a determination is made that there are inputs pointed to for element G and at block 836, a determination is made that input $I_8$ is not at the end of a CHAIN. During block 846, the input list pointer is incremented to input $I_9$ (978, FIG. 25D), and at block 834, a determination is made that there are still more inputs pointed to for element G. At block 836, a determination is made that input $I_9$ is not at the end of a CHAIN, and at block 846, the input list pointer is incremented to next input for element G (979, FIG. 25D). During block 834, a determination is made that there are no more inputs pointed at f or element G, and at block 826, it is determined that the netlist pointer is not at the end of the blocklist. During block 828, the pointer is advanced to the next blocklist element, element F. At block 830, an input list for element F is obtained from the netlist (2266, FIG. 24A) and at block 832, the input list pointer is set to the null input list for element F (980, FIG. 25D). At block 834, a determination is made that there are no more inputs pointed to by an input list pointer for element F, and at block 826, a determination is made that the blocklist pointer is not at the end of the blocklist. During block 828, the blocklist pointer is advanced to the next element on the blocklist, element J, and at block 830, an input list for this element is obtained from the netlist (2274, FIG. 24A). During block 832, the input list pointer is set to point to element J's null input list (982, FIG. 25D), and at block 834, it is determined that there are no inputs in element J's input list. At block 826, a determination is made that the blocklist pointer is pointed to the end of the blocklist and processing returns at block 848 to the RUNTIME SIMULATOR method at block 806.

At block 806 of the RUNTIME SIMULATOR, the COUNT variable is set equal to zero and "n" is set equal to SUBIT which was determined during the NUMBER OF SUBITERATIONS method (FIGS. 22A and 22B). At block 808, Incrementer I equal is set to zero, and at blocks 810, 812, and 814, the update output procedures are executed "n" times. During block 816, all update state procedures are executed, and the COUNT variable is incremented by 1 at block 818. When the COUNT variable reaches the number of iterations to be performed, then processing returns to the calling program at block 822.

5) Second Embodiment of the RUNTIME SIMULATOR method of FIGS. 26A and 26B.

FIGS. 26A and 26B are flow-block diagrams of the second embodiment for the RUNTIME SIMULATOR. This embodiment is a more efficient version of the RUNTIME SIMULATOR because it does not execute as many subiterations as the first embodiment of the RUNTIME SIMULATOR. Instead of executing the update output procedures a predetermined number of times, this embodiment of the RUNTIME SIMULATOR will execute the update output procedures only until the input values stop changing, or settle down. When the input values settle down after executing update output procedures, the inputs are considered defined, and the update state procedures for all state blocks can then be executed.

FIG. 26A is a detailed flow diagram of the second embodiment of the RUNTIME SIMULATOR, and FIG. 26B is a flow diagram of an INITIALIZATION method for setting up the lists and tables required by the second embodiment of the RUNTIME SIMULATOR. Specifically, referring to FIG. 26A of the second embodiment, at block 988, the INITIALIZATION method (FIG. 26B) is entered. At block 1026 of the INITIALIZATION method, the feedthrough list for each output is placed into a table called the feedthrough table. The feedthrough list for each output is stored in the Library Store. During block 1028, the feedthrough table is scanned to determine which of the feedthrough lists are null. The outputs which are associated with these null feedthrough lists are placed into their own lists called the OUTPUT LIST WITH NULL FEEDTHROUGH (OLNF). During block 1030, the feedthrough table is scanned to determine which outputs have a non-null feedthrough list. The outputs associated with these feedthrough lists are then placed into a new list called OUTPUT LIST HAVING FEEDTHROUGH (OLF). At block 1032, a list of each block which has a state is created; this list will be called the STATE BLOCK LIST (SBL). During block 1034, all of the outputs on the OLF list are initialized to zero, and at block 1036, a time step counter "T" is set equal to zero. This counter is used to keep track of the time step iteration being performed by the RUNTIME SIMULATOR. During block 1038, processing returns to the RUNTIME SIMULATOR (FIG. 26A) at block 992.

During block 992 of the RUNTIME SIMULATOR method (FIG. 26A), the numeric value of all of the inputs which are in the feedthrough table is stored. During block 994, a variable called "OUTPUT UPDATED" is set equal to the last output on the OLF list. The purpose of this variable is to flag the last output on the OLF list that has been updated. This variable will be checked periodically to see if no change in any feedthrough input occurred since all the outputs on the OLF have been tested for a change in an input numeric value. During block 996, the update output procedures for all outputs are executed which are on the OLNF list. These outputs do not require defined inputs, and they can be processed right away. During block 998, a pointer is set to the first output on the OLF list. At block 1000, a FEEDTHROUGH LIST (FL) INPUT-pointer is set equal to the first input on the feedthrough list for the output pointed to by the OLF-pointer. The value of the input pointed to by the FL-pointer is then compared against the value of the input which was stored at block 992. If the value of the input is equal to the value of the input stored at block 1014, is entered to determine if the FL-input pointer is now pointing to the last input on the feedthrough list for the output pointed to by the OLF-pointer. If it is not, then during block 1012, the FL-input pointer is set to the next input in the output's feedthrough list. Processing resumes at block 1002, during which it is determined whether the value of the currently pointed to input is equal to the value of the currently pointed to input which was stored at block 992.

Returning to block 1014, if the input pointer is set equal to the last input in the currently pointed to output's feedthrough list, then at block 1016, a determination is of whether the variable "OUTPUT UPDATED" is equal to the current output which is pointed to by the OLF-pointer. The purpose of this step is to determine if all of the outputs in the OLF list have been traversed since any feedthrough input has changed in numeric value. If all the outputs have not been traversed, then the OLF pointer is incremented to the next output in the list at block 1010. If all the outputs have been traversed, this means that all of the outputs in the OLF list have been updated and thus, the update state procedure for all the blocks having a state can be executed at block 1018.

Returning to block 1002, if the current value of the input pointed to by the FL-input pointer is not equal to the stored value, then during block 1004, the update output procedure for the output currently pointed to by the OLF-pointer is executed. During block 1006, the variable "OUTPUT UPDATED" is set equal to the output pointed to by the OLF-pointer. During block 1008, a numeric value for all the inputs in the feedthrough table is stored, and at block 1010, the OLF-pointer is incremented to the next output in the OLF-list. Processing resumes at block 1000 during which the FL-input pointer is set to the first input on the currently pointed to output feedthrough list. This process continues until all of the inputs on the various feedthrough lists in the feedthrough list table contain the same value as the value which is stored from the previous subiteration. When all of the input values stop changing then blocks 1018, 1020, and 1023 are processed. During block 1018, all of the update state procedures for the blocks having a state are executed. This step also symbolizes the end of one iteration, or the execution of one time step in a simulation. During block 1020, a determination is made of whether the number of iterations or time steps performed by the simulation has been completed. If "T" is equal to the maximum number of iterations, then during block 1022, processing returns to the calling program, and if "T" is not equal to the maximum number of iterations, then at block 1023, the incrementer counter for the number of time iterations is incremented and the processing starts all over again at block 992.

6) Detailed Example of the Second Embodiment of the RUNTIME SIMULATOR method of FIGS. 26A and 26B.

Figure 27:
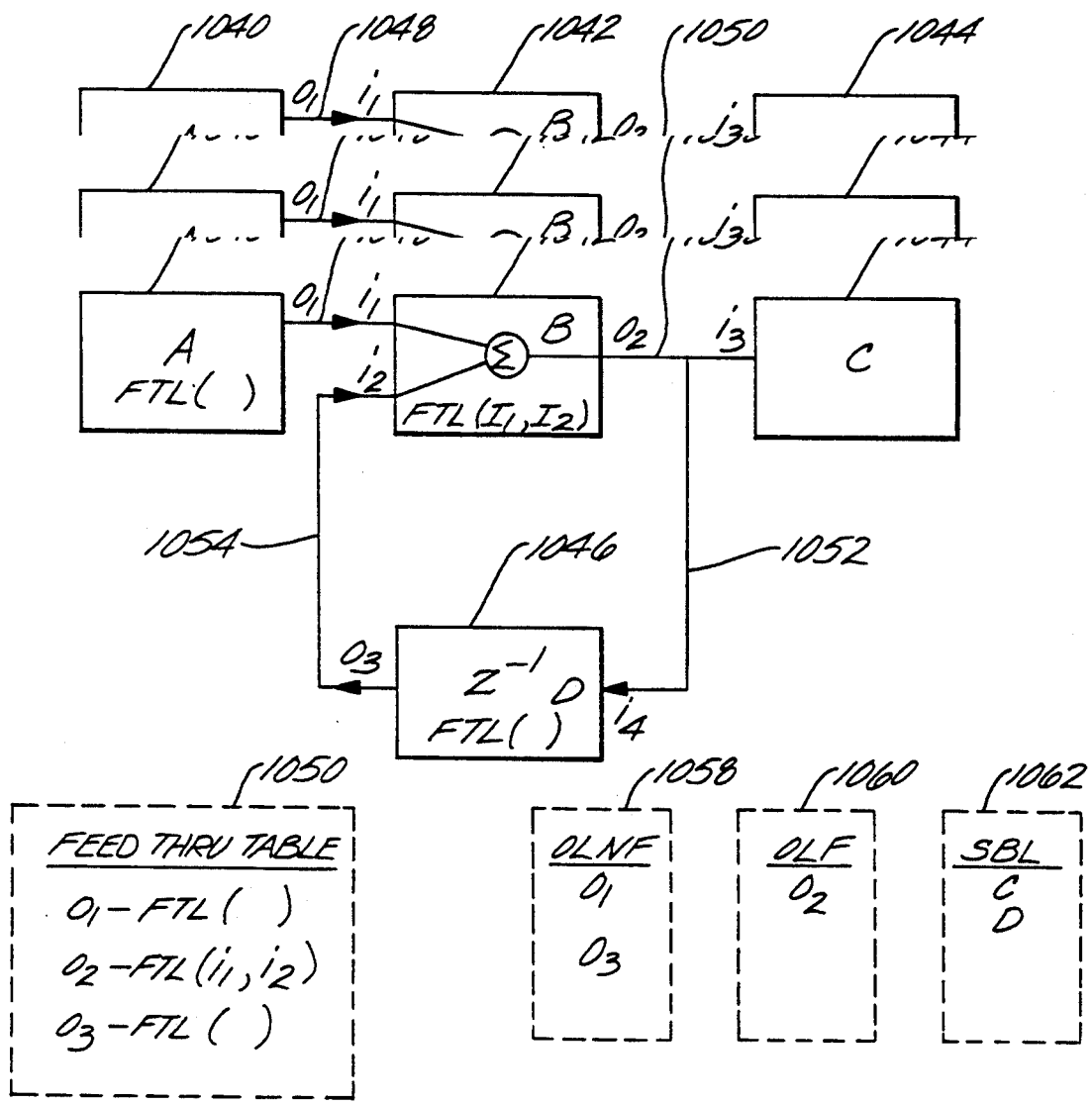
FIG. 27 is a block diagram which is formed on the display and is simulated in the simulator of FIG. 1A. Also depicted is a feedthrough list, output list of outputs with null feedthrough (OLNF), output list of outputs with feedthrough (OLF), and state block list (SBL), all stored in memory and corresponding to the block diagram are also shown.

Referring now to FIGS. 26A and 26 B, 27, 27A and 28, a detailed example of the second embodiment of the RUNTIME SIMULATOR is now discussed. FIG. 27 is an example of a simple block diagram created by a user on the screen display of the simulator of FIG. 1A. Specifically, block A1040 is a source block having output $O_1$ and a null feedthrough list. Block B1042 is a summation block having inputs $I_1$, $I_2$, and $O_2$. Block C1042 has input $I_1$ and input $I_2$ on its feedthrough list. Block D1044 is a sink block having input $I_3$ 1050 and a null feedthrough list. Block D1046 is a unit-delay block having input $I_4$ 1052, and output $O_3$ 1054 and a null feedthrough list. The netlist representation of the block diagram FIG. 27 is shown in FIG. 27A.

During block 988 of the second embodiment of the RUNTIME SIMULATOR method the INITIALIZE method (FIG. 26B) is entered. During block 1026, a feedthrough list table containing a feedthrough list for each output is formed. Information on the feedthrough list is obtained from the Library 14A. At block 1056 of FIG. 27, a feedthrough list table for the block diagram is shown. Specifically, output $O_1$ is shown having a null feedthrough list, output $O_2$ has input $I_1$ and input $I_2$ on its feedthrough list, and output $O_3$ has a null feedthrough list. During block 1028, the OLNF list is formed, which is a list of outputs which have null feedthrough lists. Block 1058 of FIG. 27 shows that output $O_1$ and output $O_3$ are both outputs which have null feedthrough lists as depicted in the feedthrough table at block 1056. During block 1030 of FIG. 26B, an OLF list is formed. This list is the list of outputs which have a non-null feedthrough property. Block 1060 of FIG. 27 shows the OLF list having output $O_2$. Output $O_2$ has input $I_1$ and input $I_2$ on its feedthrough list and thus, has an all feedthrough property which is a non-null characteristic. During block 1032 of the INITIALIZE method (FIG. 26B), an SBL list, which is a list of the blocks which have a state, is formed. Elements C and D are shown on the SBL list at 1062 of FIG. 27. During Block 1030, output $O_2$ on the OLF list is initialized to zero and the time step counter is set to 0.

The proposed example is set up so that when "T" is equal to zero, the state variables of the unit delay block, block D are initialized to be zero. Additionally, the source block is set to output zero when the time step "T" is equal to zero.

At this point in the initialization process, all of the outputs are known, $O_1$, $O_2$, and $O_3$, and thus, the initial values of the inputs $I_1$, $I_2$, $I_3$, and $I_4$ are also known (1064, FIG. 28). Block 1038 returns processing to the RUNTIME SIMULATOR method at block 992. During block 992, a copy of the numeric values of the inputs, which appear in the feedthrough table, is stored. The inputs which appear in the feedthrough table are input $I_1$ and input $I_2$. Currently, the input values for input $I_1$ and input $I_2$ are zero (1065, FIG. 28). During block 994, the variable "LAST OUTPUT UPDATED" is set equal to the last output in the OLF list, which is output $O_2$. During block 996, update output procedures for all the outputs that are on the OLNF list are executed, and at block 998, the OLF-pointer is set equal to the first output on the OLF list, which is $O_2$ (1067, FIG. 28). During block 1000, the FL-input pointer is set equal to the first input on the feedthrough list for $O_2$, which is input $I_1$. As shown at row 1068 of FIG. 28. During block 1002, current value for $I_1$ is checked to see if it is equal to the stored value for $I_1$. The current and stored values for $I_1$ are equal, both are zero. During block 1014, a determination is made that the FL-input pointer is not pointing to output $O_2$'s last input on its feedthrough list, and at block 1012, the input pointer is set equal to the next input, input $I_2$ on output $O_2$'s feedthrough list (1070, FIG. 28). During block 1002, a determination is made that the current value for input $I_2$ is equal to the stored value for input $I_2$, and at block 1014, a determination is made that $I_2$ is equal to the last input on output $O_2$'s feedthrough list. During block 1016, a determination is made that the last OUTPUT UPDATED variable contains the output $O_2$, and that output $O_2$ is the output currently pointed to by the OLF-pointer. None of the inputs which are in the feedthrough table have changed in this subiteration, and thus, the update state procedures for all blocks having a state can be executed at block 1018. Block 1020 determines that incrementer "T" is not equal to the maximum number of iterations for the method. During block 1023, the iteration counter by incremented 1. This step symbolizes that the second iteration for the runtime simulator will now be performed (t=1) and the source block 1040 will output a 1 instead of a 0 when it is executed. During block 992, a copy is stored of the numerical value of the inputs $I_1$ and $I_2$, both contain a value of 0. During block 994, the variable LAST OUTPUT UPDATED is set equal to the last output on the OLF-list which is output 02. At block 996, the update output procedures for all of the outputs on the OLNF list is executed. Source block 1040's output $O_1$ is on OLF list and it will be updated to a value of 1, and at the same time, the input $I_1$ will also be updated to the value of 1 (1072, FIG. 28). During block 998, the OLF-pointer is set to the first output in the OLF list, which is still output $O_2$. The input pointer is set equal to the first input for output $O_2$'s feedthrough list, which is $I_1$ (1074, FIG. 28). At block 1002, a determination is made that the current value of $I_1$ is not equal to the stored value of $I_1$. $I_1$ has value 1, and $I_1$ was stored at block 992 with a value of 0. During block 1004, the update output procedure associated with Output $O_2$ is executed. The update output procedure associated with 02 is a summation of inputs $I_1$ and $I_2$. Input $I_1$ is currently equal to 1 and input $I_2$ is currently equal to 0. A summation of the contents of both $I_1$ and $I_2$ is equal to 1, and output $O_2$ is assigned the value of 1. Inputs $I_3$ and $I_4$ are also updated to have the value of 1 because they are both connected to output $O_2$ (FIG. 28, 1076). During block 1006, the variable OUTPUT UPDATED is set equal to the last output pointed to by the OLF-pointer, output $O_2$. During block 1008, the input values for $I_1$ and $I_2$ is stored (1078, FIG. 28). At block 1010, the OLF-pointer is incremented to the next output in the OLF list. There is currently only one output, $O_2$ in the OLF list, so the FL-OLF pointer resets to the beginning of the list, which is Output $O_2$. Processing returns to block 1000, which sets the FL-input pointer equal to the first input in $O_2$'s feedthrough list, $I_1$. At block 1002, a determination is made that the current value for input $I_1$ is equal to the stored value for input $I_1$, both are equal to 1. At block 1014, a determination is made that input $I_1$ is not the last input on $O_2$'s feedthrough list, and at block 1012, the input pointer is advanced to input $I_2$ on $O_2$'s feedthrough list (1080, FIG. 28). At block 1002, a determination is made that the current value of input $I_2$ is equal to the stored value of input $I_2$, both are equal to 0. During block 1014, it is determined that $I_2$ is the last input on $O_2$'s feedthrough list, and at block 1016, a determination is made that the variable OUTPUT UPDATED is equal to the current output pointed to by the OLF pointer, output $O_2$. Thus, all of the changes in the inputs and outputs to the system have settled down and thus, at block 1018 the update state procedure for all the state blocks are executed. At this time, the iteration has been completed, and at block 1020, it is determined that the maximum number of iterations has been completed. The simulation is finished and processing returns to block 1022, the calling method, (1082, FIG. 28).

E. Control Input Simulation

The six embodiments of the SIMULATION PROGRAM BUILDERS previously discussed are for developing computer software programs representative of block diagram to be simulated. A method and apparatus for controlling these software computer programs during execution/simulation is now discussed.

By being able to control the execution of a software computer program representative of the block diagram, a designer can more effectively simulate more complex systems by block diagrams.

Adding control inputs to various blocks of a block diagram, the designer can design block diagrams of systems which have sections that operate and process signals at different iteration rates, and/or a designer can design a block diagram of a system which allows the operation or non-operation of various sections of the block diagram to be dependent on the value of certain signals. (Examples of both capabilities are discussed in FIGS. 34 and 37, respectively).

FIG. 29 represents a simple block diagram in which a control input is added to one of the blocks. Specifically, block 1084 is a source block with one output $O_1$ 1090, and block 1088 is a sink block with input $I_4$ 1092. Block 1086 has three inputs and one output. Input $I_1$ 1090 and input $I_2$ 1094 are data inputs which are processed in accordance with the function represented by the block. Output $O_1$ 1092 is an output which is produced in accordance with the function represented by the block. Input $I_3$ is a control input which affects the function characteristic the block performs. For example, when $I_3$ has an input of 0, the function of the block might be to process normally. However, if input $I_3$ has an input of 1, then the function characteristic of the block might be to output 0 (effectively turned off). The six SEQUENCER methods for generating and executing software programs representative of block diagrams treat the control inputs like any other input. Stated differently, the control inputs sequenced in the same manner as normal data inputs by the six SEQUENCER methods.

The software procedures representative of blocks having control inputs are equipped with conditional software statements for interpreting the control input and responding by changing the characteristic function of the software procedure. In this way, a block can represent more than one function which changes, depending upon the one or more control input to the block. For example, consider a standard unit delay block 1102 as shown in FIG. 30. This block traditionally represents equation $y(t) = x(t-1)$. In other words, the output $y(t)$ is the input $x(t-1)$ from a prior time step. To show control, a new input is added to the bottom of the block (FIG. 30). In this case, the new input is the control input for a "hold" function. "Hold" effectively maintains the last output of the block constant. The function of the block now represents the conditional equation:

$$y(t) = \begin{pmatrix} x(t-1) \text{ if } C(t) = \leq 0, \text{ and} \\ y(t-1) \text{ if } C(t) = > 0, \end{pmatrix}$$

where $y(t)$ is the output to the block, $x(t)$ is the input to the block, and $C(t)$ is the control input to the block. This equation basically means that when the control input is low $C(t)$ ($\leq 0$), the block acts like a traditional block. However, when the control input is high $C(t)$ ($>0$), the block holds constant the last output during this time step. Specifically, the control input changes the characteristic function of the delay block by forcing it to process the inputs in a certain way, depending upon the control input. The software procedure representative of this block is provided with conditional statements which interpret the control input and respond with the appropriate action, depending on whether the control input is high or low.

Another control input is the "reset" input. The purpose of "reset" is to reset the function characteristic's parameters, state variables, constants, etc. back to their original values when the simulation begins. One such example is to add reset to an integrator function. The characteristic of an integrator block (FIG. 31) is represented by the equation:

$$y(t) = \sum_{K=0}^{t} x(k) + IC,$$

where $y(t)$ is the output of the block, and $x(k)$ is a series function, and IC is an initial constant value parameter which is preset by the designer. An integrator block with a control input is represented in FIG. 32. The purpose of the control input is to reset the integrator function back to its original constant value, IC. The block now represents the conditional equation:

$$y(t) = \begin{pmatrix} \sum_{K=0}^{t} x(k) + IC \text{ if } C(t) = < 0, \text{ and} \\ IC \text{ if } C(t) > 0, \end{pmatrix}$$

where $y(t)$ is the output of the integrator block, $x(t)$ is the summation of a series, and IC is the constant value. Essentially, when the control input $C(t)$ is less than or equal to 0 ($C(t) = <0$), the integrator block functions as it normally does. However, if the control input is greater than 0 ($C(t)>0$), then the integrator is reset back to the constant value, IC. The software procedure representative Of this block contains a conditional statement for interpreting the control input and determining which function characteristic to be performed. Essentially, during the execution of the integrator function, either one of these functions can occur, depending Upon the control input value.

Another example of controlling the function characteristic of a block is to be able to "set" the values of the parameters of the function (FIG. 32A). For example, a coefficient has the following characteristic:

$$y(t) = k(x(t)),$$

where $y(t)$ is the output, $x(t)$ is the input, and k is the coefficient value of the block. If a control capability were added to this block, then the function characteristic might change to:

$$y(t) = \begin{pmatrix} k(x(t)) \text{ if } C(t) > 0 \\ B(x(t)) \text{ if } C(t) = < 0, \end{pmatrix}$$

where $y(t)$ is the output, $x(t)$ is the input, and k and B are two different coefficient values of the block. When the control input is greater than zero ($C(t)>0$), the input signal $y(t)$ is multiplied by k. However, when the control input is less than or equal to zero, the input signal x(t) is multiplied by B.

FIG. 33 represents the integrator function having both "reset" and "hold" control inputs. The block might represent the following equation:

$$y(t) = \begin{cases} y(t-1)t \times (t) + IC \text{ if } C_1(t) \text{ and } C_2(t) = <0, \\ IC \text{ if } C_1(t) > 0, \text{ and} \\ y(t-1) \text{ if } C_2(t) > 0 \text{ and } C_1(t) = <0, \end{cases}$$

where Y(t) is equal to the output, IC is equal to a constant value, and x(t) is equal to the input to the block. Essentially, this integrator block operates as a normal integrator when the control inputs $C_1(t)$ and $C_2(t)$ are less than or equal to 0 ($C_1(t)$ and $C_2(t) = <0$). The integrator block is reset back to the original constant value IC when $C_1(t)$ is greater than 0 ($C_1(t)>0$). Lastly, when $C_2(t)$ is greater than 0, and $C_1(t)$ is less than or equal to 0 ($C_2(t)>0$ and $C_1(t)<0$), the integrator function is maintained constant at its last output, y(t−1). The software procedure representative of this integrator function has conditional statements for interpreting the various control inputs and responding to the control inputs by effecting the characteristic function of the integrator according to the condition above.

By having control of particular blocks in a block diagram, the user can effectively vary the execution of a block while the simulation proceeds. This capability enables a simulator to control the operation of particular blocks, or a group of blocks, or control the rate of execution of one or more blocks in a series of blocks during a simulation. Thus, the user can design block diagrams representative of very complex systems, which consist of several sub-systems that run at different times during the simulation, and which process data in a way which depends on the particular input data. Examples of more complex systems which can be modeled are speech recognition systems, adaptive communication, live equalization, and adaptive data encoding systems.

Two examples are presented to illustrate the efficiencies and advantages of simulating block diagrams having control capability. The first example is a multi-rate control circuit (FIG. 34), and the second example is a more complicated signal control system (FIG. 8).

Figure 34:
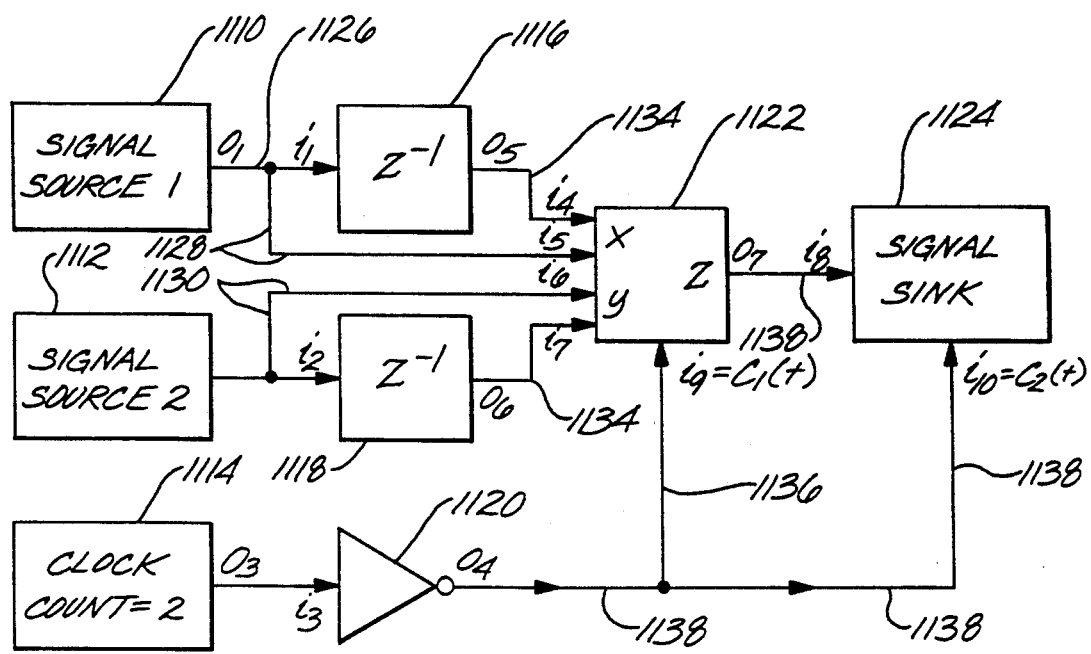
FIG. 34 is a block diagram of a block diagram, having control blocks for modeling multi-rate processing, which is formed on the display and is simulated in the simulator of FIG. 1A.
Figure 35:
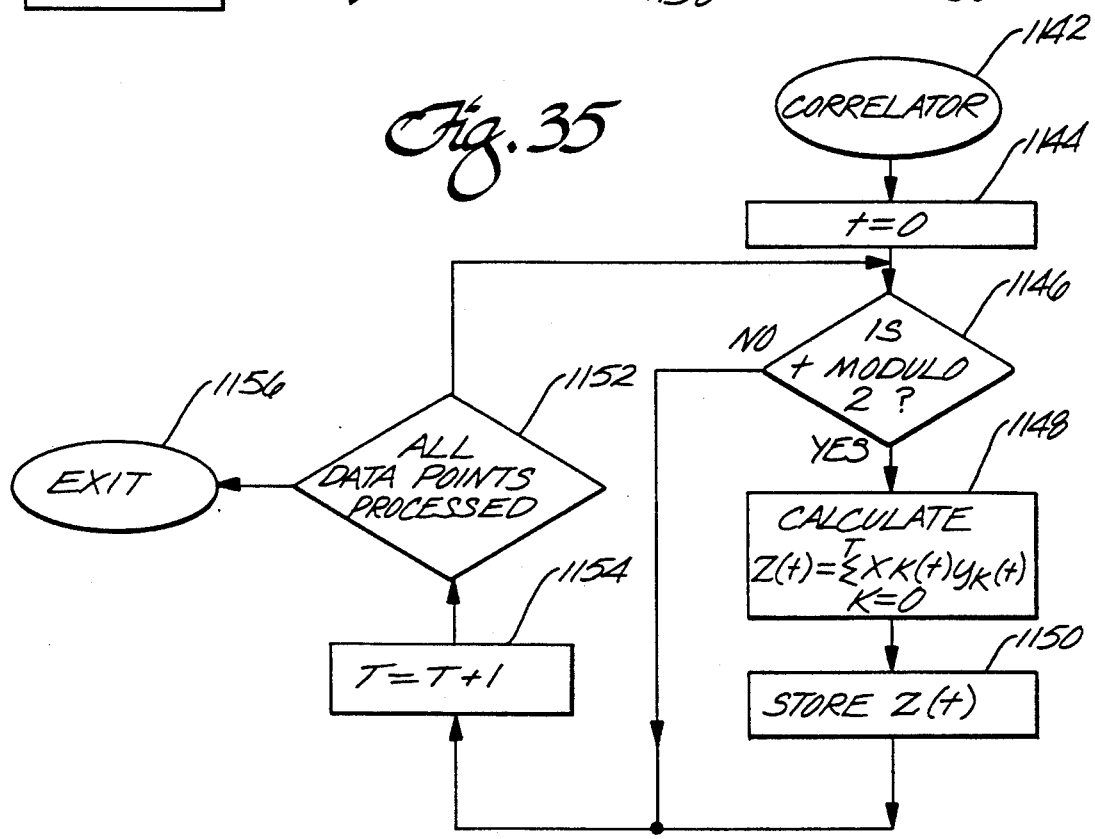
FIG. 35 is a flow diagram of the operation of the multi-rate processing system in FIG. 34.

Referring to FIGS. 34, 35, and 36, a detailed example of a multi-rate system simulated by using the control concepts discussed above. Specifically, FIG. 34 is a multi-rate block diagram with control inputs which was designed on the display of the simulator of FIG. 1A for forming a simple correlation of two waveforms. FIG. 35 is a flow block diagram version depicting the same system for correlating two waveforms, however, it was designed by the user on paper. The system depicted is also called a "TWO-LAG CORRELATOR." Clock 1114 enables the system to sample and match the pattern of two waveforms generated by the signal source 1110 and signal source 2 1112. A vector dot product is performed at block 1122 when a control input specifies that the vector operation should be performed. Additionally, block 1124 only stores information when the control input specifies that it should. In this way, this block diagram efficiently samples the two waveforms produced at blocks 1110 and 1112 and only stores the information produced by the vector dot product. More particularly single source block 1110 outputs 0 at T=0, 0.1 at T=1, 0.2 at T=3, 0.3 at T=4, and 0.4 at T=4. This output represents output $O_1$ 1126 and input $I_1$ 1126 to the unit delay block 1116. As source block 2, 1112 produces output $O_2$ 1132, which is 0 at T=0, −0.1 at T=1, −0.2 at T=2, −0.3 at T=3, and −0.4 at T=4. This output becomes input $I_2$ 1132 of block 1118.

The unit delay block 1116 and 1118 have the characteristic:

$$y(t) = x(t-1),$$

where y (t) is the output, and x(t−1) is equal to the input from the prior time step. Both the outputs of source block 1110 and source block 2 1112 are directly connected to the vector dot product block 1122 via lines 1128 and 1130, respectively. Outputs $O_5$ and $O_6$ of the unit delay blocks are also connected to the vector dot product blocks. For this example, the unit delay blocks have their states initialized to 0. In other words, $O_5$ is equal to 0 at T=0, and $O_6$ is equal to 0 at T=0.

The vector dot product block 1122 has the following characteristic:

$$z(t) = \begin{cases} x_1(t)y_1(t) + x_2(t-1)y_2(t-1) \text{ if } C_1(t) = <0, \text{ and} \\ z(t-1) \text{ if } C_1(t) > 0, \end{cases}$$

where z(t) is equal to the output of the block, and C(t) is equal to the control input to the block. This equation basically means that when the control input is less than or equal to 0 (C(t) = <0), the block acts like a traditional dot product block. However, when the control input is greater than 0 (C(t)>0), then the block outputs a constant value, z (t−1). The output z(t) of block 1122 is $O_7$ 1138. Input $I_8$ 1138 to the signal sink block 1124 is equivalent to the output $O_7$. The signal sink block will store the output z(t) under the following conditions:

Store $z(t)$ if $C_2(t) < 0$, and
No operation if $C_2(t) > 0$, where z(t) is the output of the vector dot product block 1122, and $C_2(t)$ is a control input to the block. Basically, this equation means that when the control input $C_2(t)$ is less than or equal to 0 ($C_2(t)(<0)$), then the signal sink source stores the output z(t). However, if the control input $C_2(t)$ is greater than 0 ($C_2t>0$), then the signal sink does not store any input values. The control input $C_1(t)$ 1136 and $C_2(t)$ 1138 are both originally generated by block 1114. This block is a clock block, and it outputs $O_3$ a 1 on the first time step and on every other time step ($1_01_01_1$, etc.). Output $O_3$ of block 1114 becomes the input $I_3$ to inverter block 1120. The inverter block effectively inverts the output of block 1114 and outputs a 0 on the first time step and a 1 on every other time step ($0_10_10_1$, etc.) Output $O_4$ of the inverter block 1120 effectively becomes the control inputs $C_1(t)$ and $C_2(t)$ to blocks 1122 and 1124, respectively.

FIG. 35 is a user-specified flow block diagram which the user creates on a piece of paper before the user designs the block diagram of FIG. 34 for simulation. Block 1144 of FIG. 35 sets the timer incrementer to 0, and block 1146 determines when t is modulo 2. Then blocks 1148 and 1150 are performed. Block 1148 calculates the dot product:

$$z(t) = \sum_{K=0}^{t} s_K(t) y_K(t),$$

and the result z(t) of the dot product is stored at block 1150. If t is not equal to modulo 2, then processing continues at block 11541, where the time incrementer is incremented by 1. Also, after the output is stored at block 1150, block 1154 is called to increment the time counter by 1. If all the data points have been processed, then the CORRELATOR algorithm exits at block 1156. Blocks 1122, 1124, and 1114 of FIG. 34 effectively model blocks 1146, 1148, and 1150 of FIG. 35. The ability to add control to the block diagram FIG. 34, the sequence of blocks and their operation could not be easily represented. Specifically, the multirate feature occurring at block 1146 when t is modulo 2 could not be designed by the standard block diagram simulator.

FIG. 36 represents the status of the outputs and inputs of the correlation block diagram in FIG. 34. The vertical columns represent either outputs or inputs, and each horizontal row corresponds to a time step. As an illustrative example as to how the block diagram of FIG. 34 operates, the operation of one time step is now discussed. Particularly, at t=2, the output $O_1$ of block 1110 is 0.2, and the output $O_2$ of block 1112 is 0.2. The output $O_3$ of block 1114 is 1, and the output of the inverter block 1120 is 0. Unit delay block 1116 has an output of $O_5$ of 0.1, and the unit delay block 1118 has an output $O_6$ of 0.1. The data inputs to the vector dot product block 1120 are $I_4 = 0.1$, $I_5 = 0.2$, $I_6 = -0.2$, and $I_7 = -0.1$. Inputs $I_4$ and $I_5$ correspond to $x_1(t)$ and $x_2(t)$ of vector dot product equation above. Inputs $I_6$ and $I_7$ correspond to $y_1(t)$ and $y_2(t)$, respectively. (Refer to the top row of FIG. 36.) The control input for the vector dot product block 1122 is $I_9$. When the control input is less than or equal to 0, it is defined by the characteristic equation of the vector dot product block. Additionally, the control input $I_1 0$ and the characteristic equation set up above for the single source block states that when the control input is less than or equal to 0, then the signal sink block stores the value produced by the vector dot product block. Thus, the equation is calculated for $z(t=2)=(0.1)(-0.2)+(0.2)(-0.1)=-0.4$. The signal sink source stores the value of $-0.04$ at $t=2$ (FIG. 36).

Figure 37:
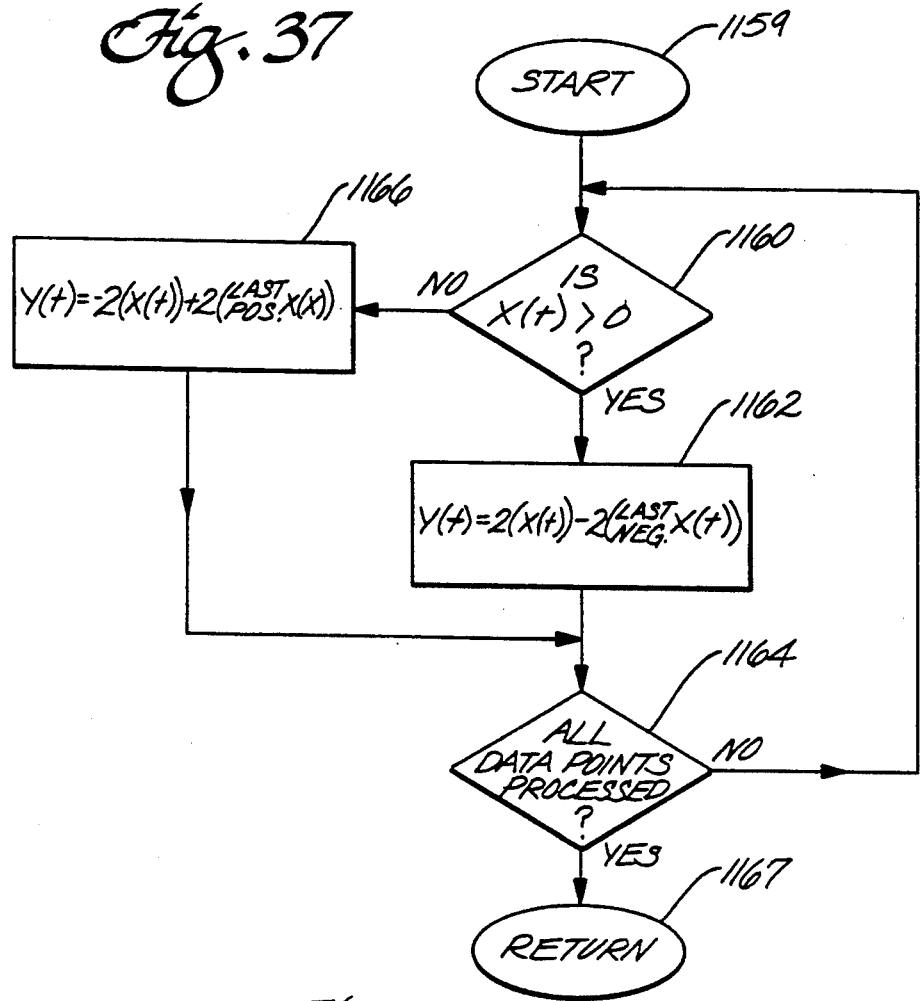
FIG. 37 is a flow diagram of a system having conditional processing which might be laid out by a user on paper prior to laying out a block diagram for simulation.

FIG. 37 is an example of a flow diagram which was designed by a user on paper and it illustrates a conditional processing problem. Essentially, in this example, the characteristic function of this system changes depending upon the nature of the input signal to the system. In other words, during execution, the operation of the system automatically converts from one function to another function. Specifically, at block 1160, this example system would evaluate an input signal x(t) to determine if the input signal were above or below a particular threshold. In the example system, when the input signal x(t) is greater than 0 (x(t)>0), the function described is depicted in block 1166. However, if the input signal threshold is not greater than 0, then the system performs the characteristic function depicted in block 1162. In other words, the characteristic functionality of the system is determined by a particular input signal x(t). The system illustrated in FIG. 37 could be thought of as a system on its own, or as a submodule of a larger system, where the operation of this submodule is dependent upon the input signal x(t). When x (t) is greater than 0, the functionality of a block follows the equation:

$$y(t)=2(x(t))-2(\text{last negative } x(t)),$$

where y(t) is equal to the output and x(t) is equal to the input. Block 1166 has the following function equation:

$$y(t)=-2(x(t))+2(\text{last positive } x(t)),$$

where y(t) is equal to the output, and x(t) is equal to the input of the block. Block 1164 determines if all the input data points x(t) have been processed by the system, and if they have not, then the system will process the next data point at block 1160. This process continues until all the data points have been processed, and the system returns to its normal processing at block 1167.

Traditionally, the system in FIG. 37 could not be easily modeled by a block simulating system because these systems could not affect the characteristic function of a particular block while a system was executing.

Figure 38:
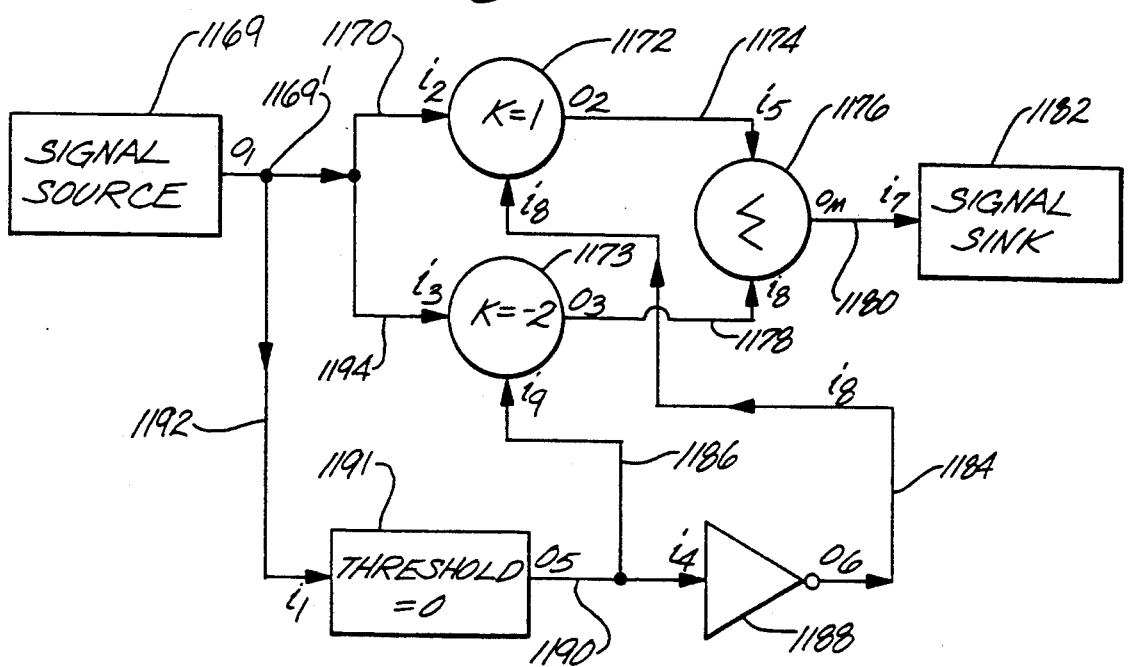
FIG. 38 is a block diagram representation of the flow diagram in FIG. 37 and it is formed on the display and is simulated in the simulator of FIG. 1A.

FIG. 38 is a block diagram which effectively accounts for the control feature of the flow diagram in FIG. 37. The block diagram of FIG. 38 utilizes blocks which have the control capability for affecting the characteristic function of the particular block.

Specifically, blocks 1172 and 1173 are coefficient blocks which have the following hold characteristic function:

$$y(t) = \begin{pmatrix} (k)(xt)) \text{ if hold}(t) = < 0, \\ y(t-1) \text{ if hold}(t) > 0, \end{pmatrix}$$

where y(t) is equal to the output, x(t) is equal to the input, and k is equal to the value of the coefficient, 2 or −2. Basically, this equation means that when the control input hold(t) is less than or equal to 0 (hold(t)<0), then the block multiplies the input signal by a constant k. However, if the control input is greater than 0 (hold(t)>0), then the system continues to output the last output until the input becomes less than or equal to 0. The software procedures representative of these coefficient blocks are provided with conditional statements perform the function characteristics described.

The control inputs are generated by the threshold block 1191 and the inverter block 1188, respectively. The threshold block follows the following characteristic:

$$y(t) = \begin{pmatrix} 1 \text{ if } x(t) > \text{threshold} = 0, \\ -1 \text{ if } x(t) = < \text{threshold} = 0, \end{pmatrix}$$

where y(t) is the output, and x(t) is the input to the block. Basically, this equation means that when the input is greater than a threshold (threshold=0), then in the block outputs a 1. However, if the input signal is less than or equal to the threshold, then the block outputs a −1. The output $O_5$ 1190 of the threshold block 1191 becomes the control input $I_9$ 1186 to the coefficient block 1173. In addition, the Output $O_5$ 1190 becomes the input $I_4$ 1180 to the inverter block 1188. The characteristic of the inverter block is the following:

$$y(t) = \begin{cases} 1 \text{ if } x(t) > 0, \\ 0 \text{ if } x(t) = < 0, \end{cases}$$

where y(t) is the output, and x(t) is the input to the block. Basically, this equation means that when the input signal x(t) is greater than 0 (x(t)=>0), then the block's output is a 1. However, if the input signal x(t) is less than or equal to 0 (x(t)<0), then the block outputs a 0. Again, the software procedure representative of this block contains a conditional statement for determining whether a 1 or a 0 should be outputed from the block. The Output $O_6$ of the inverter block 1188 and $O_5$ of the threshold block 1191 become the control input $I_8$ 1184 and $I_9$ 1186 of the coefficient blocks 1172 and 1173, respectively.

The outputs of the coefficient blocks $O_2$ 1174 and $O_3$ 1178 are the inputs $I_5$ 1174 and $I_6$ 1178 of the summer block 1176. The characteristic function of the summer block is as follows:

$$y(t) = x_1(t) + x_2(t),$$

where y(t) is the output of the block, and $x_1(t)$ and $x_2(t)$ are the inputs to the block. Essentially, the summer blocks add input $I_5$ 1174 to the input $I_6$ 1178 to produce output $O_4$ 1180. Output $O_4$ 1180 is the input $I_7$ 1180 of the signal sink block 1182. This blocks operates as a normal signal sink block by storing in memory the output $O_4$.

Block 1169 is the signal source block to the system, and its characteristic is to output the data values 0, 1, 2, −3, −4, 5, −6, and 7. This output stream is output $O_1$ 1169. Output $O_1$ 1169 becomes the input $I_1$ 1192 to the threshold block 1191. In addition, the output $O_1$ 1169 is the input $I_2$ 1170 of the coefficient block 1172, the input $I_3$ 1194 to the coefficient block 1173. The designer of the system will set the coefficients and the parameters of the blocks during the time he is designing the block diagram of FIG. 38. Specifically, coefficient k of block 1172 will be set equal to 2, coefficient k of block 1173 will be set to −2, and the threshold value of block 1191 will be set equal to 0.

Referring to FIGS. 37, 38, and 39, a detailed example is now discussed. FIG. 39 is a table depicting the status of the various outputs and inputs to each block and the block diagram of FIG. 38. The horizontal rows correspond to results of operations of the system at particular time step, and the vertical columns correspond to either an output or an input. Referring to the horizontal row, when time t is equal to 0, the output 1 of the signal source block 1169 is a 0. This output becomes the input value $I_1$ for the threshold block 1191. When input $I_1$ is equal to 0, the threshold block outputs a −1 at $O_5$. Output $O_5$ is the input $I_4$ for the inverter block 1188. The inverter block outputs a 0 at $O_6$ when its input is less than zero. Outputs $O_5$ and $O_6$ are the control input $I_9$ and $I_8$ to the coefficient blocks, respectively. When the control input $I_9$ is less than 0, the characteristic of the coefficient block 1173 is −2 times x(t). x(t) is equal to the input $I_3$ to the coefficient block 1173, and it is presently equal to the output $O_1$ from the signal source block 1169. Thus, $I_3$ is equal to 0, and the output of the coefficient block 1173 is equal to 0. The control input $I_8$ to the coefficient block 1172 is greater than 0, so the coefficient block outputs its last value, which is equal to the initial value of the block, 0. The outputs of the coefficient blocks $O_2$ and $O_3$ are both equal to 0, and they are the inputs $I_5$ and $I_6$ to the summer block 1176. The output $O_4$ of the summer block is equal to 0, and this output is the input $I_7$ to the sink block 1182.

Referring now to the second horizontal row of FIG. 39, time t is equal to 1, symbolizing the next time step for the system. The data output for the signal source block is equal to 1 for this time step, and this output is the input $I_1$ to the threshold block 1191. The output of the threshold block is a +1 at $O_5$ because when the value of the input to the threshold block is greater than 0, the output of the block is equal to +1. The output $O_5$ is input $I_4$ to the inverter block 1188. This block outputs a 0 because the input $I_4$ is greater than 0. The control input $I_9$ to the coefficient block 1173 is equal to 1. The coefficient block 1173 outputs its last output value because the control input is greater than 0. The last value for the coefficient block 1173 was a 0, is equal to 0. The control input $I_8$ of the coefficient block 1172 is equal to 0, which means that the coefficient block 1172 operates normally. The input $I_2$ to the coefficient block 1172 is equal to the output $O_1$ of the single source block. Output $O_1$ is equal to 1, and thus the output of $O_2$ of the coefficient block 1112 is equal to 2. Summer block 1176 takes the output $O_3$ and the output $O_2$ as inputs $I_5$ and $I_6$, respectively. The output $O_4$ of the summer block 1176 is equal to 2. $O_4$ becomes the input $I_7$ to the signal sink block 1182, which stores the value 2.

Referring to the third horizontal row of FIG. 39, the third time step, when t=2, output $O_1$ of the signal source block 1169 is equal to 2. This output is the input $I_1$ of the threshold block 1191, which outputs a 1 at $O_5$ because the input value is greater than 0. $O_5$ is the input $I_4$ for the inverter block 1188, and this block outputs a 0 because the input is greater than 0. The control input $I_9$ for the coefficient block 1173 is equal to the output $O_5$. The control input $I_9$ is equal to 1, and thus the coefficient block 1173 outputs its last value, which is equal to 0. Thus, output $O_3$ is equal to 0. The control input $I_8$ of the coefficient block 1172 is equal to output $O_6$, which is 0. According to the characteristic of the coefficient block, when the control input is greater than or is less than or equal to 0, the coefficient block processes normally. Thus, the coefficient block 1172 multiplies the input $I_2$ by 2. The output $O_2$ of the coefficient block, is equal to 4. The output $O_2$ and the output $O_3$ are the inputs $I_5$ and $I_6$ of the summer block 1176, respectively. The summer block sums the values of $I_5$ which is equal to 4 and $I_6$ which is equal to 0. Output $O_4$ is equal to 4, and this output becomes input $I_7$ to the signal source block 1182 which stores the value 4. This process continues until all of the data inputs from the signal source block are processed. Refer to FIG. 39 for the remaining iterations of the above diagram in FIG. 38.

The invention has been described in an exemplary and preferred embodiment, but it is not limited thereto. Those skilled in the art will recognize that a number of additional modifications and improvements can be made to the invention without departure from the essential spirit and scope. For example, a number of different software techniques and any number of different software languages would be suitable for implementing the disclosed invention.

What is claimed is:

1. A method for ordering computer software procedures in order in a computing machine for modeling each of multiple blocks of a block diagram, the block diagram being capable of having at least one feedback loop, each said block corresponding to at least one of the software procedures for performing at least one function and comprising at least one input or at least one output, one or more of such block diagrams having interconnections for passage of representations between the inputs and the outputs of such blocks forming such block diagram, the at least one software procedure corresponding to each such block comprising an update output procedure which defines the representation for at least one of said outputs for such block as a function of the representation for at least one of said inputs for such block, or an update state procedure which defines at a current time a state for such block as a function of the representation for at least one of the inputs for such block at a prior time or an update output procedure which defines at a current time the representation for at least one of the outputs of such block as a function of either the current state or the representation for at least one of the inputs of the corresponding block, the method of ordering further comprising the steps of:

a) generating a list of any said input for each of such blocks;

b) generating a feed-through list for each of at least some of such outputs of such blocks, the feed-through list comprising a list of any said input which directly affects the output of the same block; and c) processing in the computing machine such input and feed-through lists for the one of the block diagrams for ordering of such procedures and comprising the step of determining the occurrence of a predetermined relation between any said input in the feed-through list and in the input list for one of such blocks in the one block diagram and, the step of selectively, depending on the occurrence of the predetermined relation, ordering one of an update state procedure that corresponds to the same block in the order relative to the other update state and update output procedures so that a representation of the input for such update state procedure will have been defined by one of said update output procedures previous in the order.

2. The method of claim 1 wherein the computing machine comprising a memory and wherein each of the steps of generating comprises the step of storing the respective lists in the memory and the step of processing comprises the step of using the computing machine for processing the input and feed-through lists from the memory for the step or ordering of such procedures.

3. The method of claim 1 wherein the step of determining the predetermined relation comprises the step of determining if all inputs in the input list for such one of said blocks are present in the feed-through list for the same said block.

4. The method of claim 1 wherein the step of determining the predetermined relation comprises the step of determining if no inputs are present in the feed-through list for such one of said blocks that are also present in the input list for the same said block.

5. The method of claim 4 wherein the step of determining the predetermined relation also comprises the step of determining if some inputs are present in the feed-through list for such one of said blocks that are also present in the input list for the same said block.

6. The method of claim 1 wherein such one of said blocks has more than one input and wherein the step of ordering comprises the step of ordering the update state and update output procedures in the order such that all inputs to such one of said blocks are defined by at least one update output procedure previous in the ordered procedures.

7. The method of claim 1 wherein the update state and the update output procedures each comprise a procedure call to a procedure for causing the computing machine to carry out the steps of the procedure.

8. The method of claim 7 wherein the method of machine ordering comprising ordering such procedures for modeling the block diagram and comprising the step of executing such ordered procedures for modeling the block diagram.

9. The method of claim 7 wherein the step of processing comprises the step of generating a sequence list indicative of the order in which such procedures are to be executed.

10. The method of claim 7 wherein the step of processing comprises the step of processing such procedures for each of such blocks in such order.

11. A method of claim 10 wherein the step of processing comprises the step of executing such procedures for each of such blocks in such order.

12. The method of claim 7 wherein said blocks of the block diagram comprise at least one said feedback loop and wherein the step of processing for ordering comprises the step of ordering the procedure for the block in the feedback loop in an order and determining if any such input to said block in the feedback loop cannot be defined by a procedure already in the order.

13. The method of claim 7 wherein the step of processing for ordering comprises the step of ordering procedure calls to the procedures.

14. The method of claim 7 wherein each of the steps or providing a list comprises the step of generating a list.

15. The method of claim 7 wherein there is a library of feed-through lists, at least one such feed-through list for each of a plurality of such blocks, stored in a memory and the step of providing the feed-through lists comprises the step of reading such feed-through lists from the library.

16. Means for ordering computer software procedures in an order for modeling in a computing machine, each of multiple blocks of a block diagram the block diagram being capable of having at least one feedback loop, each said block corresponding to at least one of the software procedures for performing at least one function and comprising at least one input or at least one output, one or more of such block diagrams having interconnections for passage of representations between the inputs and the outputs of such blocks forming the block diagram, the at least one software procedure corresponding to each such block comprising an update output procedure which defines the representation for at least one of said outputs for such block as a function of the representation for at least one of said inputs for such block, or an update state procedure which defines at a current time a state for such block as a function of the representation for at least one of the inputs for such block at a prior time or an update output procedure which defines at a current time the representation for at least one of the outputs of such block as a function of either the current state or the representation for at least one of the inputs of the corresponding block, the means for ordering, comprising:

a) means for generating a list of the inputs for each of such blocks;

b) means for generating at least one feed-through list for each of at least some of the such outputs of such blocks, the feed-through list comprising a list of any said input which directly affects the output of the same block; and c) a computing machine for processing each of such input and feed-through lists for the one of the block diagrams for ordering of such procedures and comprising means for determining the occurrence of a predetermined relation between any said input in the feed-through list and the input list for one of such blocks in the one block diagram and, means for selectively, depending on the occurrence of the predetermined relation, ordering one of the update state procedures that corresponds to the same block relative to the other update state and update output procedures in the order, so that a representation of the input for such update state procedure will have been define by one of said update output procedures previous in the order.

17. A method for ordering in a computer for machine processing, procedures representing each of multiple blocks of a block diagram, the block diagram being capable of having at least one feedback loop, each such block corresponding to at least one of the procedures for performing at least one function representative of such block and comprising at least one input or at least one output, said blocks having interconnections between the inputs and outputs of the blocks forming the block diagram, at least one such block being a delay block for use in the feedback loop having an input that directly effects an output of such block and at least one such block having an input that effects an output of such block after a delay, one of such block diagrams having interconnections for passage of representations between the inputs and outputs of such blocks forming such block diagram, the at least one procedure corresponding to each such block comprising an update output procedure which defines the representation for at least one of said outputs for such block as a function of the representation for at least one of said inputs for such block or, in the case of a delay block, an update state procedure which defines at a current time a state for such block as a function of the representation for at least one of the inputs for such block at a prior time or an update output procedure which defines at a current time the representation for at least one of the outputs of such delay block as a function of either the current state or the representation for at least one of the inputs of such delay block, the method of ordering comprising the steps of:

a) providing a list of each of any said input for each of such blocks;

b) providing in addition to the list of inputs, at least one feed-through list for each such delay block, the feed-through list comprising a list of each of any said input for such delay block which directly affects such output of the same delay block; and c) processing, in the computer, such input and feed-through lists for the one of the block diagrams for ordering of such procedures in an order for machine processing and comprising the step of determining the occurrence of a predetermined relation between any said input in the feed-through list and the input list for one of such blocks in the one block diagram and, the step of selectively, depending on the occurrence of the predetermined relation, ordering one of an update state procedures that corresponds to the same block in the order relative to the other update state and update output procedures so that a representation of the input for such update state procedure will have been defined by one of said update output procedures previous in the order.

18. The method of claim 17 wherein the step of processing comprises the step of generating a sequence list indicative of the order in which such procedures are to be executed for modeling.

19. A method of claim 18 wherein the procedures each comprise a procedure for causing a computing machine to carry out the step of the procedure and the step of processing further comprising the step of ordering the procedure calls to the procedures in the order specified by the sequence list.

20. A method of claim 19 comprising the further step of executing the procedures in such order, to determine representations for such inputs and outputs.

21. The method of claim 17 wherein the step of processing comprises the step of modeling the block diagram.

22. The method of claim 17 wherein the step of processing further comprises the step of processing such procedures for each of such blocks in the order.

23. The method of claim 17 wherein the step of determining in the step of processing comprises the step of determining if any such input in the feedback loop cannot be defined by such a prior procedure in the order.

24. The method of claim 17 wherein each of the steps of providing a list comprises the step of generating the corresponding list.

25. The method of claim 17 wherein there are memory storage areas accessible to the computer and wherein there is a library of said feed-through lists for each of a plurality of such blocks stored in the memory storage areas and the step of providing the feed-through lists comprises the step of reading such feed-through lists for each such delay block from the library.

26. The method of claim 25 wherein the step of providing such input lists comprises the step of reading a list of such input lists from the memory storage areas.

27. The method of claim 17 wherein the step of determining the predetermined relation comprises the step of determining if all inputs in the input list are present in the feed-through list for the same said block.

28. The method of claim 17 wherein the step of determining the predetermined relation comprises the step of determining if no inputs are present in the feed-through list that are present in the input list for the same said block.

29. The method of claim 28 wherein the step of determining the predetermined relation comprises the step of determining if some inputs are present in the feed-through list that are present in the input list for the same said block.

30. The method of claim 17 wherein the step of processing for ordering comprises the step of ordering such update output procedure for the delay block such that the update output procedure for such delay block is ordered previously in the order to the update state procedure for such delay block.

31. The method of claim 17 wherein at least one of the update state procedures and at least one of the update output procedures are each a function of more than one input to the corresponding block and wherein the step of processing for ordering comprises the step of ordering such update state and update output procedures in the order such that all inputs of which they are a function are defined by a prior said procedure in the order.

32. The method of claim 17 wherein the step of processing ordering comprises the step of adding to the order any said procedure after all of any such inputs of which such procedure is a function is defined by one said procedure already in the order.

33. The method of claim 32 wherein said blocks comprise at least one combined block having a corresponding combined procedure, said combined procedure having at least one such input that indirectly affects such an output of the combined block and at least one such input that affects one such output of the combined block after a delay, the method of processing for ordering procedures comprising the step of adding the feed-through procedure to the order after each of any such inputs of which said feed-through procedure is a function is defined by at least one said procedure that is already in the order, even though an input of which an update state procedure is a function for the same block has not been defined by a procedure in the order.

34. The method of claim 33 comprising the step of adding the update state procedure to the order after all of any such inputs of said update state procedure are defined by a procedure already in the order.

35. The method of claim 1 or 17 wherein the method comprises the step of assembling the procedures for subsequent processing by a computing machine.

* * * * *